(12) United States Patent
Hwang et al.

(10) Patent No.: US 10,753,546 B2
(45) Date of Patent: Aug. 25, 2020

(54) LIGHT MODULE AND LIGHTING DEVICE HAVING SAME

(71) Applicant: LG INNOTEK CO., LTD., Seoul (KR)

(72) Inventors: Seong Jin Hwang, Seoul (KR); Se Eun Kang, Seoul (KR); Jin Hee Kim, Seoul (KR); Gyeong Il Jin, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 62 days.

(21) Appl. No.: 16/098,645

(22) PCT Filed: Apr. 28, 2017

(86) PCT No.: PCT/KR2017/004594
§ 371 (c)(1),
(2) Date: Nov. 2, 2018

(87) PCT Pub. No.: WO2017/191954
PCT Pub. Date: Nov. 9, 2017

(65) Prior Publication Data
US 2019/0137046 A1  May 9, 2019

(30) Foreign Application Priority Data

May 4, 2016 (KR) .................. 10-2016-0055778
Aug. 30, 2016 (KR) .................. 10-2016-0111054
(Continued)

(51) Int. Cl.
*F21K 9/20* (2016.01)
*G02B 5/02* (2006.01)
(Continued)

(52) U.S. Cl.
CPC ............... *F21K 9/20* (2016.08); *F21K 9/61* (2016.08); *F21S 2/005* (2013.01); *F21S 43/14* (2018.01);
(Continued)

(58) Field of Classification Search
CPC ............ F21K 9/20; F21K 9/61; F21S 43/249
See application file for complete search history.

(56) References Cited

U.S. PATENT DOCUMENTS 5,899,552 A * 5/1999 Yokoyama ........... G02B 6/0038
349/62
6,196,691 B1   3/2001 Ochiai
(Continued)

FOREIGN PATENT DOCUMENTS

CN       1738991      2/2006
CN     101421557      4/2009
(Continued)

OTHER PUBLICATIONS

European Search Report dated Apr. 5, 2019 issued in Application No. 17792856.1.
(Continued)

*Primary Examiner* — Leah Simone Macchiarolo
(74) *Attorney, Agent, or Firm* — KED & Associates, LLP

(57) ABSTRACT

A lighting module disclosed in an embodiment comprises: a substrate; a light-emitting element arranged on the substrate; and a resin member arranged on the substrate and the light-emitting element. The resin member comprises a plurality of side surfaces and an exit surface on the upper portion thereof. The plurality of side surfaces of the resin member comprise a first side surface adjacent to the light emitting device, a second side surface facing the first side surface, and third and fourth side surfaces arranged between the first and second side surfaces so as to face each other. The exit surface of the resin member comprises a light extraction structure having a large length in a first direction and having a concavo-convex pattern in a second direction that is perpendicular to the first direction. The light emitting device comprises an exit area corresponding to a part of the second side surface in the first direction. The thickness of the
(Continued)

second side surface, in connection with the resin member, may be smaller than the thickness of the first side surface.

20 Claims, 54 Drawing Sheets

(30) Foreign Application Priority Data

Mar. 9, 2017 (KR) ........................ 10-2017-0030144
Mar. 9, 2017 (KR) ........................ 10-2017-0030165

(51) Int. Cl.

| | |
|---|---|
| *F21K 9/61* | (2016.01) |
| *F21S 43/245* | (2018.01) |
| *G02F 1/13357* | (2006.01) |
| *F21V 8/00* | (2006.01) |
| *F21S 43/239* | (2018.01) |
| *F21S 43/14* | (2018.01) |
| *F21S 43/249* | (2018.01) |
| *F21V 5/00* | (2018.01) |
| *F21S 2/00* | (2016.01) |
| *F21V 5/02* | (2006.01) |
| *F21V 7/22* | (2018.01) |
| *F21Y 103/10* | (2016.01) |
| *F21Y 103/00* | (2016.01) |

(52) U.S. Cl.
CPC ........... *F21S 43/239* (2018.01); *F21S 43/245* (2018.01); *F21S 43/249* (2018.01); *F21V 5/005* (2013.01); *F21V 5/02* (2013.01); *F21V 7/22* (2013.01); *G02B 5/02* (2013.01); *G02B 6/008* (2013.01); *G02B 6/0046* (2013.01); *G02F 1/133603* (2013.01); *F21Y 2103/00* (2013.01); *F21Y 2103/10* (2016.08); *G02B 6/0021* (2013.01); *G02B 6/0038* (2013.01); *G02F 2001/133607* (2013.01)

(56) References Cited

U.S. PATENT DOCUMENTS

| | | | | |
|---|---|---|---|---|
| 6,241,358 B1* | 6/2001 | Higuchi | ................ | G02B 6/008 362/613 |
| 8,405,796 B2* | 3/2013 | Masuda | ............ | G02F 1/133606 349/64 |
| 9,625,638 B2* | 4/2017 | Durkee | ................ | G02B 6/0038 |
| 2001/0017774 A1* | 8/2001 | Ito | ........................ | G02B 6/0031 362/613 |
| 2001/0053072 A1* | 12/2001 | Takemoto | ......... | G02F 1/133606 362/613 |
| 2004/0090764 A1 | 5/2004 | Niida et al. | | |
| 2006/0044825 A1 | 3/2006 | Sa | | |
| 2007/0189701 A1 | 8/2007 | Chakmakjian et al. | | |
| 2008/0037284 A1 | 2/2008 | Rudisill | | |
| 2009/0168441 A1 | 7/2009 | Lin et al. | | |
| 2010/0002465 A1 | 1/2010 | Tsang et al. | | |
| 2010/0296026 A1* | 11/2010 | Kubota | ................ | G02B 6/0068 349/62 |
| 2011/0012942 A1* | 1/2011 | Kim | ..................... | G02B 6/0016 345/690 |
| 2011/0050558 A1 | 3/2011 | Park et al. | | |
| 2012/0182756 A1* | 7/2012 | Chang | .................... | G02B 6/002 362/555 |
| 2013/0343061 A1 | 12/2013 | Liao et al. | | |
| 2014/0192557 A1 | 7/2014 | Lu et al. | | |
| 2015/0003060 A1 | 1/2015 | Bijlsma et al. | | |
| 2015/0155330 A1 | 6/2015 | Oh et al. | | |
| 2015/0184829 A1 | 7/2015 | Baek et al. | | |
| 2015/0331169 A1 | 11/2015 | Jang et al. | | |

FOREIGN PATENT DOCUMENTS

| | | |
|---|---|---|
| CN | 101469844 | 7/2009 |
| CN | 102695913 | 9/2012 |
| CN | 103511911 | 1/2014 |
| CN | 104115050 | 10/2014 |
| EP | 2 860 775 | 4/2015 |
| KR | 10-2014-0090056 | 7/2014 |
| WO | WO 2011/049373 | 4/2011 |
| WO | WO 2015/174728 | 11/2015 |

OTHER PUBLICATIONS

Chinese Office Action dated Dec. 2, 2019 issued in Application No. 201780041845.7.
International Search Report (with English Translation) and Written Opinion dated Aug. 11, 2017 issued in Application No. PCT/KR2017/004594.
Chinese Office Action dated May 15, 2020 issued in Application No. 201780041845.7.
European Office Action dated Jun. 22, 2020 issued in Application No. 17792856.1.

* cited by examiner

FIG. 95
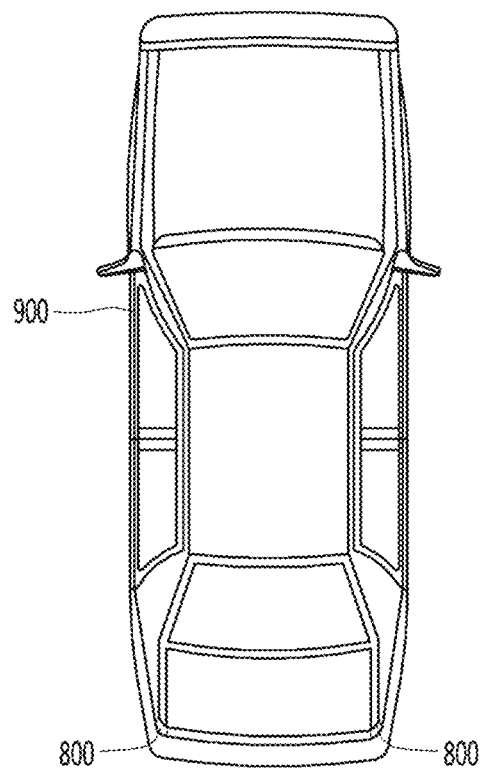
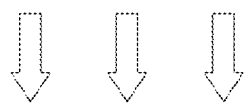
FIG. 96
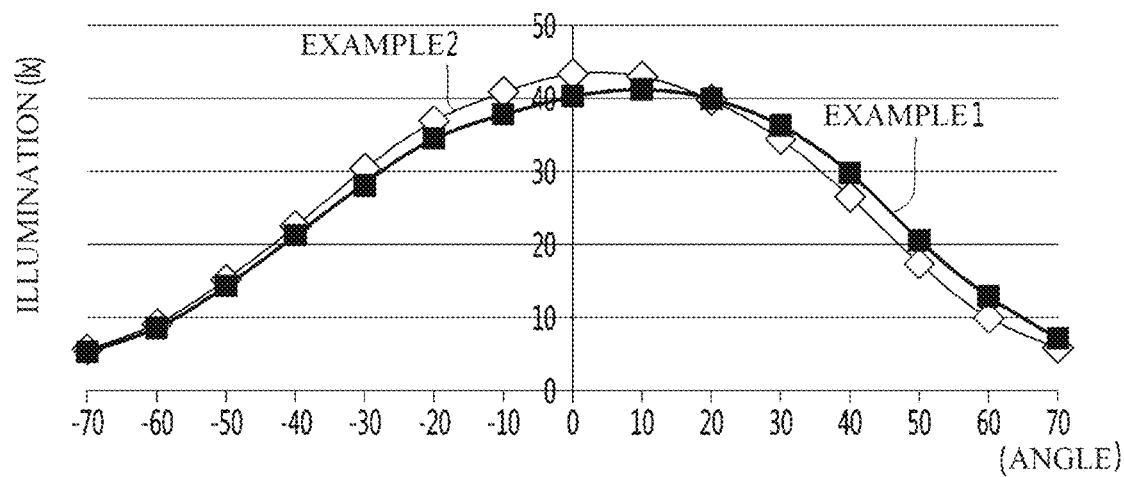

LIGHT MODULE AND LIGHTING DEVICE HAVING SAME

CROSS-REFERENCE TO RELATED PATENT APPLICATIONS

This application is a U.S. National Stage Application under 35 U.S.C. § 371 of PCT Application No. PCT/KR2017/004594, filed Apr. 28, 2017, which claims priority to Korean Patent Application No. 10-2016-0055778, filed May 4, 2016, Korean Patent Application No. 10-2016-0111054, filed Aug. 30, 2016, Korean Patent Application No. 10-2017-0030144, filed Mar. 9, 2017, and Korean Patent Application No. 10-2017-0030165, Mar. 9, 2017, whose entire disclosures are hereby incorporated by reference.

TECHNICAL FIELD

Embodiment relates to a lighting module to provide a surface light source which has a plurality of light emitting diode.

Embodiment relates to a lighting device having a lighting module.

Embodiment relates to a backlight unit, a liquid crystal display device, a vehicle lamp having a lamp module.

BACKGROUND ART

Conventional lighting applications include not only a vehicle lighting but also a backlight for a display and a signage.

A light emitting device, for example, a light emitting diode (LED) has advantages such as low power consumption, semi-permanent lifetime, fast response speed, safety, environmental friendliness compared to conventional light sources such as fluorescent lamps and incandescent lamps. Such an LED has been applied to various lighting devices such as various display devices, indoor lights or outdoor lights, or the like.

Recently, a lamp employing an LED has been proposed as a vehicle light source. Compared to incandescent lamps, an LED has an advantage in low power consumption. However, since an emitting angle of light emitted from an LED is small, when the LED is used as a vehicle lamp, it is required to increase a light emitting area of a lamp using the LED.

Since a size of an LED is small, it is possible to increase a degree of freedom of design of a lamp, and the LED has economic efficiency due to the semi-permanent lifetime.

DISCLOSURE

Technical Problem

An embodiment provides a lighting device having a resin member for a surface light source.

An embodiment provides a lighting module with improved light extraction efficiency and light distribution characteristics.

An embodiment provides a lighting module having a resin member that covers a plurality of light emitting devices and has a light extraction structure disposed at an upper portion thereof.

An embodiment provides a lighting module having a reflective member disposed at a lower portion of a resin member covering a plurality of light emitting devices.

An embodiment provides a lighting module in which a pattern of a light extraction structure disposed at an upper portion of a resin member is arranged in a direction orthogonal to or in the same direction as an arrangement direction of the light emitting devices.

An embodiment provides a lighting module in which a resin member having a light extraction structure at an upper portion thereof has the same thickness or a region far from a light emitting device has a thin thickness.

An embodiment provides a lighting module in which a resin member having a light extraction structure has a gradually thinner thickness as it is farther from an exit surface of a light emitting device.

An embodiment provides a lighting module having a reflective portion and a light extraction structure at an exit surface of a resin member covering a light emitting device.

An embodiment provides a lighting module having a protrusion portion covering a light emitting device in a resin member.

An embodiment provides a lighting module having a protrusion portion covering a light emitting device in a resin member and a curved surface between the convex portion and a light exit structure.

An embodiment provides a lighting module having a protrusion portion and a recess corresponding to the protrusion portion on opposite sides of a resin member.

An embodiment provides a light emitting cell or a lighting module having a protrusion portion covering a light emitting device in a resin member, a reflective portion with a curved surface and an exit portion having a light extraction structure.

An embodiment provides a lighting module in which a recess and a protrusion portion which are coupled to each other in resin members separated from each other are disposed and a lighting device having the same.

An embodiment provides a lighting module in which light extraction structures having a different size or shape from each other are disposed at an exit surface of a resin member covering a light emitting device.

An embodiment provides a lighting module in which a plurality of concave portions and/or convex portions are disposed at an exit surface of a resin member covering a light emitting device.

An embodiment provides a lighting module in which concave curved surfaces disposed at an exit surface of a resin member reflect or transmit light incident from a light emitting device, thereby improving central luminous intensity.

An embodiment provides a lighting module in which a concave reflective region of a resin member reflects or transmits light incident from a light emitting device, thereby improving central luminous intensity.

An embodiment provides a light emitting cell or a lighting module having a reflective member that reflects light emitted from a light emitting device between a resin member and a substrate.

An embodiment provides a lighting module in which light emitting cells having a light emitting device and a resin member are arranged in one direction and a lighting device having the same.

An embodiment provides a lighting module irradiating a surface light source and a lighting device having the same.

An embodiment may provide a vehicle lamp having a lighting module irradiating a surface light source.

An embodiment may provide a backlight unit or a liquid crystal display device having a lighting module irradiating a surface light source.

Technical Solution

A lighting module according to an embodiment includes: a substrate; a light emitting device disposed on the substrate; and a resin member disposed on the substrate and the light emitting device, wherein the resin member includes a plurality of side surfaces and an exit surface on an upper portion thereof, the plurality of side surfaces of the resin member include a first side surface adjacent to the light emitting device, a second side surface facing the first side surface, and a third side surface and a fourth side surface disposed between the first and second side surfaces and facing each other, and the exit surface of the resin member includes a light extraction structure having a long length in a first direction and having a concavo-convex pattern in a second direction orthogonal to the first direction, the light emitting device includes an emitting region corresponding to a portion of the second side surface in the first direction, and a thickness of the second side surface may be smaller than that of the first side surface in the resin member.

A lighting module according to an embodiment includes: a substrate; a light emitting device disposed on the substrate; and a resin member disposed on the light emitting device, wherein the resin member includes a side surface and an exit surface on an upper portion thereof, the side surface of the resin member includes a first side surface adjacent to the light emitting device, a second side surface facing the first side surface, a third side surface disposed between the first and second side surfaces, and a fourth side surface facing the third side surface, the exit surface of the resin member includes a plurality of concave portions with a concave curved surface and a convex portion disposed between the concave portions, the concave portion has a longer length in a first direction and disposed in plural in a second direction from the first side surface toward the second side surface of the resin member, the exit surface of the resin member includes a first region including a concave portion adjacent to the first side surface and at least a portion of which is overlapped with the light emitting device in a vertical direction, a second region including a region in which a virtual straight line connecting at least two uppermost ends of the convex portions is inclined, a third region including at least one concave portion disposed between the second region and the second side surface, and a fourth region including at least one concave portion disposed between the third region and the second side surface, and in the third region, a distance between the substrate and the uppermost end of the convex portion adjacent to the second region may be smaller than a distance between the substrate and the uppermost end of the convex portion adjacent to the fourth region.

A lighting module according to an embodiment includes: a substrate; a light emitting device disposed on the substrate; and a resin member disposed on the light emitting device, wherein the resin member includes a side surface and an exit surface on an upper portion thereof, the side surface of the resin member includes a first side surface adjacent to the light emitting device, a second side surface facing the first side surface, a third side surface disposed between the first and second side surfaces, and a fourth side surface facing the third side surface, the exit surface of the resin member includes a light extraction structure having a long length in a first direction and a concavo-convex pattern in a second direction orthogonal to the first direction, the exit surface of the resin member includes a first region at least a portion of which is overlapped with the light emitting device in a vertical direction, a second region including a concave portion having a predetermined depth in a direction of the substrate between the first region and the second side surface, and a third region disposed between the second region and the second side surface, the light extraction structure disposed in the first region has a long length in the first direction and is disposed in the second direction, the second region has a height lower than a height of an uppermost end of the first region, the concave portion of the second region includes a first reflective surface having a surface inclined in a direction toward the substrate, and a second reflective surface having a surface inclined in a direction away from the substrate, the first and second reflective surfaces have a long length in the first direction, and the light extraction structure disposed in the third region has a long length in the first direction and is disposed in the second direction, and a lowermost end of the concave portion may be higher than an upper surface of the light emitting device and may not be overlapped with the light emitting device and the substrate in the vertical direction.

According to an embodiment, a boundary portion between the first and second reflective surfaces of the second region may be a low point of the second region, a distance between a straight line perpendicular to the low point of the second region and an emitting region of the light emitting device may be a, and when a distance between a straight line horizontal to the low point of the second region and the upper surface of the light emitting device is b, a ratio of the a:b may be in a range from 1:1 to 1:2~2:1 to 1:1, and a maximum value of the a, b may be less than or equal to a thickness of the light emitting device.

According to an embodiment, a thickness of the resin member may become gradually smaller as it is farther from the light emitting device, or a distance from the substrate may become gradually smaller.

According to an embodiment, the resin member may be arranged in plural in the first direction on the substrate, and the light emitting device may be disposed in each of the resin members, and the light emitting devices disposed in the plurality of resin members may be disposed in the first direction.

According to an embodiment, at least one of a multilayered reflective member and a single-layered reflective layer is disposed between the resin member and the substrate.

According to an embodiment, the resin member may include a first region in which the light emitting device is disposed, and a second region between the first region and the second side surface, and the light extraction structure may be disposed on the first and second regions, and the light extraction structure of the second region may have a gradually lower height as it is farther from the light emitting device.

According to an embodiment, the resin member may include adjacent first and second resin members, the light emitting device may include a first light emitting device disposed adjacent to a first side surface of the first resin member and a second light emitting device disposed adjacent to a first side surface of the second resin member, and the first and second resin members may include a protrusion portion covering the first and second light emitting devices.

According to an embodiment, the first resin member may have a concave recess in a direction of the first light emitting device from the second side surface, a protrusion portion of the second resin member may be disposed in the recess of the first resin member, and an upper surface of the protrusion portion may have a rough surface.

According to an embodiment, the exit surface of the resin member may include a first region adjacent to the first side surface, a second region overlapped with the light emitting device in the vertical direction, and a third region between the second region and the third side surface, the second region may include at least one of a concave portion and a convex portion, the concave portion having a concave curved surface and a long length in the second direction of the resin member, and the second region may be disposed lower than an upper surface of the first region.

According to an embodiment, the exit surface of the resin member may include a plurality of concave portions having a concave curved surface and a convex portion disposed between the concave portions, the concave portions may have a long length in the first direction, and be alternately arranged in the second direction from the first side surface toward the second side surface of the resin member, the exit surface of the resin member may include a first region including a concave portion adjacent to the first side surface and at least a portion of which is overlapped with the light emitting device in the vertical direction, a second region including a region in which a virtual straight line connecting at least two uppermost ends of the convex portions is inclined, a third region including at least one concave portion disposed between the second region and the second side surface, and a fourth region including at least one concave portion disposed between the third region and the second side surface.

According to an embodiment, in the third region, a distance between the substrate and the uppermost end of the convex portion adjacent to the second region may be smaller than a distance between the substrate and the uppermost end of the convex portion adjacent to the fourth region, and a height of the convex portion disposed in the first region may be higher than a height of the convex portion disposed in the third region, and the convex portion disposed in the fourth region may have a gradually lower height as it is adjacent to the second side surface of the resin member.

According to an embodiment, the exit surface of the resin member may include a first region at least a portion of which is overlapped with the light emitting device in the vertical direction, a second region including a concave portion having a predetermined depth in the direction of the substrate between the first region and the second side surface, and a third region disposed between the second region and the second side surface, wherein the light extraction structure disposed in the first region may have a long length in the first direction and be disposed in the second direction, the second region may have a height lower than a height of an uppermost end of the first region, the concave portion of the second region may include a first reflective surface having a surface inclined in the direction toward the substrate, and a second reflective surface having a surface inclined in the direction away from the substrate, wherein the first and second reflective surfaces may have a long length in the first direction, and the light extraction structure disposed in the third region may have a long length in the first direction and be disposed in the second direction, and the lowermost end of the concave portion may be higher than the upper surface of the light emitting device and may not be overlapped with the light emitting device and the substrate in the vertical direction.

Advantageous Effects

According to a lighting module according to an embodiment, luminous intensity of a surface light source may be improved.

According to an embodiment, a lighting module can improve central luminous intensity of a surface light source emitted from each light emitting cell.

According to a lighting module according to an embodiment, light uniformity of a surface light source may be improved.

An embodiment can reduce a loss of light and may disperse light by using a light emitting device and a resin member having a light extraction structure on a substrate.

An embodiment has an effect of preventing a hot spot by disposing a reflective portion in a region of a resin member adjacent to a light emitting device.

An embodiment can reduce a difference in luminous intensity in a region between adjacent resin members by overlapping adjacent resin members with a structure of a recess and a protrusion portion.

According to an embodiment, it is possible to reduce a loss of light and disperse light by disposing concave curved surfaces in different exit regions of a resin member covering a light emitting device.

An embodiment has an effect of preventing a hot spot by disposing a concave curved surface in an exit region of a resin member covering a light emitting device.

An embodiment may improve luminous efficiency and light distribution characteristics of light emitting cells.

An embodiment may improve optical reliability of a lighting module according to an embodiment and a lighting device having the same.

An embodiment may improve reliability of a vehicle lighting device having a lighting module according to an embodiment.

An embodiment can be applied to a backlight unit having a lighting module, various display devices, a surface light source lighting device, and a vehicle lamp.

An embodiment may improve optical reliability of a lighting module according to an embodiment and a lighting device having the same.

DESCRIPTION OF DRAWINGS

FIG. 95 is a plan view of a vehicle in which the vehicle lamp of FIG. 94 is applied.

FIG. 96 is a view showing the brightness of the lighting device according to the fifth embodiment and the sixth embodiment.

MODES OF THE INVENTION

Figure 1:
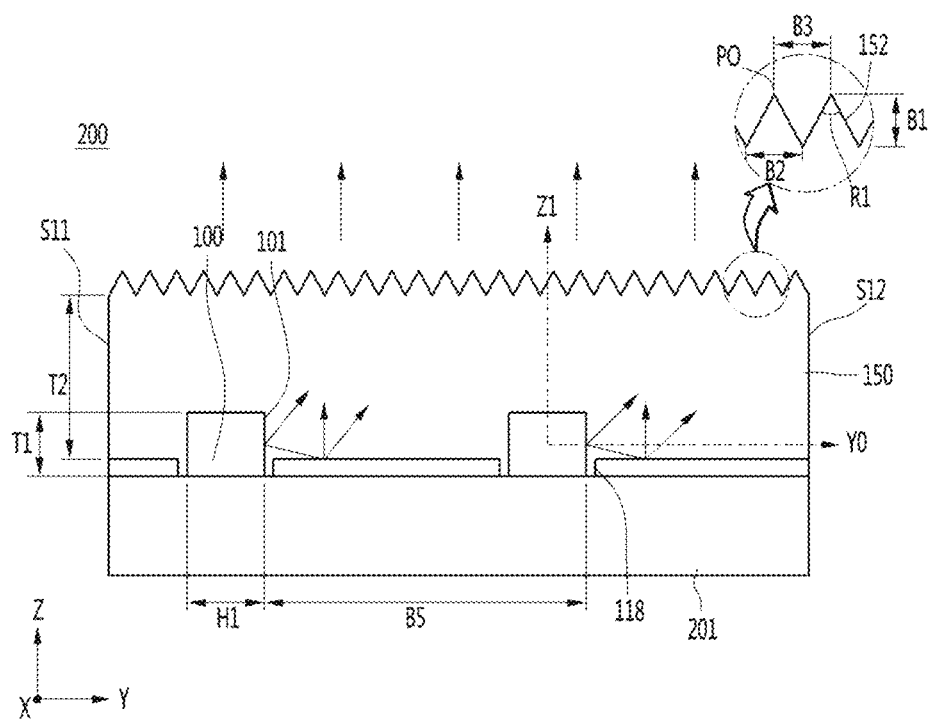
FIG. 1 is a side cross-sectional view illustrating a lighting module according to the first embodiment.

Hereinafter, preferred embodiments of the present invention will be described in detail with reference to the accompanying drawings, in which a person having ordinary skill in the art to which the present invention pertains can easily implement the present invention. However, it should be understood that embodiments described in the specification and configurations illustrated in the drawings are merely a preferred embodiment of the present invention, and there are various equivalents and modifications that can substitute the embodiments and configurations at the time of filing the present application.

In describing operating principles of a preferred embodiment of the present invention in detail, when detailed description of a known function or configuration is deemed to unnecessarily blur the gist of the present disclosure, the detailed description will be omitted. Terms to be described below are defined as terms defined in consideration of functions of the present invention and meaning of each term should be interpreted based on the contents throughout the specification. The same reference numerals are used for parts having similar functions and actions throughout the drawings.

A lighting device according to the present invention may be applied to various lamp devices requiring lighting, for example, a vehicle lamp, a home lighting device, or an industrial lighting device. For example, when a lighting device is applied to a vehicle lamp, it may be applied to a head lamp, a side mirror lamp, a fog lamp, a tail lamp, a stop lamp, a side marker lamp, a daytime running light, a vehicle interior lighting, a door scarf, rear combination lamps, a backup lamp, and the like. The lighting device of the present invention may also be applied to indoor and outdoor advertisement apparatus fields, and also may be applicable to all other lighting-related fields and advertisement-related fields that are currently being developed and commercialized or that may be implemented by technological development in the future.

Hereinafter, embodiments will be shown more apparent through the description of the appended drawings and embodiments. In the description of the embodiments, in the case in which each layer (film), area, pad or pattern is described as being formed "on" or "under" each layer (film), area, pad or pattern, the "on" and "under" include both of forming "directly" and "indirectly". Also, the reference for determining "on" or "under" each layer will be described based on the figures.

First Embodiment

Figure 2:
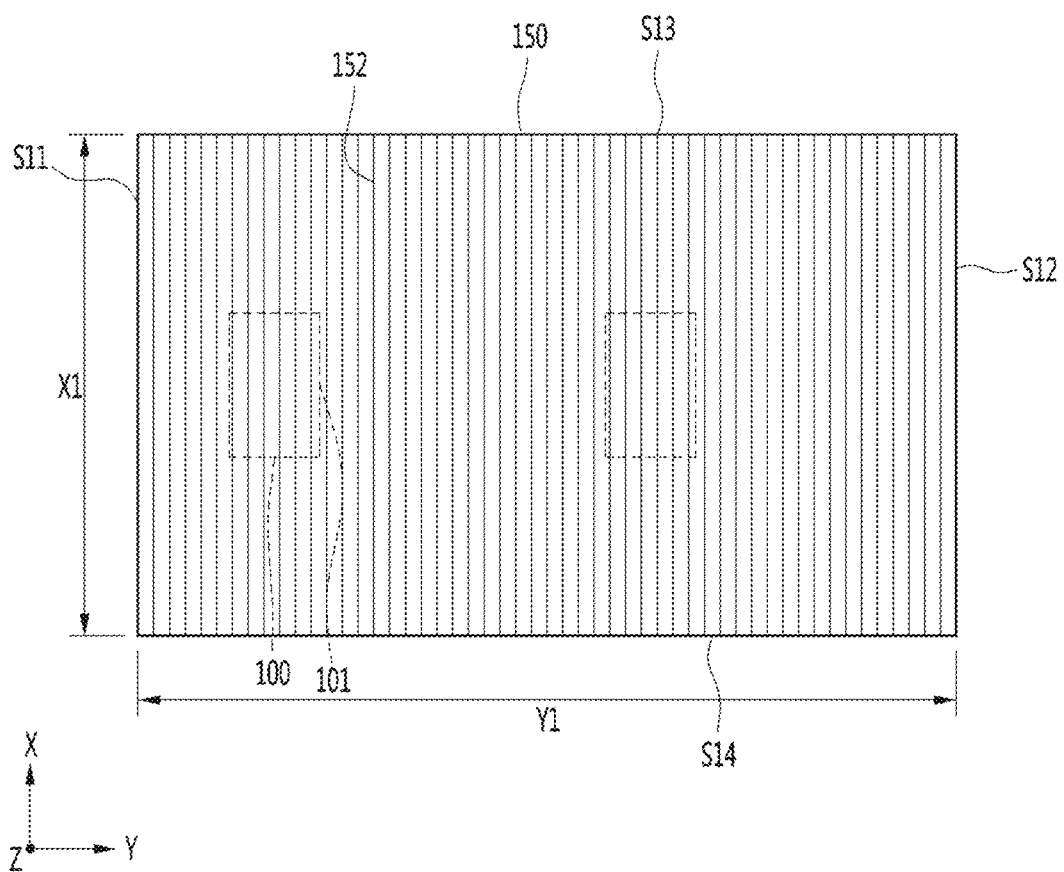
FIG. 2 is an example of a plan view of the lighting module of FIG. 1.

FIG. 1 is a side cross-sectional view of a lighting module according to a first embodiment, and FIG. 2 is another example of the lighting module of FIG. 1.

Referring to FIGS. 1 and 2, a lighting module 200 according to an embodiment includes a substrate 201, a plurality of light emitting devices 100 disposed on the substrate 201, and a resin member 150 covering the substrate 201 and the light emitting devices 100, and a reflective member 110 disposed between the resin member 150 and the substrate 201.

The substrate 201 includes a printed circuit board (PCB). The substrate 201 may include, for example, a resin-based circuit board (PCB), a metal core (Metal Core) PCB, a flexible PCB, a ceramic PCB, and a FR-4 substrate. When the substrate 201 is disposed in a metal core PCB disposed with a metal layer on a bottom, a heat dissipation efficiency of the light emitting device 100 can be improved. The substrate 201 may be a flexible substrate or a non-flexible substrate.

The substrate 201 comprises a wiring layer (not shown) at an upper portion thereof, the wiring layer may be electrically connected to the plurality of light emitting devices 100. The plurality of light emitting devices 100 may be connected in series, in parallel, or a series-parallel by the wiring layer, but the embodiment is not limited thereto. The substrate 201 may function as a base member located on a base of the light emitting device 100 and the reflective member 110.

An upper surface of the substrate 201 has an X-axis and Y-axis plane, and a thickness of the substrate 201 may be a height of a Z direction perpendicular to X-axis and Y-axis. Here, a Y direction is a first direction, an X direction is a second direction perpendicular to the Y axis, and the Z direction may be a third direction perpendicular to the X and Y axes. A length of the Y direction and a length of the X direction of the substrate 201 is the same or different from each other, for example, the length of the Y direction may be longer than the length in the X direction.

Figure 92:
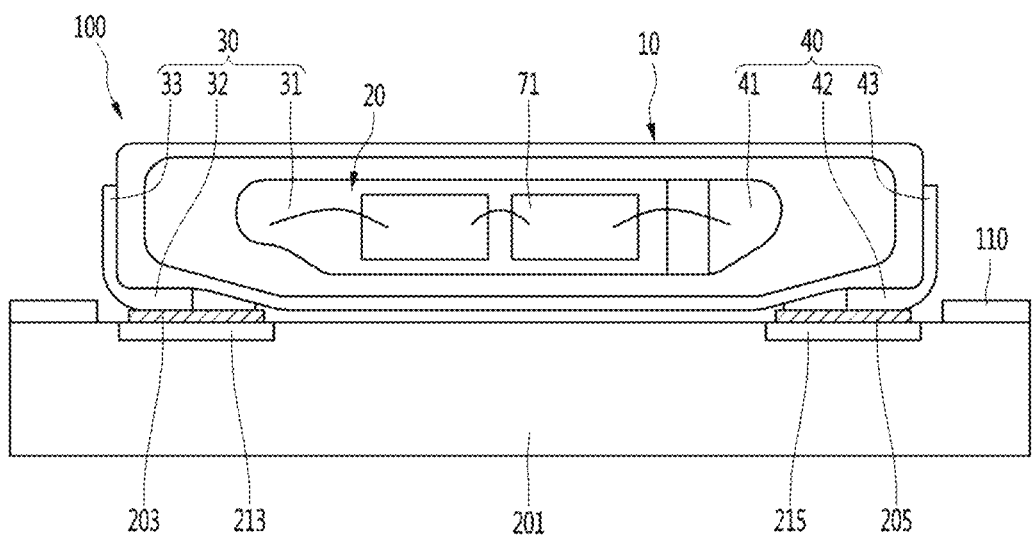
FIG. 92 is a front view of the light emitting device in FIG. 90 disposed on a substrate.
Figure 93:
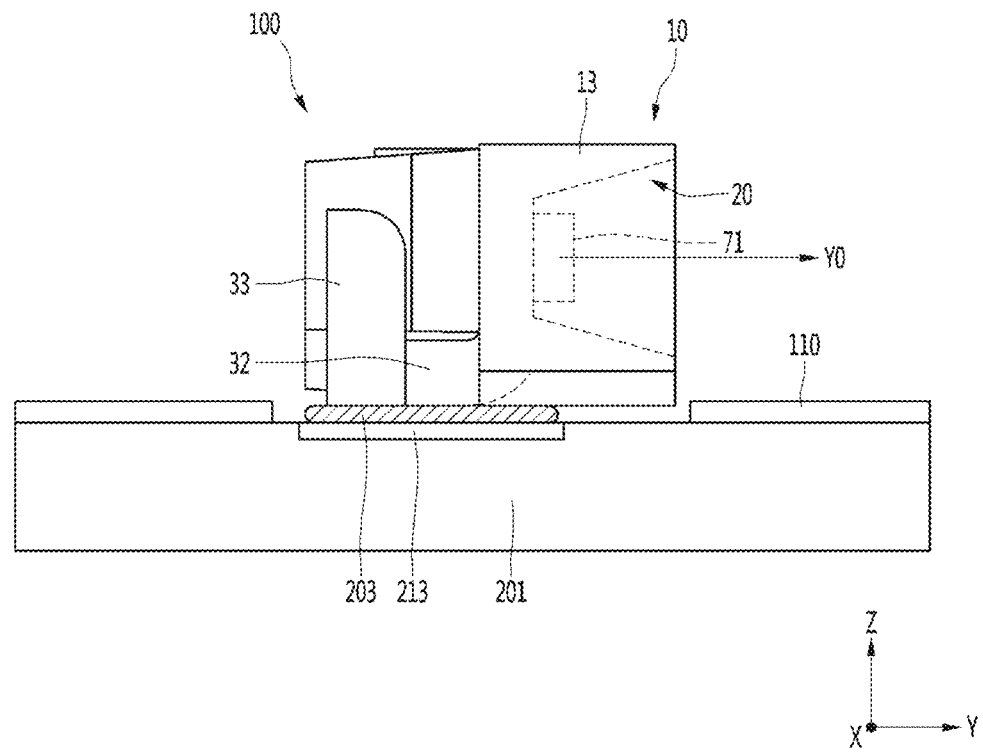
FIG. 93 is a side view of the light emitting device of FIG. 92 disposed on a substrate.

As shown in FIG. 92 and FIG. 93, the light emitting device 100 may be disposed on the substrate 201. The plurality of light emitting device 100 may be arranged in a predetermined distances B5 on the substrate 201, or may be arranged in a different distance to each other. The light emitting devices 100 is arranged at least one column, two columns or more on the substrate 201, and the first column or the second column or more of the light emitting devices 100 is disposed in a length direction of the substrate 201, that is, may be disposed in a first direction Y. For convenience of description, the embodiment will be described as an example in which the plurality of light emitting devices 100 are arranged in one column in the first direction Y. The distance between the light emitting devices 100 may have a 100 mm or less, for example, in a range of 5 mm to 100 mm or in a range of 10 mm to 40 mm. If the distance B5 between adjacent light emitting devices 100 is more than the above range, it is difficult to control a desired amount of light or light uniformity.

The light emitting device 100 is a device having a light emitting diode (LED) and includes an LED chip or a package which is packaged with the LED chip, and the LED chip may emit at least one of a blue light, a red light, a green light, an ultraviolet (UV) light. The light emitting device may emit light in a white, blue, red, at least one of green. The light emitting device 100 may be a side view type which a bottom portion of the light emitting device is electrically connected to the substrate 201, but the embodiment is not limited thereto. As another example, the light emitting device 100 may be a LED chip, but the embodiment is not limited thereto. A plurality of light emitting devices 100 disposed in the lighting module may emit light of the same color to each other. The plurality of light emitting devices 100 may emit light of a single color in one direction.

An emitting region 101 of the light emitting device 100 may be disposed on a surface adjacent to the substrate 201, for example, on a side surface adjacent to an upper surface of the substrate 201. The emitting region 101 is disposed to a side surface between a bottom surface and an upper surface of the light emitting device 100 and emits light in the first direction Y. The emitting region 101 of the light emitting device 100 is a surface adjacent to the reflective member 110, or may be a surface perpendicular to the upper surface of the substrate 201 and/or the upper surface of the reflective member 110.

The optical axis Y0 of light emitted through the emitting region 101 of the light emitting device 100 is in a direction parallel with the upper surface of the substrate 201, or may be tilted within a range of 30 degrees or less with respect to a horizontal axis to the upper surface of the substrate 201. The optical axis Y0 may be a horizontal light emitted from the light emitting device 100 or a direction orthogonal to an upper surface of the LED chip in the light emitting device 100. The light emitting device 100 may have a wide light-oriented angle in the ±X direction than the light-oriented angle in the ±Z direction. The light-oriented angle in the ±X direction of the light emitting device 100 may be a 110 degrees or more, for example, in a range of 120 degrees to 160 degrees or may be a 140 degrees or more. The light-oriented angle in the ±Z direction of the light emitting device 100 may be 110 degrees or more, for example, in a range of 120 degrees to 160 degrees.

A thickness T1 of the light emitting device 100 may be smaller than the length of the first and second direction X, for example, may be 3 mm or less, for example, may be 2 mm or less. The length of the second direction of the light emitting device 100 may be at least 1.5 times the thickness T1 of the light emitting device 100, but the embodiment is not limited thereto. The light emitting device 100 may be wider the light emitting angle of the second direction than the light emitting angle of the third direction Z. The light emitting angle of the second direction X of the light emitting device 100 may have in a range of 110 degrees to 160 degrees.

The reflective member 110 may be disposed on the substrate 201. The reflective member 110 may have an area equal to or smaller than an area of the upper surface of the substrate 201. The reflective member 110 may be spaced from an edge of the substrate 201. The resin member 150 may be in contact with the upper surface of the edge region of the substrate 201. When the resin member 150 is in contact with the upper surface of the edge region of the substrate 201, a moisture penetration may be suppressed.

A hole 118 through which a portion of the light emitting device 100 is inserted may be disposed in the reflective member 110. The upper surface of the substrate 201 may be exposed to the hole 118 of the reflective member 110 and a lower portion of the light emitting device 100 may be bonded to the hole 118 of the reflective member 110. The size of the hole 118 may be equal to or larger than the size of the light emitting device 100, but is not limited thereto. The plurality of holes 118 of the reflective member 110 may be disposed at a position corresponding to each of the light emitting devices 100. The reflective member 110 may be in contact with the upper surface of the substrate 201 or may be bonded by the resin member 150, but the invention is not limited thereto.

Figure 7:
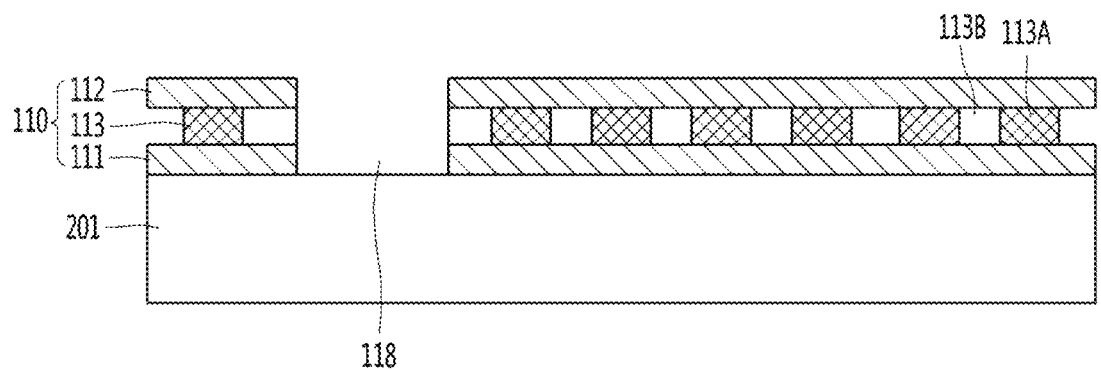
FIG. 7 is a side cross-sectional view of the reflective member of the lighting module according to an embodiment.
Figure 8:
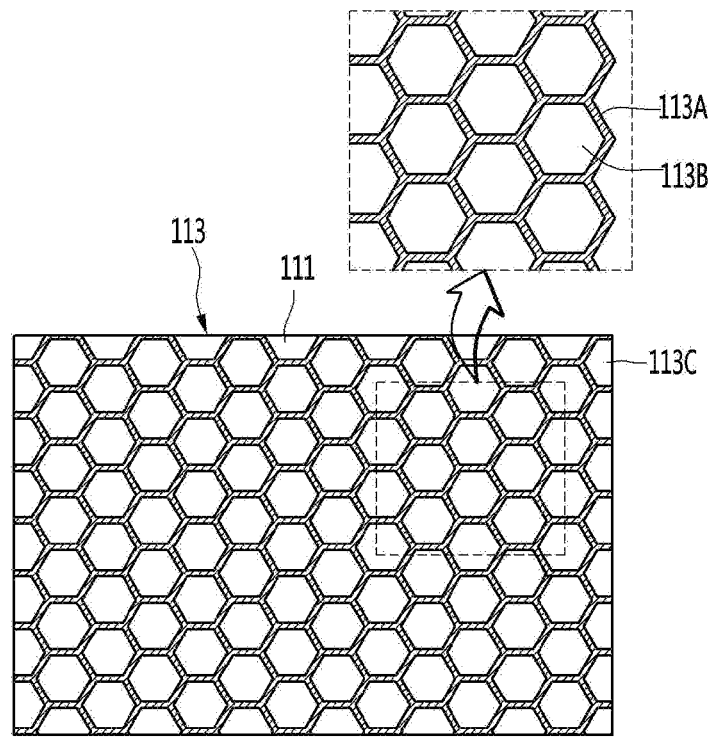
FIG. 8 is an example of a reflection pattern of the reflective member of FIG. 7.

As shown in FIGS. 7 and 8, the reflective member 110 may have a multi-layer structure having different materials. The reflective member 110 includes a reflective layer 111 disposed on the substrate 201, a transmissive layer 112 disposed on the reflective layer 111, and a reflective pattern 113 disposed between the reflective layer 111 and the transmissive layer 112. The reflective member 110 may be a reflective film.

The reflective layer 111 may include a light reflecting material such as a metal or a non-metallic material. In the case of a metal, a metal layer such as Ag may be disposed. In the case of a non-metallic material, the reflective layer 111 may include a plastic material. The transmissive layer 112 is a transparent film and may be made of a resin material such as silicone or epoxy or a transparent plastic material such as polyethylene terephthalate (PET), polyvinyl chloride (PVC), and urethane.

As shown in FIGS. 7 and 8, the reflective pattern 113 may be disposed between the reflective layer 111 and the transmissive layer 112. The reflective layer 111 and the transmissive layer 112 may be spaced apart from each other by a predetermined gap. An air gap 113B may be formed between the reflective layer 111 and the transmissive layer 112. The air gap 113B may be disposed in a region between the reflective patterns 113. The air gap 113B or the reflective pattern 113 may be disposed on an outer circumference between the reflective layer 111 and the transmissive layer 112. The reflective pattern 113 may be adhered to the reflective layer 111 and the transmissive layer 112. As another example, the transmissive layer 112 may be in contact with the reflective layer 111 through a region between the reflective patterns 113.

The reflective layer 111 and the reflective pattern 113 reflect light incident through the transmissive layer 112, and the reflected light may be extracted through the resin member 150. The reflective pattern 113 may be formed to the surface of the reflective layer 111 through white printing or silk screen printing. The reflective pattern 113 may reflect the incident light. The reflective pattern 113 may improve the brightness in the entire region by dispersing the incident light. The reflective pattern 113 may include a metal oxide, for example, a material such as $TiO_2$, $CaCO_3$, $BaSO_4$, or $Al_2O_3$, or may be printed using an ink including at least one of silicon or polysilicon (PS). The reflective pattern 113 may be formed of, for example, a material in which a metal oxide is added to silicon or epoxy. The pattern density of the reflective pattern 113 may gradually increase as a distance from the light emitting device 100 increases. The unit structure 113A of the reflective pattern 113 may have a polygonal shape, a circular shape, an elliptical shape, a regular or irregular shape, and may be formed in two dimensions or three dimensions. The unit structure 113A of the reflective pattern 113 may have a hexagonal shape having an air gap 113B formed therein. The reflective patterns 113 may be arranged such that the unit structures 113A are densely arranged to each other or an air gap 113C may be disposed in a region where the groups of the reflective patterns 113 are spaced from each other. By reflecting the light by the reflective pattern 113 and the reflective layer 111, the number of the light emitting devices 100 may be reduced and the light uniformity in the entire region may be improved. Since the reflective member 110 is disposed on the bottom of the resin member 150, the thickness (T2 in FIG. 1) of the resin member 150 may be reduced. Since the reflective member 110 is disposed on the bottom of the resin member 150, the thickness of the resin member 150 may become thinner as a distance from the light emitting device is increased.

The resin member 150 may be disposed on the substrate 201. The resin member 150 may be formed of an insulating material and a transparent material. The resin member 150 may be disposed on an entire upper surface or a portion of the upper surface of the substrate 201. The resin members 150 may be disposed on the upper surface of the substrate 201, or may be arranged in a plurality of unit sizes. The upper surface area of the resin member 150 may be the same as or different from the upper surface area of the substrate 201. The resin member 150 may be formed of a transparent material having a thickness T2 that is thicker than the thickness T1 of the light emitting device 100. The resin member 150 may include a resin material such as silicon or epoxy. The resin member 150 may include a thermosetting resin material and may optionally include PC, OPS, PMMA, PVC, and the like. The resin member 150 may be formed of glass, but is not limited thereto. For example, a main material of the resin member 150 may further include a monomer in which isobornyl acrylate (IBOA), hydroxybutyl acrylate (HBA), and hydroxy metaethyl acrylate (HEMA), which are low boiling point diluent type reactive monomers, are mixed, and as an additive, a photo initiator (for example, 1-hydroxycyclohexyl phenyl-ketone, Diphenyl), Diphenyl (2,4,6-trimethylbenzoyl phosphine oxide), an antioxidant or the like may be mixed.

The resin member 150 may include a bead (not shown), and the bead may diffuse and reflect incident light to increase the amount of light. The beads may be arranged in a range of 0.01 to 0.3% of the weight of the resin member 150.

Since the resin member 150 is disposed on the light emitting device 100, the light emitting device 100 may be protected and loss of light emitted from the light emitting device 100 may be reduced. The resin member 150 may cover the plurality of light emitting devices 100 and may contact the emitting region 101 of the light emitting device 100. The resin member 150 may be in contact with the upper surface and side surfaces of the light emitting device 100. A portion of the resin member 150 may be disposed in the hole 118 of the reflective member 110. A portion of the resin member 150 may contact the upper surface of the substrate 201 through the hole 118 of the reflective member 110. The portion of the resin member 150 is brought into contact with the substrate 201 to prevent the reflection member 110 disposed between the resin member 150 and the substrate 201 from flowing. The holes 118 of the reflective member 110 may be further provided with holes other than the region where the light emitting device 100 is disposed in order to fix the reflection member 110, but the invention is not limited thereto.

The thickness T2 of the resin member 150 may be equal to or greater than the thickness T1 of the light emitting device 100 or may be 20 mm or less. The thickness T2 of the resin member 150 may range from 2 mm to 20 mm, for example. When the thickness T1 of the resin member 150 is larger than the above range, there is deteriorated the light efficiency. When the thickness T1 of the resin member 150 is lowered than the above range, there is lowered a light uniformity. Referring to FIG. 2, the length Y1 of the resin member 150 in the first direction Y may be greater than the width X1 of the second direction X, and the length Y1 in the first direction Y1 may be varied depending on the number of the light emitting devices 100. The width X1 may be 50 mm or less, for example, in a range of 10 mm to 30 mm or 15 mm to 23 mm, and if the width X1 exceeds the above range, an area deviating from the beam spreading angle is increased and the light uniformity can be lowered.

The surface of the resin member 150 may be coated with a metal material such as aluminum, chromium, and barium sulfate. However, the present invention is not limited thereto. Here, the surface of the resin member 150 may be a side surface where a light extraction structure 152 is not formed, but the invention is not limited thereto.

The resin member 150 may include a light extraction structure 152 on an upper surface or an exit surface thereof. At least two or more of the side surfaces of the resin member 150 may be arranged in a plane perpendicular or inclined to a bottom surface of the resin member 150. The resin member 150 includes first to fourth side surfaces S11, S12, S13, and S14, wherein the first side surface S11 and the second side surface S12 are opposite to each other, and the third side surface S13 and the fourth side surface S14 are opposite to each other. The third and fourth side surfaces S13 and S14 may be disposed between the first and second side surfaces S11 and S12 or may be adjacent to the first and second side surfaces S11 and S12. A boundary portion between the third side surface S13 or the fourth side surface S14 and the first and second side surfaces S11 and S12 may be angular or curved surface. The first side surface S11 may face a rear surface of the light emitting device 100 and a portion of the second side surface S12 may face the emitting region 101 of the light emitting device 100.

The light extraction structure 152 may be an optical pattern and may change a critical angle of incident light. The light extraction structure 152 may be integrally formed with the resin member 150. The resin member 150 and the light extraction structure 152 may be formed of the same material. Each pattern of the light extraction structure 152 may be formed in a prism shape having a gradually narrower width as it goes up in the third direction Z. The light extraction structure 152 may include a pattern having a wide bottom width and a narrow top width. The light extraction structure 152 may include at least one or more of a hemispherical shape, a polygonal shape, or a shape such as a polygonal horn or a cone.

Figure 3:
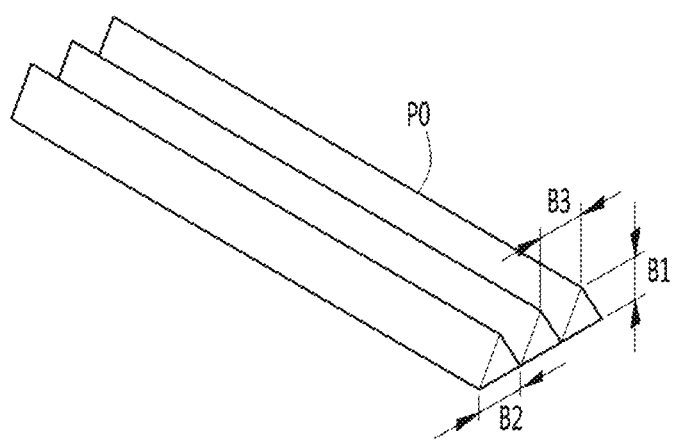
FIG. 3 is a perspective view showing an example of the light extraction structure of the resin member in a light module according to an embodiment.
Figure 4:
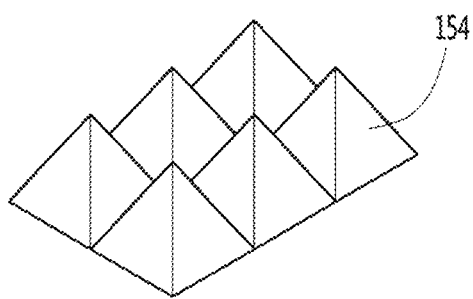
FIG. 4 is a perspective view showing another example of the light extraction structure of the resin member in a light module according to an embodiment.
Figure 5:
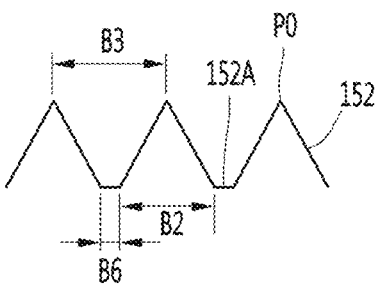
FIG. 5 is a cross-sectional view showing a first modification of the light extraction structure of the resin member in accordance with an embodiment.

A side cross-section of the light extraction structure 152 may be arranged in a prismatic pattern having a triangular shape. The pattern may be continuously arranged with a triangular prism shape as shown in FIG. 3, or may be arranged with a predetermined gap B6 in a region 152A between the patterns as shown in FIG. 5. As shown in FIG. 4, the pattern 154 may have a polygonal cone shape, for example, a pyramid shape or a hemispherical shape. The triangular prism pattern shown in FIG. 3 may have a long length in the second direction orthogonal to the third direction and may be arranged along the first direction. The second direction, which is the length direction of the prism pattern, may be a direction orthogonal to the first direction, which is an arrangement direction of the light emitting devices.

As shown in FIGS. 1 and 3, when an unit pattern of the light extraction structure 152 is, for example, a triangular prism pattern, a bottom width B2 and a height B1 may be the same or different from each other, the bottom width B2 may be 0.2 mm or more, for example, in the range of 0.2 mm to 3 mm. When the bottom width B2 of the pattern is smaller than the above range, improvement of the light extraction efficiency is insignificant. When the bottom width B2 of the pattern is greater than the above range, a light uniformity may be degraded. The height B1 of the pattern may be 0.2 mm or more, for example, in a range of 0.2 mm to 3 mm. When the height B1 of the pattern is smaller than the above range, a pattern formation is difficult and improvement in light extraction is insignificant, and the thickness T2 of the resin member 150 is increased when the height B1 is greater than the above range. The distance B3 between the patterns as the distance between a peak points P0 of the patterns may be 0.2 mm or more, for example, in the range of 0.2 mm to 3 mm. When the distance is smaller than the above range, the improvement of the light efficiency is insignificant, and the light uniformity may be lowered when the distance is greater than the above range. Here, the distance B3 between the patterns of the light extraction structure 152 or the bottom width B2 of the patterns may be equal to each other.

When the light emitted from the light emitting device 100 or the light reflected by the reflecting member 110 is incident, the light extraction structure 152 changes the critical angle of light by a both side surfaces or inclined side surfaces of the pattern, and light can be extracted to the outside. The light emitted to the resin member 150 by the light extraction structure 152 may be a surface light source.

As another example, the distance B3 between the patterns of the light extraction structure 152 and the bottom width B2 of the pattern may become gradually narrower as they are away from the emitting region 101 of each light emitting device 100. The light extraction structure 152 may be disposed in a region overlapping the light emitting device 100 in a vertical direction. Accordingly, the resin member 150 may improve the uniformity of the light by the light extraction structure 152 in the entire region by arranging differently the distance B3 or the bottom width B2 of the pattern according to the incident light amount of the incident light, and a surface light source may be provided.

Referring to FIG. 5, when the patterns of the light extraction structure 152 are spaced from each other, the region 152A between the patterns may be spaced apart by 0.01 mm or more, for example, in a range of 0.01 mm to 3 mm. The width B6 of the region 152A between the patterns may be equal to or smaller than the bottom width B2 of the pattern. The region 152A between these patterns may be a horizontal surface or a sloped surface or a concave surface.

Figure 6:
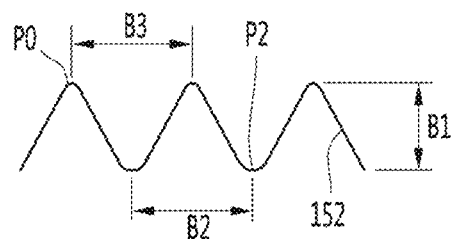
FIG. 6 is a cross-sectional view showing a second modification of the light extraction structure of the resin member in accordance with an embodiment.

Referring to FIG. 6, a high point P0 of patterns in the light extraction structure 152 may have a convex surface. The light extraction structure 152 may have a concave surface having a low point P1 between the patterns. Since the high peak P0 and the low point P1 of the patterns are arranged in a curved surface, the incident light can be reflected or transmitted. Since the high peak P0 and the low point P1 of the patterns are arranged on the curved surface, the light loss and the damage of the pattern due to the deformed shape during an injection molding may be prevented. The height, the bottom width and the distance of these patterns will be described with reference to FIGS. 2 and 3.

Second Embodiment

Figure 9:
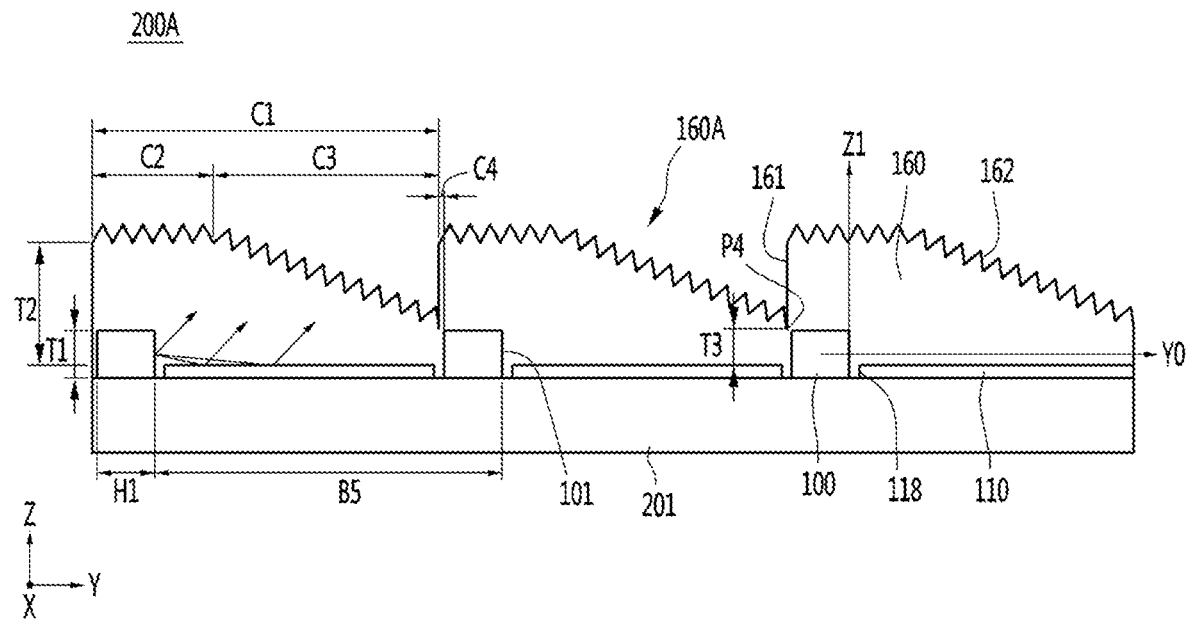
FIG. 9 is a side cross-sectional view of a lighting module according to the second embodiment.
Figure 10:
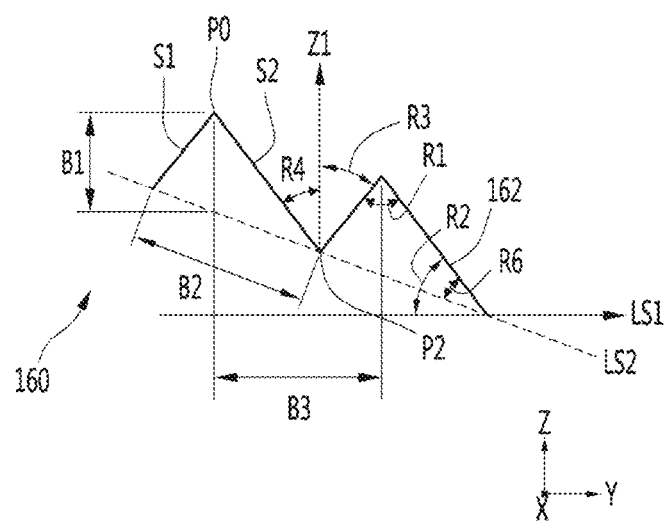
FIG. 10 is a view showing an example of the light extraction structure of the resin member of the light module of FIG. 9.

FIG. 9 is a side cross-sectional view of a lighting module according to a second embodiment, and FIG. 10 is a partially enlarged view of a light extraction structure of FIG. 9. In describing the second embodiment, the same configuration as that disclosed above is referred to the description disclosed above, and may be selectively applied thereto.

Referring to FIGS. 9 and 10, a lighting module 200A includes a substrate 201, a plurality of light emitting devices 100, a reflective member 110, and a resin member 160.

A first side surface S11 of the resin member 160 may be spaced apart from a rear surface of each of the light emitting devices 100. At least a portion of a second side surface S12 of the resin member 160 may correspond to an emitting region 101 of the light emitting device 100.

The resin member 160 may have a light extraction structure 162. The resin member 160 may include a plurality of light emitting cells 160A. Each of the light emitting cells 160A includes a first region C2 having a horizontal upper surface and a second region C3 inclined. The light emitting cells 160A of the resin member 160 may be disposed on each of the light emitting devices 100, respectively. The light emitting cell 160A is a region in which light is emitted from each of the light emitting devices 100, and may be a unit region having an individual light emitting device 100. The resin member of an adjacent light emitting cell 160A may be connected to each other. The light emitting devices 100 disposed at each of the light emitting cells 160A may emit the same color to each other. The plurality of light emitting devices 100 may emit light of a single color in one direction.

The first region C2 of the light emitting cell 160A may overlap with the light emitting device 100 in a vertical direction. A width of the first region C2 may be equal to or 1.5 times or more a width H1 of the light emitting device 100. The first region C2 may be located above the rear surface of the light emitting device 100 to protect the rear surface of the light emitting device 100. The second region C3 may extend in a direction of the second side surface S12 from the emitting region 101 of the light emitting device 100. A thickness of the second region C3 may become gradually thinner as it is farther from the light emitting device 100. A height of an upper surface of the second region C3 may have a gradually lower height as it is father from the light emitting device 100. Such a thickness of the second region C3 is gradually narrower as it is farther from the light emitting device 100, thereby improving uniformity of light extracted through the second region C3. Luminous intensity or distribution of light extracted through an upper surface or an exit surface of the resin member 160 may be uniform by disposing the light extraction structure 162 on the first and second regions C2 and C3.

The first region C2 may be disposed at 50% or less of a width C1 or a period of the light emitting cell 160A, for example, in a range of 5% to 30%. The first region C2 may be disposed in a range of 1/5 to 1/7 of the second region C3. The pattern of the light extraction structure 162 disposed on the first region C2 may have the same distance and the same bottom width. The second region C3 may be an inclined region with respect to an upper surface of the substrate 201 or an upper surface of the reflective member 110. The light extraction structure 162 on the second region C3 may have the same shaped pattern or the same distance between the patterns as being adjacent to the substrate 201 or the reflective member 110.

As shown in FIG. 10, the light extraction structure 162 may include a pattern having a polygonal shape or a curved surface as disclosed in an embodiment. When a unit pattern of the light extraction structure 162 is, for example, a triangular prism pattern, a bottom width B2 and a height B1 may be the same as or different from each other, and the bottom width B2 of the pattern may be 0.2 mm or more, for example, in a range of 0.2 mm to 3 mm. When the bottom width B2 of the pattern is smaller than the range, an improvement of light extraction efficiency is insignificant, and when it is larger than the range, light uniformity may be lowered. The height B1 of the pattern may be 0.2 mm or more, for example, in a range of 0.2 mm to 3 mm, and when the height B1 of the pattern is smaller than the range, it is difficult to form a pattern and an improvement of light extraction is insignificant, and when it is larger than the range, a thickness of the resin member 160 is increased. A distance B3 between the patterns is a distance between high points P0 of the pattern, which may be 0.2 mm or more, for example, in a range of 0.2 mm to 3 mm, and when the distance B3 is smaller than the range, an improvement of luminous efficiency is insignificant, and when it is larger than the range, light uniformity may be lowered.

Both side surfaces inclined in a unit pattern of the light extraction structure 162 include first and second surfaces S1 and S2, and the first surface S1 may be a surface more adjacent to a vertical straight line Z1 than the second surface S2. When an angle R6 of the second surface S2 of the patterns is equal to each other, an inclination angle R3 of the first surface S1 may be gradually smaller. As the light extraction structure 162 of the second region C3 is adjacent to the substrate 201 or the reflective member 110, an internal angle R1 of the pattern may be gradually smaller. The angle R3 with respect to the first surface S1 on the basis of the vertical straight line Z1 may be equal to or smaller than an angle R4 with respect to the second surface S2.

The internal angle R1 of the pattern in the light extraction structure 162 may be gradually narrower as it is adjacent to the substrate 201 or the reflective member 110, and for example, may be smaller in proportion to a distance from the light emitting device 100. When the angle R6 of the second surface S2 of the pattern is the same angle to each other, the angle R3 of the first surface S1 may be changed according to the distance. The angle R3 of the first surface S1 is 60 degrees or less, for example, in a range of 50 degrees to 60 degrees when a starting point of an inclination is distance 0, and may be decreased by 1 degree or more every time the distance increases by 1 mm. The angle R3 includes θ1−(α× β), the θ1 is an angle when the distance is 0, and has a range of 50 to 60 degrees, and the distance a is a distance from 0 to C3, and the weight β may be in a range of 1 to 1.1 or less. For example, in a range of 1.06 to 1.09, as a weight of an increased angle per 1 mm. For example, when a value of the weight β is 1.08 and the angle R3 at the point 0 is 55 degrees, R3 at the position moved to the point of 10 mm may be obtained as 55−(10×1.08)=44.92.

An inclination angle R6 of the second surface S2 of the pattern in the light extraction structure, which is an angle with respect to a horizontal straight line LS2 connecting low points of the patterns, may be smaller than R3. The angle R6 may be disposed at 1 degree or more, for example, in a range of 1 degree to 50 degrees, or 30 degrees to 50 degrees, as inclination angle of the second region C3. Here, the second surface S2 is disposed at an angle of 50 to 70 degrees with respect to a horizontal straight line LS1, and may provide the second region C3 with an inclined structure. The condition of R2>R6 may be satisfied.

A thickness T2 of the first region C2 in the resin member 160 may be in a range of 2 mm to 50 mm, for example, 2 mm to 10 mm. The thickness of the second region C3 may be smaller than the thickness T2 of the first region C2. A minimum thickness T3 of the resin member 160 or the second region C3 may be equal to or less than a thickness T1 of the light emitting device 100. The upper surface of the resin member 160 or a low point P4 of the second region C3 may be disposed on the same line as, or lower than, an optical axis Y. of the light emitting device 100. The minimum thickness T3 of the resin member 160 may be disposed at 0.5 mm or more from the upper surface of the reflective member 110, for example, in a range of 0.5 mm to 5 mm, and when it is thinner than the above range, the connected portion may be weakened, and when it is thicker than the above range, optical interference may be given to another light emitting cell 160A.

In the resin member 160, a boundary region C4 between the light emitting cells 160A may be disposed on a rear surface of the light emitting device 100. An outer side surface 161 between the light emitting cells 160A may be a vertical surface or an inclined surface, and may connect adjacent the light emitting cells 160A to each other.

Third Embodiment

Figure 11:
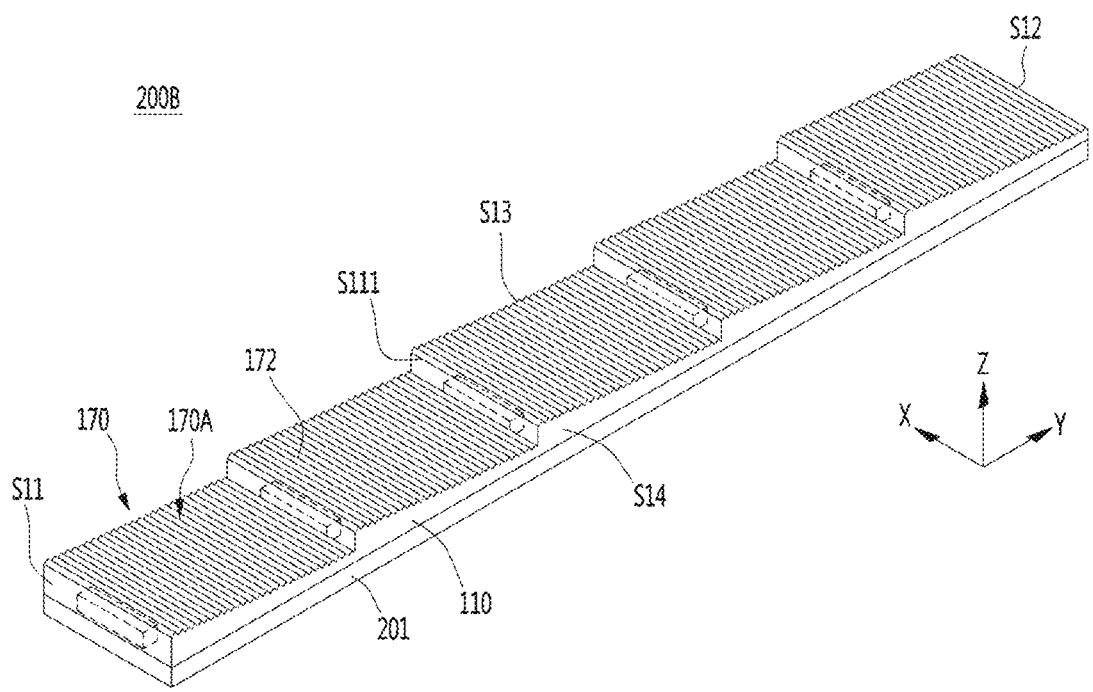
FIG. 11 is a perspective view of a lighting module according to the third embodiment.
Figure 12:
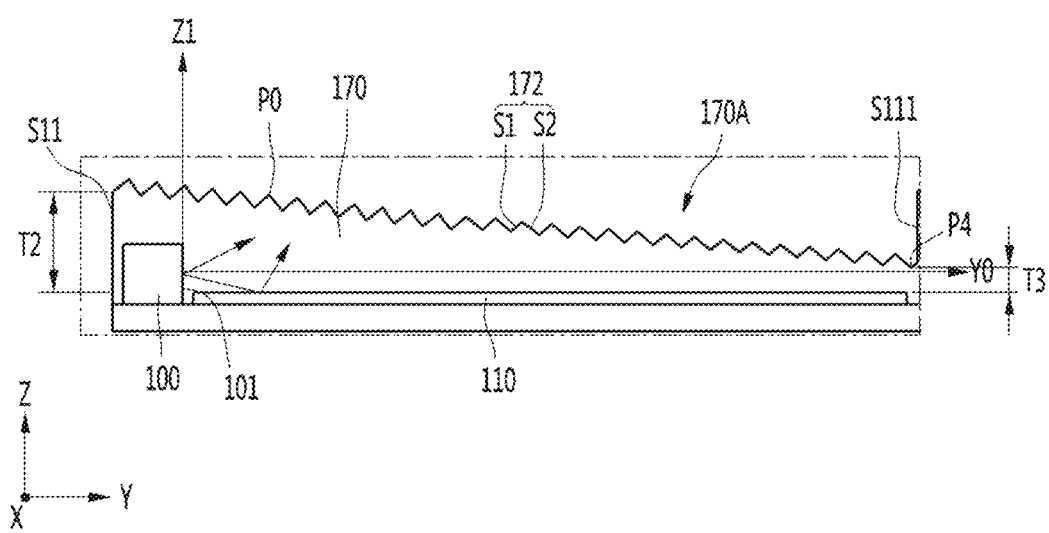
FIG. 12 is a partial side cross-sectional view of the lighting module of FIG. 11.
Figure 13:
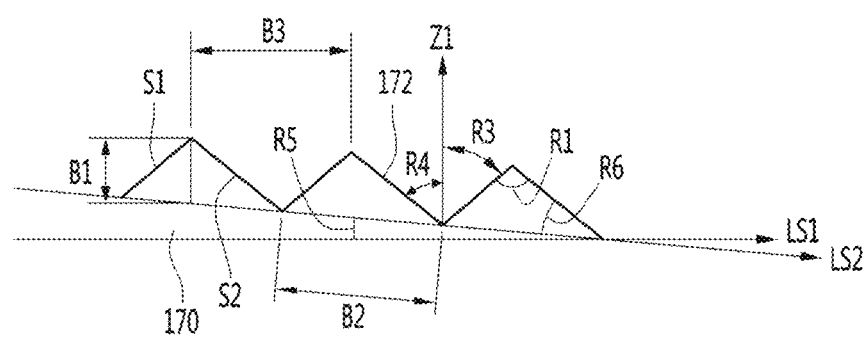
FIG. 13 is a view for explaining a light extraction structure of the resin member in the lighting module of FIG. 12.
Figure 14:
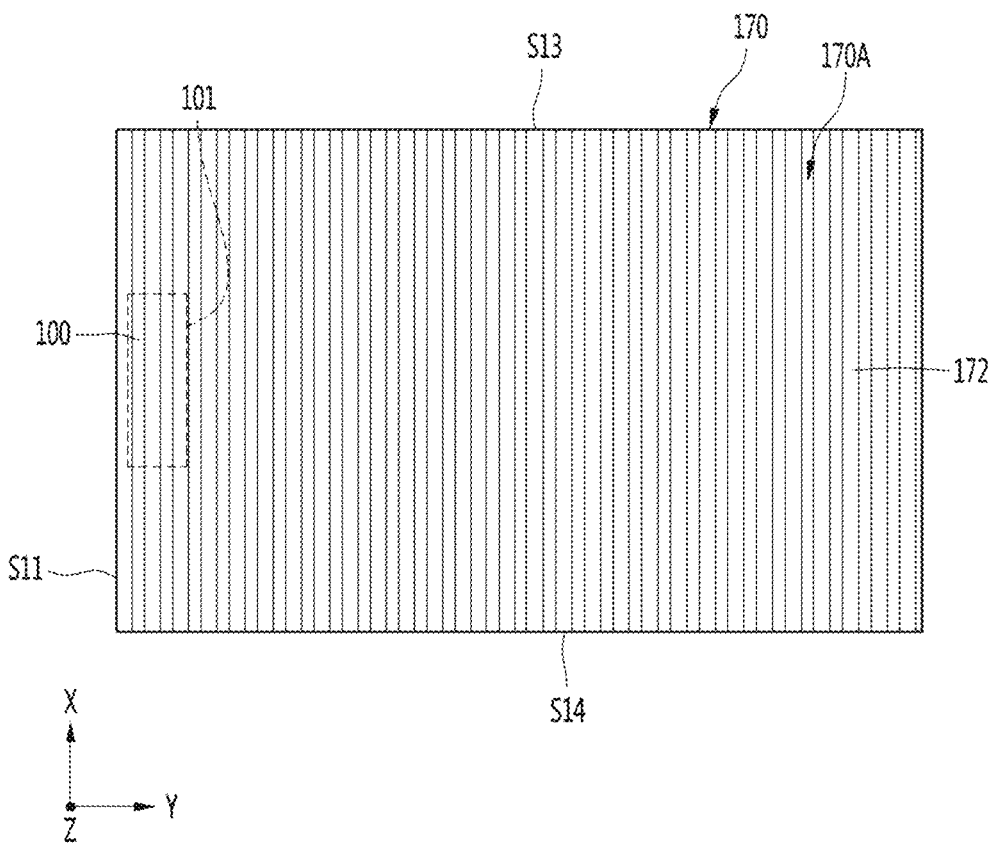
FIG. 14 is an example of a partial top view of the lighting module of FIG. 12.

FIG. 11 is a is a perspective view of a lighting module according to the third embodiment, FIG. 12 is a partially enlarged view of the lighting module of FIG. 11, FIG. 13 is a view illustrating the light extraction structure of the resin member of FIG. 12, FIG. 14 is a plan view of the lighting module of FIG. 12. In describing the third embodiment, the same configuration as the above-described configuration is referred to the above description, and may be selectively applied to the present embodiment.

Referring to FIGS. 11 to 14, a lighting module 200B includes a substrate 201, a light emitting device 100, a resin member 170 and the reflective members 110. A light emitting cells 170A of the resin member 170 may be respectively disposed on each light emitting device 100. The light emitting cell 170A is a region for emitting light emitted from each of the light emitting devices 100 and may be a unit region having each light emitting device 100. The light emitting cells 170A may emits the same color from each other by a light emitting device 100. The plurality of light emitting devices 100 may emit light of a single color in one direction.

Figure 16:
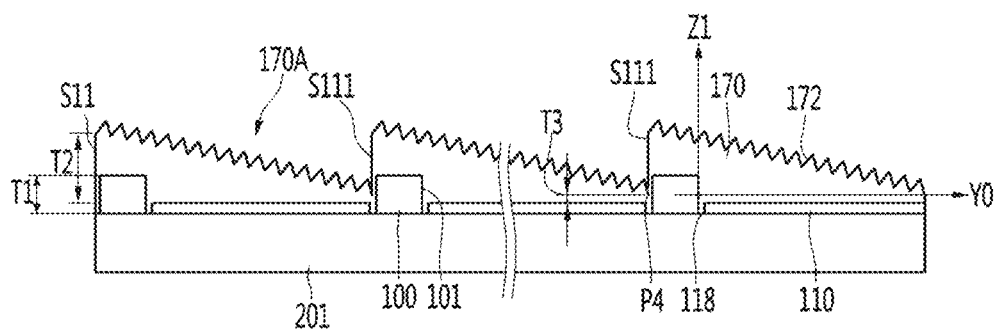
FIG. 16 is an example of a side cross-sectional view of the lighting module of FIG. 11.

As shown FIGS. 11, 12 and 16, the resin member 170 includes a sloped region, and the sloped region may be formed in an entire region of the upper surface of the resin member 170. The maximum thickness T2 of the resin member 170 may be 50 mm or less, for example, in a range of 2 mm to 10 mm.

The region having the maximum thickness T2 in the resin member 170 may extend further outward than the rear surface of the light emitting device 100, for example, in a rear direction, to protect the rear surface of the light emitting device 100. The region having the minimum thickness T3 in the resin members 170 may be a region adjacent to other light emitting device 100. The minimum thickness T3 of the resin member 170 may be equal to or less than the thickness of the light emitting device 100. The low point P4 on the upper surface of the resin member 170 may be disposed on the same line or lower than the optical axis Y0 of the light emitting device 100. The minimum thickness T3 of the resin member 170 may be 0.5 mm or more, for example, in a range of 0.5 mm to 5 mm from the upper surface of the reflective member 110, and when the thickness is thinner than the above range, a problem may arise in a portion connected, and when the thickness is thicker than the above range, it may cause optical interference to other light emitting cells.

In the resin member 170, the side surfaces S11, S12, S13, and S14 except for the upper surface may be a sloped surface or a vertical surface. The light extraction structure 172 may not extend to the third and fourth side surfaces S13 and S14. The side surfaces S11, S12, S13, and S14 of the resin member 170 can prevent light from leaking. The side surface S111 disposed in a boundary region between the light emitting cells 170A of the resin member 170 may be a vertical surface or a sloped surface.

The pattern of the light extraction structure 172 may be disposed along an inclined region with respect to the upper surface of the substrate 201 or the upper surface of the reflective member 110. The patterns of the light extraction structure 172 may have the same shape, or a distance between the patterns may be the same or different as the substrate 201 or the reflective member 110 is adjacent to each other.

The light extraction structure 172 of the resin member 170 will be described with reference to the description of the patterns disclosed in the embodiment. As shown in FIG. 13, when the unit pattern of the light extraction structure 172 is, for example, a triangular prism pattern, the bottom width B2 and the height B1 may be the same or different, and the bottom width B2 of the pattern may be 0.2 mm or more, for example, in a range of 0.2 mm to 3 mm. When the bottom width B2 of the pattern is smaller than the above range, the improvement of the light extraction efficiency is insignificant. When the bottom width B2 is larger than the above range, the light uniformity may be lowered. The height B1 of the pattern may be 0.2 mm or more, for example, in a range of 0.2 mm to 3 mm. When the height B1 of the pattern is smaller than the above range, a pattern formation is difficult and improvement in light extraction is insignificant. When the height B1 of the pattern is greater than the above range, there is a problem that the thickness of the resin member 170 is increased. The distance B3 between the patterns as the distance between the high points of the pattern may be 0.2 mm or more, for example, in the range of 0.2 mm to 3 mm. When the distance is smaller than the above range, the improvement of the light efficiency is insignificant. When the distance is greater than the above range, the light uniformity may be lowered.

An internal angle R1 of the pattern may gradually become narrower as the light extraction structure 172 is adjacent to the substrate 201 or the reflecting member 110. For example, when an angle R6 of the second surface S1 of the pattern is the same, an inclination angle R3 of the first surface S1 can be gradually reduced. Accordingly, the internal angle R1 of the pattern may be gradually reduced toward the substrate 201 or the reflective member 110, for example, may be reduced in proportion to the distance to the light emitting device 100. The angle R6 of the second surface S2 of the pattern is the same angle and the angle R3 of the first surface S1 may be changed according to the distance. When the inclination starting point is distance 0, the angle R3 of the first surface S1 is 60 degrees or less, for example, in the range of 50 degrees to 60 degrees, and may be decreased by 1 degree or more every time the distance is increased by 1 mm. The R3 includes $\theta1-(\alpha \times \beta)$, the angle $\theta1$ is an angle when the distance is 0 and has a range of 50 degrees to 60 degrees, the distance a is a section from distance 0 to C3, and the weight $\beta$ is a weight of an angel increased by 1 mm, and may be in the range of more than 1 and 1.1 or less, for example, in a range of 1.06 to 1.09. For example, when a value of the weight (3 is 1.08 and the angle R3 is 55 degrees at the low point 0, the angle R3 at the position shifted 10 mm from the low point may be obtained as 55−(10×1.08)=44.92. In this case, when the starting angle, that is, the angle at the position where the distance is zero is lowered, the inclination angle of the entire upper surface is lowered, or the maximum thickness of the resin member 170 is lower than the second embodiment, the angel R3 may be changed.

In FIG. 13, an inclination angle R6 of the second surface S2 of the pattern in the light extraction structure 172 is an angle with respect to a horizontal straight line LS2 connecting the low points of the patterns, and may be smaller than the angle R3. An angle R5 may be an inclination angle of the upper surface of the resin member 170 and may be 1 degree or more, for example, in a range of 1 degree to 10 degrees, or 6 degrees to 10 degrees.

Figure 15:
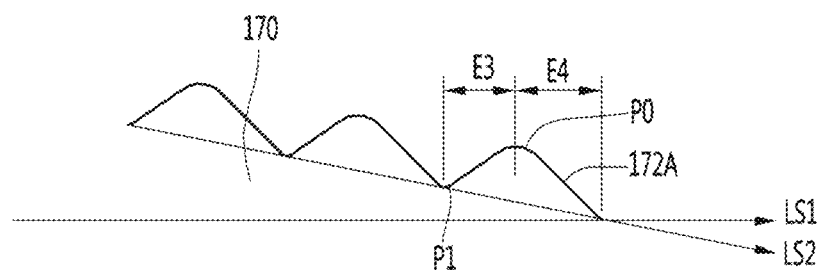
FIG. 15 is another example of the light extraction structure of FIG. 13.

The pattern of the light extraction structure 172 of the resin member 170 may include at least one of the high point and the low point as an angular surface or a curved surface. For example, the pattern may be selected from the shapes shown in FIGS. 3, 4 and 6. As another example, the pattern of the light extraction structure 172 may be such that the regions between the patterns are spaced apart from each other without contacting each other, as shown in FIG. 5, and the spaced regions may be sloped or curved. Alternatively, the patterns of the light extraction structure 172A of FIG. 15 may be disposed along a sloped region with at least one or both of the high point P0 and the low point P1 having a curved surface. Here, the widths E3 and E4 of the both sides from the high point P0 can satisfy the condition of E4>E3 as the distance from the emitting region 101 of the light emitting device becomes larger. The condition of E4>E3 can be applied to the pattern of FIG. 13, and the distance E4 may be gradually increased as the distance from the light emitting device is larger than the distance E3.

The high point of the pattern of the light extraction structure 172 according to the embodiment may have a gradually lower height as the distance from the emitting region 101 of the light emitting device 100 is increased. The distance between the light emitting devices 100 disposed within the resin member 170 may be 100 mm or less, for example, in a range of 5 mm to 100 mm, and when the light emitting device 100 is smaller than the range, an interference may occur, and when it is larger than the above range, it is difficult to secure an amount of light and light uniformity.

As shown in FIG. 16, the resin member 170 has the light extraction structure 172 on the substrate 201 or the reflective member 110 and is arranged to have a thickness that gradually becomes thinner away from the light emitting device 100, so that the light emitted from the reflective member 110 or the light emitting device 100 can be emitted in the upward direction. The light extraction structure 172 is disposed closer to the optical axis as the light extraction structure 172 is farther from the light emitting device 100, thereby reducing a difference in amount of light incident on the light extraction structure 172. The uniformity of the light extracted through the light extraction structure 172 can be improved. Such the light uniformity may have a uniform light uniformity of the surface light source over a certain width, and for example, the light distribution of the direction of the optical axis, +30 degrees (Left) or −30 degrees (Right)

with respect to the optical axis on the plane of the illumination module may be uniform.

Figure 17:
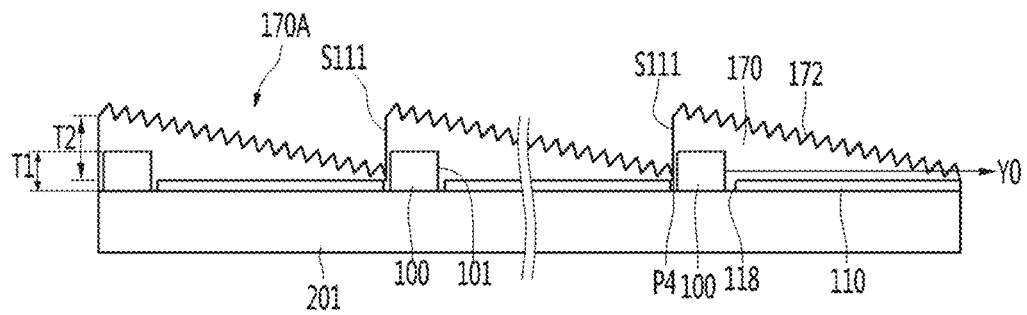
FIG. 17 is a side cross-sectional view illustrating a first modification of the lighting module of FIG. 16.
Figure 18:
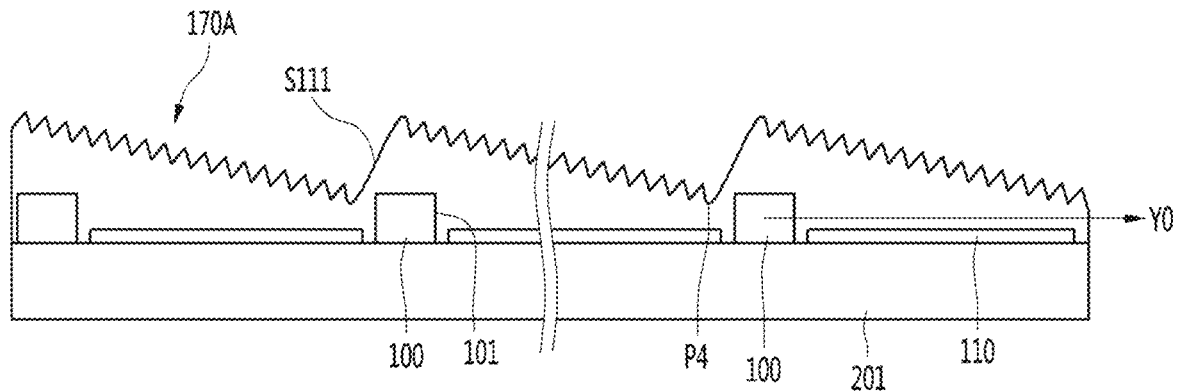
FIG. 18 is a side cross-sectional view illustrating a second modification of the lighting module of FIG. 16.

FIG. 16 is an example of a side sectional view of the lighting module of FIG. 11, and FIGS. 17 and 18 are first and second modified examples of the lighting module of FIG. 16.

As shown in FIG. 16, the light extraction structure 172 of the resin member 170 is disposed at a low point lower than the optical axis of the light emitting device 100, and is spaced apart from the reflective member 110. The minimum thickness T3 of the resin member 170 is smaller than the thickness T1 of the light emitting device 100. In this case, light leaks through the thinnest region of the resin member 170 and may be suppressed from proceeding through other emitting region.

As shown in FIG. 17, a low portion on an upper surface of the resin member 170 may be contacted with the reflection member 110. The low point of the upper surface of the resin member 170 contacts the reflective member 110, thereby reducing optical interference between the light emitting cells. Here, the low point P4 of the upper surface of the resin member 170 may be formed to be long in the width of the second direction X as shown in FIG. 14, or may be formed only in the center region. The resin member 170 is disposed on the inclined side surface S111 between an adjacent light emitting cells 170A so that the injection molding may be easily separated.

As shown in FIG. 18, the resin member 170 may be connected to the light extraction structure 172 with a concave low point P4 having a curved surface connected to the side surface S111 between the adjacent light emitting cells 170A, and may be connected to the extraction structure 172 with a high point having a convex surface. This resin member 170 can be easily separated during injection molding, and light traveling in the light direction may be effectively blocked by the low point P4 of the concave curved surface to prevent light interference from being generated in other emitting regions.

Figure 19:
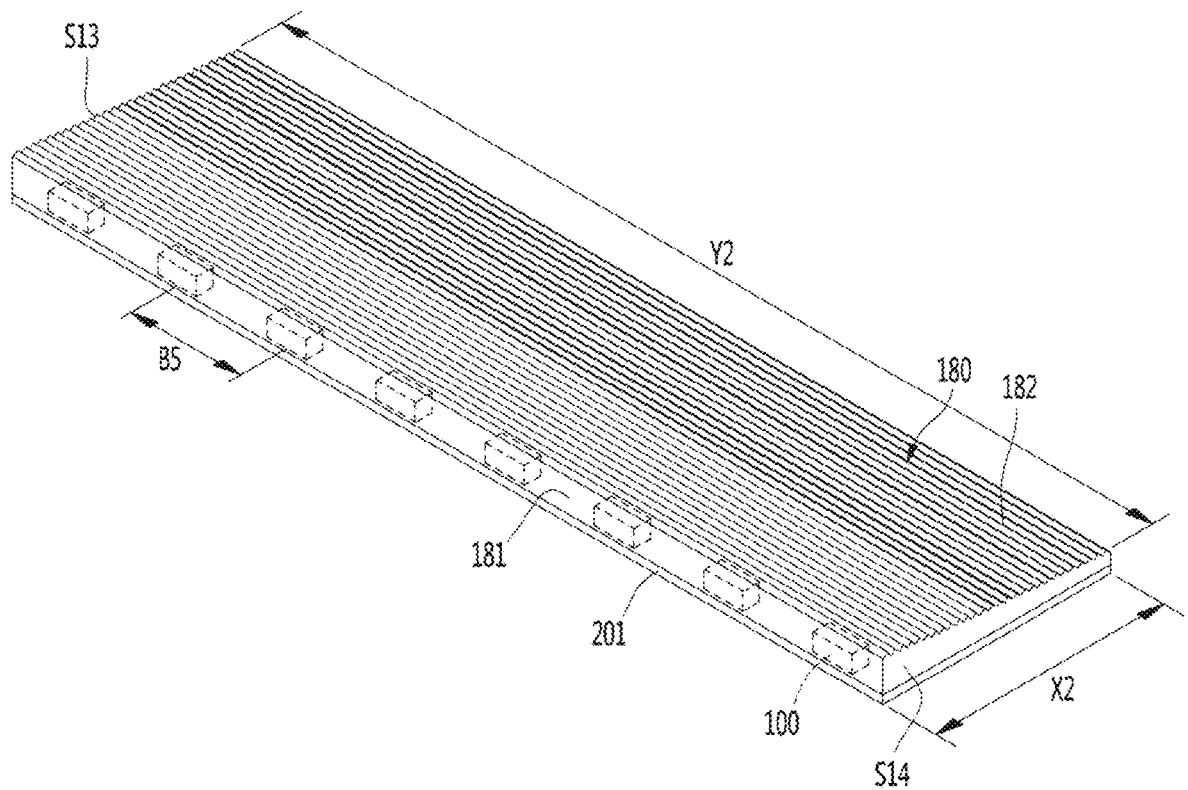
FIG. 19 is a perspective view illustrating a third modification of the lighting module of FIG. 11.
Figure 20:
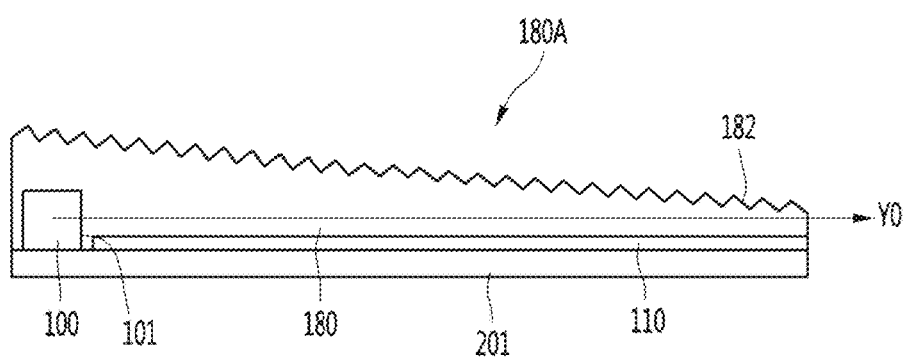
FIG. 20 is a partial side cross-sectional view of the lighting module of FIG. 19.

FIG. 19 is a perspective view showing a third modification of the lighting module of FIG. 11, and FIG. 20 is a partial side sectional view of the lighting module of FIG. 19.

Referring to FIGS. 19 and 20, a lighting module includes a substrate 201, a plurality of light emitting devices 100, a reflective member 110 on the substrate 201, and a resin member 180 having a light extraction structure 182 on the substrate 201 and the light emitting device 100.

The light emitting device 100 may be arranged along the second direction Y of the substrate 201. The light emitting device 100 may be arranged along at least one of the edges of the substrate 201, for example, may be arranged along a longitudinal edge of the substrate 201.

The light emitting device 100 may be arranged along the thickest region of the regions of the resin member 180. The thickness of the resin member 180 may be thicker in the region where the light emitting device 100 is disposed and may become thinner as the distance from the light emitting device 100 increases. The patterns of the light extraction structures 182 of the resin member 180 may be alternately arranged in the first direction and arranged in the long longitudinal direction in the second direction orthogonal to the first direction. The length of each pattern may be the same as the length Y2 of the resin member 180. The longitudinal direction of a prism pattern may be the same direction as the arrangement direction of the light emitting devices. The prism patterns may be arranged in a direction orthogonal to an arrangement direction of the light emitting devices.

The length X2 of the resin member 180 in the first direction may be smaller than the length Y2 in the second direction, for example, ½ or less. A distance B5 between the light emitting devices 100 may be 100 mm or less, for example, in a range of 1 mm to 30 mm or 15 mm to 25 mm. When the distance B5 between the light emitting devices 100 is smaller than the above range, the number of the light emitting devices 100 can be increased. When the distance B5 between the light emitting devices 100 is greater than the above range, a dark region may be generated.

As another example, the light emitting device 100 may be disposed on the substrate 201 in a zigzag. The thickness of the resin member 180 may be thicker in the region where the light emitting device 100 is disposed and may become thinner as the distance from the light emitting device 100 increases. Each of the light emitting regions of the resin member 170 is disposed on each of the light emitting devices 100 and may be arranged in a width of 100 mm or less, for example, in a range of 1 mm to 30 mm or 15 mm to 25 mm, respectively. Although the thickness of the resin member 180 according to the embodiment has been described as being gradually thinned, it may optionally include the structure of the resin member of the first or second embodiment.

Figure 21:
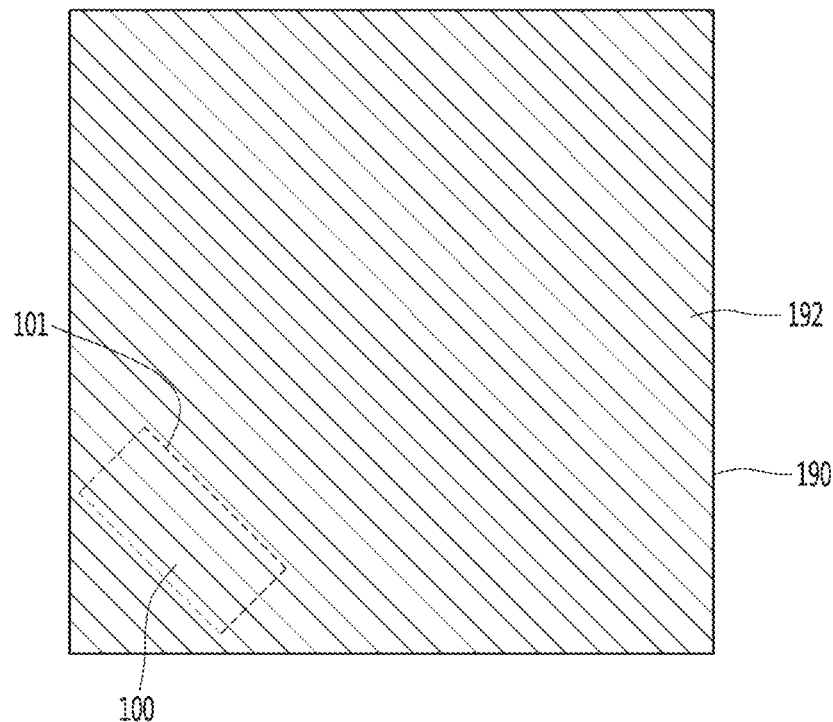
FIG. 21 is a plan view showing another example of the lighting module of FIG. 14.

FIG. 21 is a view showing another arrangement example of the light emitting device in the lighting module according to the embodiment.

Referring to FIG. 21, when the resin member 190 has a polygonal light emitting cell, the light emitting device 100 may be disposed within an edge region of the resin member 190. The light extraction structure 192 of the resin member 190 may be arranged in a direction in which patterns are orthogonal to the optical axis direction of the light emitting device 100. The detailed construction of such a pattern will be described with reference to the description of the embodiments disclosed above. The resin member disclosed in the embodiment may be a straight bar having a predetermined width, a curved bar having a predetermined curvature, a bar having at least one bent, or two or more of the straight, curved, or may be in a mixed form. Such a shape may vary depending on the type and structure of a vehicle lamp such as an application such as a head lamp, a side marker lamp, a side mirror lamp, a fog lamp, a tail lamp, a stop lamp, a daytime running lamp. Or it may be applied to a display device, a lighting device such as a vehicle interior lighting, a vehicle outer lamp.

Figure 22:
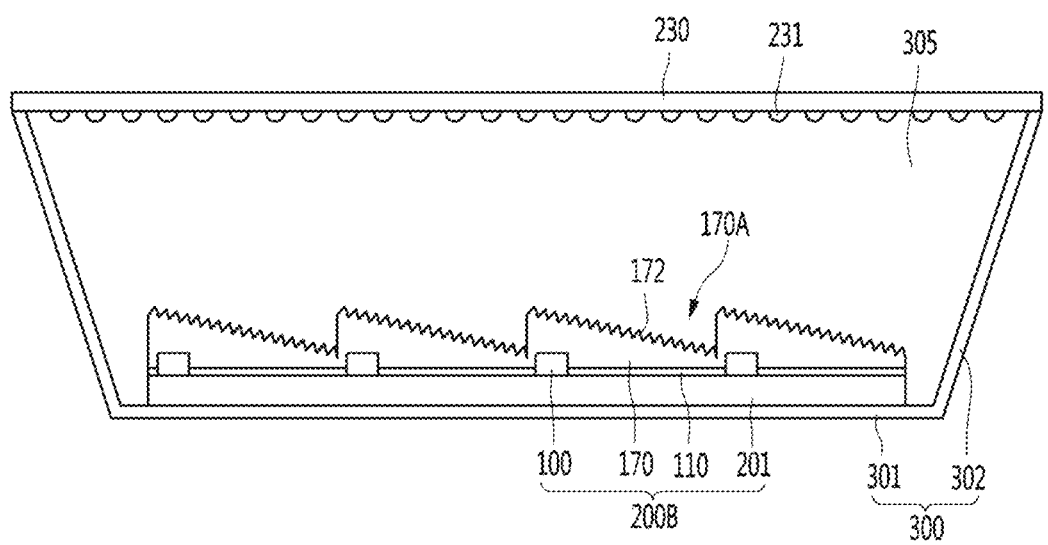
FIG. 22 is a side cross-sectional view of the lighting device having the lighting module of FIG. 16.
Figure 23:
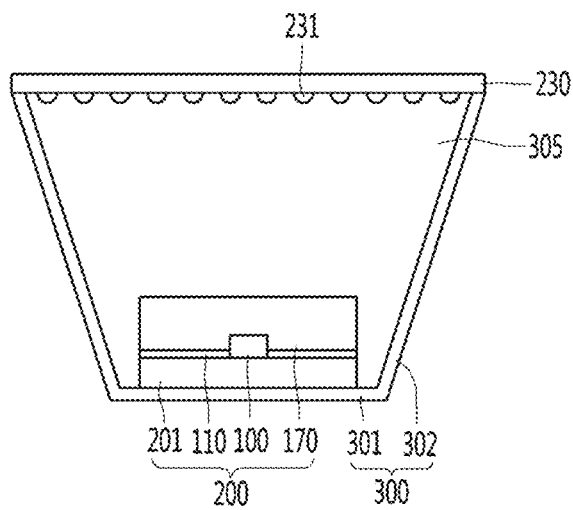
FIG. 23 is another side cross-sectional view of the lighting device of FIG. 22.

FIGS. 22 and 23 show a lighting device with a lighting module according to an embodiment. The lighting module in the lighting device according to the embodiment can selectively apply the first to third lighting modules, and the description will be made with reference to the above description. The lighting module 200B includes a module disclosed in the embodiment (s), for example, includes a substrate 201, a plurality of light emitting devices 100 on the substrate 201, a resin member 170 and reflective member 110.

An optical member 230 may be disposed on the lighting module 200B, and the optical member 230 may diffuse and transmit incident light. The optical member 230 uniformly diffuses and emits the surface light source emitted through the resin member 170. The optical member 230 may include an optical lens or an inner lens, and the optical lens may condense the light toward the target or change the path of the light. The optical member 230 may include a plurality of lens portions 231 on at least one of the upper surface and the lower surface of the optical member 230, and the lens portions 231 may have a shape protruding downward from the optical member 230 or may have a shape protruding upward from the optical member 230. Such an optical member 230 may control the light distribution characteristics of the lighting device.

The optical member 230 may include a material having a refractive index of 2.0 or less, for example, 1.7 or less. The material of the optical member 230 may be formed of a transparent resin material of acrylic, polymethyl methacrylate (PMMA), polycarbonate (PC), epoxy resin (EP), or transparent glass.

The optical member 230 may be spaced from the lighting module 200B, for example, the substrate 201 by 10 mm or more, for example, in a range of 15 mm to 100 mm. when the distance is out of the above range, a light intensity may be lowered and when the distance is smaller than the above range, the uniformity of light may be lowered.

The lighting module 200 may include a heat dissipation plate (not shown) at a bottom surface thereof. The heat dissipation plate may include a plurality of heat dissipation fins and may dissipate heat conducted to the substrate 201. The heat dissipation plate may include at least one of metals such as aluminum, copper, magnesium, nickel, or an alloy thereof.

The lighting device includes a housing 300 having a receiving space 305, a lighting module according to an embodiment disposed at the bottom of the receiving space of the housing 300, and an optical member 230 disposed on the lighting module. An outer surface of the receiving space 305 of the housing 300 may be provided at an inclined surface with respect to the bottom surface of the housing 300 and the inclined surface may improve the light extraction efficiency. The surface of the receiving space 305 of the housing 300 may be formed with a metallic material of reflective material and the light extraction efficiency in the receiving space 305 may be improved by such metallic material. The depth of the receiving space 305 is larger than the high point of the resin member 170 and may emit light emitted through the resin member 170.

The housing 300 includes a bottom portion 301 and a reflective portion 302. The bottom portion 301 is disposed under the substrate 201. The reflective portion 302 may protrude upward from an outer periphery of the bottom portion 301 and may be disposed around the resin member 170. The housing 300 may include a metal or a plastic material, but the invention is not limited thereto.

A hole (not shown) through which a cable connected to the substrate 201 passes may be formed in the bottom portion 301 or the reflective portion 302 of the housing 300, but the invention is not limited thereto. The substrate 201 is bonded to the bottom portion 301 of the housing 300 with a fastening means such as a screw or a bonding member or a hook-like structure. Accordingly, the substrate 201 may be fixed to the bottom of the housing 300. The lighting device according to the embodiment may be applied to various vehicle lighting devices such as a head lamp, a side marker lamp, a side mirror lamp, a fog lamp, a tail lamp, a stop lamp, a daytime running lamp, and a display device or a traffic lamps.

Fourth Embodiment

Figure 24:
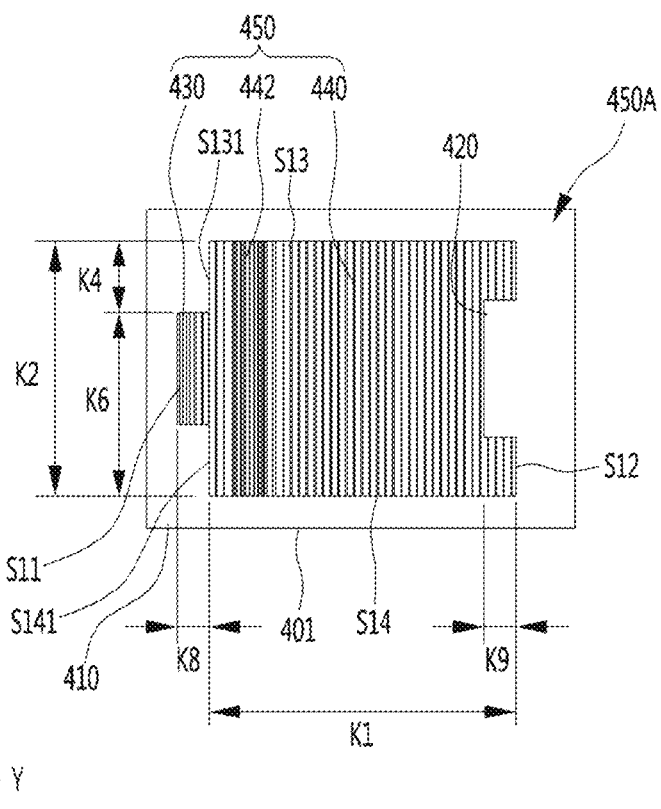
FIG. 24 is a plan view of a lighting module according to the fourth embodiment.
Figure 25:
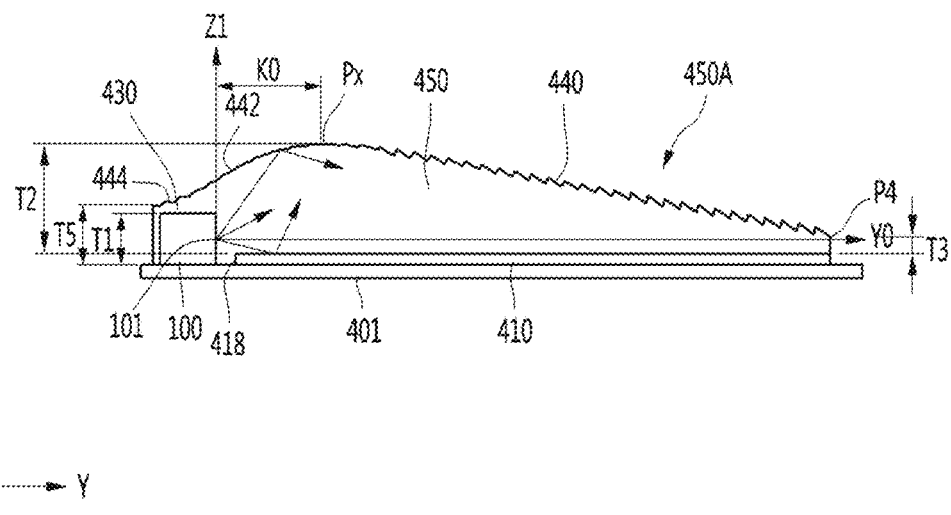
FIG. 25 is a side cross-sectional view of the lighting module of FIG. 24.

FIG. 24 is a plan view illustrating a lighting module according to a fourth embodiment, and FIG. 25 is a side cross-sectional view of the lighting module of FIG. 24.

Figure 26:
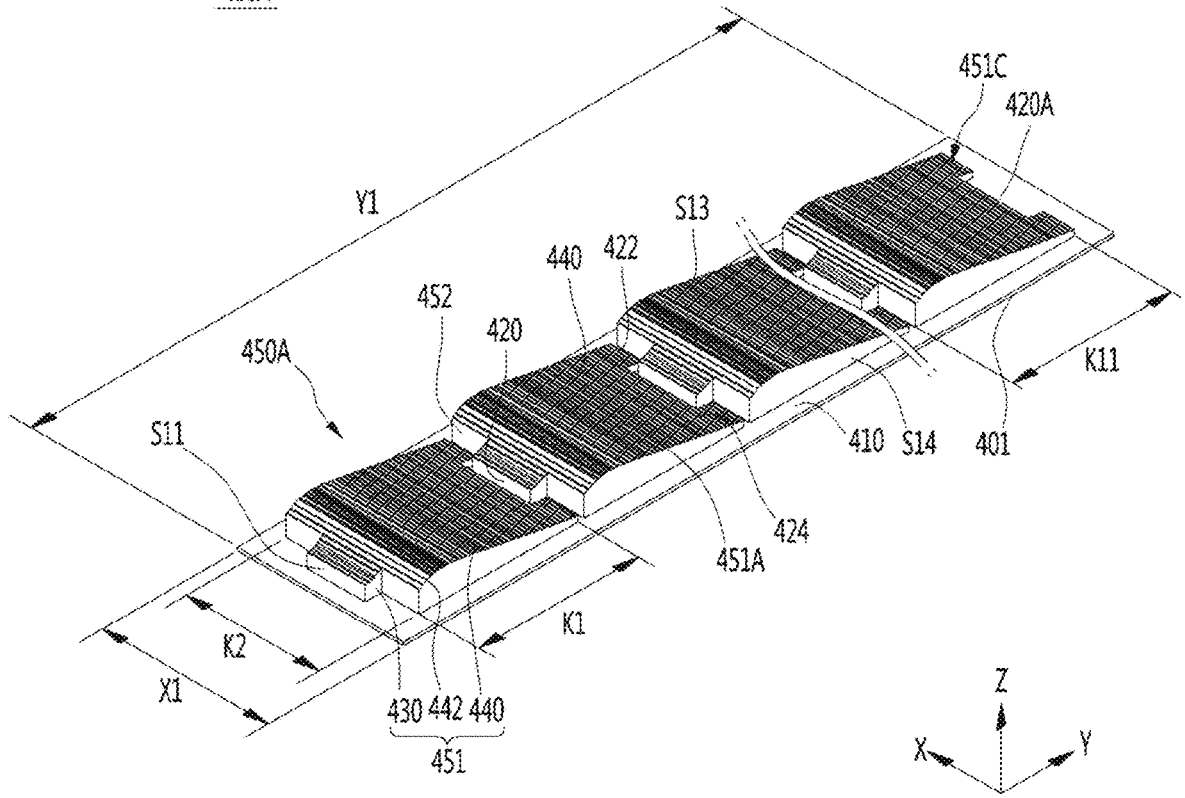
FIG. 26 is a perspective view of the lighting module arrangement of FIG. 24.

Referring to FIGS. 24 and 25, a lighting module 400 according to an embodiment may include a substrate 401, a light emitting device 100 disposed on the substrate 401, and a resin member 450 covering the substrate 401 and the light emitting device 100 and emitting light. The lighting module 400 may include a reflective member 410 disposed on the substrate 401. The lighting module 400 may emit light emitted from the light emitting device 100 as a surface light source. The lighting module 400 may be defined as a light emitting cell or a light source module. One lighting module 400 may be disposed on the substrate 401, or a plurality of the lighting modules 400 may be arranged in a first direction as shown in FIG. 26. The substrate 401 is referred to the description of embodiment(s) disclosed above, and may be selectively applied to the present embodiment.

The light emitting device 100 and the resin member 450 are disposed on the substrate 401 and the light emitting device 100 is disposed on one side of the resin member 450 to emit light in the Y direction. The light emitting device 100 may have an emitting region 101 through which light is exited, and the emitting region 101, for example, may be vertically disposed in the Z direction with respect to the Y-axis horizontal to the substrate 401. The emitting region 101 may be disposed in an X-axis and Z-axis plane. The description of the light emitting device 100 is referred to the description of embodiment(s) disclosed above, and may be selectively applied to the present embodiment. The resin member 450 may emit light of the same color to each other by the light emitting device 100. The plurality of light emitting devices 100 may emit light of a single color.

The lighting module 400 may include a reflective member 410. The reflective member 410 may be disposed between the substrate 401 and the resin member 450. The reflective member 410 may be provided in the form of a reflective member having a metallic material or a non-metallic material. The reflective member 410 may be disposed on the substrate 401. The description of the reflective member 410 is referred to the description of embodiment(s) disclosed above, and may be selectively applied to the present embodiment.

The reflective member 410 may be formed to have a thickness thinner than a thickness T1 of the light emitting device 100. The thickness of the reflective member 410 may include a range of 0.2 mm±0.02 mm. A lower portion of the light emitting device 100 may be passed through an opening 418 of such a reflective member 410 and an upper portion of the light emitting device 100 may be protruded. A straight line or an optical axis Y0 extending from the emitting region 101 of the light emitting device 100 may be orthogonal to a center of the emitting region 101 and may be disposed above an upper surface of the reflective member 410. The material of the reflective member 410 may be described with reference to the above description and selectively applied to the present embodiment. The reflective member 410 according to an embodiment may reflect incident light, and thus an amount of light may be increased so that light may be emitted in a uniform distribution.

The resin member 450 may be disposed on the substrate 401. The material and the detailed configuration of the resin member 450 is referred to the description of embodiment(s) disclosed above, and may be selectively applied to the present embodiment. Since the resin member 450 is disposed on the light emitting device 100, the light emitting device 100 may be protected and loss of light emitted from the light emitting device 100 may be reduced. The resin member 450 may cover the light emitting device 100 and may be in contact with the emitting region 101 of the light emitting device 100. A thickness of the resin member 450 may vary depending on a region. A thickness T2 of the thickest region (e.g., Px) in the Z direction in the resin member 450 may be thicker than the thickness T1 of the light emitting device 100 and a thickness T3 of the thinnest region (e.g., P4) may be thinner than the thickness T1 of the light emitting device 100. A high point Px which is highest in the resin member 450 may be disposed to be closer to the light emitting device 100 than a center of the resin member 450 in the Y direction. The maximum thickness T2 of the resin member 450 may be greater than or equal to the thickness T1 of the light emitting device 100 and may be less than or equal to 20 mm. The maximum thickness T2 of the resin member 450 may be, for example, in a range of 2 mm to 20 mm. When the maximum thickness T2 of the resin member 450 is larger than the above range, light efficiency may decrease or a size of module may increase, and when the maximum thickness T2 is smaller than the above range, light uniformity may be deteriorated. The resin member 450 may be a unit light emitting cell 450A or a light emitting region of a unit lighting module. The resin member 450 may have a length K1 in the Y direction equal to or greater than a length K2 in the X direction. The length K1 in the Y direction may be the length of first and second side surfaces S11 and S12 disposed on opposite sides of the resin member 450 in the X direction. The length K1 in the Y direction may have a range of 10 mm or more, for example, 10 mm to 40 mm, or 20±5 mm. The length K2 in the X direction may be in a range of 10 mm or more, for example, 10 mm to 30 mm or 15 mm to 23 mm. A size of the resin member 450 may be provided in consideration of the light uniformity, and may vary depending on applications.

The thinnest region of the resin member 450 may be the farthest region based on the emitting region 101 of the light emitting device 100. The minimum thickness T3 of the resin member 450 may be 1 mm or more based on an upper surface of the substrate 401 or less than the thickness of the light emitting device 100. A low point P4 of an upper surface of the resin member 450 may be lower than a height of an upper surface of the light emitting device 100. The low point P4 which is lowest in the upper surface of the resin member 450 may have a thickness of 0.5 mm or more, for example, in a range of 0.5 mm to 5 mm from the upper surface of the reflective member 410 or the substrate 401. When the thickness is thinner than the above range, light extraction may be deteriorated, and when it is thicker than the above range, optical interference to other light emitting cells 450A may be caused. The low point P4 of the upper surface of the resin member 450 may be equal to or higher than a height of the straight line extending from the center of the emitting region 101 of the light emitting device 100, or the optical axis Y0. A side surface of the resin member 450 may be coated with a metal material such as aluminum, chromium, or barium sulfate, but is not limited thereto.

The upper surface of the resin member 450 includes an exit portion 440 and a reflective portion 442. The exit portion 440 may include a light extraction structure. The light extraction structure may change a critical angle of incident light as an optical pattern. The light extraction structure may be formed integrally with the resin member 450. The resin member 450 and the light extraction structure may be formed of the same material. The light extraction structure may have a pattern having a predetermined distance or irregular distance. The light extraction structure may have a distance of pattern gradually narrowed as it is farther from the light emitting device 100. The above-described patterns, for example, the patterns shown in FIGS. 10, 13, and 15 may be selectively applied to the light extraction structure.

A distance from the upper surface of the substrate 401 may be gradually reduced as the exit portion 440 of the resin member 450 is farther from the light emitting device 100. The distance of the pattern of the exit portion 440 may be uniform or gradually narrowed as the region is adjacent to the substrate 401. The exit portion 440 may have the light extraction structure and may be disposed to have a thickness that gradually decreases as the exit portion 440 is farther from the light emitting device 100. Accordingly, the exit portion 440 may emit the light reflected by the reflective member 410 or the light emitted from the light emitting device 100 in the Z direction. The exit portion 440 is disposed to be adjacent to the substrate 401 as it is farther from the light emitting device 100, and thus a difference in amount of light according to a distance from the emitting region 101 of the light emitting device 100 may be reduced. Accordingly, the uniformity of the light extracted via the exit portion 440 may be improved. When the light emitted from the light emitting device 100 or the light reflected by the reflective member 410 is incident, the light extraction structure of the light exit portion 440 may change a critical angle of light by the patterns of the light exit portion 440 to extract the light to an outside. The light emitted in the Z direction via such an exit portion 440 may be a surface light source. The light extraction structure of the exit portion 440 is referred to the description of embodiment(s) disclosed above, and may be selectively applied to the present embodiment.

The reflective portion 442 in the upper surface of the resin member 450 may be disposed on a region adjacent to the light emitting device 100. The reflective portion 442 may be disposed to be closer to the light emitting device 100 than the light extraction structure. The reflective portion 442 may include a region between the light emitting device 100 and the exit portion 440. The reflective portion 442 may include a convex curved surface. The reflective portion 442 may include a curved surface including an aspherical shape or having a plurality of inflection points. The reflective portion 442 may reflect light traveling in an upward direction from the light emitting device 100 in a different direction. The light reflected by the reflective portion 442 may be extracted via the exit portion 440 or reflected on the reflective member 410. Such a reflective portion 442 may prevent hot spots from being generated in a region adjacent to the light emitting device 100.

The reflective portion 442 may have a gradually lower height as it is adjacent to the light emitting device 100. A surface of the reflective portion 442 may have a height gradually higher as it is farther from the light emitting device 100 and may be connected to the high point Px of the resin member 450 and the light extraction structure of the exit portion 440. The reflective portion 442 may have a structure of a plurality of steps or may be formed as a curved surface having a plurality of inflection points.

The reflective portion 442 may cover up to a distance K0 of 0.1 mm or more, for example, a distance K0 of 0.1 mm to 10 mm, or a distance K0 of 1 mm to 3 mm based on a straight line Z1 in the Z direction or a straight line Z1 perpendicular to the upper surface of the substrate 401 from the emitting region 101 of the light emitting device 100. A radius of curvature of the curved surface of the reflective portion 442 may have 3 mm or more, for example, in a range of 4 mm to 5.5 mm. A boundary point between the reflective portion 442 and the exit portion 440 may be the high point Px of the resin member 450 and may be 45 degrees or more, for example, in a range of 45 to 80 degrees based on the Y-axis. The high point Px of the resin member 450 may be the same as or different from a high point of the reflective portion 442. A high point of the exit portion 440 may be the same as or different from the high point of the reflective portion 442. The distance K0 of such a reflective portion 442 and the curvature of the curved surface may vary depending on a position of the light emitting device 100 and beam spread angle characteristics of the light.

A region of the reflective portion 442 may extend to a partial region of a protrusion portion 430. The region of the reflective portion 442 may further include a region to −10 degrees in the −Y direction based on the straight line Z1 in the Z direction from the emitting region 101 of the light emitting device 100. Here, the region corresponding to the negative (−) angle may be a region on the light emitting device 100. A height of a low point of the reflective portion 442 may be disposed at a position higher than the upper surface of the light emitting device 100. A height of the high point of the reflective portion 442 may be disposed at a position higher than the upper surface of the light emitting device 100 from the substrate 401. The height of the high point of the reflective portion 442 may be, for example, 1.5 mm or more, for example, in a range of 2 to 10 mm, or in a range of 2 to 4 mm. The region of the reflective portion 442 according to an embodiment may be disposed on a region deviating from a beam spread angle of the light emitting device 100 so as to solve a problem of hot spots due to the light deviating from the beam spread angle of the light of the light emitting device 100.

The resin member 450 may include a protrusion portion 430. The protrusion portion 430 is disposed on a region of the light emitting device 100 and encloses the light emitting device 100. The protrusion portion 430 may protrude in a rear direction from the resin member 450 or may protrude in a recessed direction of another resin member as shown in FIG. 26. Here, the rear direction may be a direction opposite to the direction in which the light is exited. The surface of the protrusion portion 430 may be spaced apart from the surface of the light emitting device 100 to protect the light emitting device 100.

The first side surface S11 of the resin member 450 may include a first concave region S131 and a second concave region S141 at an outer side of the protrusion portion 430. The protrusion portion 430 may be disposed between the first concave region S131 and the second concave region S141. The first and second concave regions S131 and S141 may be regions that are not overlapped with the light emitting device 100 in the first direction. The first concave region S131 may be disposed between the protrusion portion 430 and a third side surface S13 and the second concave region S141 may be disposed between the protrusion portion 430 and a fourth side surface S14.

A width K6 of the protrusion portion 430 in a second direction may be greater than the width of the light emitting device 100 and may be greater than a width K4 of the first concave region S131. The width K6 of the protrusion portion 430 may be 30% or more, for example, in a range of 35% to 70% of a width K2 of the resin member 450. The width K6 of the protrusion portion 430 may be twice or less the width of the light emitting device 100. When the width K6 of the protrusion portion 430 is larger than the above range, dark portions at the boundary portion may be generated. When the width K6 is less than the above range, a size of the light emitting device 100 may be reduced.

A distance between the surface of the protrusion portion 430 and the light emitting device 100 may be in a range of 0.2 mm or more, for example, 0.3 to 1 mm. When the distance is smaller than the above range, a protection effect may be deteriorated, and when the distance is larger than the above range, dark portions may be generated. An upper surface 444 of the protrusion portion 430 may be formed as a rough surface, and the rough surface may reflect light incident from another direction. The rough surface may include a concave-convex shape, but is not limited thereto. The rough upper surface of the protrusion portion 430 may have a pattern size smaller than that of the exit portion 440. Accordingly, the rough surface of the protrusion portion 430 may reflect light incident from the rear direction.

A thickness T5 of the protrusion portion 430 may be greater than the thickness T1 of the light emitting device 100. The protrusion portion 430 may have a thickness thinner than the maximum thickness T2 of the resin member 450 and the protrusion portion 430 may protrude in the rear direction from a part of a center region of the resin member 450 when viewed from the top. The width K6 of the protrusion portion 430 in the X direction may be larger than a width D1 (see FIG. 30) of the light emitting device 100 and may be smaller than a width of the resin member 450 in the X direction.

The resin member 450 may include a recess 420 (see FIG. 24). The recess 420 may be disposed at a region corresponding to a protrusion portion of another resin member. The recess 420 may be a region where a part of the second side surface S12 is concave in a direction of the light emitting device 100. The resin member 450 in the recess 420 may be removed and a part of another resin member 450, for example, a protrusion portion may be disposed. The recess 420 may have the same width in the second direction or may have a width that gradually increases as it is farther from the light emitting device 100. A distribution of the light emitted via the resin member 450 may vary due to the recess 420. Such a recess 420 may be removed in the case of a single module, or in the case of a plurality of modules, a recess of the last resin member may be removed, but is not limited thereto. A depth K9 of the recess 420 in the first direction may be less than a length K8 of the protrusion portion 430. The depth K9 of the recess 420 may be 0.5 mm or more, for example, in a range of 1 to 3 mm. When the depth K9 of the recess 420 is deeper than the above range, the light emitting region may be reduced. When the depth K9 is smaller than the above range, luminous intensity may be decreased or dark portions may be generated around the protrusion portion of another resin member. A shape of the recess 420 may correspond to a shape of the protrusion portion 430, and may be a polygonal shape, for example, a quadrilateral shape. A width of the recess 420 may be a shape having the same width as it goes in a light exit direction or is farther from the light emitting device 100. As another example, the width of the recess 420 may gradually increase as it is farther from the light emitting device 100. The shape of the protrusion portion 430 may be a shape having the same width or a shape having a width that gradually increases. The shape of the recess 420 may be a shape corresponding to that of the protrusion portion 430.

Although the lighting module of FIGS. 24 and 25 has been described as the unit light emitting cell 450A, it may be implemented as a lighting module in which light emitting cells having a plurality of resin members are arranged as in embodiment(s) described later.

Figure 27:
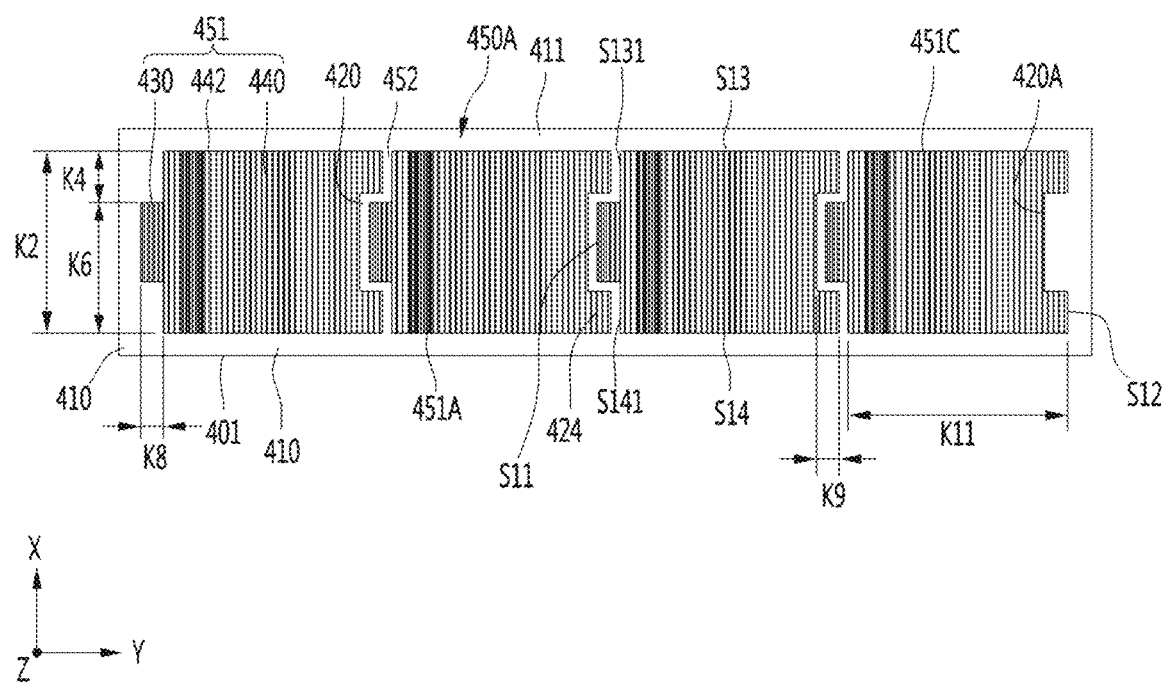
FIG. 27 is a plan view of the lighting module of FIG. 26.
Figure 28:
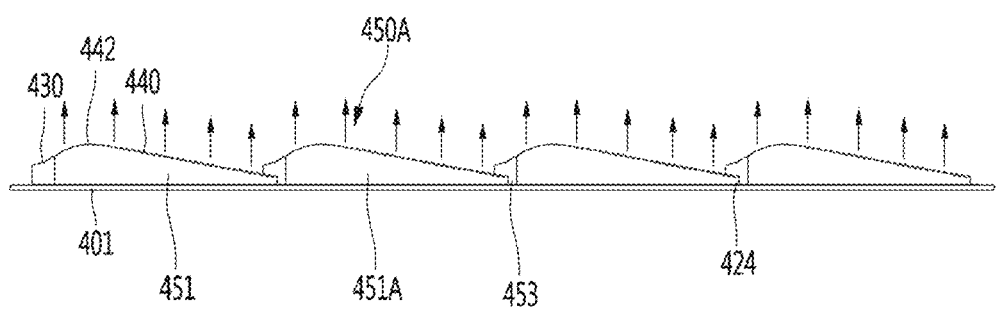
FIG. 28 is a side cross-sectional view of the lighting module of FIG. 26.
Figure 29:
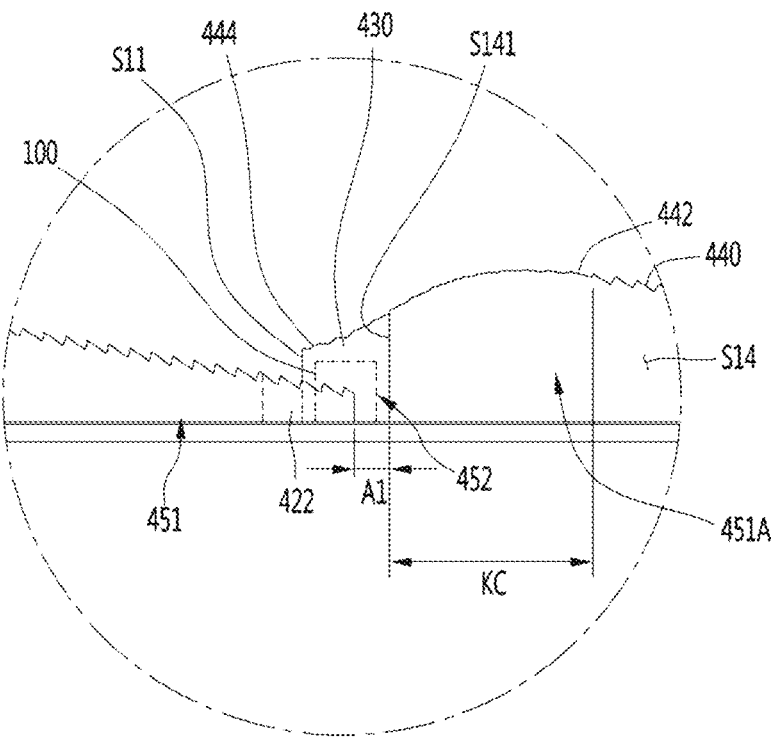
FIG. 29 is a partially enlarged view of FIG. 28.
Figure 30:
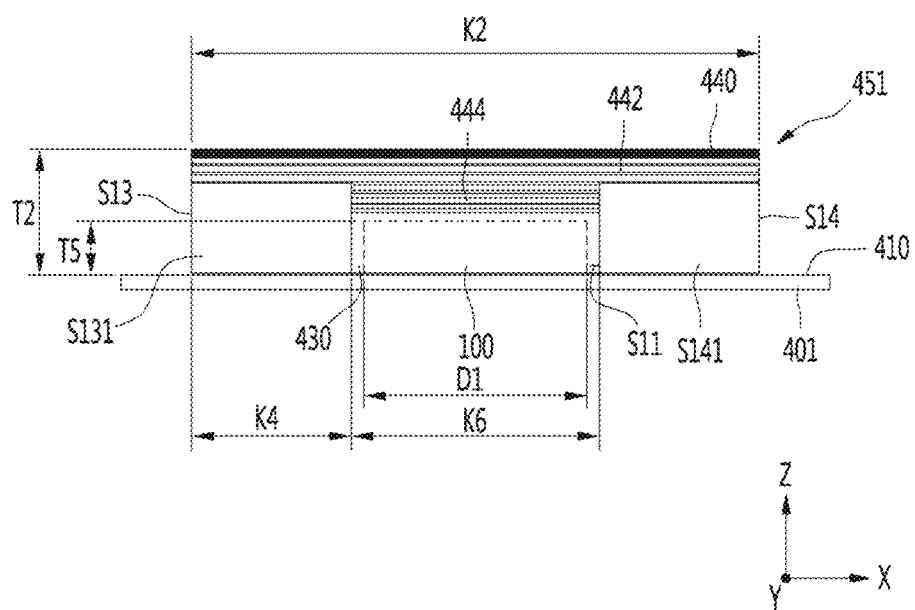
FIG. 30 is a front view of the lighting module of FIG. 26.
Figure 31:
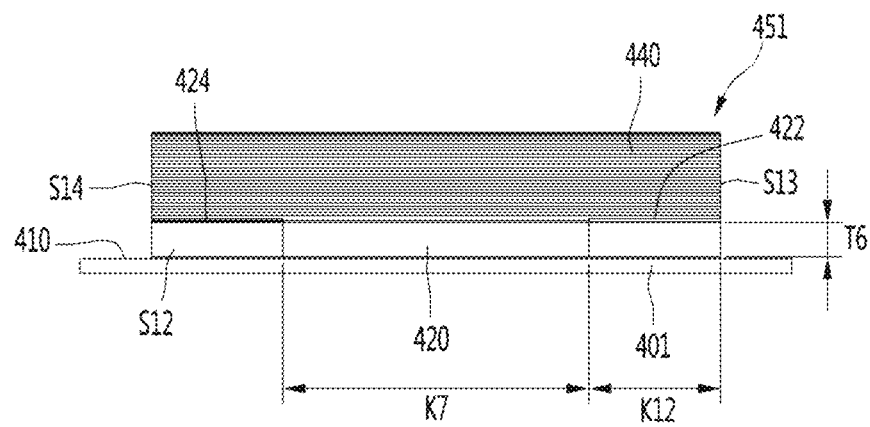
FIG. 31 is a rear view of the lighting module of FIG. 26.
Figure 32:
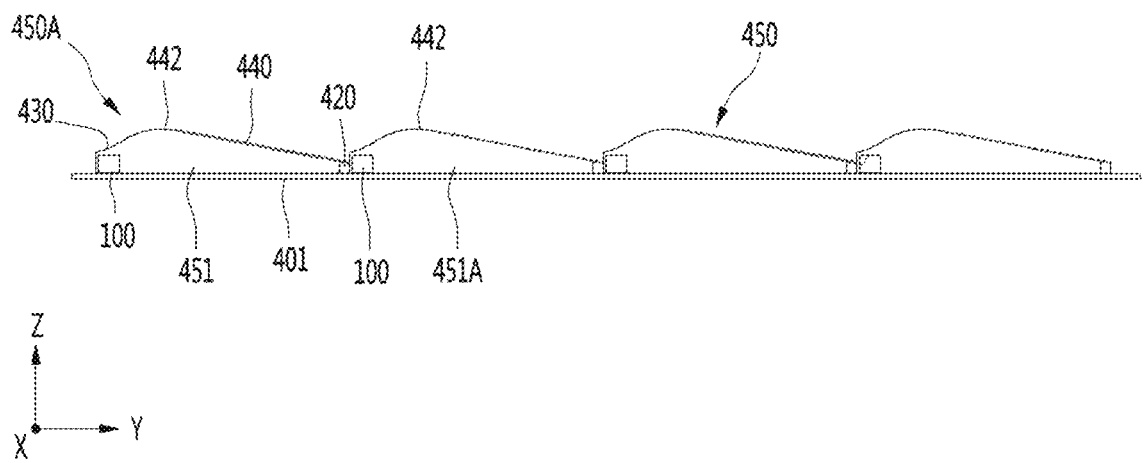
FIG. 32 is a side cross-sectional view of the lighting module of FIG. 26.
Figure 33:
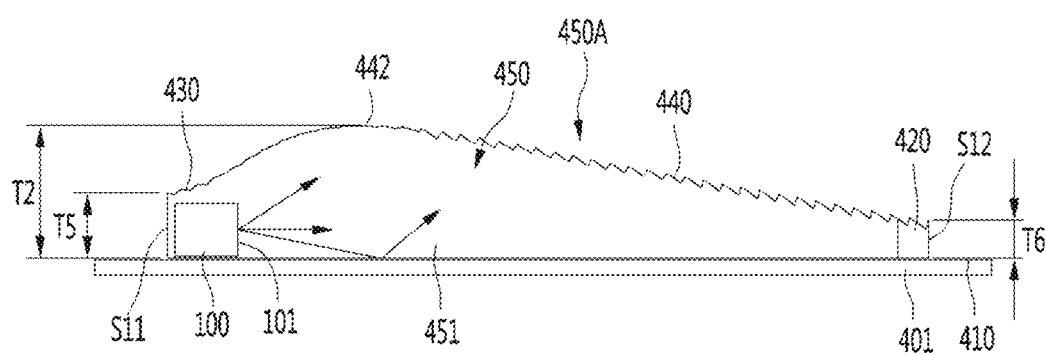
FIG. 33 is an enlarged view of the lighting module or light emitting cell of FIG. 32.
Figure 34:
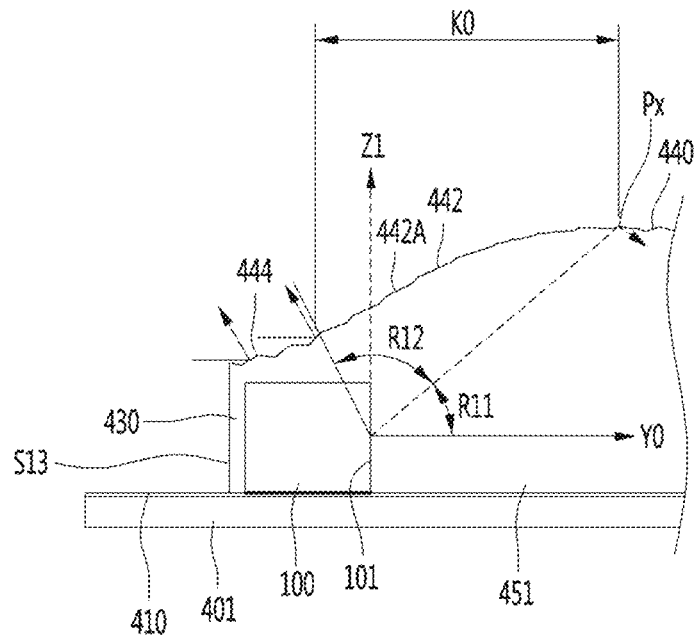
FIG. 34 is a cross-sectional view illustrating a reflective portion of the resin member of the lighting module of FIG. 33.

FIGS. 26 to 28 illustrate another example of FIG. 24, a lighting module in which a plurality of light emitting cells are arranged. FIG. 26 is a perspective view illustrating a lighting module, FIG. 27 is a plan view of the lighting module of FIG. 26, FIG. 28 is a side cross-sectional view of the lighting module of FIG. 26, FIG. 29 is a partial enlarged view of FIG. 28, FIG. 30 is a front view of the lighting module of FIG. 26, FIG. 31 is a rear view of the lighting module of FIG. 26, FIG. 32 is a side cross-sectional view of the lighting module of FIG. 26, FIG. 33 is an enlarged view of the lighting module of FIG. 32 or a light emitting cell, and FIG. 34 is a cross-sectional view for explaining a reflective portion of a resin member of the lighting module of FIG. 33. In describing such an embodiment, the same configuration and the same part as that of the embodiment(s) disclosed above is referred to the description disclosed above, and may be selectively applied to the present embodiment.

Referring to FIGS. 26 to 34, a plurality of light emitting cells 450A may be arranged on a substrate 401 in a lighting module 400A. At least two light emitting cells 450A may be arranged on the substrate 401. The light emitting cells 450A may be arranged on the substrate 401 in one or a plurality of rows. A direction in which light of each of the light emitting cells 450A is exited may be the same direction or in different directions.

As shown in FIGS. 26 and 27, a length Y1 in the Y direction of the substrate 401 in the lighting module 400A may be twice or more a width X1 in the X direction. An area of the upper surface of the substrate 401 may be greater than a sum of an area of a lower surface of the light emitting cell 450A. A circumference of the upper surface of the substrate 401 may be disposed at a circumference of a side surface of the light emitting cell 450A. Here, the upper surface of the substrate 401 may be the surface of the reflective member 410 shown in FIG. 25, but is not limited thereto. The width X1 of the substrate 401 may be greater than the length K2 of the resin member 450. The reflective member 410 may be disposed between the plurality of light emitting cells 450A or a plurality of resin members 451 and 451A and the substrate 401.

The plurality of resin members 451 and 451A are arranged on the substrate 401 and each of the resin members 451 and 451A may cover the light emitting device 100. The light emitting cell 450A may include each of the resin members 451 and 451A and each of the light emitting devices 100. The resin members 451 and 451A may include, for example, a first resin member 451 and a second resin member 451A adjacent to the first resin members 451 as a light transmitting member spaced apart from each other. The first resin member 451 and the second resin member 451A may be disposed alternately. The second resin member 451A may be arranged in the light exit direction of the first resin member 451. The first resin member 451 and the second resin member 451A may have the same shape and may be arranged in the first direction. At least a portion of the first resin member 451 and the second resin member 451A may be spaced apart or may not be in contact with each other. The first resin member 451 and the second resin member 451A may be physically separated. As another example, the first resin member 451 and the second resin member 451A may be partially connected, but is not limited thereto. The resin member positioned last among the plurality of resin members 451 and 451A will be described as a third resin member 451C.

The lengths K1 of the first and second resin members 451 and 451A may be equal to each other. The length K1 may be the length of the first and second side surfaces S11 and S12 of the resin members 451 and 451A and may be disposed to be long in the Y direction. A length K11 of the third resin member 451C may be equal to or shorter than the lengths K1 of the first and second resin members 451 and 451A. This may reduce or remove the depth of a recess 420A of the third resin member 451C so that the length of the third resin member 451C may be different from that of another resin member.

The length K1 in the Y-direction of the first and second side surfaces S11 and S12 of the resin members 451 and 451A may be equal to or different from the length K2 in the X direction, and may be at least 10 mm or more. The length K1 may be in a range of 10 mm to 40 mm or 15 to 25 mm. The length K2 may be 10 mm or more, and may be in a range of 10 to 30 mm, or in a range of 13 to 25 mm. An area of the bottom of the resin members 451 and 451A may be a region in which one light emitting device 100 may be covered and may be a size of a unit cell having uniform luminous intensity. The length K11 of the third resin member 451C may be in a range of 10 to 40 mm, or in a range of 15 to 25 mm. A width of the third resin member 451C may be equal to the length K2 of the first and second resin members 451 and 451A. The length K2 of the resin members 451 and 451A may be smaller than the width X1 of the substrate 401. The length K2 and the length K1 of the resin members 451 and 451A according to an embodiment may have a size such that the luminous intensity of the light emitted from each light emitting device 100 (see FIG. 32) has a uniform distribution above a predetermined level. When the length K2 and the length K1 are smaller than the range, the number of the light emitting cells may be increased, and when the length K2 and the length K1 are larger than the range, a difference in the uniformity of the luminous intensity may be large.

As shown in FIGS. 27 to 29, a gap portion 452 may be disposed between the plurality of resin members 451 and 451A. The gap portion 452 may be disposed between adjacent first and second resin members 451 and 451A to be spaced apart from each other. The gap portion 452 may be disposed in the X direction. A width G1 (see FIG. 29) of the gap portion 452 may be in a range of 0.5 mm or more, for example, 0.5 to 1.5 mm, and such a width may be a cutting region at the time of a manufacturing process or a gap between injection molding frames at the time of an injection process. When the resin members 451 and 451A are in contact with each other, such a gap portion 452 may reduce problems due to expansion or contraction between each other or luminous intensity differences.

As shown in FIG. 32, each of the resin members 451 and 451A may include a light emitting device 100 therein. A distance between the light emitting devices 100 may correspond to the length K1 of the resin members 451 and 451A. The distance between the light emitting devices 100 may be disposed in consideration of a desired amount of light or uniformity of light. One or a plurality of such light emitting devices 100 may be disposed in the resin members 451 and 451A, and embodiments will be described as an example in which the light emitting device 100 is disposed in a single unit for convenience of explanation.

Referring to FIGS. 26 to 30 and FIG. 32, each of the resin members 451, 451A, and 451C may include a protrusion portion 430. In each of the resin members 451, 451A, and 451C, the protrusion portion 430 may be disposed at the surface of the light emitting device 100 and may protrude in the rear (−) direction. Each of the resin members 451, 451A, and 451C may include a reflective portion 442 as described above. The reflective portion 442 may be disposed at one side of upper surfaces of the resin members 451, 451A, and 451C and may be connected to the protrusion portions 430. A first region of the reflective portion 442 disposed on the light emitting device 100 may have the same width as the width K6 of the protrusion portion 430, and a second region at the exit side of the light emitting device 100 may be the same as the length K2 of the upper surfaces of the resin members 451, 451A, and 451C. Such a reflective portion 442 may be overlapped on the light emitting device 100 and may be connected to the exit portion 440. A width of the second region of the reflective portion 442 may be the same as the width (e.g., K2) of the exit portion 440.

As shown in FIGS. 26, 27, and 31, the resin members 451 and 451A may include a recess 420. The recess 420 may be disposed at a region opposite to the protrusion portion 430 in each of the adjacent resin members 451 and 451A. At least three surfaces of the recess 420 may correspond to the protrusion portion 430. The recess 420 may include, for example, a first surface corresponding to the emitting region 101 of the light emitting device 100, and second and third surfaces facing each other at opposite sides of the first surface. Side surfaces of the protrusion portion 430 may face the first, second, and third surfaces of the recess 420. The second and third surfaces of such a recess 420 may be perpendicular or inclined to a horizontal straight line of the first surface. The light emitting device 100 in another resin member may be disposed in the recess 420. That is, a gap between the second and third surfaces opposite to each other in the recess 420 may be uniform or may be gradually widened as it is farther from the first surface. The gap between the second and third surfaces of such a recess 420 may be a distance that is not in contact with the side surfaces of the protrusion portion.

The protrusion portion 430 and the recess 420 may be disposed at a boundary between the adjacent resin members 451 and 451A. The protrusion portion 430 of the second resin member 451A may be disposed at the recess 420 of the first resin member 451. At least a portion of the protrusion portion 430 of the second resin member 451A may be disposed at the recess 420 of the first resin member 451. Accordingly, a peripheral region (that is, a light emitting region) of the recess 420 of another resin member may be disposed at the outer side of the protrusion portion 430. Due to a coupling structure of the protrusion portion 430 and the recess 420, it is possible to suppress occurrence of dark portions at a boundary between different resin members.

The third resin member 451C may be provided with the recess 420A or the recess 420A may be removed therefrom, and when the recess 420A is removed, a second side surface of the third resin member 451C may be disposed on the same straight line. In an embodiment, the recesses 420 and the protrusion portions 430 may be disposed at the region between the adjacent resin members 451 and 451A so that protrusions 422 and 424 of the recess 420 may be disposed at opposite sides of the protrusion portion 430. At least a portion of the protrusion portion 430 may be disposed at the recess 420 or at least a portion of the light emitting device 100 may be disposed thereat. As shown in FIG. 27, the recess 420 may have a depth K9 that is larger than the length in the Y direction of the light emitting device 100. The depth K9 in the Y direction of the recess 420 may be smaller than the length K8 of the protrusion portion 430 and may range from 0.5 mm or more, for example, 1 to 3 mm. When the depth K9 of the recess 420 is deeper than the above range, the light emitting region may be reduced. When the depth K9 is smaller than the above range, luminous intensity may be decreased or dark portions may be generated around the protrusion portion 430. A shape of the recess 420 may correspond to a shape of the protrusion portion 430, and may be a polygonal shape, for example, a quadrilateral shape. The shape of the recess 420 may be a shape having the same width as it goes in the light exit direction or is farther from the light emitting device 100, or a shape having a width that gradually increases. The shape of the protrusion portion 430 may be a shape having the same width or a shape having a width that gradually increases. A height of the resin member in a peripheral region of the recess 420 may be lower than a height of the protrusion portion 430.

The resin members 451 and 451A may include guide protrusions 422 and 424. The guide protrusions 422 and 424 may be disposed at opposite sides of the recess 420 to face each other. The guide protrusions 422 and 424 may be a region, which is disposed at opposite sides of the protrusion portion 430 and in which light is emitted, and the light emitted from the light emitting device 100 may be emitted. The guide protrusions 422 and 424 may have a reflective member 410 disposed at a lower portion thereof and an exit portion 440 or a light extraction structure disposed at a surface thereof. Accordingly, the guide protrusions 422 and 424 may exit the incident light in an upward direction, and may suppress or block occurrence of the dark portions in the peripheral region of the protrusion portion 430. Thicknesses of the first and second guide protrusions 422 and 424 may be thinner than a thickness of the protrusion portion 430. The first and second guide protrusions 422 and 424 may be overlapped with the protrusion portion 430 in the X-axis direction.

The gap portion 452 may extend to the recess 420 so as to prevent the adjacent resin members 451 and 451A from contacting with each other in the recess 420. Since such a gap portion 452 is provided as an air gap in the region between the adjacent resin members 451 and 451A, refractive index of the resin members 451 and 451A is different from that of the gap portion 452 so that leakage of light may be suppressed or the leaked light may be reflected. The gap portion 452 according to an embodiment may prevent warpage at the connection portion of the resin members due to thermal expansion or contraction between the resin members 451 and 451A.

Referring to FIGS. 27 and 30, the resin members 451, 451A, and 451C may be vertical surfaces or inclined surfaces of the third and fourth side surfaces S13 and S14 in the second direction, but are not limited thereto. A part of the second side surface S12 adjacent to the gap portion 452 may correspond to the guide protrusions 422 and 424. The first side surface S11 may be a front surface between the third and fourth side surfaces S13 and S14 and the second side surface S12 may be a rear surface between the third and fourth side surfaces S13 and S14. A boundary portion between the first side surface S11 and the third and fourth side surfaces S13 and S14 may be an angular surface or a curved surface. The boundary portion between the first side surface S11 and the third and fourth side surfaces S13 and S14 may be an angular surface or a curved surface. The outer side first side surface S11 of the protrusion portion 430 may face at least one surface of the adjacent recess 420.

The first side surface S11 of the resin members 451,451A, and 451C may include the first concave region S131 and the second concave region S141 at an outer side of the protrusion portion 430. The protrusion portion 430 may be disposed between the first concave region S131 and the second concave region S141. The first and second concave regions S131 and S141 may be regions that are not overlapped with the light emitting device 100 in the first direction. The first concave region S131 may be disposed between the protrusion portion 430 and the third side surface S13 and the second concave region S141 may be disposed between the protrusion portion 430 and the fourth side surface S14.

The width K6 of the protrusion portion 430 in the second direction may be greater than the width D1 (see FIG. 30) of the light emitting device 100 and may be greater than the width K4 of the first concave region S131. The width K6 of the protrusion portion 430 may be 30% or more, for example, in the range of 35% to 70% of the width K2 of the resin member 451. The width K6 of the protrusion portion 430 may be twice or less the width D1 of the light emitting device 100. When the width K6 of the protrusion portion 430 is larger than the above range, dark portions at the boundary portion may be generated. When the width K6 is less than the above range, a size of the light emitting device 100 may be reduced. A light exit area of the guide protrusions 422 and 424 may be reduced. Here, a direction of the width of the protrusion portion 430 may be a direction perpendicular to an optical axis.

Referring to FIGS. 27 and 31, a width K7 of the recesses 420 and 420A may be greater than the width K6 of the protrusion portion 430. The recesses 420 and 420A may be wider than a width K12 of each of the guide protrusions 422 and 424 and may be 30% or more, for example, in a range of 40% to 70% of the length K2 of the resin member. The width K7 of the recesses 420 and 420A may be not more than twice the width K6 of the protrusion portion 430 in the X direction and, for example, may be twice or less the width D1 of the light emitting device 100. When the width K7 of the recess 420 is larger than the above range, optical loss may be increased or dark portions may be generated at a periphery of the protrusion portion 430. In addition, the area of the light exit of the guide protrusions 422 and 424 may be reduced.

The width K12 of each of the guide protrusions 422 and 424 may be equal to each other. In this case, a light distribution or a light emission area at the outer side of the protrusion portion 430 may be provided equally. A thickness T6 of the guide protrusions 422 and 424 shown in FIG. 31 may be disposed to be thinner than the thickness T5 of the protrusion portion 430 shown in FIG. 30, so that it is possible to prevent luminous intensity of a peripheral region of the protrusion portion 430 from deteriorating. An outer side surface S15 of the guide protrusions 422 and 424 may be formed as a vertical or inclined surface. The guide protrusions 422 and 424 may be overlapped with the light emitting device 100 and the protrusion portion 430 in the second direction or the width direction.

As shown in FIGS. 28 and 29, each light emitting cell 450A may exit light emitted from the light emitting device 100 as a uniform surface light source, and occurrence of dark portions may be suppressed by a structure of the protrusion portion 430 and the guide protrusions 422 and 424 at the boundary region between the resin members 451 and 451A. Further, an amount of light exited from the region adjacent to the light emitting device 100 may be suppressed by the reflective portion 442 of the resin members 451 and 451A so that the occurrence of dark portions may be suppressed and the light having a uniform light distribution may be emitted from an entire surface by the exit portion 440.

As shown in FIGS. 33 and 34, the reflective portion 442 of the resin members 451 and 451A may be disposed at a region deviating from an angle R11 of a straight line connecting the high point Px to the center of the emitting region 101 with reference to a straight line or the optical axis Y0. The high point Px may be a point of the half angle of the beam spread angle or a high point of the resin members 451 and 451A. The reflective portion 422 may have an angle R12 of 45 degrees or more, for example, 45 to 55 degrees from the straight line with respect to the emitting region 101 of the light emitting device 100. The reflective portion 422 may be disposed in a range of −10 degrees or less and +45 degrees or less with respect to the straight line Z1 in the Z direction at the emitting region 101 of the light emitting device 100, so that the incident light may be effectively reflected.

Figure 35:
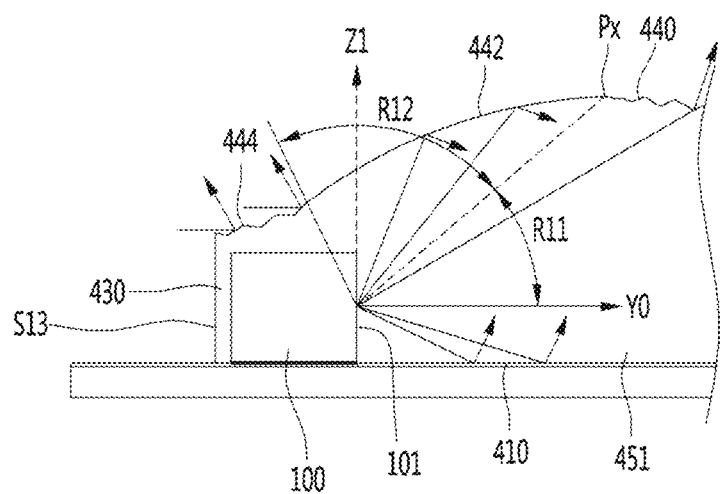
FIG. 35 is a further example of the reflective portion of the resin member of FIG. 34.

As shown in FIG. 34, the reflective portion 442 of the resin members 451 and 451A may have a structure 442A of a plurality of steps and as shown in FIG. 35, may be formed in a curved surface having a plurality of inflection points or different radii of curvature instead of having a stepped structure. As shown in FIG. 35, the reflective portion 442 may be disposed in a range of −10 degrees or less and +45 degrees or less with respect to the straight line Z1 in the Z direction at the emitting region 101 of the light emitting device 100, so that the incident light may be effectively reflected. The reflective member 410 according to an embodiment will be described, for example, with reference to FIGS. 7 and 8 and may be selectively applied to the present embodiment. As another example, when a layer of highly reflective material is disposed on the upper surface of the substrate 401, the reflective member 410 may be removed. The exit portion 440 of the resin member 451 may selectively include FIG. 10, 13 or 15 with respect to the light extraction structure, and a detailed description thereof will be omitted.

Figure 36:
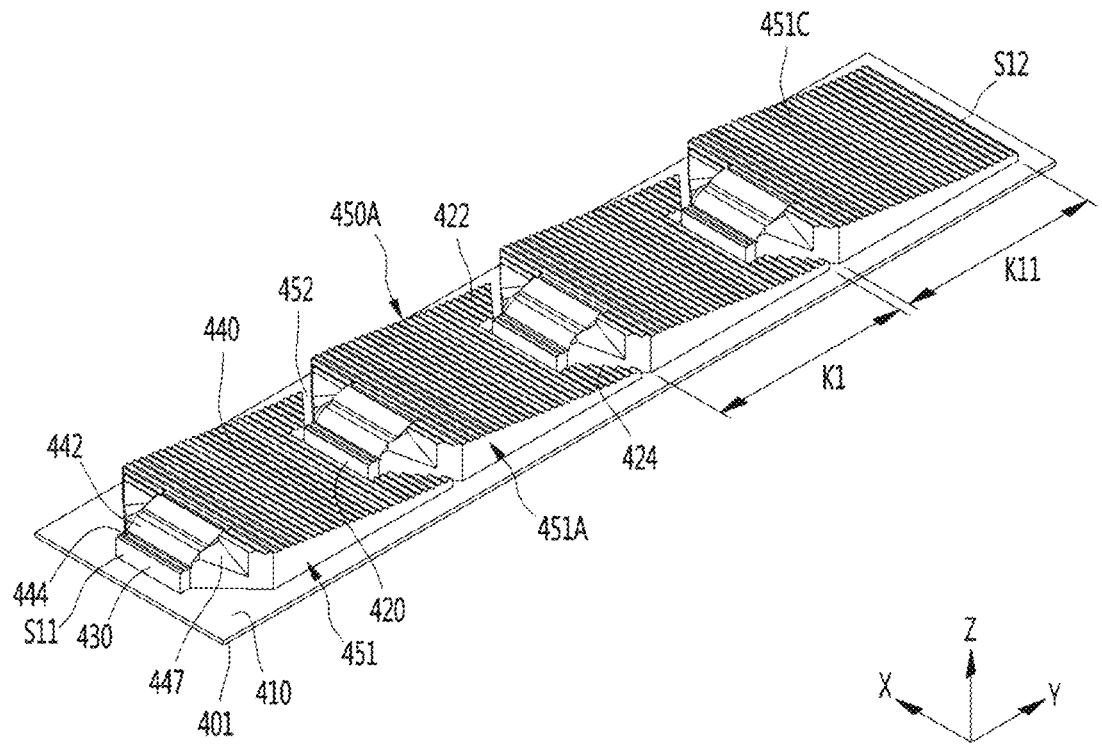
FIG. 36 is a perspective view showing a first modification of the lighting module of FIG. 24 or FIG. 26.
Figure 37:
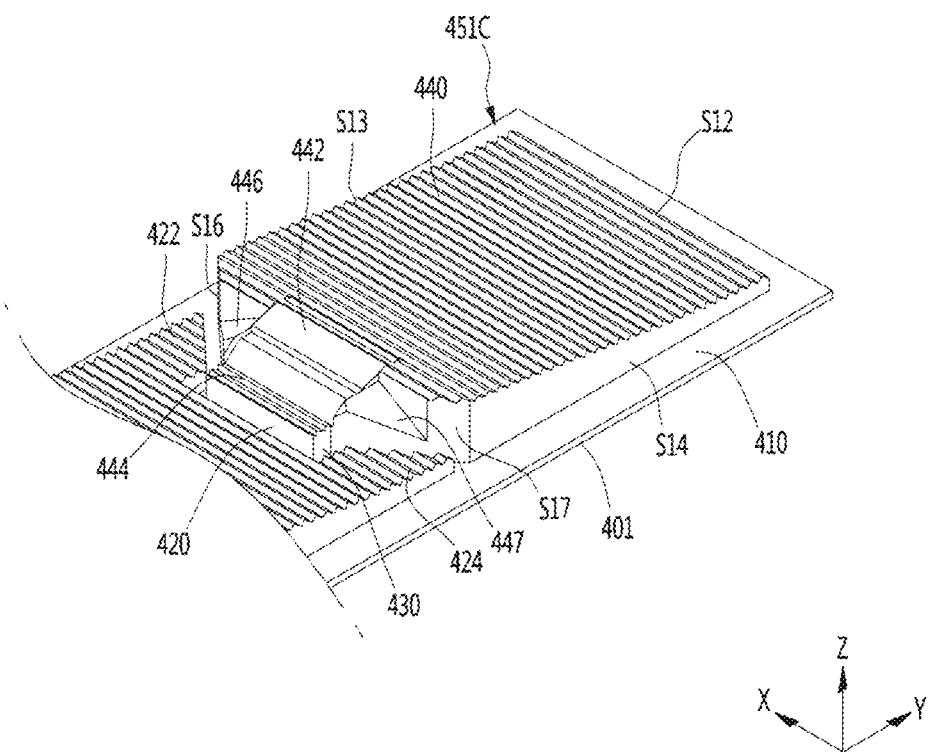
FIG. 37 is a partial perspective view of the lighting module of FIG. 36.
Figure 38:
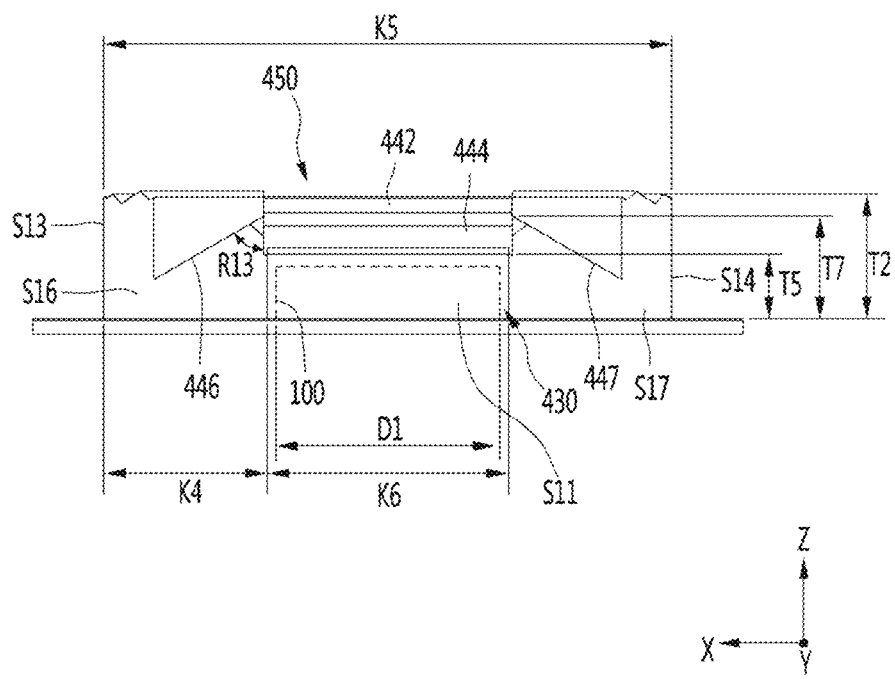
FIG. 38 is a front view of the lighting module of FIG. 36.
Figure 39:
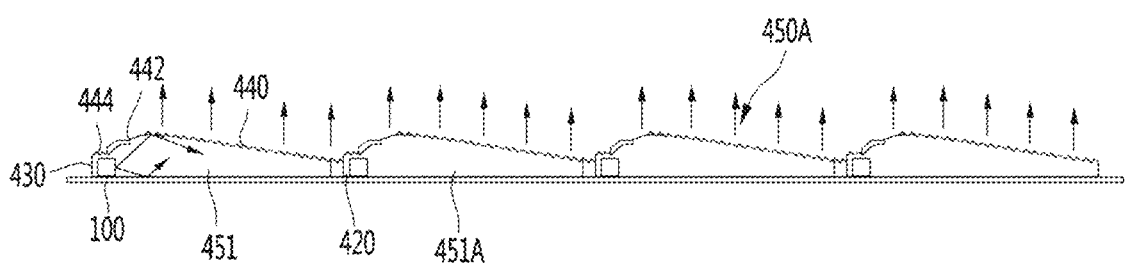
FIG. 39 is a partial side cross-sectional view of the lighting module of FIG. 36.

FIG. 36 is a perspective view illustrating a first modified example of the lighting module of FIG. 24 or FIG. 26, FIG. 37 is a partial perspective view of the lighting module of FIG. 36, FIG. 38 is a front view of the lighting module of FIG. 36, and FIG. 39 is a partial side cross-sectional view of the lighting module of FIG. 36. In describing such an embodiment, the same configuration as that of embodiment(s) disclosed above is referred to the description of embodiment(s) disclosed above, and may be selectively applied to the present embodiment.

Referring to FIGS. 36 to 39, the lighting module may include a plurality of light emitting cells 450A, and each of the plurality of light emitting cells 450A may be disposed on a substrate 401, respectively.

Each of the light emitting cells 450A includes a light emitting device 100 and resin members 451 and 451A. The resin members 451 and 451A include a protrusion portion 430 and a recess 420 covering the light emitting device 100. Here, the resin members 451 and 451A are disposed to be adjacent to each other. The third resin member 451C, which is the last resin member in the lighting module, may have the protrusion portion 430 and the recess 420 may be removed, but are not limited thereto.

The protrusion portion 430, the recess 420, the reflective portion 442 and the exit portion 440 of the resin members 451 and 451A will be described with reference to the description of the above-described embodiment. As shown in FIG. 38, the reflective portion 442 may function as a center-side reflective portion located at a region corresponding to the protrusion portion 430. The resin members 451 and 451A may include side reflective portions 446 and 447 having inclined upper surfaces at opposite sides of the reflective portion 442. The width in the X direction of the reflective portion 442 of the resin members 451 and 451A may be the same as the width K6 of the protrusion portion 430 so that the incident light may be reflected.

The side reflective portions 446 and 447 may include first and second side reflective portions 446 and 447 spaced apart from each other, the first side reflective portion 446 may be disposed in a corner region between the protrusion portion 430 and the third side surface S13 of the resin members 451 and 451A, and the second side reflective portion 447 may be disposed in a corner region between the protrusion portion 430 and the fourth side surface S14 of the resin members 451 and 451A. The first side reflective portion 446 and the second side reflective portion 447 may be disposed at opposite sides of the reflective portion 442.

As shown in FIG. 38, upper surfaces of the first and second side reflective portions 446 and 447 may be formed to be inclined laterally from the reflective portion 442. The inclined upper surfaces of such first and second side reflective portions 446 and 447 may be disposed at the outer side of the protrusion portion 430 having the light emitting device and extend to opposite sides of the reflective portion 442. An inclination angle R13 of the inclined upper surface may be in a range of 25 to 89 degrees, for example, 25 to 35 degrees, the incident light may be reflected to the reflective member 410, and the reflected light may be exited via the inclined upper surface. Accordingly, the reflective portion 442 located at the periphery of the protrusion portion 430 may prevent hot spots, and the inclined upper surfaces of the side reflective portions 446 and 447 block light leaked via the lateral direction to be exited, and thus it is possible to prevent a decrease in a light distribution at the boundary region between adjacent resin members 451 and 451A. The inclined upper surfaces of the side reflective portions 446 and 447 may have a height gradually lowered as they go toward an outer side direction, for example, the second direction from the reflective portion 442. The inclined upper surfaces of the side reflective portions 446 and 447 may be disposed in the −Y direction or the rear direction with respect to the exit portion 440. The side reflective portions 446 and 447 may be disposed at regions corresponding to the guide protrusions 422 and 424 of other resin members.

The reflective portion 442 at a region between the protrusion portion 430 and the exit portion 440 and the first and second side reflective portions 446 and 447 at opposite sides of the reflective portion 442 in the second direction may be provided, and thus it is possible to prevent hot spots in the center region adjacent to the light emitting device 100 due to the light reflected by the reflective portion 442, to reduce light loss by the inclined upper surfaces of the first and second side reflective portions 446 and 447, and to improve light extraction efficiency in the periphery of the protrusion portion 430.

As shown in FIG. 38, the first side reflective portion 446 may have a first reflective side surface S16 extending between a side surface of the protrusion portion 430 and a third side surface S13, and the second side reflective portion 447 may have a second reflective side surface S17 extending between a side surface of the protrusion portion 430 and a fourth side surface S14. The first and second reflective side surfaces S16 and S17 of such first and second side reflective portions 446 and 447 may be formed to be inclined with respect to the horizontal surfaces of the third and fourth side surfaces S13 and S14, so that it is possible to reflect light leaked via the adjacent resin members 451 and 451A. A distance between the reflective side surfaces S16 and S17 of the first and second side reflective portions 446 and 447 may gradually increase as it is farther from the light emitting device 100 and may be equal to a distance between the third and fourth side surfaces S13 and S14.

A width of an upper surface of the first and second side reflective portions 446 and 447, that is, a width of an upper surface in the second direction, may be gradually narrowed as it is farther from the reflective portion 442. A high point height T7 of the first and second side reflective portions 446 and 447 may be disposed to be lower than the high point of the reflective portion 442 and higher than the low point of the reflective portion 442, and a low point height may be disposed to be lower than the upper surface of the protrusion portion 430 and higher than the optical axis. Such first and second side reflective portions 446 and 447 may reflect the light leaked in the lateral direction so that the light reflected by the reflective member 410 may be exited via the inclined upper surface.

The exit portion 440 may be disposed at a side of light exit as compared with the reflective portion 442 and the first and second side reflective portions 446 and 447, and thus light exit efficiency may be improved. A recess of the last third resin member 451C in the resin member may be absent or may be smaller than the depth of the recess 420 of another resin member. The length K11 of such a third resin member 451C may be smaller than the length K1 of other resin members 451 and 451A.

Figure 40:
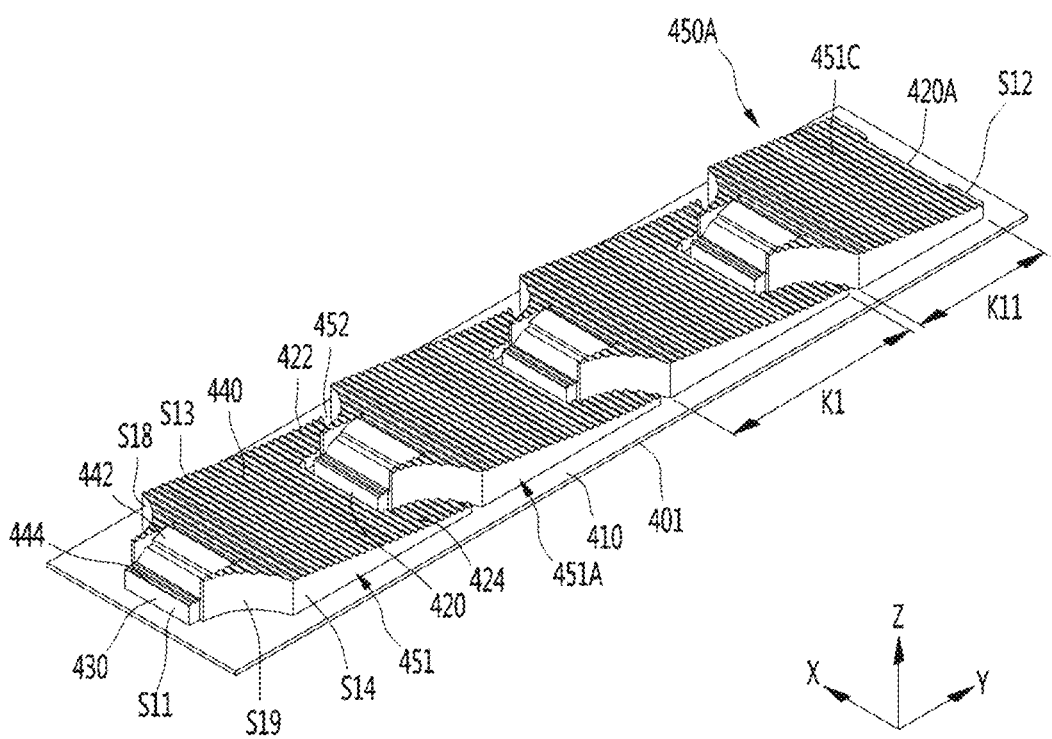
FIG. 40 is a second modification of the lighting module of FIG. 24 or FIG. 26.
Figure 41:
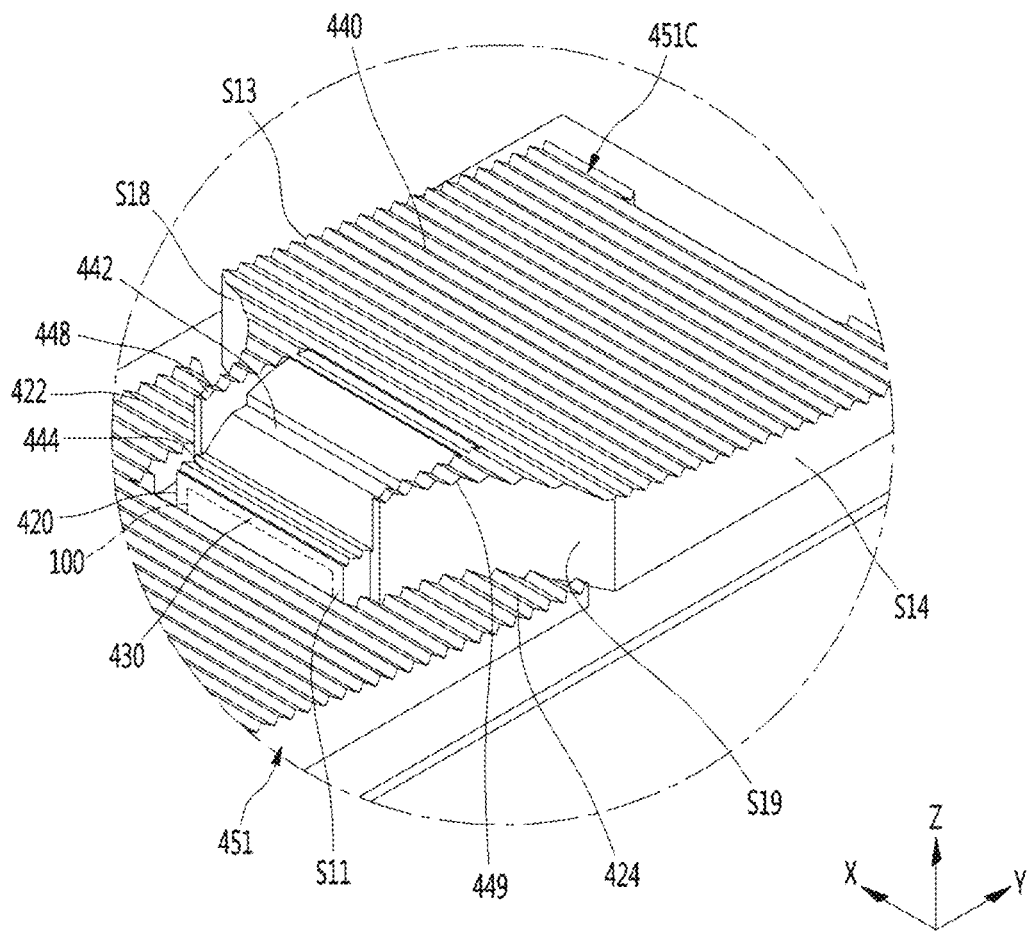
FIG. 41 is a partially enlarged view of the lighting module of FIG. 40.
Figure 42:
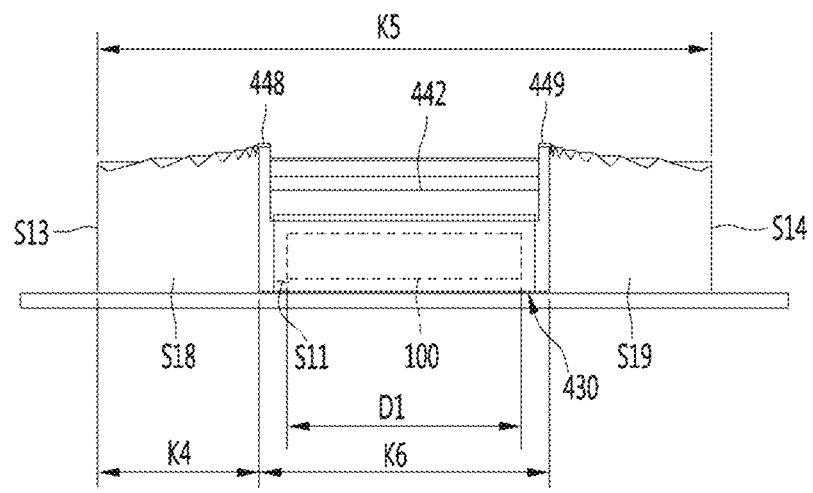
FIG. 42 is a front view of the lighting module of FIG. 40.
Figure 43:
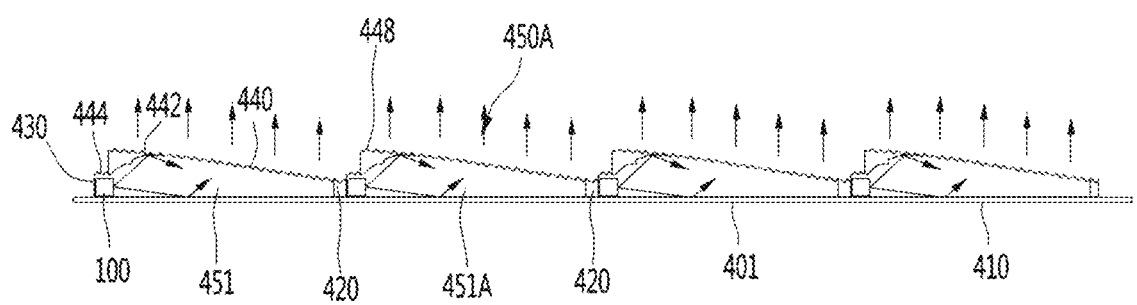
FIG. 43 is a partial side cross-sectional view of the lighting module of FIG. 40.

FIG. 40 is a perspective view illustrating a second modified example of the lighting module of FIG. 22 or FIG. 26, FIG. 41 is a partial enlarged view of the lighting module of FIG. 40, FIG. 42 is a front view of the lighting module of FIG. 40, and FIG. 43 is a partial side cross-sectional view of the lighting module of FIG. 40. In describing such an embodiment, the same configuration as that of the embodiment(s) disclosed above is referred to the description of embodiment(s) disclosed above, and may be selectively applied to the present embodiment.

Referring to FIGS. 40 to 43, the lighting module includes a plurality of light emitting cells 450A. The lighting module may have a plurality of resin members 451 and 451A arranged on a substrate 401, and the resin members 451 and 451A may include a protrusion portion 430 and an exit portion 440 in which a light emitting device is disposed.

The resin members 451 and 451A may include a reflective portion 442 between the protrusion portion 430 and the exit portion 440 and the reflective portion 442 may be formed as a convex curved surface. A width in the second direction of the reflective portion 442 may be smaller than a width K6 in the second direction of the protrusion portion 430.

Side wall protrusions 448 and 449 may be disposed at an outer side of the reflective portion 442, the side wall protrusions 448 and 449 may be first and second side wall protrusions 448 and 449 spaced apart from each other to correspond to each other, and the first side wall protrusion 448 and the second side wall protrusion 449 may be disposed to face each other. The first and second side wall protrusions 448 and 449 may face each other at opposite sides of the reflective portion 442 and may be formed at a height higher than a height of the reflective portion 442. A pattern of the exit portion 440 may be disposed at upper surfaces of the first and second side wall protrusions 448 and 449, and as a region in which the first and second side wall protrusions 448 and 449 are disposed is adjacent to the light emitting device 100, the first and second side wall protrusions 448 and 449 may have a higher height. Such first and second side wall protrusions 448 and 449 may exit light via an outer side of the region of the reflective portion 442. Outer side surfaces S18 and S19 of the first and second side wall protrusions 448 and 449 may be formed to be inclined surfaces or concave curved surfaces with respect to the third and fourth side surfaces S13 and S14. The concave curved surface may totally reflect light incident from an inside. The outer side surfaces S18 and S19 may have a height gradually higher as they are adjacent to the light emitting device 100.

The guide protrusions 422 and 424 of the resin members 451 and 451A may be disposed at opposite sides of the recess 420 and may extend along opposite sides of the protrusion portion 430. The guide protrusions 422 and 424 of the resin members 451 and 451A may be respectively disposed at outer sides of the first and second side wall protrusions 448 and 449 and disposed between the reflective portion 442 and the guide protrusions 422 and 424. A gap portion 452 may be disposed between adjacent resin members 451 and 451A and the gap portion 452 may separate the protrusion portion 430 and separate apart the adjacent guide protrusions 422 and 424 from the side wall protrusions 448 and 449. Such a gap portion 452 may be disposed in a curved shape along an outer curved surface of the side wall protrusions 448 and 449, but is not limited thereto. As shown in FIGS. 41 and 43, light may be emitted by the protrusion portion 430, the side wall protrusions 448 and 449, and the guide protrusions 422 and 424 covering the light emitting device 100 in the peripheral region of the recess 420, and thus it is possible to suppress occurrence of dark portions at the boundary regions of the different resin members 451 and 451A.

A depth of the recess 420 of the last third resin member 451C in the resin member may be smaller than that of the recess 420 of other resin members 451 and 451A, or may not be present. A length K11 of such a third resin member 451C may be smaller than a length K1 of other resin members 451 and 451A. The length K11 of such a last third resin member 451C may vary depending on a depth of the recess 420.

Figure 44:
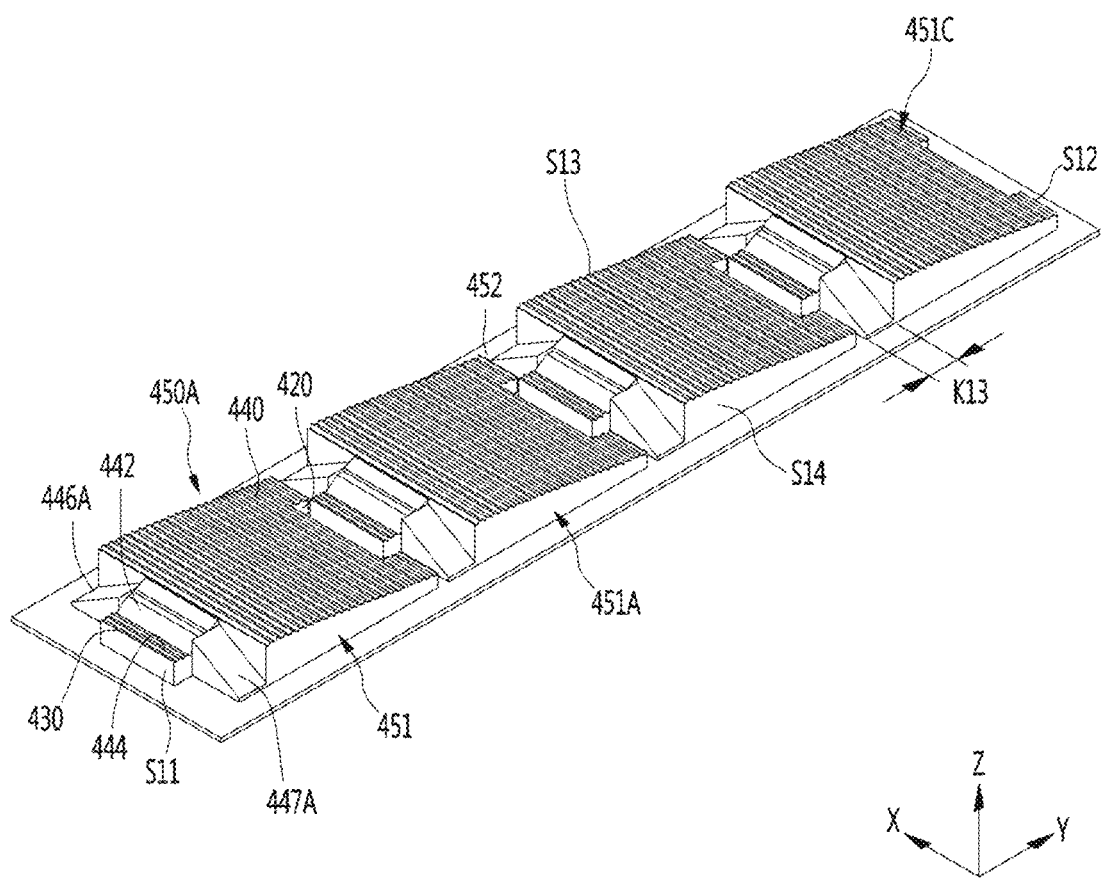
FIG. 44 is a perspective view showing a third modification of the lighting module of FIG. 24 or FIG. 26.
Figure 45:
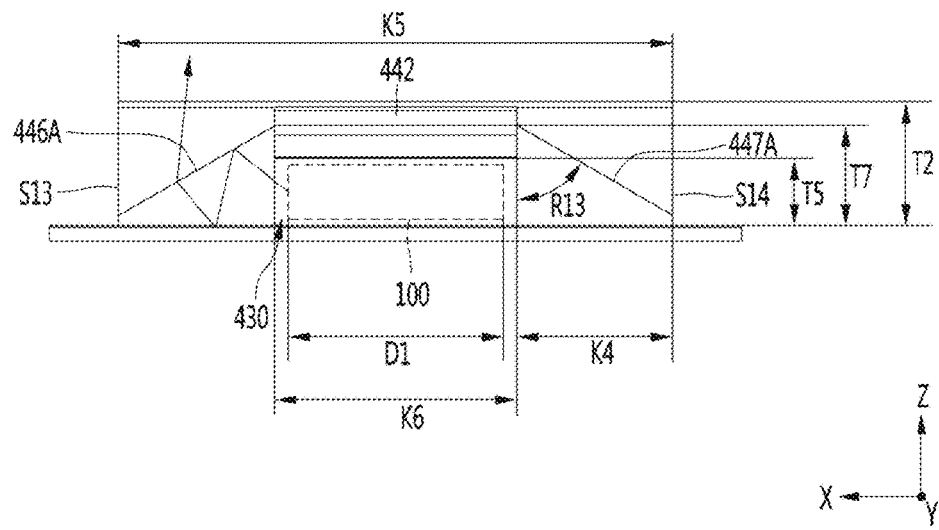
FIG. 45 is a diagram showing a front view of the lighting module of FIG. 44.

FIG. 44 is a perspective view illustrating a third modified example of the lighting module of FIG. 24 or 26, and FIG. 45 is a front view of the lighting module of FIG. 44. In describing such an embodiment, the same configuration as that of embodiment(s) disclosed above is referred to the description of embodiment(s) disclosed above, and may be selectively applied to the present embodiment.

Referring to FIGS. 44 and 45, the lighting module may include a plurality of light emitting cells 450A, and each of the plurality of light emitting cells 450A may be disposed on a substrate 401, respectively.

Each of the light emitting cells 450A includes a light emitting device 100 and resin members 451 and 451A. The resin members 451 and 451A include a protrusion portion 430 covering the light emitting device 100 and a recess 420 in which a protrusion portion of the adjacent resin member is disposed. Here, the resin members 451 and 451A include adjacent first and second resin members 451 and 451A, the first and second resin members 451 and 451A may have the protrusion portion 430 and the recess 420, and the third resin member 451C, which is the last structure of the resin member, may have the protrusion portion 430 and may be formed with the recess 420A or may have a small depth, but is not limited thereto.

The protrusion portion 430, the recess 420, the reflective portion 442 and the exit portion 440 of the adjacent resin members 451 and 451A are referred to the description of the above-disclosed embodiment. The width K6 in the second direction of the reflective portion 442 of the resin members 451 and 451A may be equal to the width of the protrusion portion 430 so that the incident light may be reflected. The reflective portion 442 may function as a center-side reflective portion located at a region corresponding to the protrusion portion 430.

The resin members 451 and 451A may include first and second side reflective portions 446A and 447A having inclined upper surfaces at opposite sides of the reflective portion 442. The first side reflective portion 446A may be disposed in a corner region between the protrusion portion 430 and the third side surface S13 of the resin members 451 and 451A, and the second side reflective portion 447A may be disposed in a corner region between the protrusion portion 430 and the fourth side surface S14 of the resin members 451 and 451A. The first side reflective portion 446A and the second side reflective portion 447A may be disposed at opposite sides of the reflective portion 442. High points of the first and second side reflective portions 446A and 447A may be higher than a low point of the reflective portion 442, and may be lower than a high point thereof. A width K13 (see FIG. 44) of the first and second side reflective portions 446A and 447A may be equal to or smaller than a length of the reflective portion 442 in the second direction. The first side reflective portion 446A may extend in a direction of the third side surface S13 from the reflective portion 442, and the second side reflective portion 447A may extend in a direction of the fourth side surface from the reflective portion 442.

As shown in FIG. 44, upper surfaces of the first and second side reflective portions 446A and 447A may be formed to be inclined in an outer side direction from the reflective portion 442. The inclined upper surfaces of such first and second side reflective portions 446 and 447 may be disposed at the outer side of the protrusion portion 430 having the light emitting device 100 and extend to opposite sides of the reflective portion 442. An inclination angle R13 of the inclined upper surface of the first and second reflective portions 446A and 447A may be in a range of 25 to 89 degrees, the incident light may be reflected to the reflective member 410, and the reflected light may be exited via the inclined upper surface. Accordingly, the reflective portion 442 located at the periphery of the protrusion portion 430 may prevent hot spots, and the inclined upper surfaces of the side reflective portions 446A and 447A block light leaked via the lateral direction to be exited, and thus it is possible to prevent a decrease in a light distribution at the boundary region between adjacent resin members 451 and 451A. The inclined upper surfaces of the side reflective portions 446A and 447A may have a height gradually lowered as they are farther toward an outer side direction, for example, the X direction from the reflective portion 442. The inclined upper surfaces of the side reflective portions 446 and 447 may be disposed in the rear direction with respect to the exit portion 440. Here, the rear direction may be a direction toward the protrusion portion 430 from the resin member 451 or 451A with respect to the exit portion 440.

A high point height T7 of the first and second side reflective portions 446 and 447 may be disposed to be lower than the high point of the reflective portion 442 and higher than the low point of the reflective portion 442, and a low point height may be disposed to be lower than the upper surface of the protrusion portion 430 and higher than the optical axis. A linear distance K4 of the first and second side reflective portions 446A and 447A may be 1 mm or more, for example, in a range of 1 to 10 mm, or in a range of 3.5 to 5.5 mm. Since the inclined upper surfaces of such first and second side reflective portions 446A and 447A may be formed in a range of 20% to 40% of the width K5 of the resin members 451 and 451A and may have the same distance at opposite sides, light may have a uniform distribution. In an embodiment, the reflective portion 442 at a region between the protrusion portion 430 and the exit portion 440 and the first and second side reflective portions 446A and 447A at opposite sides of the reflective portion 442 in the second direction may be provided, and thus it is possible to prevent hot spots in the center region adjacent to the light emitting device 100 due to the light reflected by the reflective portion 442 to reduce light loss by the inclined upper surfaces of the first and second side reflective portions 446A and 447A, and to improve light extraction efficiency in the periphery of the protrusion portion 430.

The first side reflective portion 446A may have a third side surface S13 extending between a side surface of the protrusion portion 430 and a third side surface S13, and the second side reflective portion 447A may have a fourth side surface S14 extending between a side surface of the protrusion portion 430 and a fourth side surface S14. The third and fourth side surfaces S13 and S14 of such first and second side reflective portions 446A and 447A may be formed to be stepped with respect to the horizontal surfaces of the third and fourth side surfaces S13 and S14, so that it is possible to reflect light leaked via the adjacent resin members 451 and 451A.

The exit portion 440 may be disposed at a side of light exit as compared with the reflective portion 442 and the first and second side reflective portions 446A and 447A, and thus light exit efficiency may be improved. A depth of the recess 420 of the last third resin member among the resin members may be smaller than that of the recess 420 of other resin members 451 and 451A, or may not be present.

Figure 46:
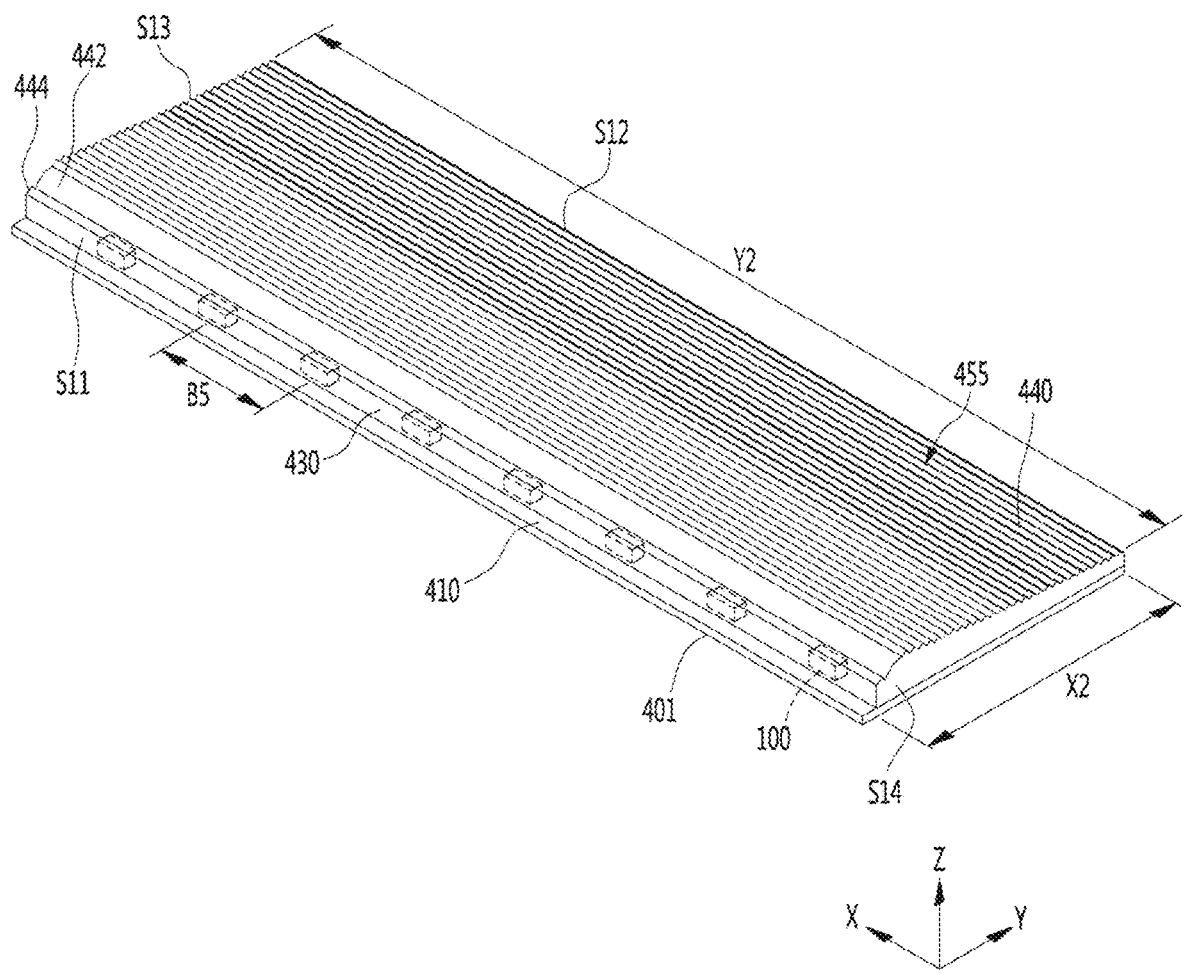
FIG. 46 is a perspective view showing a fourth modification of the lighting module of FIG. 24 or FIG. 26.

FIG. 46 is a perspective view illustrating a fourth modified example of the lighting module of FIGS. 24 and 25. In describing such an embodiment, the same configuration as that of embodiment(s) disclosed above is referred to the description of embodiment(s) disclosed above, and may be selectively applied to the present embodiment.

Referring to FIG. 46, the lighting module includes a substrate 401, a plurality of light emitting devices 100 arranged in the second direction from an edge of the substrate 401, a reflective member 410 on the substrate 401, and a resin member 455 having an exit portion 440 on the substrate 401 and the light emitting element 100.

The light emitting devices 100 may be arranged at a predetermined distance along the X direction at an edge in a longitudinal direction of the substrate 401. The light emitting device 100 may be arranged along at least one edge, that is, a long side edge, of the substrate 401.

The light emitting device 100 may be arranged along a thick region of the region of the resin member 455. A thickness of the resin member 455 may be thicker in the region in which the light emitting device 100 is disposed and thinner as it is farther from the light emitting device 100. The pattern of the exit portion 440 of the resin member 455 may be arranged alternately in the optical axis or the first direction and may be disposed at a length in the second direction perpendicular to the first direction or the optical axis. A length of each pattern may be equal to a length Y2 of the resin member 455. A longitudinal direction of the prism pattern may be the same as a direction in which the light emitting devices 100 are arranged. The prism patterns may be arranged in a direction perpendicular to the arrangement direction of the light emitting devices 100.

The resin member 455 may have a protrusion portion 430 and a reflective portion 442. The length Y2 of the resin member 455 in the first direction may be greater than a length X2 in the second direction and may be, for example, twice or more. A distance B5 between the light emitting devices 100 may be in a range of 100 mm or less, for example, in a range of 1 to 30 mm or 15 to 25 mm. When the distance B5 between the light emitting devices 100 is smaller than the above range, the number of the light emitting devices 100 may be increased, and when the distance B5 is larger than the above range, dark portions may be generated. The length X2 of the resin member 455 may be a length including the protrusion portion 430.

The protrusion portion 430 may be disposed at a length equal to the resin member 455, or may have an open region in a region between the light emitting devices 100. The reflective portion 442 may be formed as a curved surface which is convex upward from the front of the protrusion portion 430. Such a reflective portion 442 may be disposed between the protrusion portion 430 and the exit portion 440 to reflect light that deviates from a beam spread angle of light. Although the lighting module according to an embodiment has been described as one, but the lighting module may be disposed in plural as shown in FIG. 26. In this case, in the resin member of each lighting module, the protrusion portion according to an embodiment may be disposed at the portion in which the light emitting device is disposed and the recess according to an embodiment may be disposed at an exit side so as to be coupled to each other, and thus it is possible to prevent a decrease in light efficiency at a boundary portion.

FIGS. 47 to 50 are modified examples of a protrusion portion and a recess of the resin member of the lighting module according to an embodiment.

Figure 47:
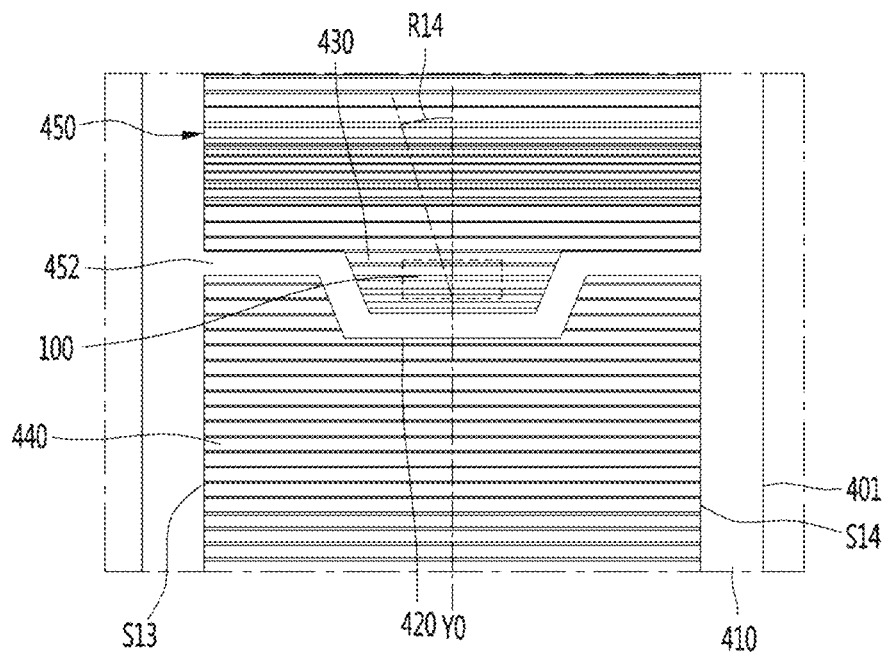
FIGS. 47 to 50 are a view showing a modified example of the protrusion and the recess of the resin member in a light module according to a fourth embodiment.

Referring to FIG. 47, the adjacent protrusion portion 430 and recess 420 in the resin member 450 may have a width gradually wider and at least one of a center of the recess 420 and a center of the protrusion portion 430 may be disposed on a straight line or the optical axis Y0 or tilted in an angle R14 of 45 degrees or less, for example, in a range of 1 to 45 degrees. When this is applied to a curved or bent lamp structure depending on a type of application being applied, the protrusion portion 430 may be coupled to the recess 420 in the above angle.

Figure 48:
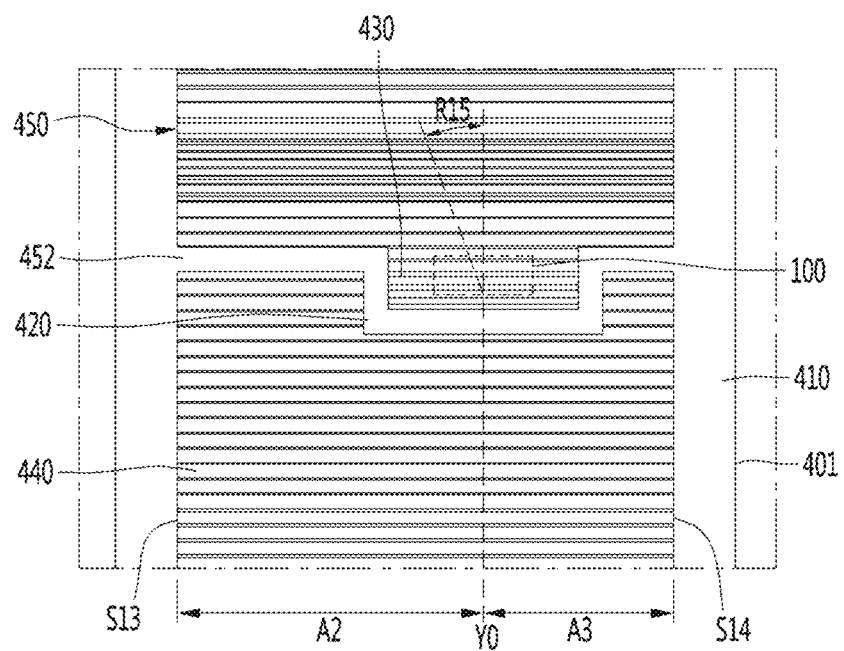

Referring to FIG. 48, the centers of the adjacent protrusion portion 430 and recess 420 in the resin member 450 may be disposed on the center line with the same straight line or on the optical axis Y0. At this point, a distance A2 between the straight line or the optical axis Y0 and the third side surface S13 of the resin member 450 may be different from a distance A3 between the straight line or the optical axis Y0 and the fourth side surface S14, and for example, the distance A2 may be greater than the distance A3. At least one of the center of the recess 420 and the center of the protrusion portion 430 may be disposed on the straight line or the optical axis Y0 or may be tilted in an angle R14 range of 45 degrees or less, for example, 1 to 45 degrees. When this is applied to a curved or bent lamp structure depending on a type of application being applied, the protrusion portion 430 may be coupled to the recess 420 in the above angle.

Figure 49:
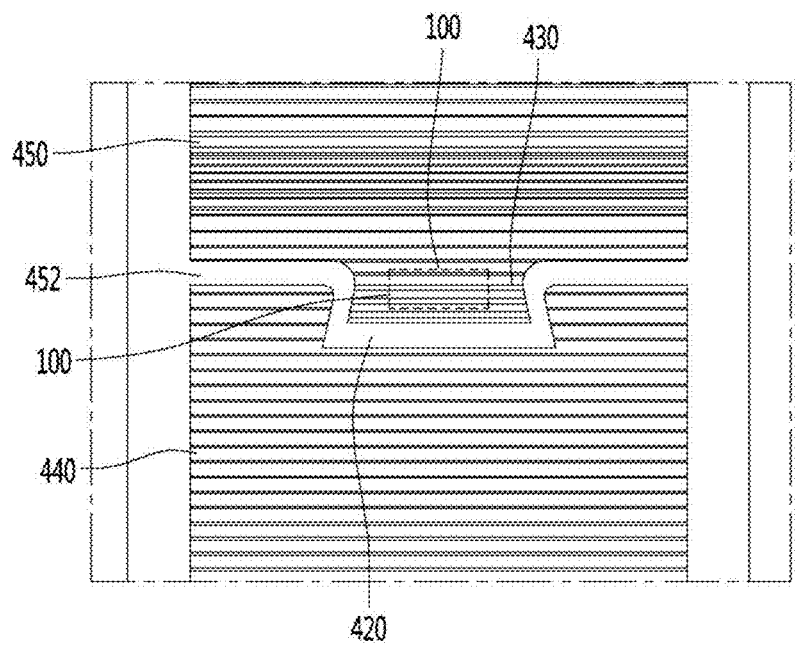

Referring to FIG. 49, adjacent protrusion portion 430 and recess 420 in the resin member 450 may be a curved surface at a corner portion, and such a curved surface may suppress interference with each other and improve reflection efficiency of light.

Figure 50:
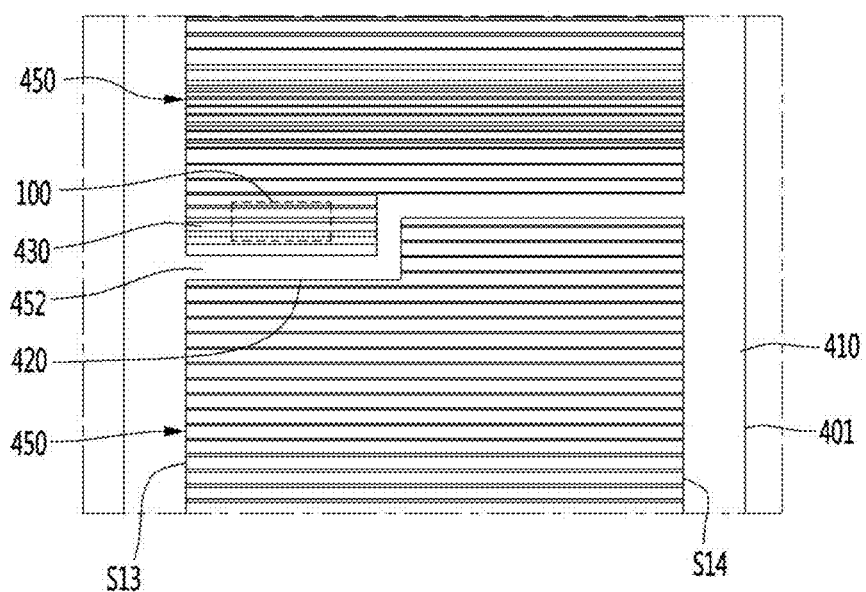

Referring to FIG. 50, the adjacent protrusion portion 430 and recess 420 in the resin member 450 may be disposed to be adjacent to the third side surface S13 rather than the fourth side surface S14. Here, the light emitting device 100 may be disposed in an oblique shape, and irradiate light to an entire region. When a plurality of resin members 451 and 451A are disposed at the resin member, at least one protrusion portion 430 and a recess adjacent thereto may be disposed to be adjacent to the third side surface S13, so that they may be applied to curved or bent parts in a curved or bent lamp.

Figure 51:
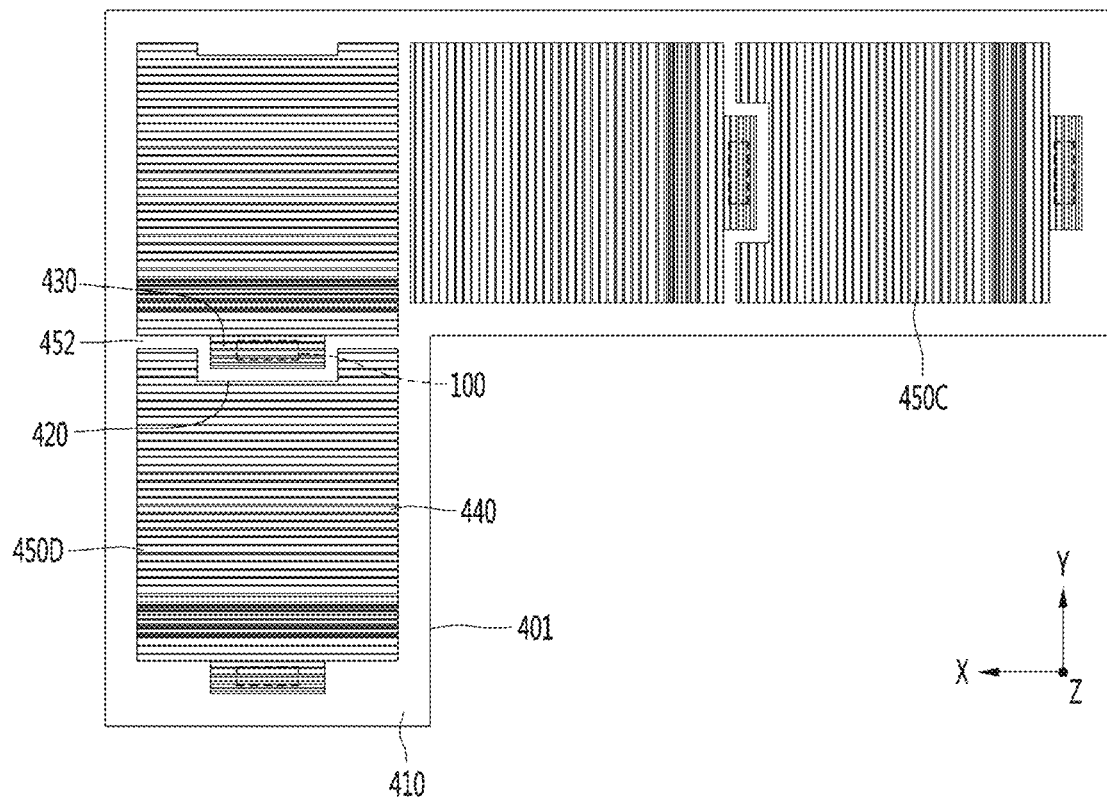
FIG. 51 is a view showing an example the lighting module of FIG. 24 or FIG. 26 which is arranged in different directions.
Figure 52:
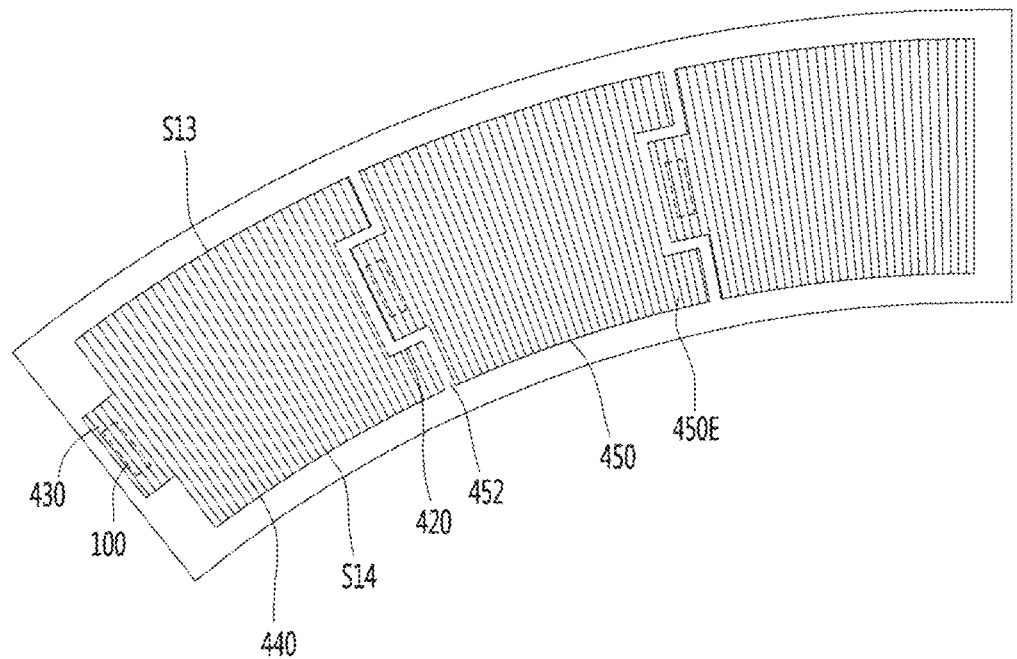
FIG. 52 is a view showing an example of the lighting module of FIG. 24 or FIG. 26 which is arranged in a curved form.

FIGS. 51 and 52 illustrate a modified example in which an arrangement shape of the lighting module is modified. Referring to FIGS. 51 and 52, a plurality of light emitting cells 450C and 450D may be disposed in n rows and m columns of the lighting module, and the condition of n≥1 and m≥1 may be satisfied. The light emitting cells 450C of the n rows and the light emitting cells 450D of the m columns may be disposed to be intersecting, corresponding to, or adjacent to each other.

Referring to FIG. 52, the lighting module may have a curved edge on the substrate 401, and a plurality of light emitting cells 450E may be arranged on the substrate 401. The plurality of light emitting cells 450E may be formed in a curved shape along the curved edge. That is, third and fourth side surfaces S13 and S14 of the resin member of each light emitting cell 450E are formed in a curved shape and an optical axis of each light emitting cell 450E may be disposed on different axes. When this is applied to a curved or bent lamp structure depending on a type of application being applied, the protrusion portion may be coupled to the recess in the above angle.

Figure 53:
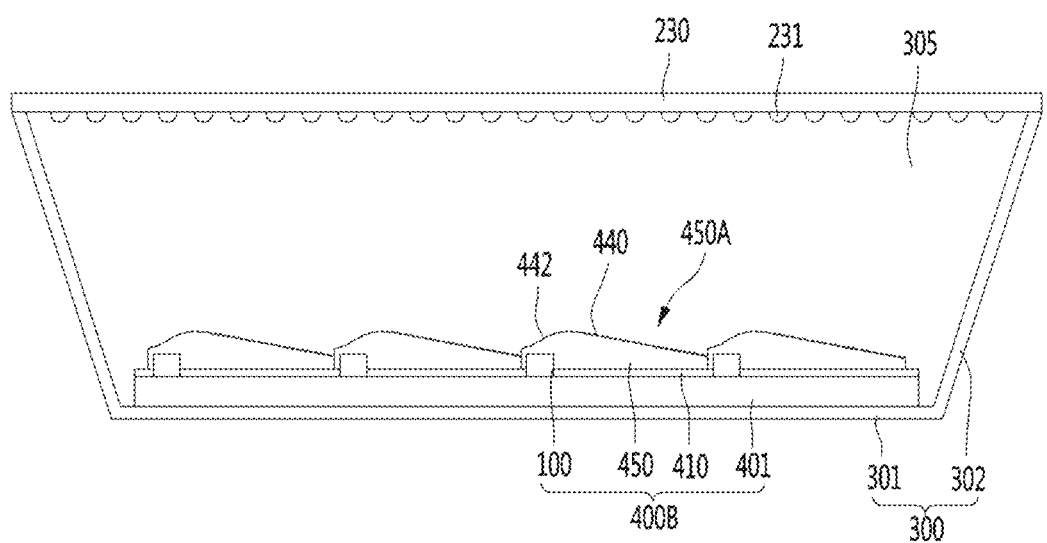
FIG. 53 is a side cross-sectional view of the lighting device having the lighting module of FIG. 26.

FIG. 53 is a view of a lighting device having a lighting module according to an embodiment. The lighting module in the lighting device according to the embodiment will be described with reference to the above description. The light module 400B includes a substrate 401, a plurality of light emitting devices 100 on the substrate 401, a resin member 450 and a reflective member 410. The resin member 450 may include a plurality of resin members. An optical member 230 may be disposed on the lighting module 400B, and the optical member 230 may diffuse and transmit incident light. The optical member 230 uniformly diffuses and emits the surface light source emitted through the resin member 450. The optical member 230 may include an optical lens or an inner lens, and the optical lens may condense the light toward the target or change the path of the light. The optical member 230 may include a plurality of lens portions 231 on at least one of the upper surface and the lower surface of the optical member 230, and the lens portions 231 may have a shape protruding downward from the optical member 230 or may have a shape protruding upward from the optical member 230. Such an optical member 230 may control the light distribution characteristics of the lighting device.

The optical member 230 may be spaced from the lighting module 200B, for example, the substrate 201 by 10 mm or more, for example, in a range of 15 mm to 100 mm. when the distance is out of the above range, a light intensity may be lowered and when the distance is smaller than the above range, the uniformity of light may be lowered. The lighting module 200 may include a heat dissipation plate (not shown) at a bottom surface thereof. The heat dissipation plate may include a plurality of heat dissipation fins and may dissipate heat conducted to the substrate 201. The heat dissipation plate may include at least one of metals such as aluminum, copper, magnesium, nickel, or an alloy thereof. Such the lighting module refers to the configuration of the above-described embodiment, and is selectively applicable to this embodiment.

Fifth Embodiment

Figure 54:
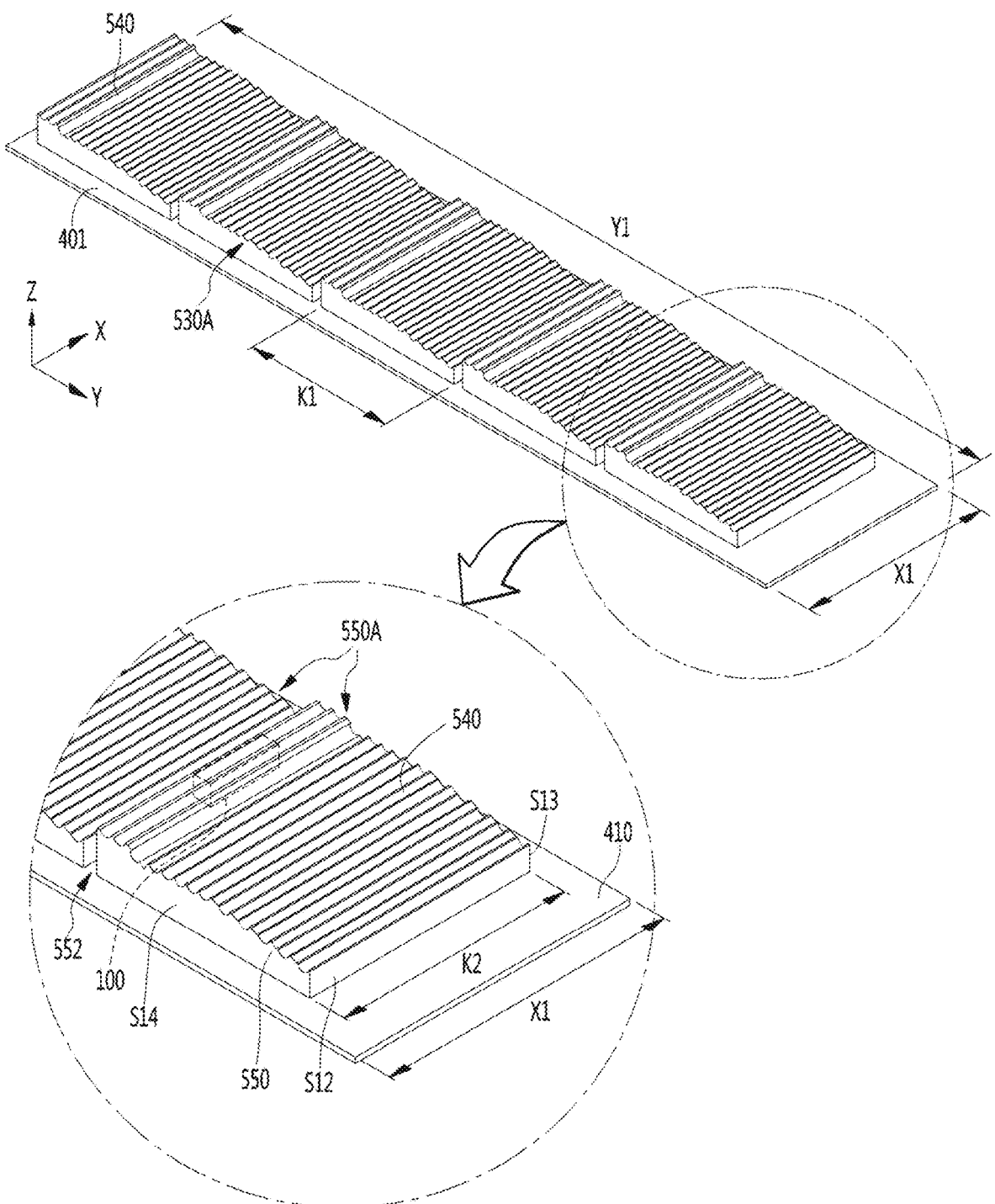
FIG. 54 is a perspective view of a lighting module according to the fifth embodiment.
Figure 55:
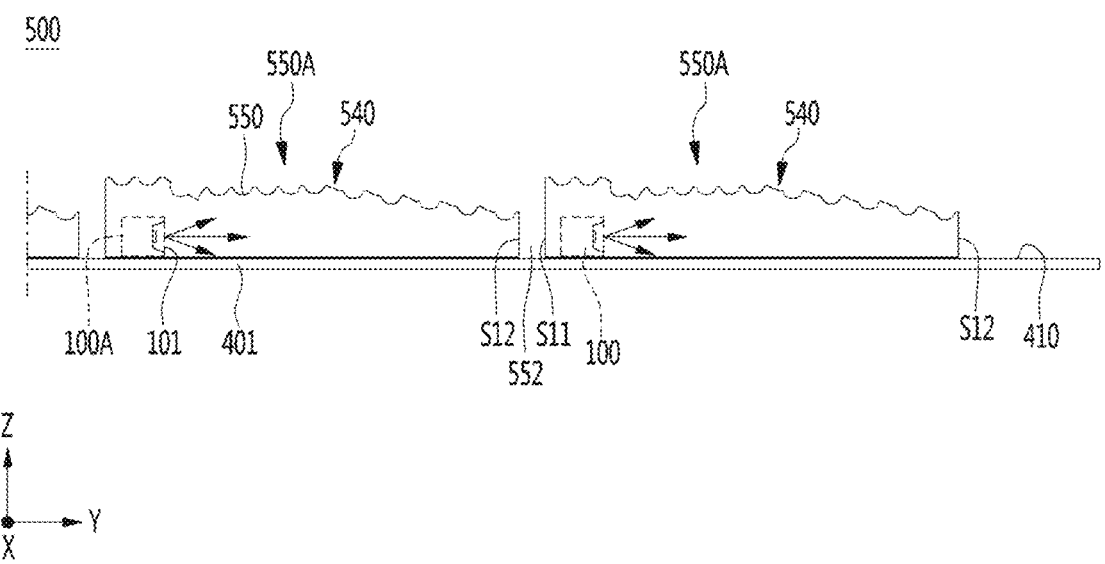
FIG. 55 is a partial side cross-sectional view of the lighting module of FIG. 54.
Figure 56:
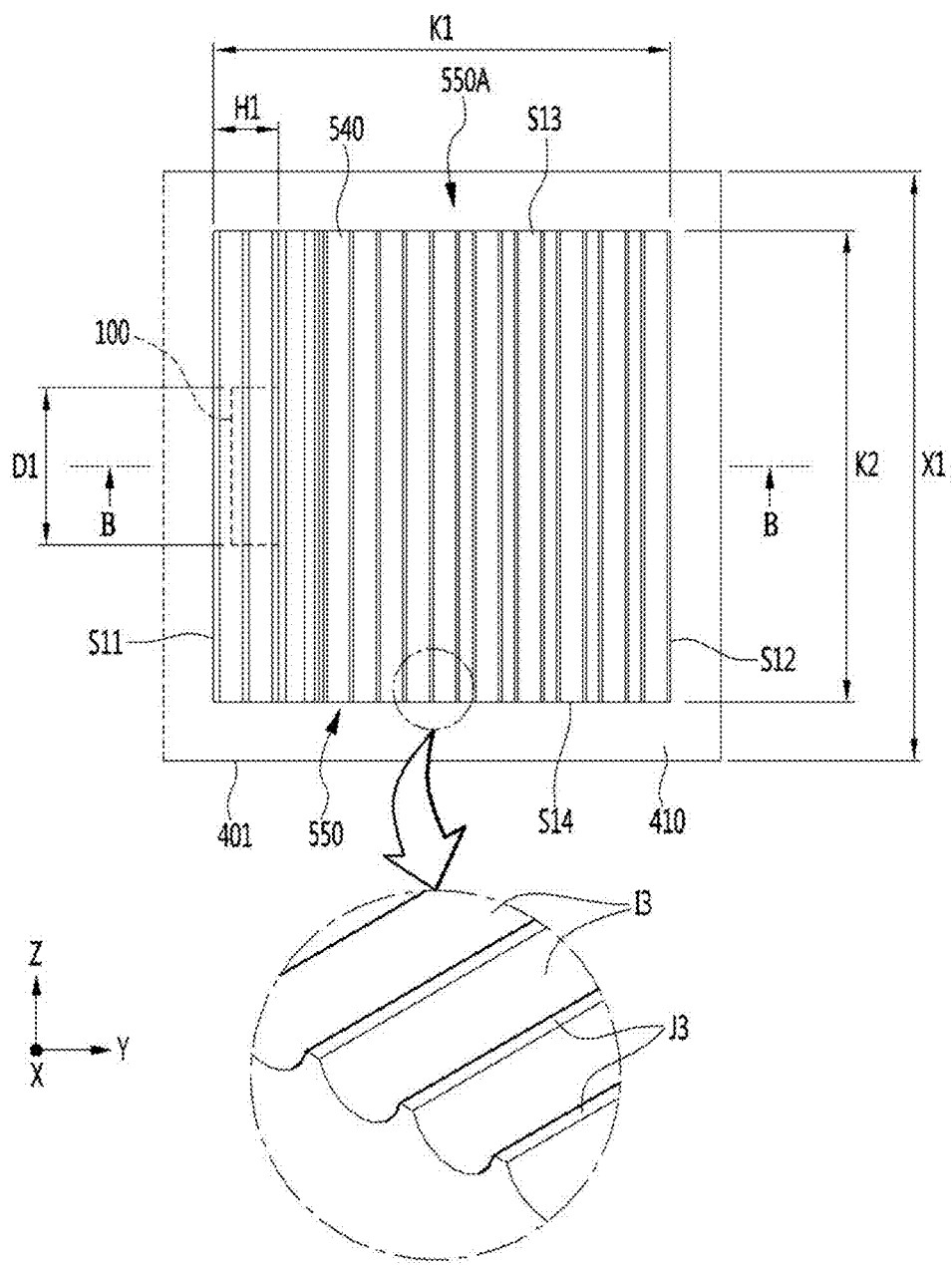
FIG. 56 is a partial plan view of the lighting module of FIG. 54.
Figure 57:
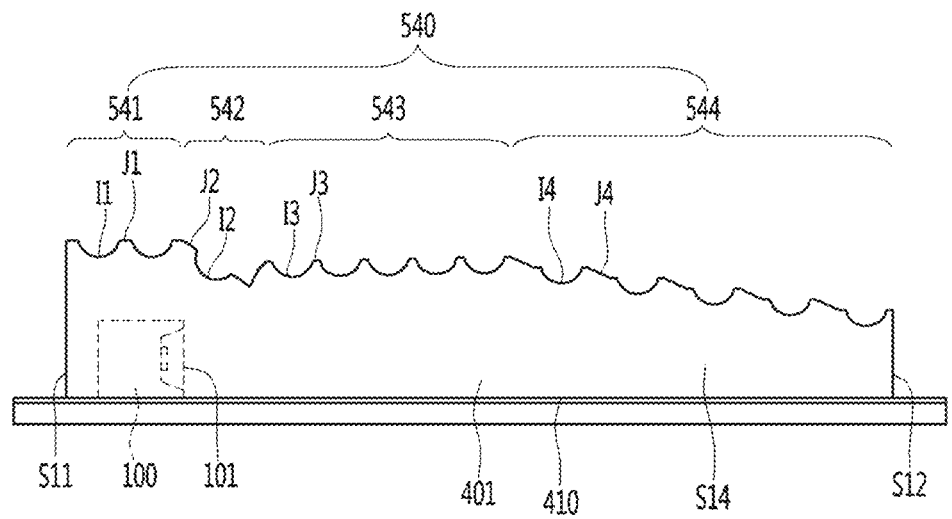
FIG. 57 is a B-B side cross-sectional view of the lighting module of FIG. 56.
Figure 58:
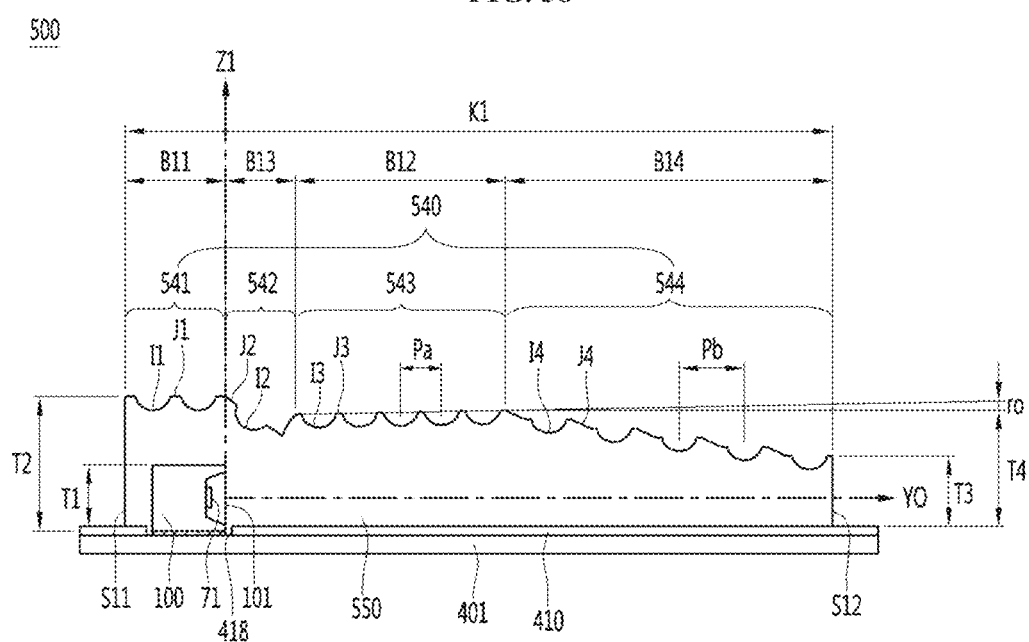
FIG. 58 is a side cross-sectional view of the lighting module of FIG. 56.
Figure 59:
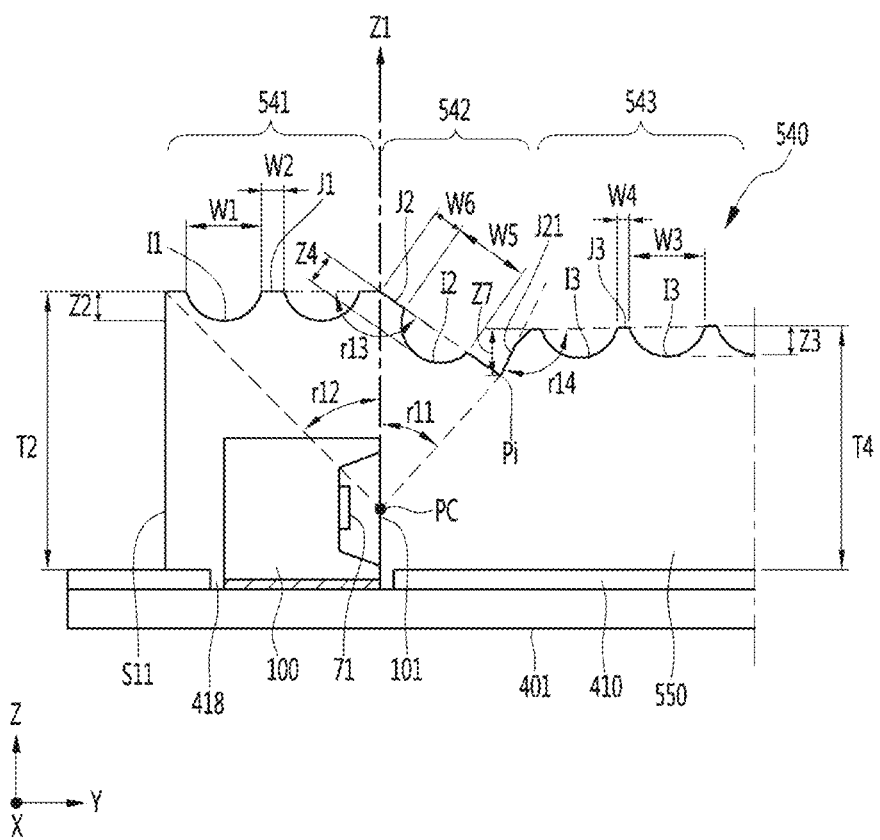
FIG. 59 is a partially enlarged view of the lighting module of FIG. 58.
Figure 60:
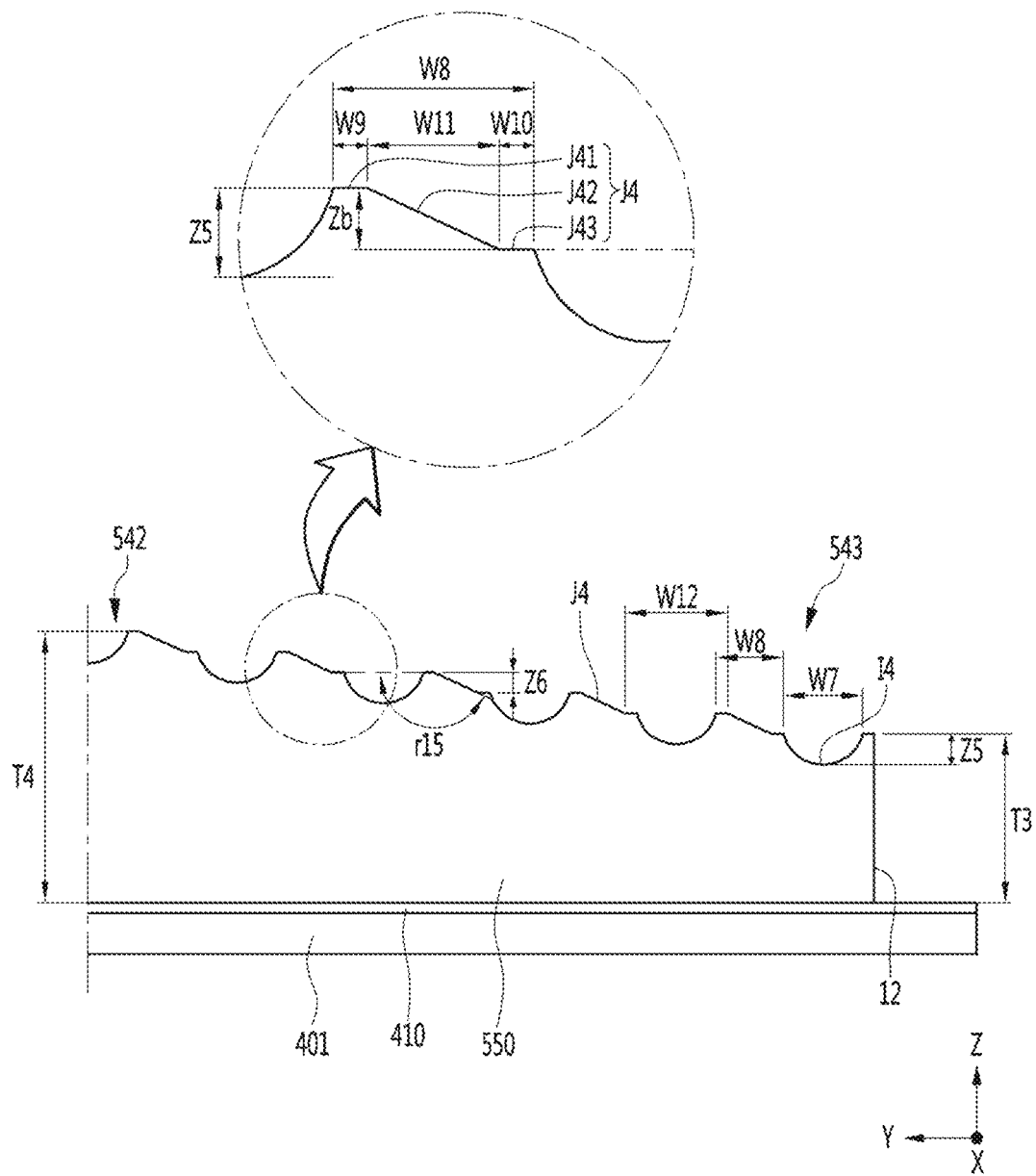
FIG. 60 is a partially enlarged view of the lighting module of FIG. 58.

FIG. 54 is a perspective view illustrating a lighting module according to a first embodiment, FIG. 55 is a partial side cross-sectional view of the lighting module of FIG. 54, FIG. 56 is a partial plan view of the lighting module of FIG. 54, FIG. 57 is a side cross-sectional view of the lighting module of FIG. 56, FIG. 58 is a side cross-sectional view of the lighting module of FIG. 57, FIG. 59 is a partial enlarged view of the lighting module of FIG. 58, and FIG. 60 is a partial enlarged view of the lighting module of FIG. 58. The configuration of the lighting module according to a fifth embodiment is referred to the description of embodiments disclosed above, and may be selectively applied to the present embodiment.

Referring to FIGS. 54 to 60, a lighting module 500 according to the fifth embodiment may include a substrate 401, a light emitting device 100 disposed on the substrate 401, and a resin member 550 made of a light transmitting material and covering the light emitting device 100 on the substrate 401.

The lighting module 500 may emit the light emitted from the light emitting device 100 as a surface light source. The lighting module 500 may include a reflective member 410 disposed on the substrate 401. One or a plurality of light emitting cells 550A may be arranged in the lighting module 500. The plurality of light emitting cells 550A may be arranged on the substrate 401 in a predetermined direction. The light emitting cells 550A may emit light of the same color by the light emitting device 100. The plurality of light emitting devices 100 may emit light of a single color.

The resin member 550 may be disposed on the substrate 401. The resin member 550 may be disposed on an entire or a part of an upper surface of the substrate 401. An area of a lower surface of the resin member 550 may be equal to or smaller than that of the upper surface of the substrate 401. A plurality of the resin members 550 may be arranged in one direction. The resin member 550 may be formed of a transparent material. The resin member 550 may include a resin material such as silicone or epoxy. The resin member 550 may include a thermosetting resin material and may selectively include, for example, PC, OPS, PMMA, PVC, or the like. The resin member 550 may be formed of glass, but is not limited thereto. For example, a material of the resin member 550 is referred to the description of the above-disclosed embodiments.

The resin member 550 may protect the light emitting device 100 by sealing the light emitting device 100 and reduce loss of light emitted from the light emitting device 100. The resin member 550 may prevent moisture penetration by sealing the surface of the light emitting device 100. The resin member 550 may be in contact with side surfaces of the light emitting device 100 and an emitting region 101. A part of the resin member 550 may be disposed at an opening 418 of the reflective member 410. As shown in FIG. 55, the resin member 550 may be disposed at each of the light emitting cells 550A and be spaced apart from each other. The resin members 550 may be spaced apart at a predetermined distance or may be disposed at an irregular distance. Two side surfaces S11 and S12 of different resin members may face in a gap portion 552 between the resin members 550. The adjacent resin members 550 may be separated from or connected to each other. When the resin members 550 are connected to each other, the resin members 550 may be partially connected.

The resin member 550 may include first and second side surfaces S11 and S12 opposite to each other and third and fourth side surfaces S13 and S14 opposite to each other. The first side surface S11 may be adjacent to the light emitting device 100 and may face a part, for example, a rear surface of the light emitting device 100. The first side surface S11 may be a surface of the opposite side of the emitting region 101 of the light emitting device 100. The second side surface S12 may be a surface facing the first side surface S11 and may face the emitting region 101 of the light emitting device 100. The third and fourth side surfaces S13 and S14 may be side surfaces adjacent to the first and second side surfaces S11 and S12 and may face each other.

A thickness of the resin member 550 may vary depending on the region. A thickness T2 of the thickest region in the Z direction in the resin member 550 is thicker than a thickness T1 of the light emitting device 100 and a thickness T3 of the thinnest region may be greater than or equal to the thickness T1 of the light emitting device 100. At least a portion of the thickest region in the resin member 550 may be overlapped with the light emitting device 100 in the vertical direction.

The maximum thickness T2 of the resin member 550 may be the thickness T1 of the light emitting device 100 or more and may be 20 mm or less. The maximum thickness T2 of the resin member 550 may be, for example, in a range of 1.7 to 10 mm or in a range of 1.7 to 4 mm. When the maximum thickness T2 of the resin member 550 is larger than the above range, light efficiency may be lowered or a module thickness may be increased. When the maximum thickness T2 is smaller than the above range, light uniformity may be lowered. The minimum thickness T3 of the resin member 550 may be 1 mm or more and less than the maximum thickness T2. The minimum thickness T3 may be in a range of 1 to 2 mm or in a range of 1.4 to 2 mm. The minimum thickness T3 may be greater than the thickness T1 of the light emitting device 100.

A length K1 in a first direction Y of the resin member 550 may be equal to or greater than a length K2 in a second direction X as shown in FIG. 56 when viewed from the top. The length K2 in the X direction may be the length of the first and second side surfaces S11 and S12 disposed on opposite sides of the resin member 550 in the Y direction. The length K1 in the Y direction may be 10 mm or more, for example, in a range of 10 to 40 mm or in a range of 10 to 20 mm. The length K2 in the X direction may be in a range of 10 mm or more, for example, 10 to 30 mm or 15 to 23 mm. A size of the resin member 550 may be provided in consideration of the light uniformity, and may vary depending on applications. The shape of a top view of the resin member 550 may be a polygonal shape, for example, a quadrilateral shape, a curved shape, or a bent shape.

The thinnest region of the resin member 550 may be the farthest region based on the emitting region 101 of the light emitting device 100. The minimum thickness T3 of the resin member 550 may be 1 mm or more based on an upper surface of the substrate 401 or not less than the thickness T1 of the light emitting device 100. The lowest point of the resin member 550 may be higher than an upper surface of the light emitting device 100. The lowest point of an upper surface of the resin member 550 may be at the same height as or higher than a height of a straight line or an optical axis Y0. Side surfaces S11, S12, S13, and S14 of the resin member 550 may be coated with a metal material such as aluminum, chromium, or barium sulfate, but are not limited thereto.

The resin member 550 according to an embodiment includes an exit surface 540. The exit surface 540 may include a light extraction structure (or an optical pattern) as the upper surface of the resin member 550. The light extraction structure may have a concave portion (for example, I3 in FIG. 55) and a convex portion (for example, J3 in FIG. 55), and may reflect or transmit incident light, or may change a critical angle. The light extraction structure may be formed integrally with the resin member 550. The resin member 550 and the light extraction structure may be formed of the same material. The light extraction structure may have a pattern having a predetermined distance or irregular distance. The exit surface 540 may be adjacent to the substrate 401 as it is a region farther from the light emitting device 100 in the first direction. The exit surface 540 may extract the light reflected by the reflective member 410 or the light emitted from the light emitting device 100 in an upward direction. The exit surface 540 may be disposed to be adjacent to the substrate 401 as it is a region farther from the light emitting device 100, and thus a difference in amount of emitted light may be reduced according to the emitting region. Accordingly, the uniformity of the light extracted via the exit surface 540 may be improved.

When the light emitted from the light emitting device 100 or the light reflected by the reflective member 410 is incident, the light extraction structure of the light exit surface 540 may change a critical angle of light to extract the light to an outside. The light emitted in the Z direction via such an exit surface 540 may be a surface light source. In the light extraction structure of the exit surface 540, a side cross-section may include at least one or two or more of a hemispherical shape, a polygonal shape, or a shape such as a polygonal horn or a cone. In the light extraction structure, a side cross-section may include a groove having a hemispherical shape. In the light extraction structure, a length in the X direction, for example, a length of the hemispherical groove may be the same as a length in the X direction of the resin member 550. In the light extraction structure, a concave portion and a convex portion may be disposed to be alternately repeated, and the concave portion or the convex portion may improve light exit efficiency. A length of the concave portion or the convex portion may be equal to a distance between the third and fourth side surfaces S13 and S14 of the resin member 550 or may be disposed to be long in the X direction of the resin member 550.

The light extraction structure of the resin member 550 will be described in detail. In the light extraction structure, the light emitted via the resin member 550 may be emitted as a surface light source with a uniform light distribution and a center luminous intensity of the resin member 550 may be improved.

The exit surface 540 of the resin member 550 may include a plurality of regions 541, 542, 543, and 544. The plurality of regions 541, 542, 543, and 544 may be disposed to divide into at least three or four or more regions in the direction from the first side surface S11 to the second side surface S12 of the resin member 550 and may have different light extraction characteristics. The plurality of regions 541, 542, 543, and 544 may be disposed to have different heights based on the position of the light emitting device 100. The plurality of regions 541, 542, 543, and 544 as light emitting regions may be disposed to have different areas based on the position of the light emitting device 100. The lengths (e.g., K2) in the X direction of the plurality of regions 541, 542, 543, and 544 may be equal to each other, and the widths in the Y direction may be different from each other. At least one of a plurality of concave portions may be disposed in each of the plurality of regions 541, 542, 543, and 544. The concave portion may be disposed in a direction (Y direction) of the second side surface S12 from the first side surface S11 and have a long length in the second direction (X direction).

The plurality of regions 541, 542, 543, and 544 may be overlapped with at least a portion of the position of the light emitting device 100 and include a first region 541 adjacent to the first side surface S11, a third region 543 at a center side, a second region 542 between the first and third regions 541 and 543, and a fourth region 544 between the third region 543 and the second side surface S12.

The first region 541 may be a region where at least a portion of the first region 541 is overlapped with the light emitting device 100 in the vertical direction and may be a region that emits the reflected light in the light emitted from the light emitting device 100. An area of an upper surface of the first region 541 may be smaller than that of upper surfaces of the third and fourth regions 543 and 544. A length in the X direction of the first region 541 may be equal to the length K2 in the X direction of the resin member 550 and a width B11 in the Y direction may be larger than a width of the light emitting device 100. The upper surface of the first region 541 may be disposed at an angle r12 of 60 degrees or less, for example, 30 to 60 degrees based on the straight line Z1 perpendicular to the emitting region 101 of the light emitting device 100. Such a first region 541 may be widely disposed on the light emitting device 100 so that it is possible to disperse light traveling on the light emitting device 100.

Referring to FIG. 58, the width B11 of the first region 541 may be smaller than a width B12 of the third region 543 and greater than a width B13 of the second region 542 in the direction from the first side surface S11 to the second side surface S12 of the resin member 550. The width B11 in the first direction (Y direction) of the first region 541 may be in a range of 1.5 mm or more, for example, 1.5 to 4 mm. When the width B11 of the first region 541 is smaller than the above range, a distance between the rear surface of the light emitting device 100 and the first side surface S11 may be small so that a protection of the rear portion of the light emitting device 100 may be weak, and when the width B11 of the first region 541 is greater than the above range, a distribution of light extracted via the first region 541 may be non-uniform.

A height of the upper surface of the first region 541 may be a distance between the upper surface of the first region 541 and a bottom of the resin member 550 or the upper surface of the substrate, and may be greater than a distance between the upper surface of the third region 543 and the bottom of the resin member 550. The height of the upper surface of the first region 541 may be the maximum thickness T2 of the resin member 550. The first region 541 may be disposed at the above height to protect an upper portion of the light emitting device 100 and to extract light reflected from the second region 542 or a substrate direction.

The first region 541 may include a first concave portion I1 and a first convex portion J1 at an upper portion thereof. The first concave portion I1 may be disposed to be adjacent to the first convex portion J1 or between a plurality of first convex portions J1. In the first region 541, the first concave portion I1 may be disposed in one or plural. The first concave portion I1 may include a shape of a concave curved surface, such as a hemispherical shape, or an aspherical shape. The first concave portion I1 may include a cylindrical shape having a concave curved surface. The first concave portion I1 may have a concave curved surface so that light L1 (see FIG. 61) reflected by the second region 542 or light transmitted from the substrate direction may be refracted and extracted. The first concave portion I1 may induce light extraction in the upper and rear regions of the light emitting device 100 to suppress occurrence of dark portions on the first region 541.

A plurality of first concave portions I1 disposed in the first region 541 may have a concave structure from an upper surface of the first convex portion J1 and may be arranged in parallel with each other in the second direction. A length in the first direction of the first concave portion I1 may be equal to the length K2 of the resin member 550 in the X direction. A depth Z2 of the first concave portion I1 may be smaller than a width of the first concave portion I1. The depth Z2 of the first concave portion I1 is the maximum depth and may be in a range of ½ or less, for example, ½ to ¼ of a width W1 in the first direction or the Y direction. The width W1 or diameter of the first concave portion I1 may be an upper width of the first concave portion I1 and may be in a range of 2 mm or less, for example, 0.4 to 2 mm. The depth Z2 of the first concave portion I1 may be in a range of 1 mm or less, for example, 0.2 to 1 mm or 0.2 to 0.5 mm. The width W1 of the first concave portion I1 is larger than the depth Z2 of the first concave portion I1 so that the extraction efficiency of the incident light may be improved and the light may be dispersed. Accordingly, it is possible to reduce occurrence of dark portions on the first region 541. As another example, the plurality of first concave portions I1 disposed in the first region 541 may be disposed in a long length along the first direction and may be disposed to be concave or convex with respect to a third direction.

The upper surface of the plurality of first convex portions J1 disposed in the first region 541 may be the upper surface of the first region 541 and the area thereof may be smaller than a surface area of the first concave portion I1. The first convex portion J1 may function as a rib for supporting the adjacent first concave portion I1 or connecting the neighboring first concave portion I1. A width W2 of the first convex portion J1 in the first direction may be smaller than the width W1 or the diameter of the first concave portion I1. It may be smaller than ½ of the width W2 or the radius of the first convex portion J1. The width W2 of the first convex portion J1 may be smaller than the depth Z2 of the first concave portion I1 and may be in a range of 0.5 mm or less, for example, 0.1 to 0.3 mm. The length of the first convex portion J1 in the second direction or the X direction may be the same as the length of the first concave portion I1.

Here, the first convex portion J1 may be connected to the first side surface S11 and the first concave portion I1 may be spaced apart from the first side surface S11. As another example, a part of the first concave portion I1 may be connected to the first side surface S11, but is not limited thereto. As another example, the first region 541 may be disposed to have a gradually lower height or a narrower distance as it is adjacent to the first side surface S11. This may reduce loss of light in the rear direction of the light emitting device 100 and suppress occurrence of dark portions.

The third region 543 may be disposed at a center side of the resin member 550 so as to control the light distribution and maximize light extraction efficiency with respect to a center region of the resin member 550. The third region 543 may be disposed between the first region 541 and the fourth region 544. The third region 543 may be disposed between the second region 542 and the fourth region 544.

The width B12 in the second direction of the third region 543 is larger than the width B11 of the first region 541 and, for example, may be disposed in a range of equal to or more than twice, for example, two to three times the width B11 of the first region 541. The width B12 of the third region 543 may be in a range of 6 mm or less, for example, 3 to 6 mm. An area of the upper surface of such a third region 543 may be larger than that of the upper surface of the first region 541.

As shown in FIGS. 58 and 59, an upper surface height T4 of the third region 543 may be disposed to be lower than a height of the upper surface of the first region 541 from the upper surface of the substrate 401 or the bottom of the resin member 550. A height of the upper surface of the third region 543 may be a distance between the upper surface of the third region 543 and the bottom of the resin member 550. The height of the upper surface of the third region 543 may be greater than a minimum height of the fourth region 544 or greater than the thickness T3 thereof. The upper surface height T4 of the third region 543 may be in a range of more than one time and less than three times the thickness T1 of the light emitting device 100. The third region 543 may have a relationship of T2>T4>T3 with respect to the upper surface height T4, and may be in a range of 2.5 mm or more, for example, 2.5 to 3.5 mm.

The third region 543 may include a third concave portion I3 and a third convex portion J3 at an upper portion. A plurality of the third concave portions I3 may be arranged in the Y direction. The plurality of third concave portion I3 may be arranged at a predetermined distance Pa or may be arranged at a narrower distance as it is farther from the light emitting device 100. Each of the third concave portions I3 may be disposed between the third convex portions J3. A shape of the third concave portion I3 may include a shape having a concave curved surface, such as a hemispherical shape, or an aspherical shape. The third concave portion I3 may include a cylindrical shape having a concave curved surface. The plurality of third concave portion I3 may be arranged parallel to each other and may have a concave shape in the substrate direction. The lengths of the third concave portion I3 and the third convex portion J3 may be equal to the length of the resin member 550 in the X direction. As another example, the third convex portion J3 and the third concave portion I3 may be disposed to have a long length in the first direction and a concave or convex curved shape with respect to the Z direction.

Referring to FIG. 59, a depth Z3 of the third concave portion I3 may be equal to the depth Z2 of the first concave portion I1 in the third direction. The depth Z3 of the third concave portion I3 may be smaller than a width W3 or the diameter of the third concave portion I3. The depth Z3 of the third concave portion I3 as a maximum depth may be in a range of ½ or less, for example, ½ to ¼ of the width W3 in the Y direction. The width W3 or diameter of the third concave portion I3 may be greater than the depth Z3 of the third concave portion I3 and may be equal to the width W1 of the first concave portion I1. The width W3 or diameter of the third concave portion I3 may be an upper width or a distance between the third convex portions J3 and may be in a range of 2 mm or less, for example, 0.4 to 2 mm. The depth Z3 of the third concave portion I3 may be in a range of 1 mm or less, for example, 0.2 to 1 mm or 0.2 to 0.5 mm. A width W4 of the third convex portion J3 as a width of an upper surface may be equal to or narrower than the width W3 of the first convex portion J1 and may be in a range of 0.5 mm or less, for example, 0.1 to 0.3 mm. The third concave portions I3 may be disposed to have a concave curved surface in the Y direction so that some of incident light L3 (see FIG. 61) may be refracted and transmitted or reflected in a direction of the fourth region 544.

The number of the third concave portions I3 in the third region 543 may be greater than the number of the first concave portions I1 in the first region 541 and, for example, may be twice or more. Such a third region 543 may control a light distribution in the center side region of the resin member 540.

The upper surface of the third convex portion J3 adjacent to the fourth region 544 in the third region 543 may be disposed at a height equal to or higher than the upper surface of the third convex portion J3 adjacent to the second region 542. In the third region 543, the upper surface of one or a plurality of third convex portions J3 adjacent to the second region 542 or a height of the upper surface or uppermost end of the convex portion whose height of the uppermost end is the lowest may be lower than the upper surface of one or a plurality of third convex portions J3 adjacent to the fourth region 544 or a height of the upper surface or uppermost end of the convex portion whose height of the uppermost end is the highest. In the third region 543, a height of the upper surface of the third convex portion J3 may be continuously increased, or gradually or step-wise increased in the second direction to the fourth region 544 from the second region 542. In the third region 543, a distance or a distance between the uppermost end of the third convex portion J3 closest to the second region 542 and the substrate 401 may be smaller than a distance or a distance between the uppermost end of the third convex portion J3 closest to the fourth region 544 and the substrate 401. As shown in FIG. 58, a virtual straight line connecting opposite ends in the second direction of the third region 543 may be disposed to be gradually spaced apart from a horizontal straight line or inclined at a predetermined angle r0. The angle r0 may include a range of 0.01 to 20 degrees or 0.1 to 5 degrees. Even though the height of the upper surface of the third convex portion J3 adjacent to the fourth region 544 is gradually increased due to directivity characteristics of the light emitted from the light emitting device 100, the light extraction characteristics may be further improved. That is, the third region 543 may gradually become higher as it is farther from the light emitting device 100.

As shown in FIGS. 58 and 59, the second region 542 may be an exit region and a reflective region. The second region 542 may be a region disposed adjacent to the light emitting device 100 to suppress generation of dark portions. The second region 542 may be a region that is not vertically overlapped with the light emitting device 100 and may be a region closest to the emitting region 101 of the light emitting device 100.

The width B13 of the second region 542 may be smaller than the width B11 of the first region 541 in the Y direction. The width B13 may be 2 mm or less. The second region 542 may be disposed in an angle r11 in a range of 45 degrees or less from the straight line Z1 perpendicular to a center of the emitting region 101 of the light emitting device 100. Such a second region 542 may reflect the light incident in a range of 45 degrees or less from the straight line Z1 perpendicular to the center of the emitting region 101 of the light emitting device 100 toward the first region 541 or the substrate. Accordingly, it is possible to prevent hot spots in the second region 542, that is, the region adjacent to the emitting region 101 of the light emitting device 100.

An upper surface of the second region 542 may include an inclined upper surface with respect to a horizontal straight line of the upper surface of the first region 541 or the third region 543. The inclined upper surface of the second region 542 may be inclined and lower than the upper surface of the second region 542 so that it is possible to prevent a shape of the light emitting device 100 located inside the resin member 550 from being seen when viewed from above the resin member 550. The upper surface of the second region 542 may have a higher portion adjacent to the first region 541 and a lower portion adjacent to the third region 543. The second region 542 may reflect some of the light emitted from the light emitting device 100 to the first region 541 or may reflect the light in a direction of the upper surface of the substrate.

Referring to FIG. 59, the second region 542 may include at least one second concave portion I2 recessed from the inclined upper surface. The second concave portion I2 may be disposed to be adjacent to a second convex portion J2 or between the second convex portions J2. A straight line extending horizontally at an upper surface of the second convex portion J2 may be disposed at an angle r13 of more than 90 degrees, for example an obtuse angle with respect to the horizontal straight line of the first convex portion J1 of the first region 541. A straight line extending from the upper surface of the second convex portion J2 may be disposed at an angle r13 of 120 degrees or more, for example, 120 to 160 degrees with respect to a straight line horizontal to the upper surface of the first convex portion J1. That is, the upper surface of the second region 542 may be disposed at an angle r13 in a range of 120 degrees or more, for example, 120 to 160 degrees from the upper surface of the first region 541. A virtual straight line connecting the uppermost ends of at least two of the second convex portions J2 may be inclined in the second region 542.

The second concave portion I2 of the second region 542 may include a shape having a concave curved surface, and may include, for example, a hemispherical shape, or an aspherical shape. The second concave portion I2 may include a cylindrical shape having a concave curved surface. The second concave portion I2 may be disposed to be in a number less than or equal to the number of the first concave portions I1, for example, may be disposed in a number smaller than that of the first concave portions I1. A length in the X direction of the second concave portion I2 may be equal to those of the first and third concave portions I1 and I3.

When a side cross-section of the second concave portion I2 has a hemispherical shape, an angle between a normal line perpendicular to the straight line passing the low point of the second concave portion I2 and a normal line perpendicular to a straight line passing the low point of the first concave portion I1 may be an acute angle. The center or normal line vector direction of the second concave portion I2 may be recessed toward the emitting region 101 of the light emitting device 100 so that the light L1 and L2 (see FIG. 61) emitted from the light emitting device 100 may be diffused or reflected, and thus hot spots on the third region 143 may be prevented.

As shown in FIG. 59, a width W5 in the second direction of the second concave portion I2, which is an upper width, may be equal to the widths W1 and W5 of the first and second concave portions I1 and I2, or 2 mm or less, for example, in a range of 0.4 to 2 mm A depth Z4 in the third direction of the second concave portion I2 may be smaller than the width W5 of the second concave portion I2. The depth Z4 of the second concave portion I2 as a maximum depth may be in a range of ½ or less, for example, ½ to ¼ of the width W5 of the second concave portion I2. The depth Z4 of the second concave portion I2 may be in a range of 1 mm or less, for example, 0.2 to 0.1 mm. The width W5 of the second concave portion I2 may be disposed to be larger than the depth Z4 of the second concave portion I2, so that it is possible to increase the reflection efficiency of the incident light, to disperse the light and to prevent hot spots.

A width W6 of the second convex portion J2 may be smaller than the width W5 or the diameter of the second concave portion I2. The width W6 of the second convex portion J2 may be smaller than the depth Z4 of the second concave portion I2 and, for example, may be in a range of 0.1 to 0.3 mm. A length in the X direction of the second convex portion J2 may be the same as that of the second concave portion I2.

A low point Pi of the second region 542 may be disposed to be lower than that of the third concave portion I3. A low point depth Z7 of the second convex portion J2 adjacent to the third region 543 in the second region 542 may be a depth from the upper surface of the third convex portion J3 and may be larger than the depth Z3 of the third concave portion I3 of the third region 543. Accordingly, the second convex portion J2 located at a lower portion of the second region 542 may cover the direct irradiation of light to the third convex portion J3 of the third region 543 closest to the second convex portion J2. The second region 542 may be disposed such that a boundary portion thereof with the third region 543 is inclined at a predetermined angle r14 with a single step or multiple steps with respect to the upper surface of the second convex portion J2. An inclined surface J21 with multiple steps at the boundary between the second and third regions 542 and 543 may be disposed at an angle r14 in a range of 120 degrees or more, for example, 120 to 150 degrees with respect to the upper surface of the second region 542. Such an inclined surface J21 with multiple steps may cover a first second convex portion J2 of the third region 543 adjacent to the second region 542 to prevent hot spots at the portion.

Referring to FIGS. 58 and 60, the fourth region 544 of the exit surface 540 may be the farthest from the light emitting device 100. The fourth region 544 of the exit surface 540 may be disposed to be lower than the height of the upper surface of the third region 543. The upper surface of the fourth region 544 of the exit surface 540 may be disposed between the upper surface of the third region 543 and the second side surface S12 of the resin member 550. A height of the upper surface of the fourth region 544 adjacent to the third region 543 may be high and that of the upper surface of the fourth region 544 adjacent to the second side surface S12 may be low. The upper surface of the fourth region 544 may have a height gradually lower as it is adjacent to the second side surface S12 of the resin member 550. The fourth region 544 may have a structure of a plurality of steps from the third region 543 and be disposed at a height gradually lowered. The upper surface of the fourth region 544 may be disposed at a height gradually lowered so that light L4 (see FIG. 61) incident from the light emitting device 100 may be refracted to be transmitted or scattered.

A width B14 of the fourth region 544 may be greater than the width B12 of the third region 543. The width B14 of the fourth region 544 may be in a range of 50% or less, for example, 30% to 50% of the length K1 in the Y direction of the resin member 550. The upper surface of such a fourth region 544 may have a height gradually lowered as it is farther from the light emitting device 100 in the resin member 550 and may be disposed in a range of 30% to 50% of the Y-axis length K1 of the resin member 550 so that the light may be scattered in the farthest region from the light emitting device 100 to provide a uniform distribution, and light loss may be reduced. In addition, since the distance between the upper surface of the fourth region 544 and the upper surface of the substrate 401 may be gradually narrower as it is farther from the light emitting device 100, it is possible to increase the utilization and extraction efficiency of light reflected via the upper surface of the substrate 401 or the reflective member 410.

Referring to FIG. 60, the upper surface of the fourth region 544 may include an inclined surface. An angle r15 between an extending straight line of the inclined surface of the fourth region 544 and a horizontal straight line at the upper surface of the third region 543 may be an obtuse angle. The angle r15 may be in a range of 140 degrees or more, for example, 140 to 170 degrees, when the angle r15 is smaller than the range, a distribution of light emitted to the fourth region 544 becomes non-uniform, the reflection efficiency of the light may be lowered, and when the angle r15 is larger than the above range, luminous intensity emitted via the fourth region 544 may be lowered.

The fourth region 544 may include a plurality of fourth concave portions I4 and a plurality of fourth convex portions J4. The plurality of fourth concave portions I4 may be disposed at a height different from each other. The plurality of fourth concave portions I4 may be disposed at a height gradually lower as they are farther from the light emitting device 100, so that incident light may be transmitted and reflected. The fourth concave portions I4 may be disposed parallel to each other at a height different from each other. As another example, the fourth convex portion J4 and the fourth concave portion I4 may be disposed to have a long length in the first direction and a concave or convex curved shape with respect to the second direction.

As shown in FIG. 58, the plurality of fourth concave portions I4 may be disposed at a predetermined distance Pb, and for example, may have a relationship of, for example, Pb>Pa, which is wider than the distance Pa of the third concave portions I3. The normal line direction of the fourth concave portion I4 may be a direction perpendicular to the upper surface of the substrate 401. The number of the fourth concave portions I4 in the fourth region 544 may be greater than that of the first concave portions I1 in the first region 541, and may be equal to or greater than that of the third concave portions I3 in the third region 543.

The fourth concave portion I4 of the fourth region 544 may include a shape having a concave curved surface, and may include, for example, a hemispherical shape, or an aspherical shape. The fourth concave portion I4 may include a cylindrical shape having a concave curved surface. The fourth concave portions I4 may protrude to the substrate.

When the fourth concave portion I4 has a hemispherical shape, the normal lines passing the center of each of the fourth concave portions I4 may be parallel to each other. The fourth concave portions I4 may protrude to the substrate so that some of light L4 (see FIG. 8) emitted from the light emitting device 100 may be refracted to pass through, and some of the light may be reflected. Accordingly, the fourth concave portions I4 may be disposed at a height gradually lowered at a predetermined distance, and the light incident from the light emitting device 100 and the light reflected by the third concave portion I3 of the second region 542 may be processed, respectively.

A length of the fourth concave portion I4 may be equal to lengths in the first direction of the first to third concave portions I1, I2, and I3. A width W7 of the fourth concave portion I4 may be equal to the widths W1, W3, and W5 of the first to third concave portions I1, I2, and I3 or may be in a range of 2 mm or less, for example, 0.4 to 2 mm in the second direction. A depth Z5 of the fourth concave portion I4 in the third direction may be smaller than the width of the fourth concave portion I4. The depth Z5 of the fourth concave portion I4 as a maximum depth may be ½ or less, for example, in a range of ½ to ¼ of the width W7 of the fourth concave portion I4. The depth Z5 of the fourth concave portion I4 may be 1 mm or less, for example, in a range of 0.2 to 1 mm. In the fourth concave portion I4, since the width W7 may be disposed to be larger than the depth Z5 and to be gradually lowered, the incident light may be transmitted or scattered. Further, the fourth convex portion J4 having a inclined surface gradually lowered and the fourth concave portion I4 having a concave curved surface may be disposed, so that the light reflected from the third region 543 or the light coming from the substrate direction may be refracted and transmitted in the upward direction, and the height may be gradually decreased as toward the second side surface S12, and thus a difference in luminous intensity of the extracted light can be reduced.

A width W8 of the fourth convex portion J4 in the second direction may be smaller than the width W7 or the diameter of the fourth concave portion I4. The width W8 of the fourth convex portion J4 may be smaller than the depth Z5 of the fourth concave portion I4 and may be in a range of, for example, 0.1 to 0.2 mm. A length of the fourth convex portion J4 may be the same as the length of the fourth concave portion I4 in the X direction.

As shown in FIG. 60, the fourth convex portion J4 may include a structure of a plurality of steps and, for example, may include a first surface J41, a second surface J42, and a third surface J43. The first surface J41 may be a flat surface, the second surface J42 may be an inclined surface, and the third surface J43 may be a flat surface. The second surface J42 may be connected between the first and third surfaces J41 and J43. The second surface J42 may include an inclined surface having a height gradually lowered as it is adjacent to the third surface J43 or farther from the light emitting device 100. The first and third surfaces J41 and J43 may have different heights at the fourth convex portion J4 disposed between the adjacent fourth concave portions I4, and for example, the third surface J43 may be disposed to be lower than the first surface J41. A height difference Z6 between the first and third surfaces J41 and J43 may be smaller than the depth Z5 of the fourth concave portion I4 and, for example, may be in a range of 0.5 mm or less, for example, 0.15 to 0.5 mm. When the height difference Z6 between the first and third surfaces J41 and J43 is large, it may be disposed to be lower than the low point of the fourth convex portion J4 in the horizontal direction, and accordingly, an amount in which some of the light emitted from the light emitting device 100 is directly transmitted via the fourth convex portion J4 (J41, J42, and J43) is increased, which may lower the uniform distribution of light.

A width W11 of the second surface J42 of the fourth convex portion J4 may be larger than widths W9 and W10 of the first and third surfaces J41 and J43, and may be twice or more. Accordingly, the light reflected in the substrate direction may be extracted via the second surface J42.

Here, the first surface J41 or the second surface J42 may be disposed at a portion of the fourth convex portion J4 adjacent to the third region 543, but is not limited thereto. The first surface J41 or the first and second surfaces J41 and J42 may be disposed at a portion of the fourth convex portion J4 adjacent to the second side surface S12.

The recessed direction of the second concave portion I2 of the second region 542 at the exit surface 540 of the resin member 550 according to an embodiment may be made different from the depressed direction of the concave portions I1, I3, and I4 of the first, third and fourth regions 541, 543, 544, so that a critical angle with respect to the incident light may be changed, and thus hot spots can be prevented.

Figure 61:
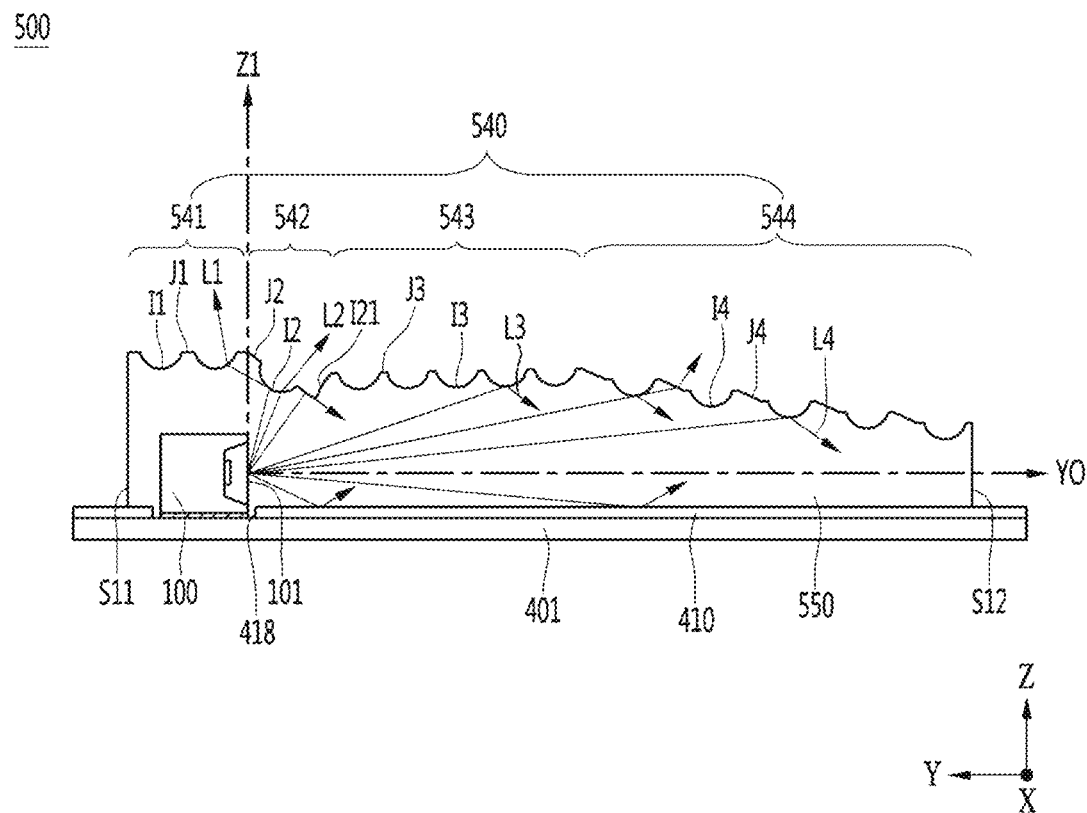
FIG. 61 is a view for explaining a light extracting path from the lighting module of FIG. 58.

As shown in FIG. 61, the light L1, L2, L3 and L4 emitted from the light emitting device 100 in the resin member 550 may be irradiated toward the resin member 550 of the substrate direction, an upper portion of the exit surface 540 of the resin member 550, for example, second to the fourth regions 542, 543, and 544. In this case, the light traveling in the substrate direction may be reflected by the reflective member 410 and may travel to the first to fourth regions 541, 542, 543, and 544. The light L3 irradiated to the third region 543 or the light reflected by the reflective member 410 may be transmitted to the third region 543 or reflected in the direction of the first region 541 or in the substrate direction. The light L1 or L2 irradiated to the second region 542 or the light reflected by the reflective member 410 may be transmitted or reflected in the direction of the first region 541 or in the substrate direction. The light L4 traveling to the fourth region 544 or reflected by the reflective member 410 may be transmitted by the fourth region 544 or reflected in the substrate direction. The resin member 550 has an effect of improving uniformity and luminous intensity of light extracted by the first to fourth regions 541, 542, 543, and 544.

Figure 62:
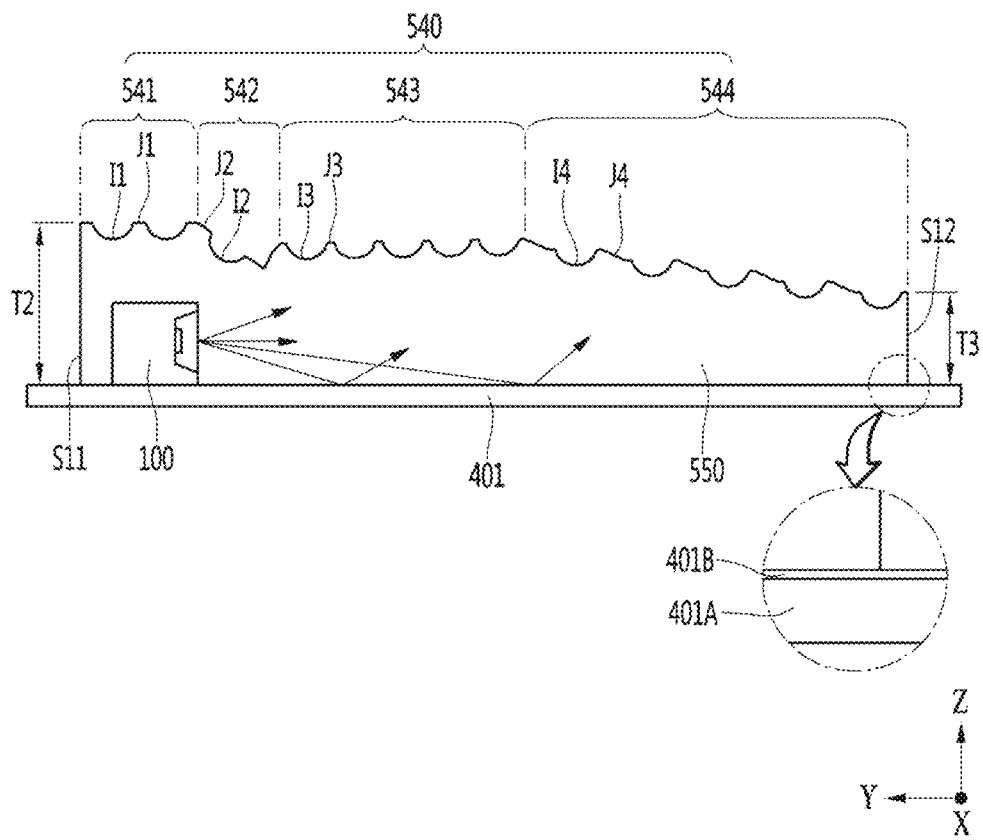
FIG. 62 is an example showing the structure of the reflective member removed from the lighting module of FIG. 58.

FIG. 62 is a modified example of the lighting module of FIG. 55, in which a reflective member having a film between the substrate 401 and the resin member 550 is removed. In this case, the substrate 401 may have a reflective layer 401B disposed on a support layer 401A. The reflective layer 401B may include a member having a solder resist material, and the solder resist material is a white material, and may reflect incident light. The thickness of the lighting module may be reduced by removing the reflective member, so that the manufacturing process may be simplified. The reflective layer 401B may be a single layer. As shown in FIG. 96, Example 1 is a case in which a film having a multilayer structure such as a reflective member is applied to a lighting module as shown in FIG. 55, and Example 2 is a case in which a film such as a reflective member is removed and a reflective layer is disposed as shown in FIG. 62. As in Examples 1 and 2 of FIG. 96, it can be seen that the illumination characteristic at the angle of ±10 degrees or less with respect to the vertical straight line is higher in the structure as in Example 2.

Figure 63:
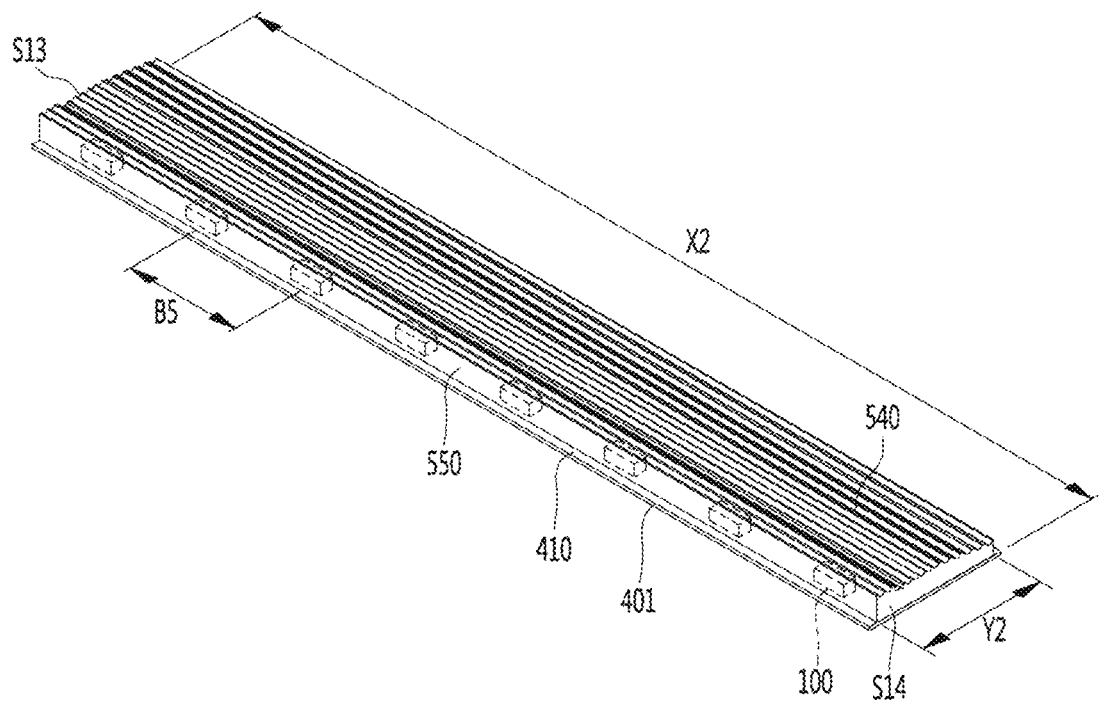
FIG. 63 is a perspective view showing a first modification of the lighting module of FIG. 54.

FIG. 63 is a first modified example of the lighting module of FIG. 54. In describing the first modified example, an exit surface of a resin member of the lighting module is referred to examples disclosed above, and may be selectively applied to the first modified example.

Referring to FIG. 63, the lighting module includes a substrate 401, a plurality of light emitting devices 100 arranged in the X direction along a first edge of the substrate 401, and a resin member 550 having an exit surface 540 on the substrate 401 and the light emitting device 100.

The light emitting devices 100 may be arranged at a predetermined distance along the X direction at a first edge in a longitudinal direction of the substrate 401. The light emitting device 100 may be arranged along at least one edge, that is, a long side edge, of the substrate 401. The light emitting devices 100 may be arranged at a predetermined distance. The light emitting device 100 may be arranged along a thick region of the region of the resin member 550. A thickness of the resin member 550 may be thicker in the region in which the light emitting device 100 is disposed and thinner as it is farther from the light emitting device 100.

As shown in FIGS. 3 to 7, the exit surface 540 of the resin member 550 may include first to fourth regions in the Y direction. The configuration and description of the first to fourth regions are referred to the description of the above-disclosed embodiments.

A length Y2 in the first direction of the resin member 550 may be greater than a length X2 in the X direction and may be, for example, twice or more. A distance B5 between the light emitting devices 100 may be in a range of 100 mm or less, for example, in a range of 1 to 30 mm or 15 to 25 mm. When the distance B5 between the light emitting devices 100 is smaller than the above range, the number of the light emitting devices 100 may be increased, and when the distance B5 is larger than the above range, dark portions may be generated.

A reflective member 410 having a reflective member may be disposed between the resin member 550 and the substrate 401. As another example, the reflective member is not a film, a reflective layer such as a solder resist formed on the circuit board 401 may be disposed as the reflective member. Although a shape of the resin member 550 or the substrate is presented as an example of a polygon when viewed from the top, it may be a shape having a curved line.

Figure 64:
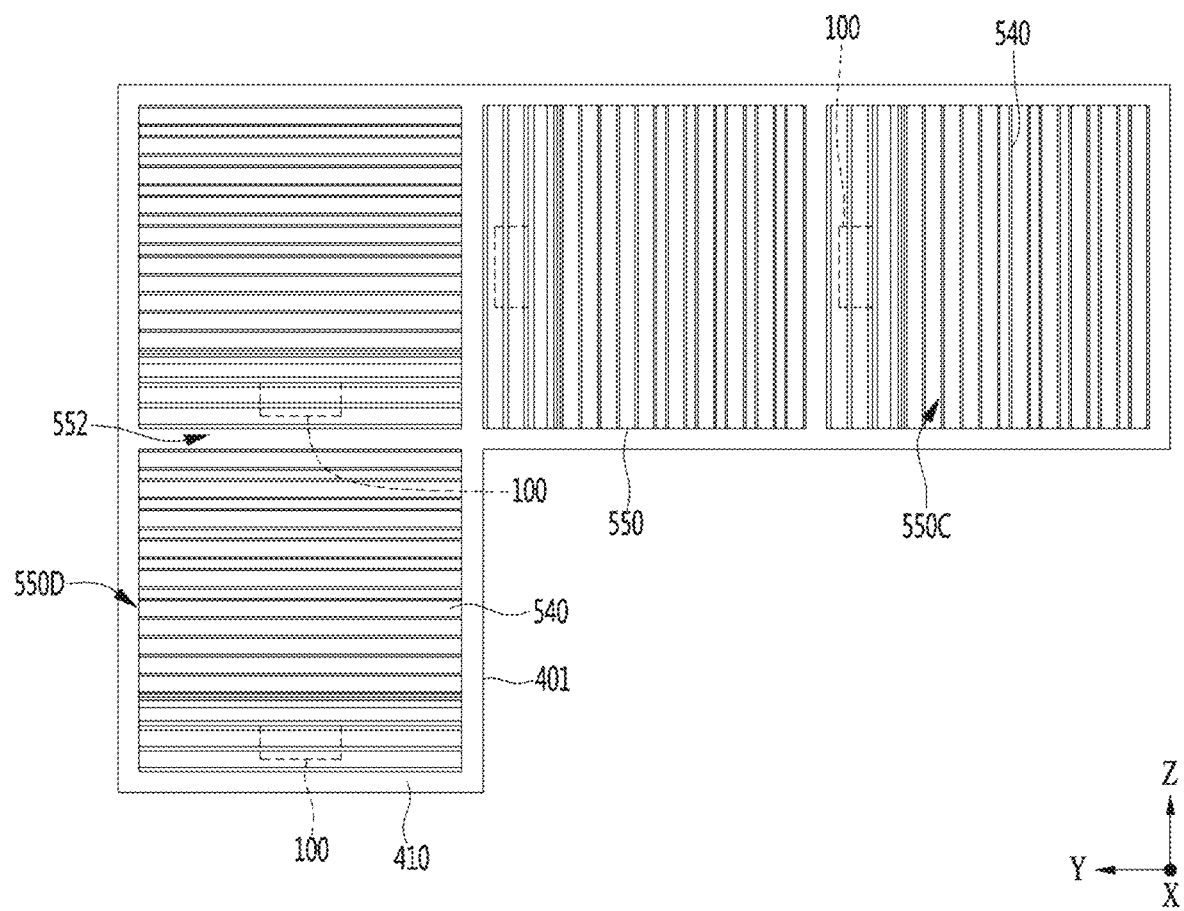
FIG. 64 is a plan view showing a second modification of the lighting module of FIG. 54.

FIG. 64 is a second modified example of the lighting module according to an embodiment. In describing the second modified example, an exit surface of a resin member of the lighting module is referred to examples disclosed above, and may be selectively applied to the second modified example.

Referring to FIG. 64, a plurality of light emitting cells 550C and 550D may be disposed in n rows and m columns in the lighting module, and the condition of n≥1 and m≥1 may be satisfied. The light emitting cells 550C of the n rows and the light emitting cells 550D of the m rows may be disposed to be intersecting, corresponding to, or adjacent to each other. For example, the plurality of first light emitting cells 550C may be arranged in the X direction on the substrate 401, and one or more second light emitting cells 550D may be disposed in the Y direction. The first and second light emitting cells 550C and 550D may be disposed to be overlapped with each other in the X direction or the Y direction. The resin member disclosed in the lighting module of FIG. 64 may include the above-disclosed first to fourth regions, respectively.

Figure 65:
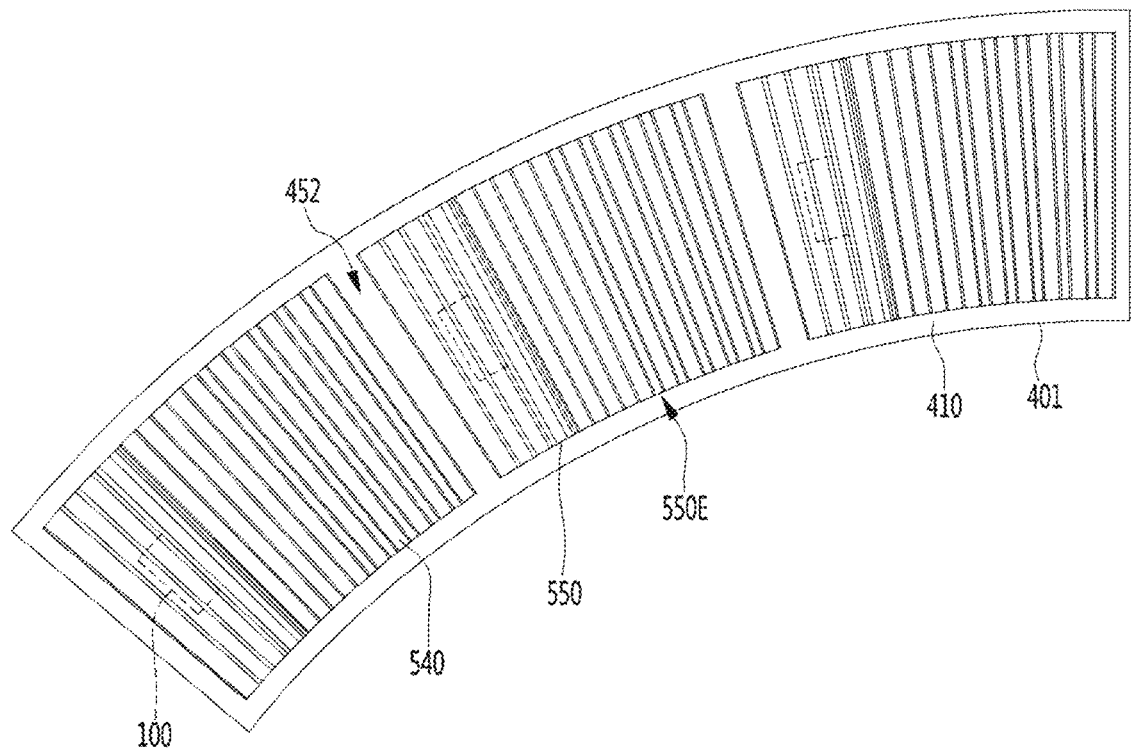
FIG. 65 is a plan view showing a third modification of the lighting module of FIG. 54.

Referring to FIG. 65, a lighting module may have a curved edge on the substrate 401, and a plurality of light emitting cells 550E may be arranged on the substrate 401. The plurality of light emitting cells 550E may be formed in a curved shape along the curved edge. That is, third and fourth side surfaces S13 and S14 of the resin member 550 of each light emitting cell 550E are formed in a curved shape, and in each light emitting cell 550E, the central axes of the light emitting devices may be disposed on different axes. This may be applied to a curved or bent lamp structure depending on the type of application being applied. The resin member 550 disclosed in the lighting module of FIG. 65 may include the above-disclosed first to fourth regions, respectively.

The reflective member 410 according to an embodiment is referred to the structure and description of the above-disclosed embodiment(s).

Figure 66:
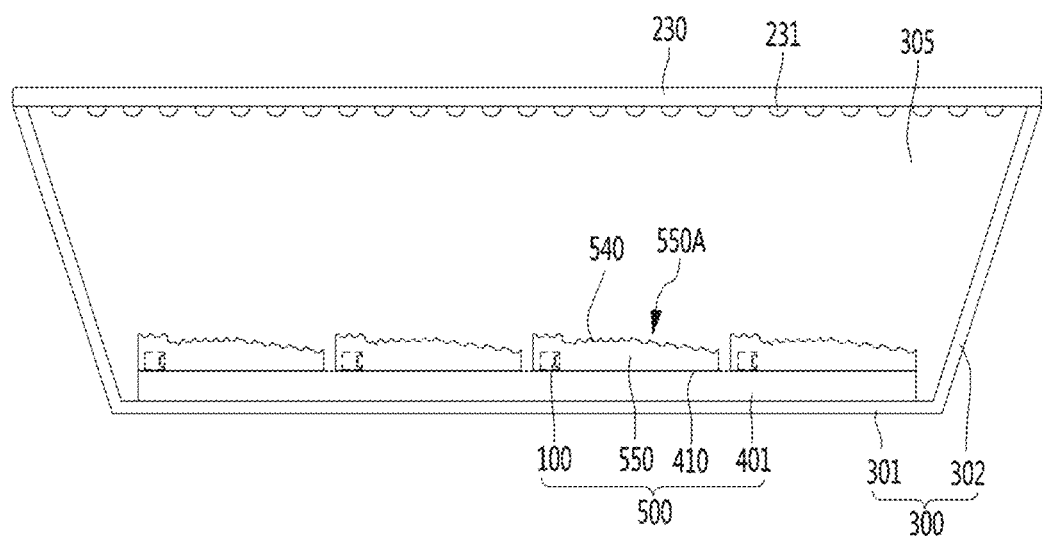
FIG. 66 is a side cross-sectional view of the lighting device having the lighting module of FIG. 55.

FIG. 66 is a view showing a lighting device having the lighting module of FIG. 55. The lighting module in the lighting device of FIG. 66 will be described with reference to the configuration and description of the lighting module described above.

As shown in FIG. 66, the lighting module 500 includes the module disclosed in the embodiment, and includes a substrate 401, a plurality of light emitting devices 100 on the substrate 401, and a resin member 550 and a reflective member 410. A plurality of resin members 550 may be disposed on the substrate 401. As shown in FIGS. 54 and 55, the lighting module 500 may be arranged with a plurality of light emitting cells 550A. The lighting module 500 may include the reflective member 410 in the form of a film or may include a reflecting member made of a solder resist material on the substrate.

An optical member 230 may be disposed on the lighting module 500, and the optical member 230 may diffuse and transmit incident light. The optical member 230 uniformly diffuses and emits the surface light source emitted through the resin member 550. The optical member 230 may include an optical lens or an inner lens, and the optical lens may condense the light toward the target or change the path of the light. The optical member 230 may include a plurality of lens portions 231 on at least one of the upper surface and the lower surface of the optical member 230, and the lens portions 231 may have a shape protruding downward from the optical member 230 or may have a shape protruding upward from the optical member 230. Such an optical member 230 may control the light distribution characteristics of the lighting device.

The lighting module 500 may include a heat dissipation plate (not shown) at a bottom surface thereof. The heat dissipation plate may include a plurality of heat dissipation fins and may dissipate heat conducted to the substrate 401. The heat dissipation plate may include at least one of metals such as aluminum, copper, magnesium, nickel, or an alloy thereof.

The lighting device includes a housing 300 having a receiving space 305, a lighting module according to an embodiment disposed at the bottom of the receiving space of the housing 300, and an optical member 230 disposed on the lighting module.

The housing 300 includes a bottom portion 301 and a reflective portion 302. The bottom portion 301 is disposed under the substrate 401. The reflective portion 302 may protrude upward from an outer periphery of the bottom portion 301 and may be disposed around the resin member 550. The housing 300 may include a metal or a plastic material, but the invention is not limited thereto. The lighting device includes a housing 300 having a receiving space 305, a lighting module according to an embodiment disposed at the bottom of the receiving space of the housing 300, and an optical member 230 disposed on the lighting module. An outer surface of the receiving space 305 of the housing 300 may be provided at an inclined surface with respect to the bottom surface of the housing 300 and the inclined surface may improve the light extraction efficiency. The surface of the receiving space 305 of the housing 300 may be formed with a metallic material of reflective material and the light extraction efficiency in the receiving space 305 may be improved by such metallic material. The depth of the receiving space 305 is larger than the high point of the resin member 550 and may emit light emitted through the resin member 550.

Sixth Embodiment

Figure 67:
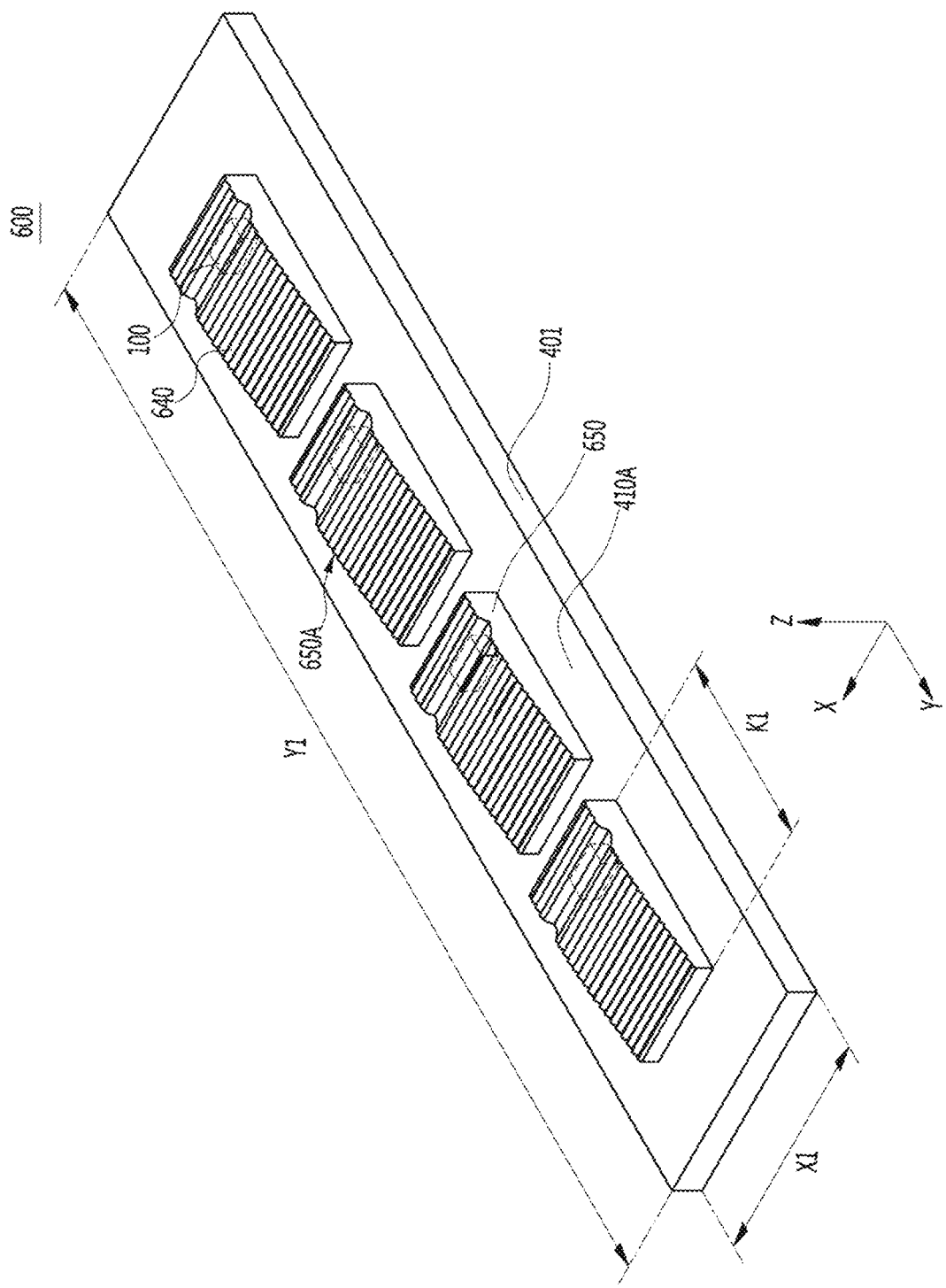
FIG. 67 is a perspective view of a lighting module according to the sixth embodiment.
Figure 68:
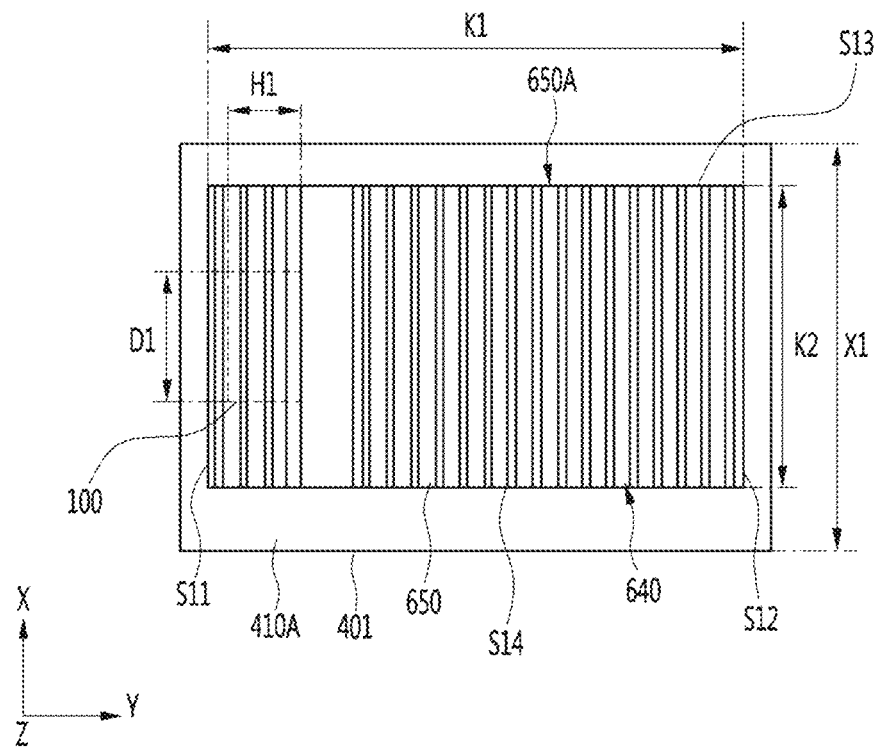
FIG. 68 is a partial plan view of the lighting module of FIG. 67.
Figure 69:
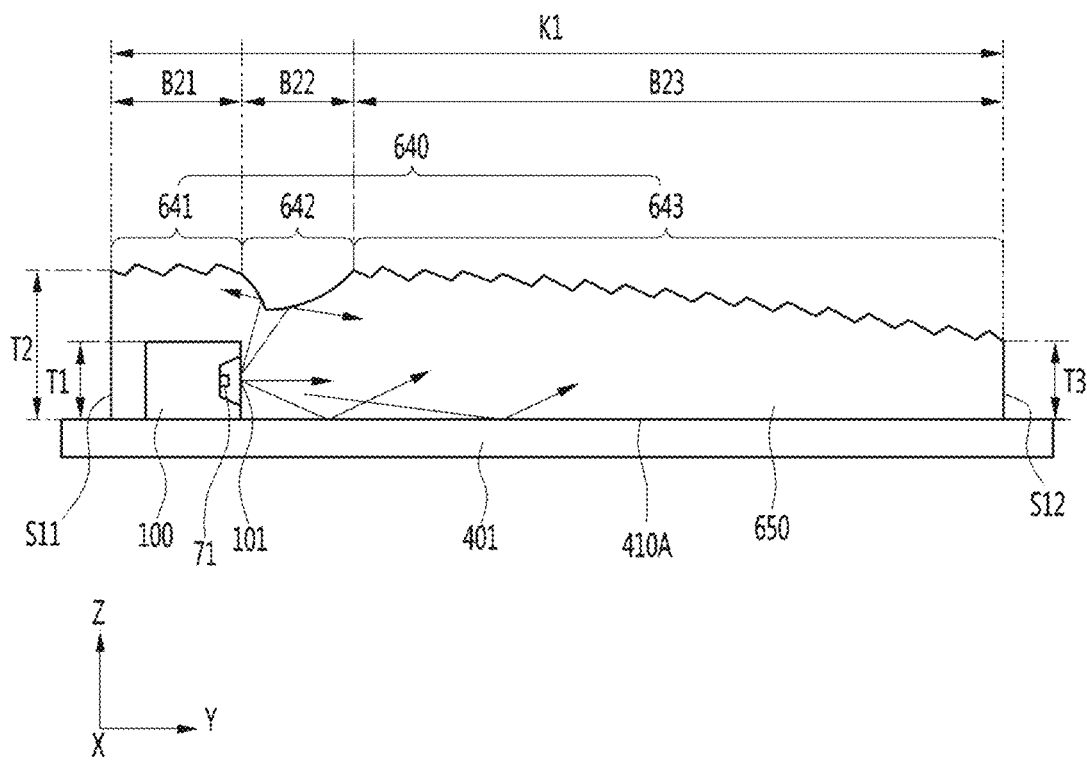
FIG. 69 is a side cross-sectional view of the lighting module of FIG. 68.
Figure 70:
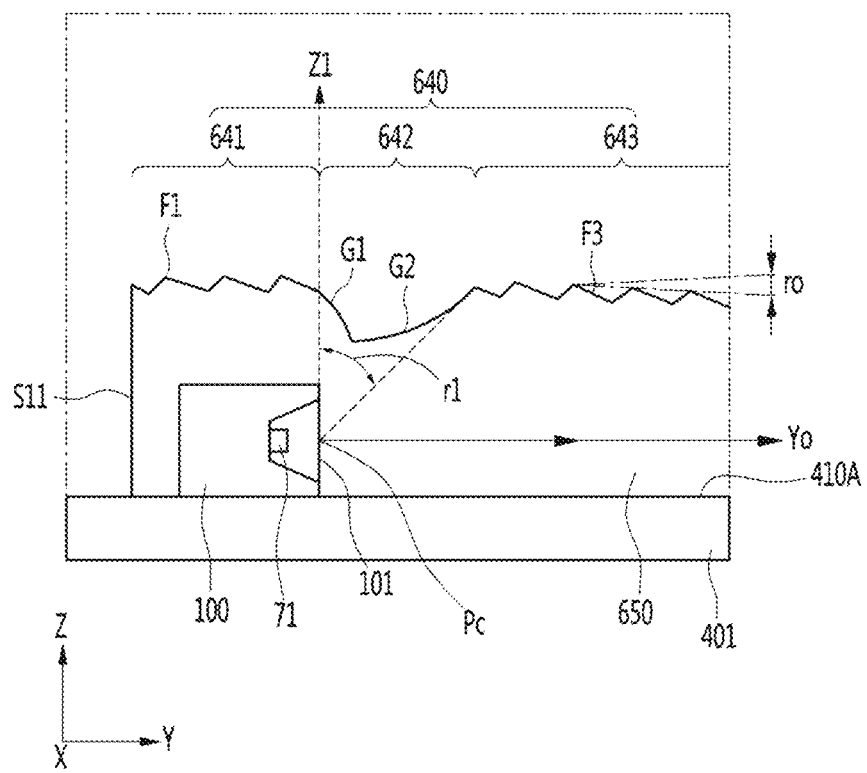
FIG. 70 is a partially enlarged view of the lighting module of FIG. 69.
Figure 71:
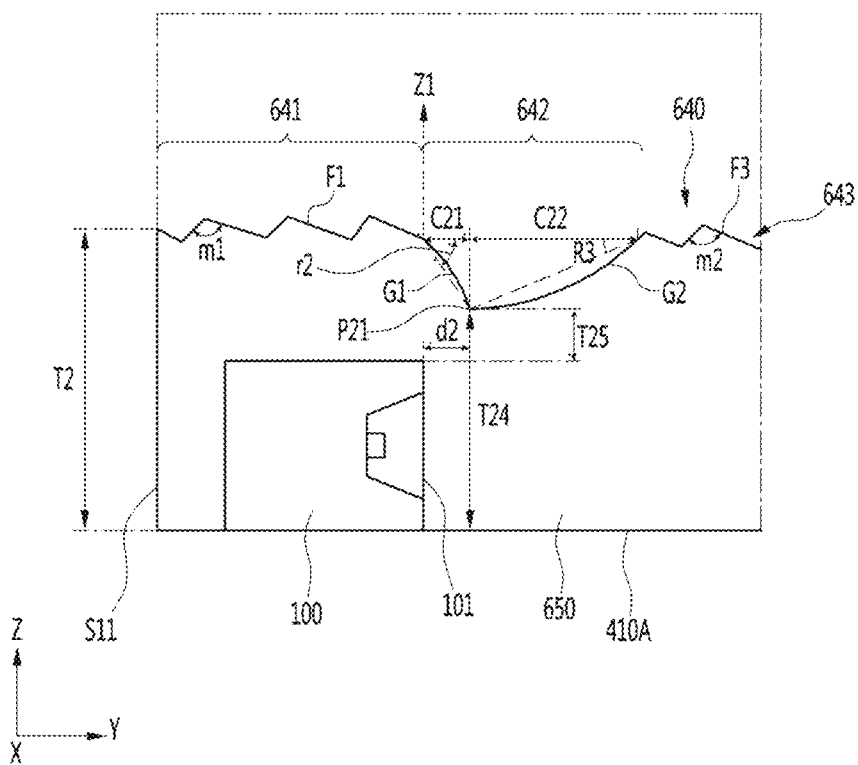
FIG. 71 is a view illustrating a second region in the lighting module of FIG. 69.

FIG. 67 is a perspective view of a lighting module according to a sixth embodiment, FIG. 68 is a partial plan view of the lighting module of FIG. 67, FIG. 69 is a side cross-sectional view of the lighting module of FIG. 68, FIG. 70 is a partial enlarged view of the lighting module of FIG. 69, and FIG. 71 is a view for explaining a second region in the lighting module of FIG. 69. A description of the sixth embodiment is referred to a description of the embodiment(s) disclosed above, and the same configuration may be selectively applied to the present embodiment.

Referring to FIGS. 67 to 71, a lighting module 600 according to the sixth embodiment may include a substrate 401, a light emitting device 100 disposed on the substrate 401, and a resin member 650 covering the light emitting device 100 on the substrate 401.

The lighting module 600 may emit light emitted from the light emitting device 100 as a surface light source. One or a plurality of light emitting cells 650A may be arranged in the lighting module 600. The light emitting cells 650A may emit light of the same color by the light emitting device 100. The plurality of light emitting devices 100 may emit light of a single color. The plurality of light emitting cells 650A may be arranged on the substrate 401 in a predetermined direction. A description of each component and operation of the lighting module according to the sixth embodiment is referred to the embodiment (s) disclosed above, and may be selectively applied to the present embodiment.

The lighting module 600 may include a reflective member 410A that reflects incident light toward an exit surface of the resin member 650. The reflective member 410A may be in a film shape as shown in FIG. 7 or 8, or may be a reflective layer. The reflective layer may be disposed as a layer of resin material or solder resist material without being attached in a separate film shape on the substrate 401. Such a reflective member 410A may be implemented as a reflective layer disposed on a surface of the substrate 401, which is not a film-shaped reflective member as shown in FIGS. 7 and 8. In a case of removing such a film-shaped reflective member, it is possible to reduce a thickness of the lighting module and eliminate a problem of thermal expansion or peeling off due to adhesion of a film.

The resin member 650 may be disposed on the substrate 401. Since the resin member 650 is disposed on the light emitting device 100, the light emitting device 100 may be protected and loss of light emitted from the light emitting device 100 may be reduced. The resin member 650 may prevent moisture penetration by sealing a surface of the light emitting device 100. When the number of the resin members 650 is plural as shown in FIG. 68, the resin member 650 of each of the light emitting cells 650A may be spaced apart from each other. The plurality of resin members 650 may be arranged in one direction. The plurality of resin members 650 may be spaced apart at a predetermined distance or may be disposed at an irregular distance. A gap between the resin members 650 may face two side surfaces S11 and S12 of different resin members. The adjacent resin members 650 may be separated from or connected to each other. When the resin members 650 are connected to each other, they may be partially connected.

The resin member 650 may include first and second side surfaces S11 and S12 opposite to each other and third and fourth side surfaces S13 and S14 opposite to each other. The first side surface S11 may be adjacent to the light emitting device 100, and may be face a rear surface of the light emitting device 100. The first side surface S11 may be an opposite surface of an emitting region 101 of the light emitting device 100. The second side surface S12 is a surface facing the first side surface S11, and may face the emitting region 101 of the light emitting device 100. The third and fourth side surfaces S13 and S14 may be adjacent to the first and second side surfaces S11 and S12, and may face each other. A thickness of the resin member 650 may vary depending on a region. A thickness T2 of the thickest region in the Z direction in the resin member 650 may be thicker than a thickness T1 of the light emitting device 100, and a thickness T3 of the thinnest region may be smaller or thicker than the thickness T1 of the light emitting device 100. The thickest region of the resin member 650 may be overlapped with the light emitting device 100 in a vertical direction. A thickness of a region adjacent to the first side surface S11 in the resin member 650 may be thicker than a thickness of a region adjacent to the second side surface S12 therein.

The maximum thickness T2 of the resin member 650 may be greater than or equal to the thickness T1 of the light emitting device 100, and may be 20 mm or less. The maximum thickness T2 of the resin member 650 may be 10 mm or less, for example, in a range of 1.7 to 10 mm, or 1.7 to 4 mm. When the maximum thickness T2 of the resin member 650 is larger than the above range, luminous efficiency may be lowered or a module thickness may be increased. When the maximum thickness T2 is smaller than the above range, light uniformity may be lowered. The minimum thickness T3 of the resin member 650 may be 1 mm or more and less than the maximum thickness T2. The minimum thickness T3 may be in a range of 1 to 2 mm or 1.4 to 2 mm. The minimum thickness T3 may be equal to, or greater or less than the thickness T1 of the light emitting device 100.

When viewed in a top view of the resin member 650, a length K1 in the Y direction may be disposed equal to or larger than a length K2 in the X direction, as shown in FIG. 68. The length K2 in the X direction may be a length of the first and second side surfaces S11 and S12 disposed on opposite sides of the resin members 650 in the X direction. The length K1 in the Y direction may be 10 mm or more, for example, in a range of 10 to 40 mm, or 10 to 23 mm. The length K2 in the X direction may be 10 mm or more, for example, in a range of 10 to 30 mm or 15 to 23 mm. A size of the resin member 650 may be provided in a size considering light uniformity, and may vary depending on applications. A top view shape of the resin member 650 may be a polygonal shape, for example, a quadrilateral shape, a curved shape, or a bent shape.

The thinnest region of the resin member 650 may be the farthest region with respect to the emitting region 101 of the light emitting device 100. The minimum thickness T3 of the resin member 650 may be 1 mm or more with respect to an upper surface of the substrate 401, or equal to or greater or less than the thickness T1 of the light emitting device 100. The lowest point of the resin member 650 may be higher or lower than a height of an upper surface of the light emitting device 100. The lowest point of an upper surface of the resin member 650 may be smaller or higher than a height of a straight line or an optical axis Y0. The side surfaces S11, S12, S13, and S14 of the resin member 650 may be coated with a metal material such as aluminum, chromium, and barium sulfate, but is not limited thereto.

The resin member 650 according to an embodiment includes an exit surface 640. The exit surface 640 is the upper surface of the resin member 650 and may include a light extraction structure (or an optical pattern or a concavo-convex pattern) in at least a portion of the region. The light extraction structure may include a concavo-convex pattern, and may reflect or transmit incident light or may change a critical angle. The light extraction structure may be integrally formed at the exit surface 640 of the resin member 650. The resin member 650 and the light extraction structure may be formed of the same material. The light extraction structure may have a pattern of a predetermined distance or irregular distance. The exit surface 640 may be gradually adjacent to the substrate 401 as it is farther from the light emitting device 100. The exit surface 640 may extract light reflected by the reflective member 410A or light emitted from the light emitting device 100 in an upward direction. The exit surface 640 is disposed adjacent to the substrate 401 as it is farther from the light emitting device 100, thereby reducing a difference in an amount of light emitted according to the emitting region 101. Accordingly, uniformity of light extracted through the exit surface 640 may be improved.

In the light extraction structure of the exit surface 640, when light emitted from the light emitting device 100, light reflected by the exit surface 640, or light reflected by the reflective member 410A is incident, the light may be extracted to the outside by changing the critical angle of light. Light emitted in the Z direction through the exit surface 640 may be a surface light source. In the light extraction structure of the exit surface 640, a side cross section may include at least one or two or more of a hemispherical shape, a polygonal shape, and a shape such as a polygonal horn or a cone. In the light extraction structure, the side cross section may include a groove with a hemispherical shape. A length of the light extraction structure in the X direction may be equal to a length of the resin member 650 in the X direction. The light extraction structure may improve light exit efficiency by a concavo-convex pattern. The light extraction structure is disposed in the same length as that of the resin member 650 in the X direction, and the concavo-convex pattern may be alternately arranged in the Y direction.

In an embodiment, the lighting module may guide light from the light emitting device 100 through the resin member 650, and exit the light through the exit surface 640, thereby providing a uniform surface light source. Since an optical path in the resin member 650 is long, the embodiment is directed to prevent luminous efficiency from deteriorating in a process of controlling a light emitting direction. In addition, the embodiment is directed to provide luminous efficiency and light distribution characteristics for various kinds of lamps applied to an object such as a vehicle according to a material of the reflective member 410A.

In the lighting module, when the reflective member 410A is a film type having a reflective pattern, image uniformity extracted through a diffusion of light by the reflective pattern may be improved, thereby providing a uniform surface light source. Since the reflective member 410A of such a film type is low in central luminous intensity of a surface light source, it may be effective for a position lamp, a tail lamp, and the like based on the law on light distribution of a vehicle. In the lighting module, when the reflective member 410A is a reflective layer such as a solder resist, an amount of light reflected from a region adjacent to the emitting region 101 of the light emitting device 100 is increased, thereby implementing a surface light source in which central luminous intensity is increased. Since the reflective member 410A having such a reflective layer provides a surface light source having a high central luminous intensity, it can be applied to a daytime running right, a backup lamp, a turn signal lamp, or the like.

The lighting module of an embodiment may change a pattern of the light extraction structure at the exit surface 640 of the resin member 650 to improve light efficiency and increase central luminous intensity, and may provide a surface light source. Light condensing property and diffusing property may be improved by the pattern of the light extraction structure of the exit surface 640 of the resin member 650 according to an embodiment. Hereinafter, the exit surface 640 of the resin member 650 will be described in detail. The exit surface 640 may emit light emitted through the resin member 650 with a uniform light distribution as the surface light source, and may improve the central luminous intensity of the resin member 650.

The exit surface 640 of the resin member 650 may include a plurality of regions 641, 642, and 643. The plurality of regions 641, 642, and 643 may be disposed with at least three or four regions or more divided in a direction of the second side surface S12 from the first side surface S11 of the resin member 650, and may have different light extraction characteristics. The plurality of regions 641, 642, and 643 may be disposed with different heights based on a position of the light emitting device 100. The plurality of regions 641, 642, and 643 is the light emitting region 101, and may be disposed with a different area from each other based on the position of the light emitting device 100. The plurality of regions 641, 642, and 643 may have the same length in the X direction (e.g., K2), and may have different widths in the Y direction. The light extraction structure may be disposed in at least one or two more of the plurality of regions 641, 642, and 643.

The plurality of regions 641, 642 and 643 may include a first region 641 in which at least a portion thereof is overlapped with the light emitting device 100 in the vertical direction and is adjacent to the first side surface S11, a second region 642 between the first region 641 and the second side surface S12, and a third region 643 between the second region 642 and the second side surface S12.

At least a portion of the first region 641 may be overlapped with the light emitting device 100 in the vertical direction. The first region 641 may be a region that emits the reflected light among light emitted from the light emitting device 100. An area of an upper surface of the first region 641 may be smaller than that of an upper surface of the third region 643. A length in the X direction of the first region 641 may be equal to the length K2 in the X direction of the resin member 650 and a width B21 in the Y direction may be larger than a width H1 (see FIG. 68) in the Y direction of the light emitting device 100. The first region 641 may be disposed at an angle of 60 degrees or less, for example, in a range of 30 to 60 degrees with respect to a straight line Z1 perpendicular to the emitting region 101 of the light emitting device 100. Such a first region 641 may be widely disposed on the light emitting device 100 at the above-described size, so that it is possible to disperse light traveling toward an upper portion and rear portion of the light emitting device 100 to a region adjacent to the first side surface S11.

Referring to FIG. 69, the width B21 of the first region 641 may be greater than a width B22 of the second region 642 and smaller than a width B23 of the third region 643 in the Y direction from the exit surface 640 of the resin member 650. The width B21 of the first region 641 may be 1.5 mm or more, for example, in a range of 1.5 to 4 mm. When the width B21 of the first region 641 is smaller than the above range, a distance between the rear surface of the light emitting device 100 and the first side surface S11 may be small, so that a protection of the rear portion of the light emitting device 100 may be weak, and when the width B21 of the first region 641 is greater than the above range, a distribution of light extracted via the first region 641 may be non-uniform.

A height of the upper surface of the first region 641 is a distance between the upper surface of the first region 641 and a bottom of the resin member, and may be disposed higher than the upper surface of the second region 642. The height of the upper surface of the first region 641 may be equal to the maximum thickness T2 of the resin member 650. The first region 641 may be disposed on the light emitting device 100 at the above height, so that it is possible to protect an upper portion of the light emitting device 100 and to extract light reflected from the third region 643 or a substrate direction.

Referring to FIGS. 70 and 71, the first region 641 may include a first light extraction structure F1 on an upper portion thereof at the exit surface 640 of the resin member 650. The first light extraction structure F1 may include a concavo-convex pattern, and a height of a high point of the concavo-convex pattern may be equal to each other. The first light extraction structure F1 may include a pattern having a prism shape. The convex pattern may include a triangular shape having two sides inclined in a side cross section, and an internal angle m1 (see FIG. 5) between the two sides may be 60 degrees or more. The high point (or vertex) of the convex pattern may be disposed to be adjacent in a first side surface direction than a center of the pattern. The vertex of the convex pattern may be an angled surface or a curved surface. For another example, the light extraction structure may include a pattern of a polygonal cone or a conical shape. For another example, a pattern having a concave hemispherical shape may be disposed in the first region 641.

The first light extraction structure F1 of the first region 641 may have one or a plurality of patterns of a prism shape or a concave hemispherical shape. The patterns may diffuse and extract light reflected from the second region 642 or light transmitted from the substrate direction. The first light extraction structure F1 of the first region 641 may extract light traveling to the upper and the rear regions of the light emitting device 100 to suppress an occurrence of dark portions. For another example, the first region 641 may be disposed with a gradually lower height or a smaller thickness as it is adjacent to the first side surface S11. Accordingly, it is possible to reduce a loss of light in the backward direction of the light emitting device 100 and suppress the occurrence of dark portions.

The second region 642 on the exit surface 640 of the resin member 650 may be an exit and reflective region. The second region 642 may be spaced apart from the emitting region 101 of the light emitting device 100 and may be disposed closer to the light emitting device 100 than the third region 643. The second region 642 is a region which is not overlapped with the light emitting device 100 in the vertical direction, and may be a region closest to the emitting region 101 of the light emitting device 100. The second region 642 may be a region for suppressing an occurrence of hot spots at a position closest to the light emitting device 100.

The second region 642 has a concave recess, and is disposed on the emitting region 101 of the light emitting device 100, so that some of light traveling in the vertical direction or toward the second region 642 by the reflective member 410A at a bottom portion adjacent to the emitting region 101 among the light emitted from the light emitting device 100, may be reflected or may be diffused to another path. Such a second region 642 may reduce an occurrence of dark portions in the second region 642 and may improve luminous intensity around the second region 642 by reflecting, transmitting, and guiding incident light to another path. Accordingly, it is possible to improve central luminous intensity of the exit surface 640 of the resin member 650 and prevent deterioration of light extraction efficiency.

In the second region 642, as shown in FIG. 69, the concave recess of the second region 642 may be disposed to be lower than a height of the first region 641 and may be disposed to be lower than a height of a high point of the third region 643 base on the upper surface of the substrate 401. The second region 642 may be lower than a height of the uppermost end of the first region 641.

A width B22 of the second region 642 in the direction of the second side surface S12 from the first side surface S11 or in the Y direction of the resin member 650 may be smaller than the width B21 of the first region 641. The width B22 may be 6 mm or less. The second region 642 may be disposed at an angle r1 (see FIG. 70) in a range of 45 degrees or less from the straight line Z1 perpendicular with respect to a center of the emitting region 101 of the light emitting device 100. The second region 642 covers a range of 45 degrees or less from the straight line Z1 perpendicular to the center of the emitting region 101 of the light emitting device 100, and may reflect most of incident light in a direction of the first region 641 or the substrate 401 or another direction. Accordingly, it is possible to prevent hot spots in the second region 642, that is, a region adjacent to the emitting region 101 of the light emitting device 100, and to increase central luminous intensity.

Referring to FIGS. 70 and 71, the second region 642 may include a first reflective surface G1 extended in a direction of a low point P21 of the second region 642 or in the direction of the substrate from the first region 641, and a second reflective surface G2 extended in a direction of an uppermost end of the third region 643 from the low point P21 of the second region 642 or the first reflective surface G1. The first and second reflective surfaces G1 and G2 may be disposed at a long length in a first direction or the X direction. The second reflective surface G2 may be disposed at a lower height than an uppermost end of the third region 643.

The first reflective surface G1 may be disposed in the vertical direction, and may include at least one of an inclined plane, a convex surface and a concave surface with respect to the vertical straight line Z1. The first reflective surface G1 may have an inclined surface in a direction toward the substrate 401. The first reflective surface G1 may have a surface in which a lowermost end is inclined in the direction toward the substrate 401. A straight line connecting both ends of the first reflective surface G1 is a line segment connecting the low point P21 and the first region 641, and may be disposed to be inclined. The straight line connecting both ends of the first reflective surface G1 may have a slope inclined in a direction toward the substrate 401 with respect to an uppermost end. The straight line connecting both ends of the first reflective surface G1 may be disposed at an angle r2 of 30 degrees or more, for example, in a range of 30 degrees to 60 degrees with respect to a horizontal straight line based on an upper end of the first reflective surface G1. The first reflective surface G1 may be disposed between the straight line Z1 perpendicular to the emitting region 101 of the light emitting device 100 and the third region 643 or between the points P21 of the second region 642. The first reflective surface G1 may be a total reflection surface that reflects light emitted from the emitting region 101 of the light emitting device 100 toward the first region 641. The first reflective surface G1 may include a convex curved surface that protrudes from the straight line connecting both ends of the first reflective surface G1. A curve of the convex curved surface may be a smooth curve passing a plurality of given control points, and may include a curve having a polynomial between adjacent two inflection points, which may be defined as a spline curve.

The second reflective surface G2 may have a surface inclined in a direction away from the substrate 401. The second reflective surface G2 may have a surface inclined in the direction away from the substrate 401 from the lowermost end of the first reflective surface G1. An uppermost end of the second reflective surface G2 may be inclined in the direction away from the substrate 401 from the lowermost end of the first reflective surface G1. A straight line connecting both ends of the second reflective surface G2 may have a slope inclined in the direction away from the substrate 401 with respect to a lowermost end.

The low point P21 of the second region 642 is a boundary portion between the first and second reflective surfaces G1 and G2, and may be an inflection point or a bent portion. The low point P21 of the second region 642 may be higher than the upper surface of the light emitting device 100, and may be spaced apart from a straight line horizontal to the emitting region of the light emitting device 100 toward the second side surface S12 by a first distance T25. The first distance T25 may be 0.5 mm or more, for example, in a range of 1 to 2 mm. When the first distance T25 is smaller than the above range, light traveling to the first region 641 decreases, and a luminance deviation may occur with other regions, and when the first distance T25 is larger than the above range, light reflected to the first region 641 decreases, and luminance deviation may occur with other regions.

The low point P21 of the second region 642 has a predetermined height T24 and is a distance from the bottom of the resin member 650, and for example, may be 2 mm or more, for example, in a range of 2 to 9 mm. A height (for example, T4) of the low point P21 of the second region 642 may be disposed at a ratio of 0.2 to 0.9 of the maximum thickness T2 of the resin member 650. A straight line perpendicular to the low point P21 of the second region 642 may be spaced apart from the emitting region 101 of the light emitting device 100 by a second distance d2, and may be 0.5 mm or more, for example, in a range of 1 to 2 mm. The low point P21 of the second region 642 is spaced apart from an upper surface edge of the light emitting device 100 by 0.6 mm or more, and may be disposed more adjacent to the second side surface than the emitting region 101 of the light emitting device 100. Here, a ratio of the first distance T25 to the second distance d2 may be in a range of 1:1 to 1:2~2:1 to 1:1, and the maximum value of the T5 and d2 may be 2 mm or less, or may be equal to or less than the thickness T1 of the light emitting device 100.

In the second region 642, the second reflective surface G2 may include at least one of an inclined plane, a convex curved surface, and a concave curved surface with respect to a horizontal straight line. The second reflective surface G2 may include, for example, a concave curved surface, and may be concave in the direction of the substrate. The concave curved surface may have a smooth curve passing a plurality of given control points, and may include a curve having a polynomial for each section between two adjacent inflection points, which may be defined as a spline curve. The second reflective surface G2 is concave downward than the straight line connecting both ends of the second reflective surface G2. The straight line connecting both ends of the second reflective surface G2 may be 15 degrees or more, for example, in a range of 15 degrees to 60 degrees from a horizontal straight line with respect to an upper end of the second reflective surface G2.

A width C21 of the first reflective surface G1 may be smaller than a width C22 of the second reflective surface G2 with respect to the straight line perpendicular to the low point P21 of the first region 641. The width C21 of the first reflective surface G1 may be smaller than the width C22 of the second reflective surface G2. The width C21 of the first reflective surface G1 may be disposed in a range of 1.2 to 4 times the width C22 of the second reflective surface G2. The width C21 may be 0.5 mm or more, for example, in a range of 0.5 to 3 mm. The width C22 or an area of the second reflective surface G2 is disposed more widely, so that most of light traveling from the light emitting device 100 to the second reflective surface G2 is reflected to the third region 643 or toward the substrate. Accordingly, hot spots in the second region 642 may be prevented, and light extraction efficiency in the third region 643 may be improved.

The second region 642 is not overlapped with the light emitting device 100 in the vertical direction, and is provided with the concave first and second reflective surfaces G1 and G2, so that it is possible to prevent a shape of the light emitting device 100 from being viewed in an oblique direction through the second region 642, thereby improving an outline.

The third region 643 of the exit surface 640 has 50% or more of the upper surface area of the resin member 650 as a light extraction region, and may diffuse incident light and provide the light as a surface light source. The third region 643 is disposed between the second region 642 and the second side surface S12, and a width B23 in the Y direction (see FIG. 69) may be 50% or more of the length K2 of the resin member 650 in the Y direction, for example, in a range of 50% to 80%.

The third region 643 of the exiting surface 640 may be the farthest region from the light emitting device 100. The height of the high point of the third region 643 may be lower than that of the upper surface of the first region 641. A height of the upper surface of the third region 643 may be high at a portion adjacent to the second region 642 and may be low at a portion adjacent to the second side surface S12. The third region 643 of the exit surface 640 may have a gradually lower height from a boundary point with the second region 642 in the direction of the second side surface S12 of the resin member 650. The upper surface of the third region 643 may have a gradually lower height as it is closer to the second side surface S12 of the resin member 650. The third region 643 may have a structure of a plurality of steps from the second region 642, and may be disposed at a gradually lowered height. A distance between the uppermost end of the third region 643 adjacent to the second region 642 and the substrate may be greater than a distance between a lower end adjacent to the second side surface S12 and the substrate. A distance between an upper end of the third region 643 closest to the second region 642 and the substrate may be greater than a distance between a lower end closest to the second side surface S12 and the substrate. Since the upper surface of the third region 643 is disposed at a gradually lowered height, light incident from the light emitting device 100, light reflected from the substrate direction, and light reflected from the second region 642 may be refracted to be transmitted or diffused.

A width B24 of the third region 643 may be greater than the width B22 of the second region 642. The width B24 of the third region 643 may be 50% or more of the length K1 of the resin member 650 in the Y direction, for example, in a range of 50% to 80%. The third region 643 has a gradually lower thickness as it is farther from the light emitting device 100 of the resin member 650, and is disposed in a range of 50% to 80% of the Y-axis length K1 of the resin member 650, so that it is possible to provide light in a uniform distribution and to reduce loss of light by scattering the light in the farthest region from the light emitting device 100. A distance between the upper surface of the third region 643 and the upper surface of the substrate 401 is gradually narrower as it is farther from the light emitting device 100, so that it is possible to increase utilization and extraction efficiency of light reflected via the upper surface of the substrate 401 or the reflective member 410A.

The upper surface of the third region 643 may include an inclined surface. The third region 643 may include a second light extraction structure F3. The second light extraction structure F3 may include a concave-convex pattern, and the second light extraction structure F3 may include a prism-shaped pattern. The prism-shaped pattern may have a concave pattern between convex patterns, and the convex pattern (e.g., mountain structure) may include a triangular shape in a side cross section. The convex pattern may have an internal angle of two sides m2 (see in FIG. 71) of 60 degrees or more. The mountain structures may have a long length in the X direction, for example, the same length as the length in the X direction of the resin member 650. The high point (or vertex) of the convex pattern may be disposed adjacent to a center of the pattern in the second side surface direction. The vertex of the convex pattern may be an angled surface or a curved surface. As another example, the light extraction structure may include a pattern of a polygonal cone or a conical shape. As another example, a pattern having a concave hemispherical shape may be disposed in the third region 643.

The convex patterns of a second light extraction structure F3 may be arranged in the same shape and at a predetermined distance. The distance of the convex patterns of the second light extraction structure F3 may be wider than the distance of the convex patterns of the first light extraction structure F1. As shown in FIG. 70, a straight line connecting high points of the convex patterns of the second light extraction structure F3 may have a predetermined angle r4 with respect to a horizontal straight line. The angle r4 may be 1 degree or more, for example, in a range of 1 degree to 45 degrees.

The third region 643 may have a larger area than a sum of areas of the first and second regions 641 and 642, and may exit light directly transmitted from the light emitting device 100 and indirectly transmitted through another path. Accordingly, light extracted through the third region 643 having the second light extraction structure F3 of the predetermined pattern may have a uniform luminance distribution.

In an embodiment, light is reflected in the direction of the first region 641 and the third region 643 by the second region 642 of the exit surface 640 of the resin member 650, thereby improving luminous intensity, that is, central luminous intensity, at the second region 642 and its periphery. In an embodiment, when a reflective member of a film type is removed between the resin member 650 and the substrate 401, a thickness of the lighting module may be reduced and the manufacturing process may be simplified. In such a structure, since a light amount is high in a range of 0 to 20 degrees with respect to the straight line perpendicular to the emitting region 101 of the light emitting device 100 by the second region 642 of the exit surface 640 of the resin member 650, it can be seen that luminous intensity around a center of the resin member 650 is improved.

Figure 72:
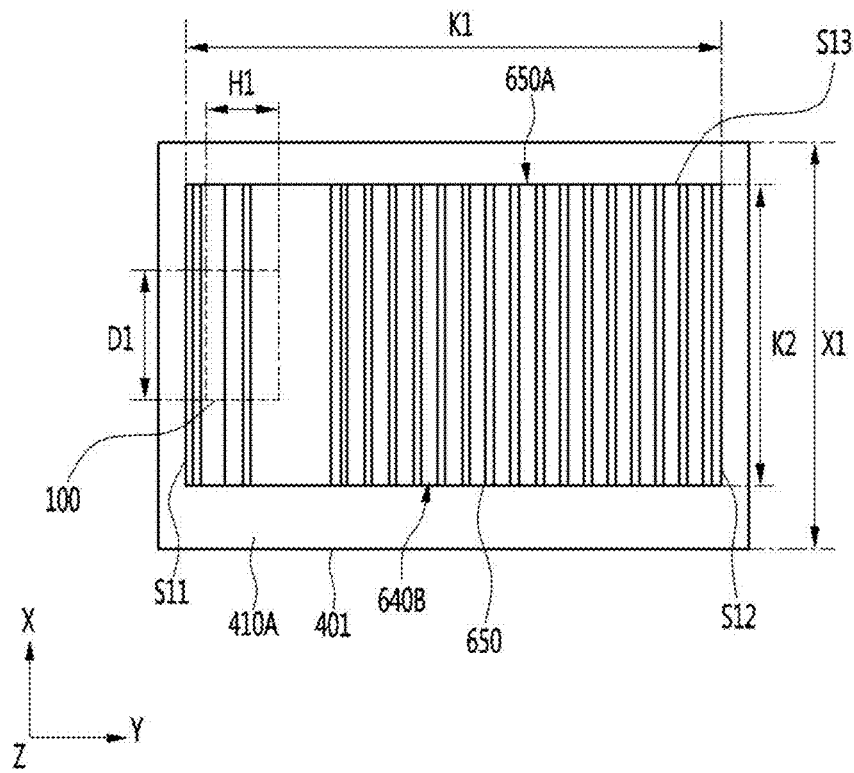
FIG. 72 is a plan view showing another example of the resin member in the lighting module of FIG. 68.
Figure 73:
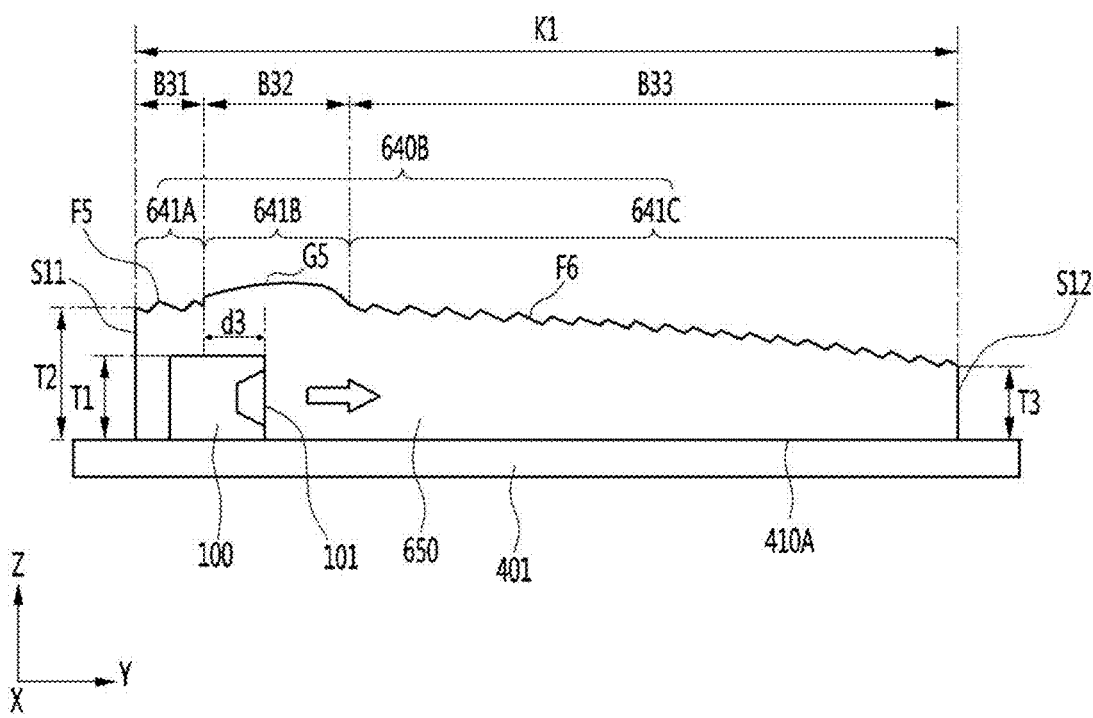
FIG. 73 is a side cross-sectional view of the lighting module of FIG. 72.
Figure 74:
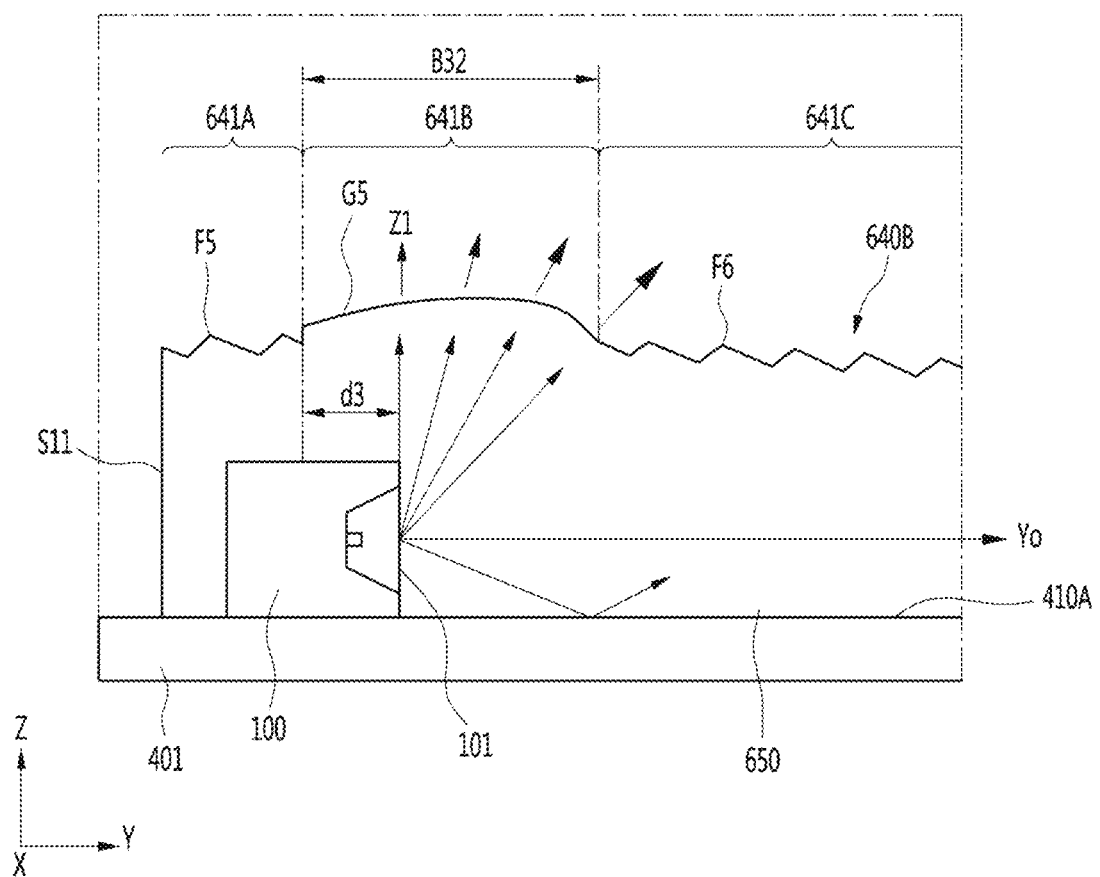
FIG. 74 is a partially enlarged view of the lighting module of FIG. 73.

FIGS. 72 to 74 are modified examples of the lighting module of FIG. 68, which are structures in which a shape of an exit surface of a resin member is modified.

Referring to FIGS. 72 to 74, a resin member 650 may include an exit surface 640B, and the exit surface 640B may include a first region 641A in which at least a portion thereof is overlapped with a light emitting device 100 in the vertical direction, a second region 641B in which a part adjacent to the first region 641A is overlapped with the light emitting device 100 in the vertical direction, and a third region 641C in which a height of an upper surface thereof is disposed to be gradually lowered and which is disposed between the second region 641B and a second side surface S12. The light emitting device 100 may be disposed to be overlapped with the first and second regions 641A and 641B of the exit surface 640B, and may be spaced apart from a first side surface S11 of the resin member 650.

The first region 641A in the exit surface 640B may have a first light extraction structure F5. The first light extraction structure F5 may include a prism shape, for example, a pattern having a triangular prism shape in a side cross section. A width B31 of the first region 641A may be smaller than a width B32 of the second region 641B. The first region 641A may be overlapped with the light emitting device 100 in the vertical direction.

The second region 641B in the exit surface 640B may have a convex curved surface upward or a convex curved surface toward an opposite side of the substrate 401. The convex curved surface may be a smooth curve passing a plurality of given control points, and may include a curve having a plurality of inflection points and a polynomial between adjacent two points, which may be defined as a spline curve. An entire region of the second region 641B may have a convex curved surface G5 and may be disposed on an upper front region and an emitting region 101 of the light emitting device 100 to diffuse incident light. The width B32 of the second region 641B may be greater than a width of the light emitting device 100 in the Y direction. A width d3 of a part of the second region 641B overlapped with the light emitting device 100 may be disposed in a range of 10% to 40% of the width B32 of the second region 641B, so that it is possible to cover an upper direction of the light emitting device 100 and a top of the emitting region 101 to diffuse incident light, and to prevent hot spots. The second region 641B may increase luminous intensity on the light emitting device 100 and a region therearound by diffusing light. In such a structure, a light amount is high in a range of 0 to +30 degrees with respect to a straight line perpendicular to the emitting region 101 of the light emitting device 100 by the second region 641B of the exit surface 640B of the resin member 650, and thus it can be seen that luminous intensity around a center of the resin member 650 is improved.

The third region 641C may include a second light extraction structure F6. A detailed configuration of the third region 641C will be described with reference to the description of the first embodiment.

Figure 75:
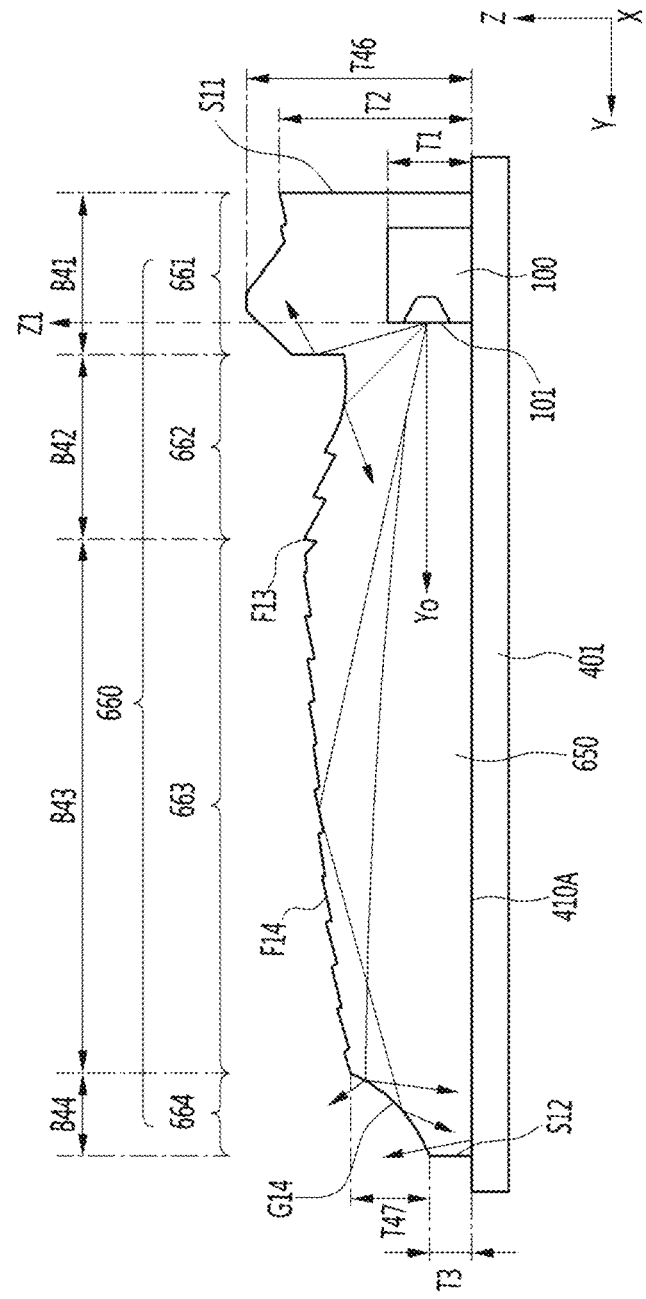
FIG. 75 is a side cross-sectional view showing a first modification of the lighting module of FIG. 69.
Figure 76:
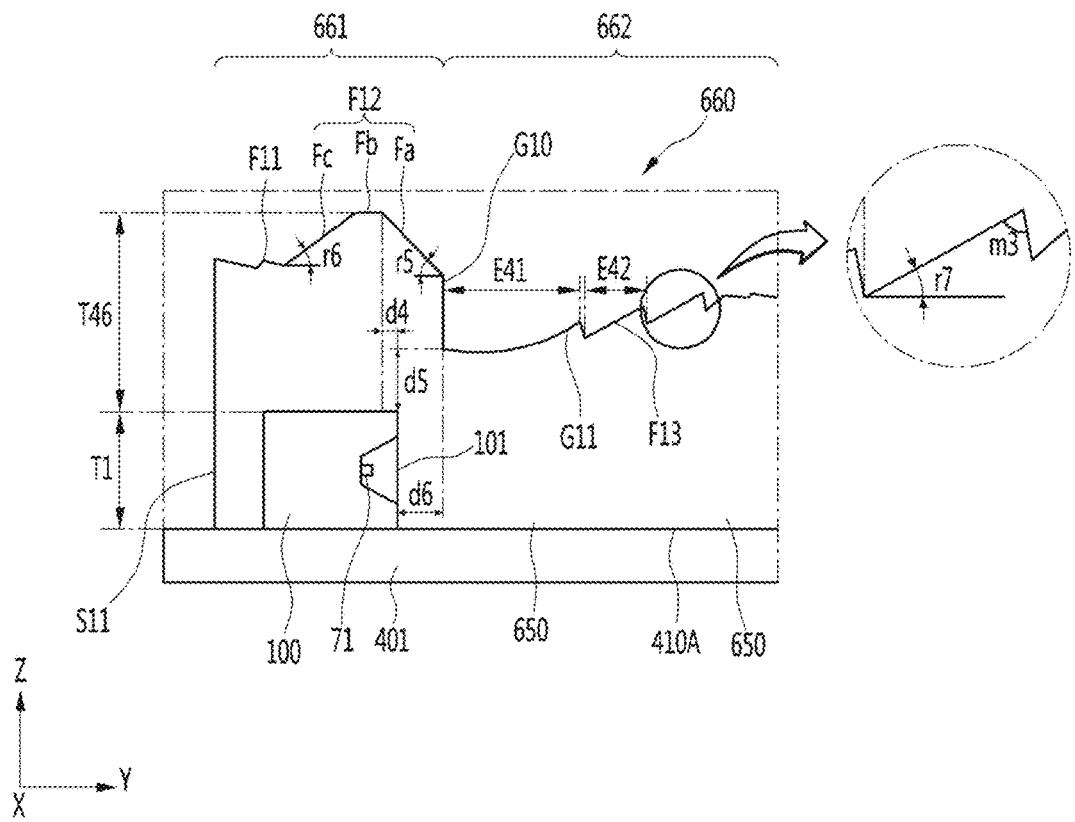
FIG. 76 is a partially enlarged view of the lighting module of FIG. 75.
Figure 77:
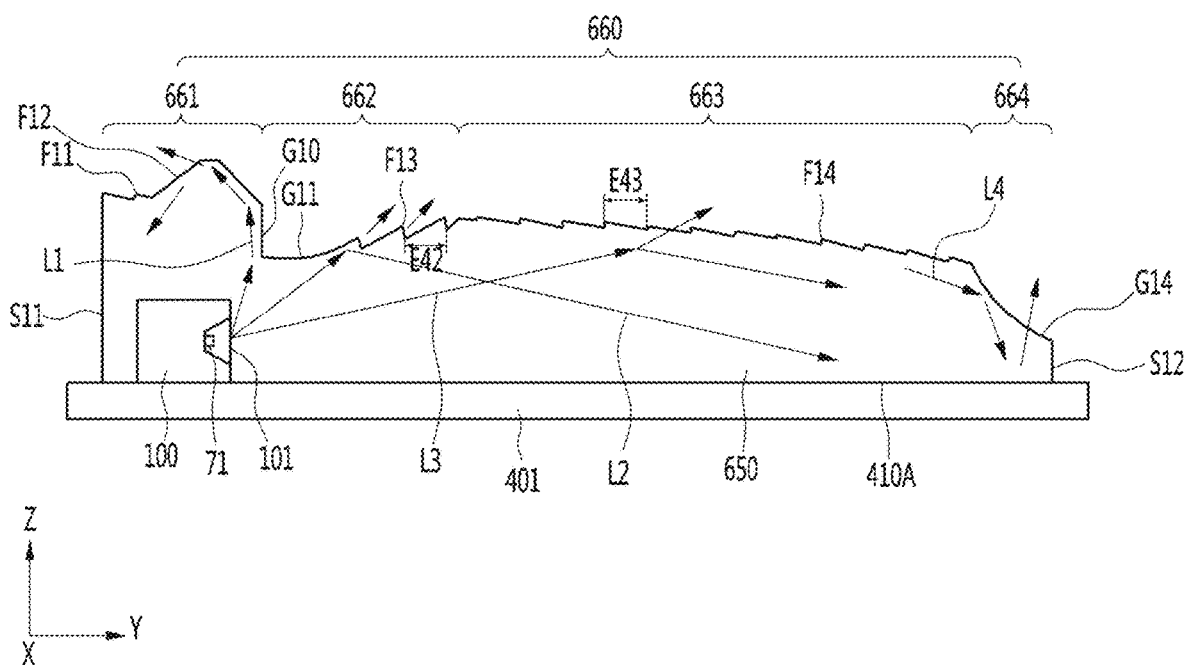
FIG. 77 is a view for explaining the light path of the lighting module of FIG. 76.

FIG. 75 is a side cross-sectional view illustrating a first modified example of the lighting module of FIG. 69, FIG. 76 is a partially enlarged view of the lighting module of FIG. 75, and FIG. 77 is a view illustrating an optical path in the lighting module of FIG. 75. In describing the present embodiment, the same configuration as the above-disclosed embodiment (s) is referred to the description of the embodiment disclosed above, and may be selectively applied to the present embodiment.

Referring to FIGS. 75 to 77, a lighting module includes a substrate 401, a light emitting device 100 disposed on the substrate 401, and a resin member 650 covering the light emitting device 100 on the substrate 401. The lighting module may include a reflective member 410A of a film type or a reflective layer of a solder resist material between the substrate 401 and the resin member 650.

The resin member 650 may include a plurality of side surfaces, for example, first and second side surfaces S11 and S12 opposite to each other. The resin member 650 may include an exit surface 660 at an upper portion thereof. The exit surface 660 may include a light extraction structure.

The exit surface 660 of the resin member 650 may include a first region 661 adjacent to the first side surface S11 and at least a portion of which is overlapped with the light emitting device 100 in the vertical direction, a second region 662 concaved between the first region 661 and the second side surface S12, and a third region 663 disposed between the second region 662 and the second side surface S12. The exit surface 660 of the resin member 650 may include a fourth region 664 between the third region 663 and the second side surface S12.

As shown in FIGS. 75 and 76, at least a portion of the first region 661 of the exit surface 660 may be overlapped with the light emitting device 100 in the vertical direction. A boundary portion between the first region 661 and the second region 662 may be disposed in an exit direction or a direction of the second side surface S12 further than an emitting region 101 of the light emitting device 100. Accordingly, light incident through the boundary portion between the first and second regions 661 and 662 may be extracted to the first region 661. The first region 661 may include a first light extraction structure F11, and the first light extraction structure F11 may be disposed adjacent to the first side surface S11.

The first region 661 may include a protrusion portion F12 and at least a portion of the protrusion portion F12 may be overlapped with the light emitting device 100. The protrusion portion F12 may be disposed to be long in a length of the Y direction of the resin member 650. The protrusion portion F12 may include an inclined first surface Fa, a second surface Fb of an upper portion thereof, and an inclined third surface Fc. The first and third surfaces Fa and Fc may correspond to each other, and the first surface Fa may extend to be inclined from the second region 662 and may reflect light incident from the second region 662. The second surface Fb may be connected from the first and third surfaces Fa and Fc and extend in a horizontal direction or have a horizontal plane, and may transmit or reflect light incident from the first surface Fa. The third surface Fc may have an inclined surface, and may transmit or reflect light reflected by the second surface Fb. Here, the first surface Fa may be inclined at a predetermined angle r5 with respect to a horizontal straight line, and the third surface Fc may be inclined at a predetermined angle r6 with respect to the horizontal straight line. The inclined angle r5 of the first surface Fa may be greater than the inclined angle r6 of the third surface Fc. The inclination angle r5 of the first surface Fa may be 35 degrees or more, for example, in a range of 35 to 75 degrees, or in a range of 40 to 50 degrees. The inclination angle r6 of the third surface Fc may be 25 degrees or more, for example, in a range of 25 to 60 degrees, or in a range of 25 to 30 degrees. Accordingly, light incident by the first surface Fa inclined at a large angle r5 may be reflected, and the light may be transmitted or reflected by the third surface Fc inclined at a small angle r6 (r6<r5). A boundary portion between the first surface Fa of the protrusion portion F12 and the second region 662, for example, a lower end portion of the first surface Fa may be disposed to be adjacent to the second side surface S12 than the emitting region 101 of the light emitting device 100. Accordingly, light emitted upward from the light emitting device 100 or light reflected from the substrate 401 may be re-incident in a direction of the first region 661.

At least a portion of the protrusion portion F12 of the first region 661 may be overlapped with the light emitting device 100 in the vertical direction. The first to third surfaces Fa, Fb and Fc of the protrusion portion F12 may be overlapped with the light emitting device 100 in the vertical direction, and a lower portion of the first surface Fa may not be overlapped with the light emitting device 100 in the vertical direction. Here, a distance d4 between an upper end of the first surface Fa and a straight line perpendicular to the emitting region 101 of the light emitting device 100 may be disposed to be 0.1 mm or more, for example, in a range of 0.1 to 1 mm to guide light. In addition, a straight line perpendicular to a lower end of the first surface Fa may be spaced apart from the straight line perpendicular to the emitting region 101 at a predetermined distance d6, so that light traveling upward from the emitting region 101 or light reflected from the substrate 401 may be incident to be guided in the first region 661. The distance d6 may be 0.2 mm or more, for example, in a range of 0.2 to 2 mm. The distance d6 may be disposed to be large in a range of 1.5 to 3 times the distance d4, so that it is possible to prevent hot spots by guiding light to the first region 661 and suppressing light transmission via the second surface Fb.

An upper surface of the protrusion portion F12 of the first region 661 may be disposed at a predetermined distance T46 from an upper surface of the light emitting device 100, for example, 1 time or more a thickness T1 the light emitting device 100, for example, in a range of 1 time to 2.5 times. The protrusion portion F12 may reduce occurrence of dark portions in an upper portion and a rear portion of the light emitting device 100.

The second region 662 of the exit surface 660 may be disposed to be higher than the upper surface of the light emitting device 100 and in the direction of the second side surface S12 than the straight line perpendicular to the emitting region 101 of the light emitting device 100. As shown in FIG. 77, the second region 662 may reflect some incident light to the first region 661, and may reflect other light to the third and fourth regions 663 and 664 or in a direction of the substrate.

As shown in FIG. 76, the second region 662 may include a first reflective surface G10 extending in the vertical direction from the first surface Fa of the first region 661, a second reflective surface G11 extending in the exit direction from the first reflective surface G10, and a second light extraction structure F13 between the second reflective surface G11 and the third region 663. The first reflective surface G10 may be disposed in the exit direction or the direction of the second side surface S12 than the straight line perpendicular to the emitting region 101 of the light emitting device 100. The distance d6 between the first reflective surface G10 and the vertical straight line may be greater than the distance d4 between the upper end of the first surface Fa of the first region 661 and the straight line perpendicular to the emitting region 101.

The first reflective surface G10 may not be overlapped with the light emitting device 100 in the vertical direction. An internal angle between the first reflective surface G10 of the second region 662 and the first surface Fa of the first region 661 may be disposed at an obtuse angle. The first reflective surface G10 may be disposed as a vertical surface or an inclined surface with respect to the vertical straight line to reflect incident light in a direction of the first region 661. The second reflective surface G11 may include a concave curved surface. The concave curved surface may be concave in the direction of the substrate, and may not be overlapped with the light emitting device 100 in the vertical direction. The second reflective surface G11 may be disposed to be higher than the upper surface of the light emitting device 100, and for example, may be spaced apart from the upper surface of the light emitting device 100 at a predetermined distance d5, and the distance d5 may be 0.3 mm or more, for example, in a range of 0.3 to 3 mm. Here, the d5 may be larger than the d6 by 0.1 mm or more, and the d6 may be larger than the d4 by 0.1 mm or more, which may have a relationship of d5>d6>d4.

The second reflective surface G11 may be disposed in a range of 45 degrees or less from the straight line perpendicular with respect to a center of the emitting region 101 of the light emitting device 100, so that incident light may be reflected to the third region 663 or in the direction of the substrate. A width E41 of the second reflective surface G11 may be disposed in the Y direction in a range of 40% to 60% of a width of the second region 662, so that incident light may be effectively reflected. The width E41 may be 0.5 mm or more, for example, in a range of 0.5 to 3 mm.

The second region 662 may include a second light extraction structure F13, and the second light extraction structure F13 may be disposed between the second reflective surface G11 and the third region 663. The second light extraction structure F13 may include a concavo-convex pattern, for example, a prism-shaped pattern. The prism-shaped pattern is a pattern with a triangular shape in a side cross section, and the prism-shaped pattern may be disposed at a height gradually higher as it is farther from the light emitting device 100. The vertexes of the prism pattern may be disposed to be closer to the third region 663 from the pattern center. In the triangular prism pattern (or a mountain structure) of the second light extraction structure F13, a width of a first side in a direction of the first side surface S11 may be disposed to be wider than a width of a second side at the opposite side in the Y direction, thereby increasing light reflection efficiency. As shown in FIG. 76, the first side may be disposed at an angle r7 less than 60 degrees with respect to a horizontal straight line, and an internal angle m3 of the first and second sides may be disposed at an acute angle.

A distance E42 of the patterns in the second light extraction structure F13 may be smaller than the width E41 of the second reflective surface G11 and may be arranged constantly. The distance E42 of the patterns in the second light extraction structure F13 may be larger than a distance E43 (see FIG. 77) of the patterns of the second light extraction structure F14 in the third region 663. Accordingly, central luminous intensity and light extraction efficiency may be improved by the second light extraction structure F13.

The third region 663 of the exit surface 660 may be disposed at a height gradually lower from a high point of the second region 662. A width B43 in the Y direction of the third region 663 may be disposed to be 40% or more, for example, in a range of 40% to 65% of a width of the resin member 650 in the Y direction. The third region 663 may include a third light extraction structure F14. The third light extraction structure F14 may include a concavo-convex pattern, for example, a prism-shaped pattern. The prism-shaped pattern is a pattern with a triangular shape in a side cross section, and the prism-shaped pattern may be disposed at a height gradually lower as it is farther from the light emitting device 100. The vertexes of the prism patterns of the third light extraction structure F14 may be disposed to be closer to the second region 662 from the pattern center. In the triangular prism pattern (or the mountain structure) of the third light extraction structure F14, a width of the first side in the direction of the first side surface S11 may be disposed to be narrower than a width of the second side at the opposite side in the Y direction. In the prism-shaped pattern, a length of the first side in the direction of the first side surface S11 may be disposed to be shorter than a length of the second side at the opposite side. A pattern height of the third light extraction structure F14 may be smaller than the pattern height of the second light extraction structure F13. As shown in FIG. 77, the third light extraction structure F14 may reflect or refract light incident from the light emitting device 100, and may extract light reflected from the substrate direction.

As shown in FIG. 75, the fourth region 664 of the exit surface 660 may be disposed between the third region 663 and the second side surface S12. The fourth region 664 may have a height lower than a height of a low point of the third region 663. The fourth region 664 may be disposed to have a concave curved surface G14 or an inclined surface in the direction of the substrate, and may reflect the light reflected by the third region 663 in the direction of the substrate. A straight line connecting two points of the concave curved surface G14 at an upper end of the fourth region 664 may be disposed at an angle of 35 degrees or more, for example, in a range of 35 to 75 degrees with respect to the horizontal straight line. A width B44 of the fourth region 664 may be smaller than widths B41 and B42 of the first and second regions 661 and 662.

The fourth region 664 may be disposed at a height T47 (see FIG. 75) greater than a height T3 of the second side surface S12 from the second side surface S12, and for example, may be disposed in a range of 1 time to 3 times the height T3 of the second side surface S12. A low point of the fourth region 664 may be disposed to be lower than the upper surface of the light emitting device 100. A boundary portion between the fourth region 664 and the second side surface S12 may be disposed to be lower than the upper surface of the light emitting device 100. A high point of the fourth region 664 may be disposed to be higher than the upper surface of the light emitting device 100. A boundary portion between the fourth region 664 and the third region 663 may be disposed to be higher than the upper surface of the light emitting device 100. Accordingly, as shown in FIG. 77, light emitted from the light emitting device 100 in a direction of the horizontal straight line or the optical axis Y0 may be reflected in the direction of the substrate by the fourth region 664, so that leakage of light may be prevented and light may be reused.

At least a portion of the fourth region 664 may be overlapped with at least a portion of the light emitting device 100 in the horizontal direction. At least a portion of the fourth region 664 may correspond to the emitting region 101 of the light emitting device 100.

Figure 78:
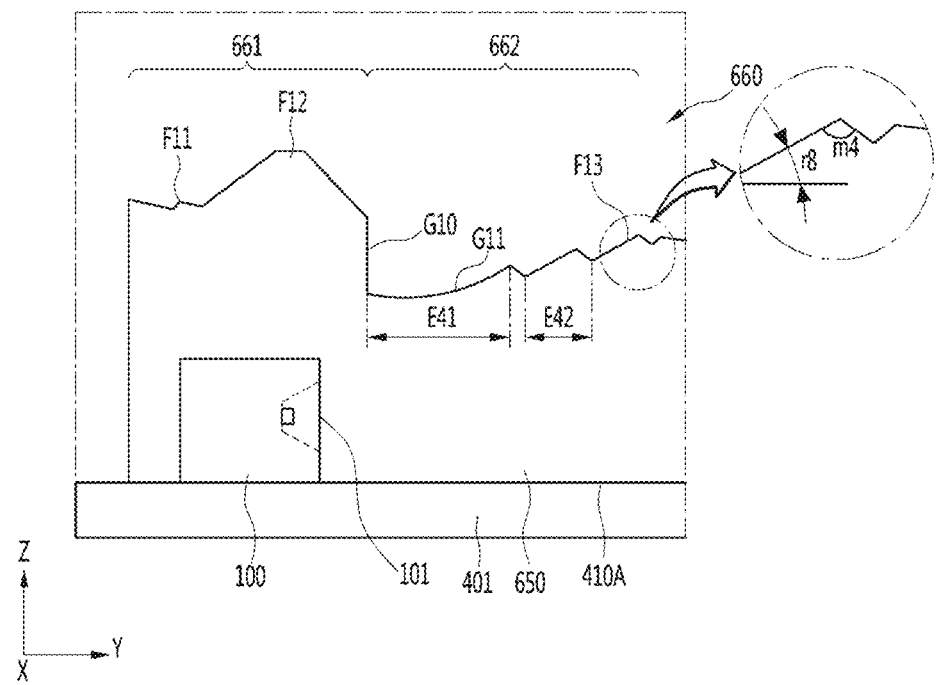
FIG. 78 is a view illustrating a second region in the lighting module of FIG. 76.

FIG. 78 is a modified example of FIG. 76, in which the second region of the resin member is modified.

As shown in FIG. 78, the second region 662 of the resin member 650 may include a first reflective surface G1 extending from the first region 661, a prism-shaped second reflective surface G11 having a concave curved surface, and a third light extraction structure F13. The second reflective surface G11 may reflect light by a prism pattern having a concave curved surface in the direction of the substrate.

The third light extraction structure F13 may be disposed between the second reflective surface G11 and the third region 663. In the prism pattern of the third light extraction structure F13, a length of a first side adjacent to the first side surface S11 may disposed to be longer than a length of a second side at the opposite side, and an angle m4 of an internal angle of the first and second sides may be 60 degrees or more. Patterns of the third light extraction structure F13 may be arranged in the Y direction, and a distance E42 of each of the patterns may be smaller than a width E41 of the second reflective surface G11. The prism pattern may have the internal angle m4 larger than the internal angle m3 of the prism pattern of FIG. 76, and two opposite sides of the prism pattern may be disposed to be inclined to control light extraction efficiency.

Figure 79:
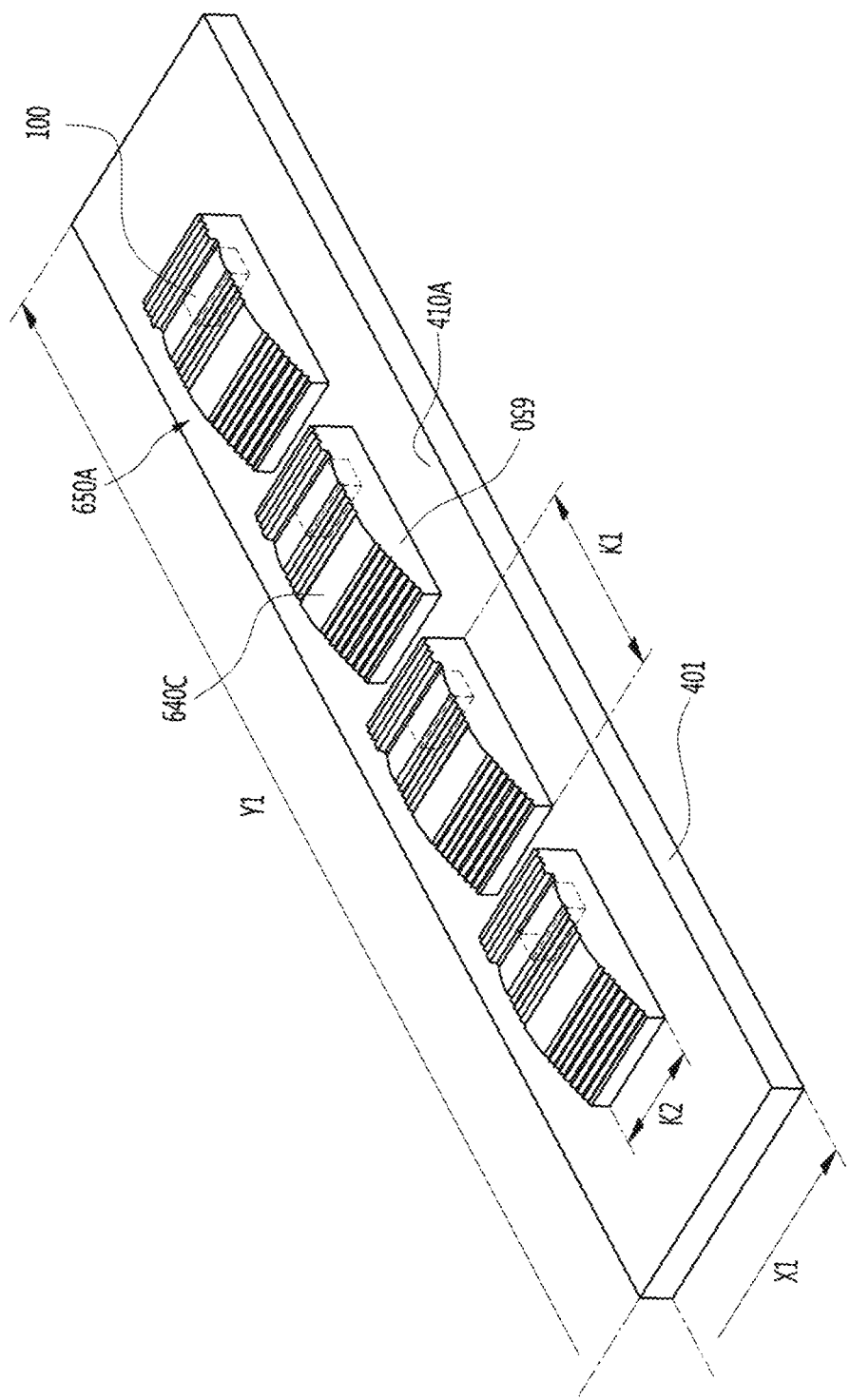
FIG. 79 is a perspective view showing a second modification of the lighting module 67.
Figure 80:
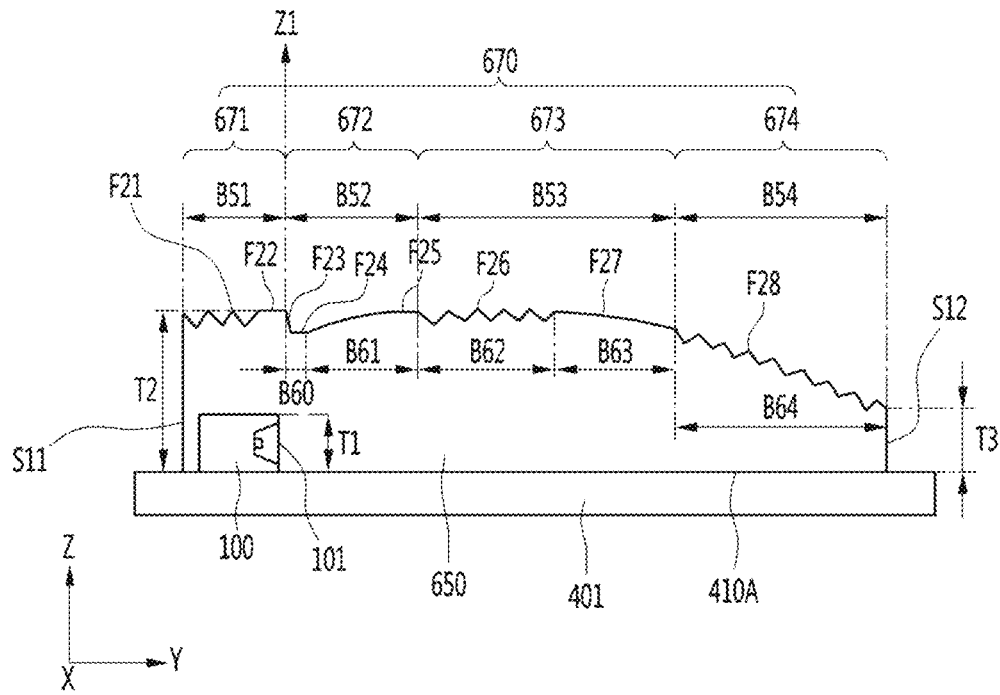
FIG. 80 is a partial side cross-sectional view of the lighting module of FIG. 79.
Figure 81:
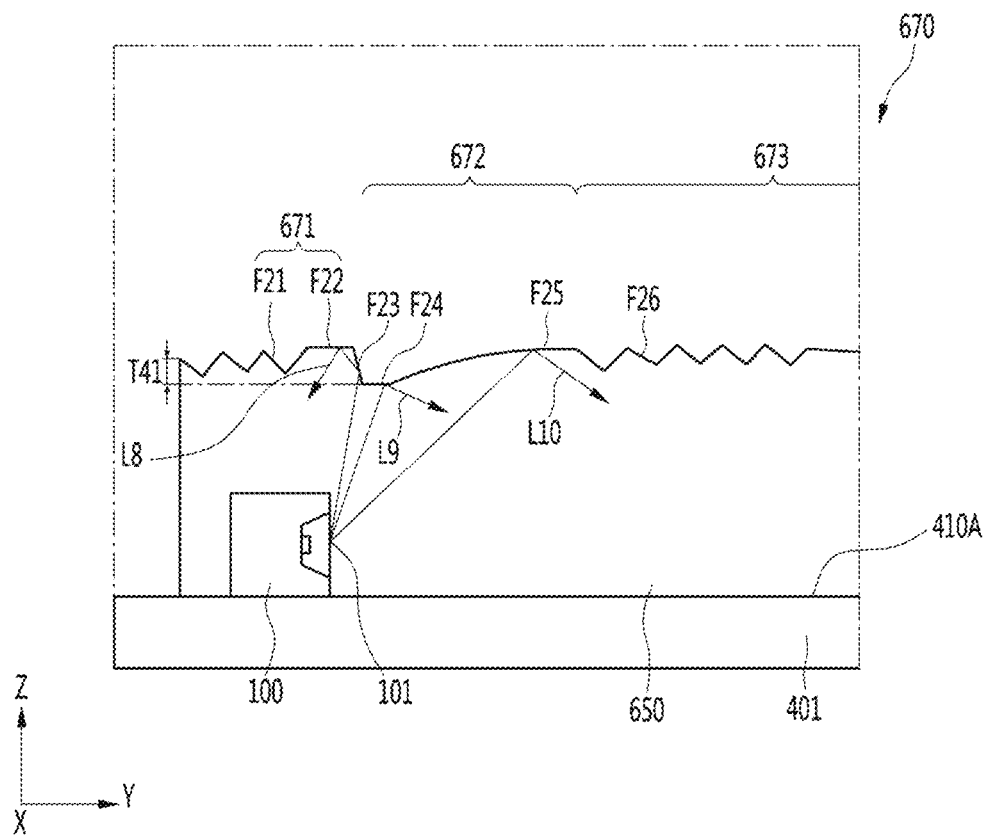
FIG. 81 is a partially enlarged view of first and second regions of the lighting module of FIG. 81.
Figure 82:
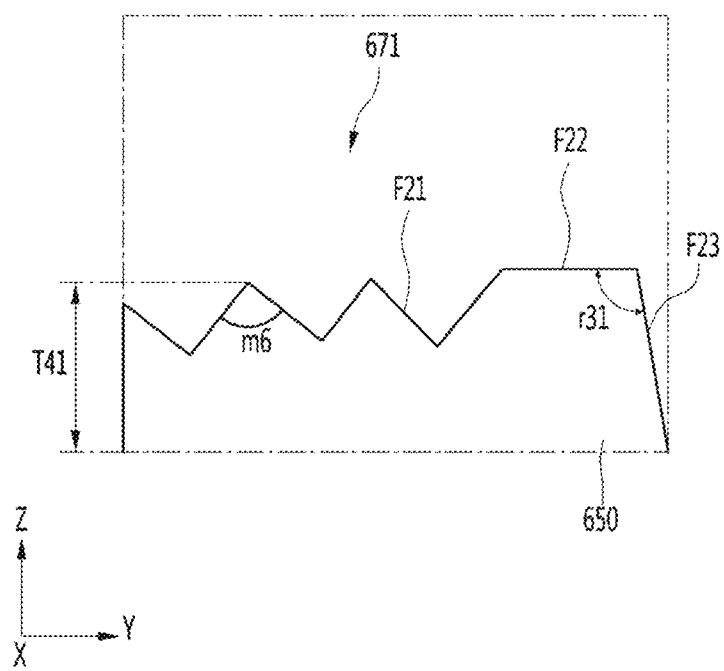
FIG. 82 is an enlarged view of the first area of the lighting module of FIG. 80.
Figure 83:
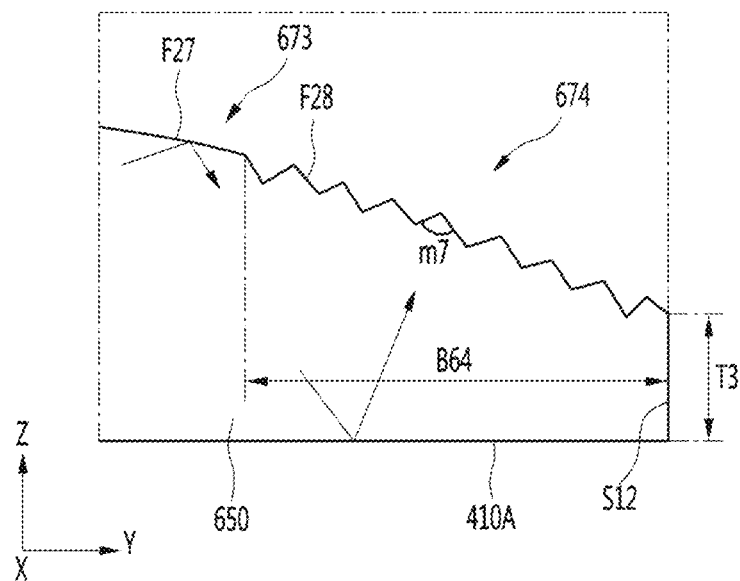
FIG. 83 is an enlarged view of the third area of the lighting module of FIG. 80.

FIG. 79 is a perspective view illustrating a second modified example of the lighting module of FIG. 69, FIG. 80 is a partial side cross-sectional view of the lighting module of FIG. 79, FIG. 81 is a partial enlarged view of first and second regions of the lighting module of FIG. 80, FIG. 82 is an enlarged view of a first region of the lighting module of FIG. 80, and FIG. 83 is an enlarged view of a third region of the lighting module of FIG. 80. In describing the present embodiment, the same configuration as the above-disclosed embodiment(s) is referred to the description of the embodiment disclosed above, and may be selectively applied to the present embodiment.

Referring to FIGS. 79 to 83, a lighting module according to an embodiment includes a substrate 401, a light emitting device 100 disposed on the substrate 401, and a resin member 650 covering the light emitting device 100 on the substrate 401. In the lighting module, a reflective member 410A of a film type or reflective material may be disposed between the substrate 401 and the resin member 650, but is not limited thereto.

The resin member 650 may be arranged on the substrate 401 in one or plural in one direction. The light emitting device 100 may be disposed in the resin member 650. A light emitting cell 650A may include a unit cell emitting on the substrate 401, and the unit cell may include the resin member 650 and the light emitting device 100. The light emitting device 100 may be disposed to be adjacent to a first side surface S11 of the resin member 650 and emit light in a direction of a second side surface S12 at the opposite side.

As shown in FIG. 80, in the resin member 650, a portion adjacent to the first side surface S11 has the thickest thickness, and a portion adjacent to the second side surface S12 has the thinnest thickness. A height T2 of the first side surface S11 may be at least two times a height T3 of the second side surface S12. A maximum thickness of the resin member 650 may be at least twice a minimum thickness. An upper end of the second side surface S12 of the resin member 650 is disposed in a range of ±0.5 mm with respect to an upper surface of the light emitting device 100 to reduce a loss of light. The height T2 of the first side surface S11 or the maximum thickness of the resin member 650 may be equal to or more than 3 mm, and the height T3 of the second side surface S12 or the minimum thickness may be equal to or less than 1.5 mm and equal to or more than 0.5 mm.

As shown in FIGS. 81 and 82, an exit surface 670 of the resin member 650 may include a first region 671 overlapped with the light emitting device 100 in the vertical direction, a second region 672 disposed between the first region 671 and the second side surface S12, a third region 673 disposed between the second region 672 and the second side surface S12, and a fourth region 674 between the third region 673 and the second side surface S12.

The first region 671 may include a first light extraction structure F21 and a protrusion portion F22, and may have a width B51 of 2 mm or more. A height of an upper surface of the first region 671 may be the height T2 of the first side surface S11, and may be the highest height of the resin member 650 and may be 2 mm or more.

Referring to FIGS. 81 and 82, the protrusion portion F22 of the first region 671 may include a flat surface extended from the second region 672, and a transmittance of light incident from the light emitting device 100 may be lowered. The first light extraction structure F21 may have a pattern with a triangular shape in a side cross section, and an internal angle m6 (see FIG. 82) of two adjacent sides may have a range of 40 to 70 degrees. The first region 671 may extract light reflected by the protrusion portion F22 via the first light extraction structure F21, so that an occurrence of dark portions on the first region 671 may be suppressed. The upper surface of the first region 671 may have a predetermined height T2 from a low point of the second region 672, for example, 0.3 mm or more, for example, in a range of 0.3 to 1 mm. The upper surface of the first region 671 is disposed to be relatively high, so that incidence efficiency may be improved, and an occurrence of dark portions may be suppressed.

The second region 672 may be disposed in the exit direction or the direction of the second side surface S12 than an emitting region 101 of the light emitting device 100, so that incident light may be reflected to the first region 671 or the third region 673, or in the direction of the substrate. The second region 672 may include a first reflective surface F23 adjacent to the first region 671 and a second reflective surface F24 extending in the Y direction from a lower end portion of the first reflective surface F23. The first reflective surface F23 may be a surface perpendicular to a horizontal straight line, or an inclined surface. The first reflective surface F23 may be disposed at an angle r31 (see FIG. 82) with respect to a horizontal straight line of the first region 671, more than 91 degrees, for example, in a range of 90 to 120 degrees, so that light L8 (see FIG. 81) in a direction of the first region 671 may be reflected. A width B60 of the first and second reflective surfaces F23 and F24 may be 1 mm or less, for example, in a range of 0.3 to 1 mm.

As shown in FIGS. 80 and 81, the second reflective surface F24 may have a flat horizontal surface or a concave curved surface and may be located to be closest to the light emitting device 100, so that a transmittance of light L9 (see FIG. 81) directly incident from the light emitting device 100 may be lowered and the reflectance may be increased. The second region 672 may include a third reflective surface F25 between the second reflective surface F24 and the third region 673. The third reflective surface F25 may include a convex curved surface. A width B61 in the Y direction of the third reflective surface F25 may be disposed be 65% or more, for example, 65% to 85% of a width B52 of the second region 672. The width B61 of the third reflective surface F25 may be disposed in a range of 1.5 mm or more, for example, 1.5 to 2.5 mm. The third reflective surface F25 may be disposed at a height higher from the second reflective surface F24 as it is farther from the light emitting device 100. The third reflective surface F25 of such a second region 672 reflects light L10 (see FIG. 81) generated from the light emitting device 100 in the exit direction and the second reflective surface F24 and the third reflective surface F25 reflect the light generated from the light emitting device 100 in a direction of the substrate. The light reflected in the direction of the substrate may be reflected by the reflective member 410A on the substrate 401 and extracted to the outside via the third region 673. Here, in the embodiment, when areas of the second and third reflective surfaces F24 and F25 of the second region 672 are disposed to be wider than those of other embodiments and the reflective member of the film type is removed, hot spots may be prevented by covering the reflective region of light (light reflected by light splashing phenomenon) coming from the substrate 401.

The third region 673 may include a second light extraction structure F26 and a fourth reflective surface F27 adjacent to the second region 672. The fourth reflective surface F27 may be disposed between the second light extraction structure F26 and the fourth region 674. A width B53 of the third region 673 may be disposed in a range of 30% to 50% of the length in the Y direction of the resin member 650. The second light extraction structure F26 may diffuse and extract incident light, and the fourth reflective surface F27 may transmit light in the direction of the substrate or to the fourth region 674 by reflecting the incident light. A width B62 of the second light extraction structure F26 may be disposed in a range of 40% to 60% of the width B53 of the third region 673. The second light extraction structure F26 may include a prism-shaped pattern, and an internal angle of two sides of the prism-shaped pattern may be disposed in a range of 50 to 70 degrees to emit light. A high point (or vertex) of the prism pattern may be disposed at a center of the pattern. The fourth reflective surface F27 may include a convex curved surface, and a height of an upper surface may gradually decrease. The fourth reflective surface F27 may be formed as a spline curve. The width B53 of the third region 673 may be equal to or smaller than the width B62 of the second light extraction structure F26. The third region 673 may be disposed at a center side among the exit surface 670 of the resin member 650, so that light diffused via the second light extraction structure F26 adjacent to the second region 672 may be extracted, and may be transmitted to the second side surface S12 or in the direction of the substrate by the concave fourth reflective surface F27 adjacent to the fourth region 674.

Figure 84:
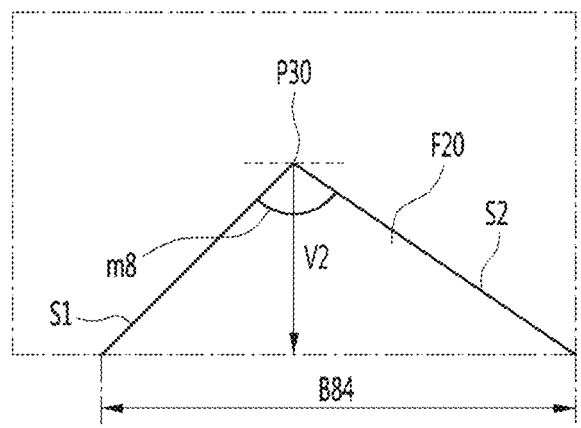
FIG. 84 is a view for explaining an example of the light extraction structure of the lighting module according to the sixth embodiment.

Referring to FIGS. 80 and 84, the fourth region 674 of the exit surface 670 may include a fourth light extraction structure F28. The fourth light extraction structure F28 may include a prism-shaped pattern, and the prism-shaped pattern may have a triangular shape. The prism pattern may be disposed to have a height gradually lower as it is adjacent to the second side surface S12 of the resin member 650. A width B54 of the fourth region 674 may be equal to a width B64 of the fourth light extraction structure F28. As shown in FIG. 83, the prism pattern of the fourth light extraction structure F28 may be disposed to have a high point closer to the third region 673, and an internal angle m7 thereof may be 60 degrees or more. The fourth light extraction structure F28 of the fourth region 674 may diffuse and emit light reflected from the light emitting device 100 or the substrate direction.

The exit surface 670 of the resin member 650 may be disposed to have line segments connecting the third reflective surface F25 of the second region 672, a surface of the third region 673, and a surface of the fourth region 674 continuously connected in a convex curve, so that light uniformity and light efficiency in the entire region may be improved.

FIG. 84 illustrates an example of a prism-shaped pattern of the light extraction structure according to an embodiment. An internal angle m8 of adjacent two sides S1 and S2 of the prism pattern in a light extraction structure F20 may be in a range of 30 to 120 degrees and a bottom width B84 may be greater than a height V2. In the prism-shaped pattern of the light extraction structure F20, the bottom width B84 may be in a range of 0.3 to 0.7 mm, and the height V2 may be in a range of 40% to 80% of the bottom width B84. A position of a vertex P30 part may be varied depending on lengths of two sides of the prism-shaped pattern. The prism-shaped pattern may be disposed to have a length of the first side S1 and a length of the second side S2 equal to each other or one length thereof longer.

Figure 85:
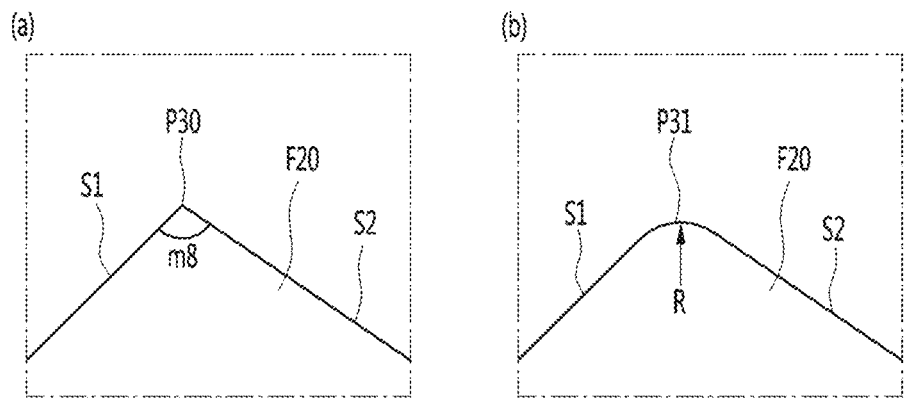
FIGS. 85 (a) and (b) are a view for explaining another example of the light extraction structure in FIG. 84.

As shown in FIG. 85, the prism-shaped pattern may be formed to have a vertex P30 as shown in (a) or a curved surface P31 having a predetermined curvature R as shown in (b). The curvature R of the curve may be in a range of 0.1 mm±0.05 mm.

Figure 86:
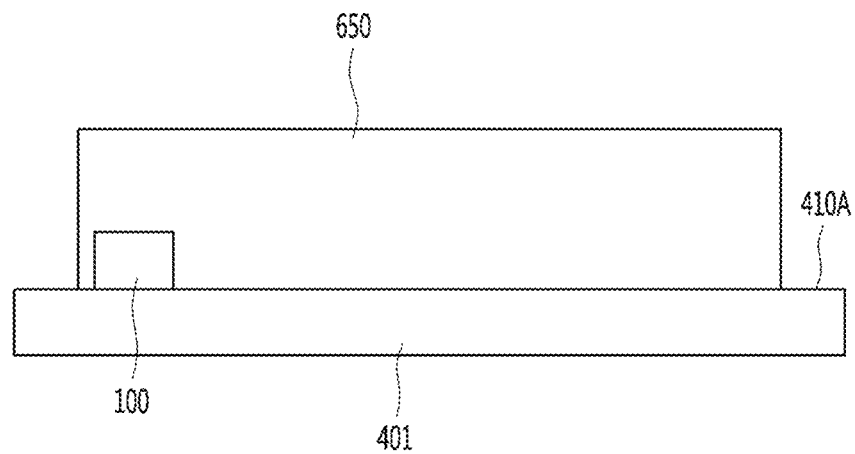
FIGS. 86 to 88 are a view for explaining the manufacturing process of the resin member of the lighting module of FIG. 80.
Figure 87:
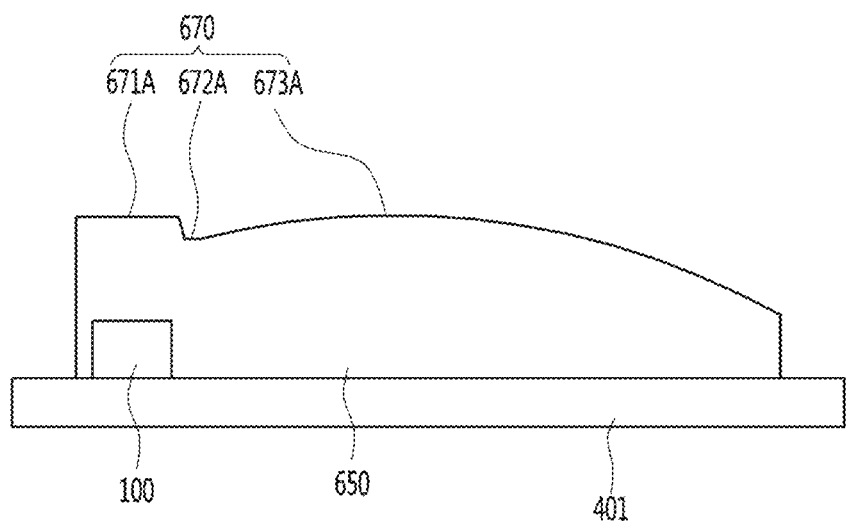
Figure 88:
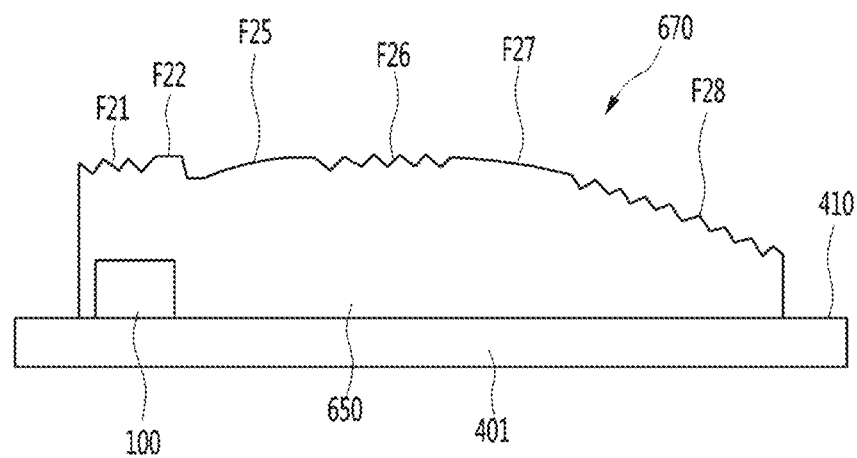

FIGS. 86 to 88 are views for explaining a process of forming an exit surface of a resin member in the lighting module of FIG. 80.

As shown in FIG. 86, the light emitting device 100 is disposed on the substrate 401 and then the resin member 650 is formed into a polygonal shape covering the light emitting device 100. Then, as shown in FIG. 87, etching is performed at different etching depths so that surfaces of regions 671A, 672A, and 673A of the exit surface 670 are exposed. Then, as shown in FIG. 88, the light extraction structures F21, F26, and F28 are selectively formed in the first, third, and fourth regions to form the exit surface of the resin member 650.

The lighting module according to the sixth embodiment may be arranged as shown in FIGS. 64 and 65, but is not limited thereto.

In illumination characteristics of the lighting module according to the sixth embodiment, as shown in FIG. 96, Example 1 is a case in which a reflective member is applied to the lighting module as shown in FIG. 68, and Example 2 is an example in which a reflective member is removed and a reflective layer of the substrate is disposed. As in Examples 1 and 2 of FIG. 96, it can be seen that the illumination characteristic in the structure as in Example 2 is higher at the angle of ±10 degrees or less with respect to the vertical straight line.

In the sixth embodiment, it is possible to increase light extraction efficiency and central luminous intensity by further adding a second region having a concave recess in the exit surface of the resin member. Further, the light extraction structure is selectively disposed at the exit surface, so that a light guide distance may be reduced and light efficiency may be improved. Furthermore, concave and/or convex curved surfaces is selectively disposed at the exit surface, and thus light extraction efficiency may be maximized and light uniformity may be increased.

Figure 89:
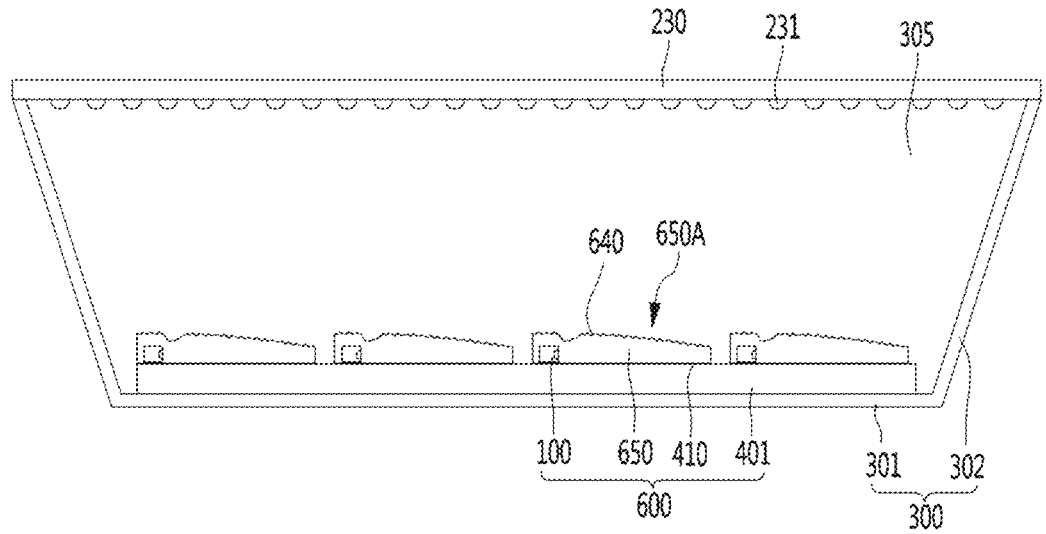
FIG. 89 is a side cross-sectional view of a lighting device having a lighting module according to an embodiment.

FIG. 89 is a view showing a lighting device having the lighting module according to the sixth embodiment. The lighting module in the lighting device will be described with reference to the configuration and description of the lighting module described above.

As shown in FIG. 89, the lighting module 600 includes the module disclosed in the embodiment, for example, includes a substrate 401, a plurality of light emitting devices 100 on the substrate 401, and a resin member 650 and a reflective member 410. A plurality of resin members 650 may be disposed on the substrate 401. As shown in FIG. 1, the lighting module 600 may be arranged with a plurality of light emitting cells 650A. The lighting module 600 may include the reflective member 410 in the form of a film or may include a reflecting member made of a solder resist material on the substrate.

An optical member 230 may be disposed on the lighting module 600, and the optical member 230 may diffuse and transmit incident light. The optical member 230 uniformly diffuses and emits the surface light source emitted through the resin member 550. The optical member 230 may include an optical lens or an inner lens, and the optical lens may condense the light toward the target or change the path of the light. The optical member 230 may include a plurality of lens portions 231 on at least one of the upper surface and the lower surface of the optical member 230, and the lens portions 231 may have a shape protruding downward from the optical member 230 or may have a shape protruding upward from the optical member 230. Such an optical member 230 may control the light distribution characteristics of the lighting device.

The lighting module 600 may include a heat dissipation plate (not shown) at a bottom surface thereof. The heat dissipation plate may include a plurality of heat dissipation fins and may dissipate heat conducted to the substrate 401. The heat dissipation plate may include at least one of metals such as aluminum, copper, magnesium, nickel, or an alloy thereof.

The lighting device includes a housing 300 having a receiving space 305, a lighting module according to an embodiment disposed at the bottom of the receiving space of the housing 300, and an optical member 230 disposed on the lighting module.

The housing 300 may be provided with an outer surface 303 of the receiving space 305 as an inclined surface with respect to a bottom surface of the housing 300. Such the inclined surface may improve light extraction efficiency. The surface of the receiving space 305 of the housing 300 may be formed with a metallic material of reflective material and the light extraction efficiency in the receiving space 305 may be improved by such metallic material. The depth of the receiving space 305 is larger than the high point of the resin member 650 and can emit light emitted through the resin member 650.

The housing 300 includes a bottom portion 301 and a reflective portion 302. The bottom portion 301 is disposed under the substrate 401. The reflective portion 302 may protrude upward from an outer periphery of the bottom portion 301 and may be disposed around the resin member 650. The housing 300 may include a metal or a plastic material, but the invention is not limited thereto. The lighting device according to the embodiment may be applied to various vehicle lighting devices such as a head lamp, a side marker lamp, a side mirror lamp, a fog lamp, a tail lamp, a stop lamp, a daytime running lamp, and a display device or a traffic lamps.

Figure 90:
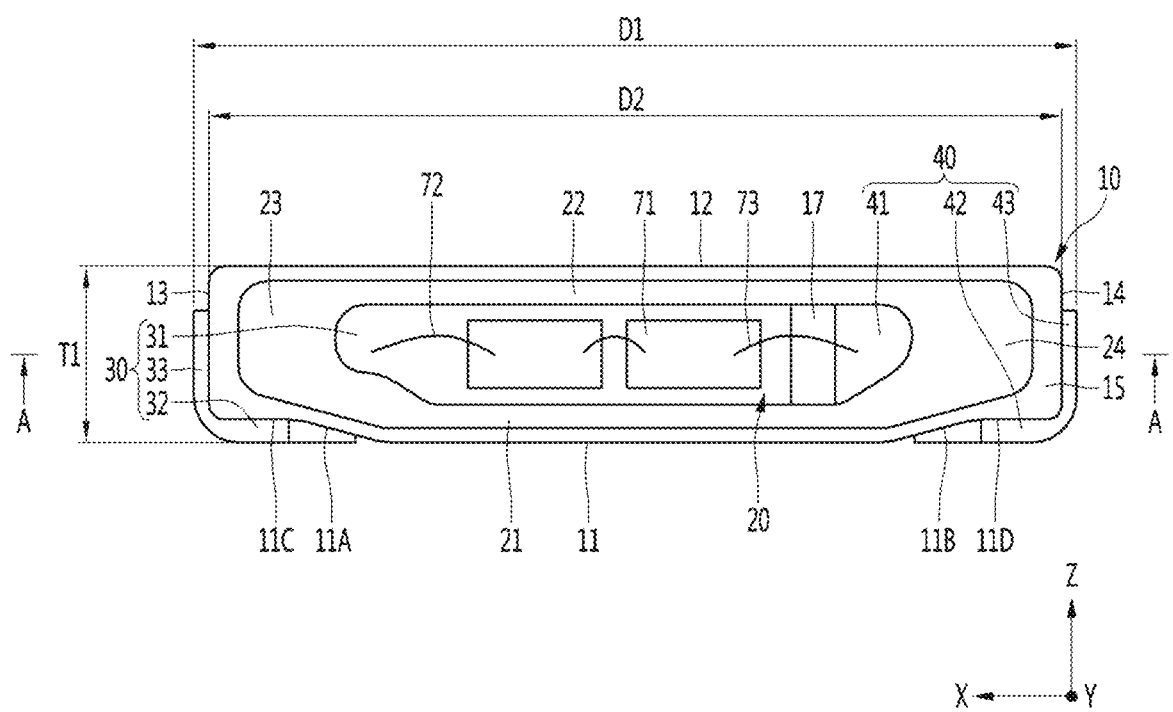
FIG. 90 is a front view showing a light emitting device of a lighting module according to an embodiment.
Figure 91:
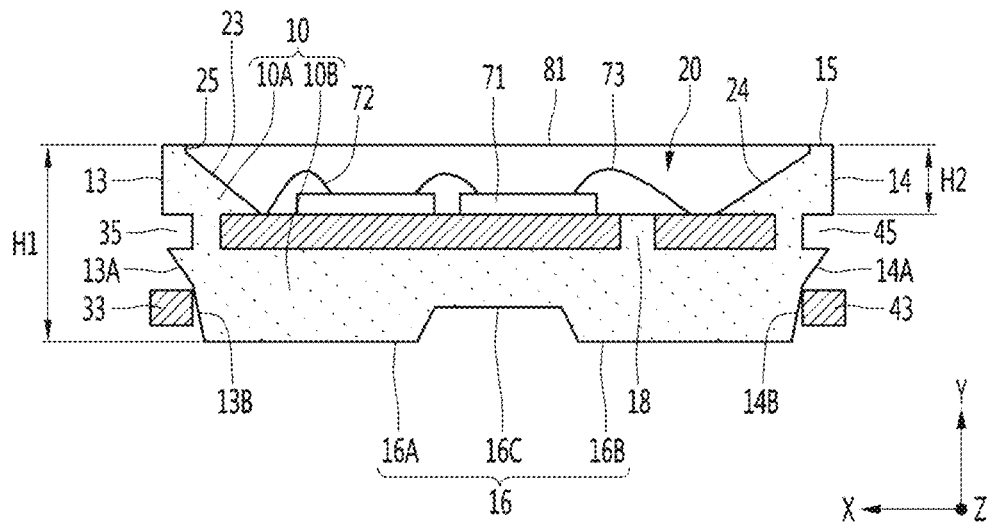
FIG. 91 is an A-A side cross-sectional view of the light emitting device of FIG. 90.

FIG. 90 is a plan view showing an example of a light emitting device of the lighting module according to the embodiment, FIG. 91 is a A-A sectional view of the light emitting device of FIG. 90, FIG. 92 is a front view in which the light emitting device of FIG. 90, FIG. 92 is an another side view of the light emitting device of FIG. 92.

Referring to FIGS. 90 and 91, the light emitting device 100 includes a body 10 having a cavity 20, a plurality of lead frames 30 and 40 in the cavity 20, and a light emitting chip 101 is disposed on at least one of the plurality of lead frames 30 and 40. The light emitting device 100 may be implemented as a side view light emitting type package.

In the light emitting device 100, a length D1 in a second direction X may be three times or more, for example, a four times or more than a thickness T1 of the third direction. The length D1 in the second direction may be 2.5 mm or more, for example, in a range of 2.7 mm to 4.5 mm. As the length D1 in the second direction of the light emitting device package 100 is provided longer, when the light emitting device 100 are arranged in the second direction, the number of the light emitting device 100 may be reduced. The light emitting device 100 can be provided with a relatively thin thickness T1 and a thickness of a light unit having the light emitting device 100 can reduce. The thickness T1 of the light emitting device 100 may be less than or equal to 2 mm.

The length D1 in the second direction of the light emitting device 100 may be greater than a length D2 of the body 10, and the thickness T1 may be equal to a thickness of the body 10, for example, the thickness in the third direction of the body 10. The length D2 of the body 10 may be three times or more than the thickness of the body 10.

As shown in FIG. 92, The body 10 includes a first body 10A having a cavity at a bottom thereof to which the lead frames 30 and 40 are exposed, and a second body 10B supporting the first body 10A. The first body 10A may be an upper portion body or a front portion body, and the second body 10B may be a lower portion body or a rear portion body. The first body 10A may be a front portion region based on the lead frames 30 and 40, and the second body 10B may be a rear region based on the lead frames 30 and 40. The first and second bodies 10A and 10B may be integrally formed. The plurality of lead frames 30 and 40 such as a first lead frame 30 and a second lead frame 40 are coupled to the body 10.

The body 10 may be formed of an insulating material. The body 10 may be formed of a reflective material. The body 10 may be formed of a material having a reflectance higher than a transmittance with respect to a wavelength emitted from the light emitting chip 71, for example, a material having a reflectance of 70% or more. In the case in which the reflectance is 70% or more, the body 10 may be defined as a non-transparent material or a reflective material. The body 10 may be formed of a resin-based insulating material, for example, a resin material such as Polyphthalamide (PPA). The body 10 may be formed of a thermosetting resin including a silicone-based, epoxy-based, or plastic material, or a material having high heat resistance and high light resistance. The body 10 includes a white-based resin. In the body 10, an acid anhydride, an antioxidant, a release agent, a light reflector, inorganic filler, a curing catalyst, a light stabilizer, a lubricant, and titanium dioxide may be selectively added. The body 10 may be formed of at least one selected from the group consisting of an epoxy resin, a modified epoxy resin, a silicone resin, a modified silicone resin, an acrylic resin, and a urethane resin. For example, an epoxy resin composed of triglycidyl isocyanurate, hydrogenated bisphenol A diglycidyl ether, etc. and an acid anhydride composed of hexahydrophthalic anhydride, 3-methylhexahydrophthalic anhydride, 4-methylhexahydrophthalic anhydride, etc. are added with 1,8-diazabicyclo (5,4,0) undecene-7 (DBU) as a curing agent, ethylene glycol as a co-catalyst, titanium oxide pigment, and glass fiber in the epoxy resin, and thus, a solid epoxy resin composition which is partially cured by heating and B stated may be used but the present invention is not limited thereto. The body 10 may be formed by suitably mixing at least one selected from the group consisting of a dispersant, a pigment, a fluorescent material, a reflective material, a light shielding material, a light stabilizer, and a lubricant in a thermosetting resin.

The body 10 may include a reflective material, such as a resin material in which a metal oxide is added, and the metal oxide may include at least one of $TiO_2$, $SiO_2$, and $Al_2O_3$. Such a body 10 may effectively reflect incident light. As another example, the body 10 may be formed of a resin material having a translucent resin material or a phosphor material converting a wavelength of incident light.

Side surfaces of the body 10 may include a first side portion 11 and a second side portion 12 opposite to the first side portion 11, and third and fourth side portions 13 and 14 adjacent to the first and second side portions 11 and 12 and disposed opposite to each other. The first and second side portions 11 and 12 are opposite to each other with respect to the first direction Y of the body 10, and the third and fourth side portions 13 and 14 may be opposite to each other with respect to the second direction X. The first side portion 11 may be a bottom of the body 10, the second side portion 12 may be an upper surface of the body 10, the first and second side portions 11 and 12 may be a long side surface having the length D2 of the body 10, and the third and fourth side portions 13 and 14 may be a short side surface having a thickness which is smaller than the thickness T1 of the body 10. The first side portion 11 may be a side surface corresponding to a circuit board.

The body 10 may include the front side portion 15 and the rear side portion 16, and the front side portion 15 may be a surface in which the cavity 20 is disposed, and may be a surface from which light is emitted. The front side portion 15 may be a front surface portion of the body 10. The rear side portion 16 may be the opposite side surface of the front side portion 15. The rear side portion 16 may be a rear surface portion of the body 10. The rear side portion 16 may include a first rear side portion 16A and a second rear side portion 16B, and a gate portion 16C between the first rear side portion 16A and the second rear side portion 16B. The gate portion 16C may be recessed between the first and second rear side portions 16A and 16B in a cavity direction than the first and second rear side portions 16A and 16B.

The first lead frame 30 includes a first lead portion 31 disposed at the bottom of the cavity 20, a first bonding portion 32 disposed on a first outer regions 11A and 11C of the first side portion 11 of the body 10, and a first heat radiating portion 33 disposed on the third side portion 13 of the body 10. The first bonding portion 32 is bent from the first lead portion 31 disposed in the body 10 and protrudes to the first side portion 11, and the first heat radiating portion 33 may be bent from the first bonding portion 32. The first outer regions 11A and 11C of the first side portion 11 may be a region adjacent to the third side portion 13 of the body 10.

The second lead frame 40 includes a second lead portion 41 disposed on the bottom of the cavity 20, a second bonding portion 42 disposed on second outer regions 11B and 11D of the first side portion 11 of the body 10, and a second heat radiating portion 43 disposed on the fourth side portion 14 of the body 10. The second bonding portion 42 is bent from the second lead portion 41 disposed in the body 10 and the second heat radiating portion 43 may be bent from the second bonding portion 42. The second outer regions 11B and 11D of the first side portion 11 may be a region adjacent to the fourth side portion 14 of the body 10.

A gap portion 17 between the first and second lead portions 31 and 41 may be formed of a material of the body 10 and may be the same horizontal surface with the bottom of the cavity 20 or may protrude, but the invention is not limited thereto. The first outer regions 11A and 11C and the second outer regions 11B and 11D has an inclined regions 11A and 11B and a flat regions 11C and 11D. The first and second bonding portions 32 and 42 of the first and second lead frames 30 and 40 may protrude through the inclined regions 11A and 11B, but the invention is not limited thereto.

Here, the light emitting chip 71 may be disposed on, for example, the first lead portion 31 of the first lead frame 30. The light emitting chip 71 may be connected to the first and second lead parts 31 and 41 by wires 72 and 73, or the light emitting chip 71 may be adhesively connected to the first lead part 31 and connected to the second lead part 41 by wire. The light emitting chip 71 may be a horizontal chip, a vertical chip, or a chip having a via-structure. The light emitting chip 71 may be mounted in a flip chip manner. The light emitting chip 71 may selectively emit light within a wavelength range of an ultraviolet ray to a visible ray. The light emitting chip 71 may emit ultraviolet light or a blue peak wavelength, for example. The light emitting chip 71 may include at least one of a group II-VI compound and a group III-V compound. The light emitting chip 71 may be formed of a compound selected from the group consisting of GaN, AlGaN, InGaN, AlInGaN, GaP, AlN, GaAs, AlGaAs, InP and mixtures thereof. The light emitting chip 71 may be disposed in the cavity 20 in one or more. The plurality of light emitting chips 71 may be disposed on at least one of the first lead frame 30 and the second lead frame 40.

In an inner side of the cavity 20, first, second, third and fourth inner sides 21, 22, 23 and 24 disposed around the cavity 20 may be inclined with respect to a horizontal straight line of an upper surface of the lead frames 30 and 40. A first inner side 21 adjacent to the first side portion 11 and a second inner side 22 adjacent to the second side portion 12 is inclined at an angle to the bottom of the cavity 20, and a third inner side 23 adjacent to the third side portion 13 and a fourth inner side 24 adjacent to the fourth side portion 14 may be inclined at an angle smaller than the inclination angle of the first and second inner sides 21 and 22. Accordingly, the first and second inner sides 21 and 22 reflect the progress of the incident light toward the first direction Y, and the third and fourth inner sides 23 and 24 may diffuse the incident light in the second direction X.

The inner side surfaces 21, 22, 23 and 24 of the cavity 20 may have a stepped region 25 vertically stepped from the front side portion 15 of the body 10. The stepped region 25 may be disposed to be stepped between the front side portion 15 of the body 10 and the inner sides 21, 22, 23 and 24. The stepped region 25 may control the directivity characteristic of the light emitted through the cavity 20.

As shown in FIG. 91, a depth H2 of the cavity 20 may be ⅓ or less of a width H1 of the body 10, for example, in a range of 0.3 mm±0.05 mm. In the case in which the depth H2 of the cavity 20 is less than the above range, it is difficult to control the directivity angle of light, and in the case of exceeding the above range, there is a problem that the width H1 of the body 10 is increased or the angle of beam spread is narrowed.

Here, the width H1 of the body 10 may be a distance between the front side portion 15 and the rear side portion 16 of the body 10. Here, the width H1 of the body 10 may be greater than the thickness T1 of the body 10, and the difference between the width H1 and the thickness T1 of the body 10 may be 0.05 mm or more, for example, in a range of 0.05 mm to 0.5 mm, and in the case in which the thickness T1 of the body 10 is greater than the difference, the thickness of the light unit may be increased, and in the case of being smaller than the above range, the heat radiation area of the lead frames 30 and 40 may be reduced.

The third and fourth side portions 13 and 14 of the body 10 may have a concave portions 35 and 45 recessed inwardly, and fingers supporting the body 10 may be inserted into the concave portions 35 and 45 during the injection process of the body 10. The concave portions 35 and 45 may be disposed on extension line extended parallel with the first and second lead portions 31 and 41 of the first and second lead frames 30 and 40. The concave portions 35 and 45 may be disposed to be spaced apart from the first and second lead portions 31 and 41. A depth of the concave portions 35 and 45 may be formed in a depth through which a portion of the concave portions 35 and 45 may be overlapped with the cavity 20, for example, a portion of the cavity 20 in a vertical direction, but it is not limited thereto.

A rear receiving region of the third and fourth side portions 13 and 14 of the body 10 include first regions 13A and 14A inclined from the third side portion 13 and the fourth side portion 14, and second regions 13B and 14B inclined from the first regions 13A and 14A.

The light emitting chip 71 disposed in the cavity 20 of the light emitting device 100 according to the embodiment may be provided singularly or in plural. The light emitting chip 71 may be selected from, for example, a red LED chip, a blue LED chip, a green LED chip, and a yellow green LED chip.

A molding member 81 is disposed in the cavity 20 of the body 10, and the molding member 81 includes a light transmitting resin such as silicone or epoxy and may be formed in a single layer or multiple layers. A phosphor may be included on the molding member 81 or the light emitting chip 71 for changing the wavelength of emitted light, and the phosphor excites a part of the light emitted from the light emitting chip 71 and emits the excited light as light of a different wavelength. The phosphor may be selectively formed from a quantum dot, a YAG, a TAG, a silicate, a nitride, and an oxy-nitride-based material. The phosphor may include at least one of a red phosphor, a yellow phosphor, and a green phosphor, but the invention is not limited thereto. The surface of the molding member 61 may be formed in a flat shape, a concave shape, a convex shape, or the like, but is not limited thereto. As another example, a translucent film having a phosphor may be disposed on the cavity 20, but the present invention is not limited thereto.

A lens may be further formed on the body 10, and the lens may include a concave and/or convex lens structure and may adjust the light distribution of the light emitted from the light emitting device 100.

A semiconductor device such as a light receiving device or a protection device may be mounted on the body 10 or any one of the lead frames, and the protection device may be implemented as a thyristor, a Zener diode, or a TVS (Transient Voltage Suppression), and the Zener diode protects the light emitting chip 71 from electrostatic discharge (ESD).

Referring to FIGS. 92 and 93, at least one or a plurality of light emitting device packages 100 is disposed on the substrate 201. The substrate 201 includes a board on which a circuit pattern is printed on an insulating layer, and may include, for example, a resin-based printed circuit board (PCB), a metal core PCB, a flexible PCB, a ceramic PCB, and an FR-4 substrate.

The first and second lead portions 33 and 43 of the light emitting device 100 are bonded to electrode patterns 213 and 215 of the substrate 201 with solder or a conductive tape which is conductive bonding members 203 and 205.

Figure 94:
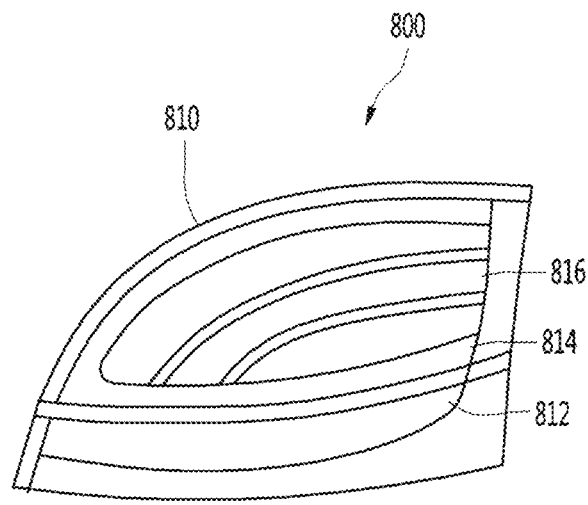
FIG. 94 is a view showing a lamp having a lighting device provided with a lighting module according to an embodiment.

FIGS. 94 and 95 are a views showing of a vehicle lamp to which the lighting module or a lighting device according to the embodiment is applied.

Referring to FIGS. 94 and 94, a tail lamp 800 in a vehicle 900 may include a first lamp unit 812, a second lamp unit 814, a third lamp unit 816, and a housing 810. Here, the first lamp unit 812 may be a light source serving as a turn signal lamp, the second lamp unit 814 may be a light source serving as a side marker lamp, and the third lamp unit 816 may be a light source serving as a stop lamp, but is not limited thereto. At least one or all of the first to third lamp units 812, 814, and 816 may include the lighting module disclosed in an embodiment.

The housing 810 accommodates the first to third lamp units 812, 814, and 816, and may be made of a light transmitting material. At this point, the housing 810 may have a curve according to a design of a vehicle body, and the first to third lamp units 812, 814, and 816 may have a curved surface light source according to a shape of the housing 810. Such a vehicle lamp may be applied to a turn signal lamp of a vehicle when the lamp unit is applied to a tail lamp, a stop lamp, or a turn signal lamp of a vehicle.

Here, in a safety standard of the vehicle lamp, when the light is measured with reference to the front light, the light distribution standard of the tail lamp is in a range of 4 to 5 candelas (cd), the light distribution standard of the brake lamp is in a range of 60 to 80 candelas (cd). It is possible to provide an average luminance distribution of 28000 nits or more on the lighting module and the lens according to the embodiment, and to provide a light distribution of 50 candelas or more. The lamp, such as the brake lamp, the tail lamp, and the like may provide brightness within the vehicle safety standards.

The characteristics, structures and effects described in the above-described embodiments are included in at least one embodiment but are not limited to one embodiment. Furthermore, the characteristic, structure, and effect illustrated in each embodiment may be combined or modified for other embodiments by a person skilled in the art. Thus, it would be construed that contents related to such a combination and such a modified example are included in the scope of the invention.

In addition, embodiments are mostly described above. However, they are only examples and do not limit the invention. A person skilled in the art may appreciate that several variations and applications not presented above may be made without departing from the essential characteristics of the embodiments. For example, each component particularly represented in the embodiments may be varied. In addition, it should be construed that differences related to such a variation and such an application are included in the scope of the invention defined in the following claims.

INDUSTRIAL APPLICABILITY

The present invention may be used in a lighting module or a lighting device that provides a surface light source or a light source having a constant line width.

The lighting module or lighting device of the present invention may be used for various kinds of lamps.

The lighting module or lighting device of the present invention may be used in a vehicle lamp.

The invention claimed is:
1. A lighting module comprising:
a substrate;
a light emitting device disposed on the substrate; and
a resin member disposed on the substrate and the light emitting device,
wherein the resin member includes a plurality of side surfaces and an exit surface on an upper portion thereof,
the plurality of side surfaces of the resin member include a first side surface adjacent to the light emitting device, a second side surface facing the first side surface, and a third side surface and a fourth side surface disposed between the first and second side surfaces and facing each other,
the exit surface of the resin member includes a light extraction structure having a concavo-convex pattern disposed in a first direction,
the light emitting device includes an emitting region facing to a portion of the second side surface in the first direction, and
a thickness of the second side surface is smaller than that of the first side surface in the resin member,
wherein the concavo-convex pattern has a long length in a second direction orthogonal to the first direction,
wherein the light emitting device, the resin member, and the substrate overlap in a vertical direction, and
wherein an upper end height of the second side surface of the resin member is lower than an upper end height of the first side surface.
2. The lighting module of claim 1, wherein a thickness of the resin member is a gradually smaller as it is farther from the light emitting device, and
wherein a distance the substrate and the exit surface of the resin member is gradually smaller as a distance from the light emitting device to the second side surface increases.
3. The lighting module of claim 2, comprising at least one of a multi-layered reflective member and a single-layered reflective layer between the resin member and the substrate.
4. The lighting module of claim 1, wherein the resin member is arranged in plural in the first direction on the substrate,
the light emitting device is disposed in each of the plurality of resin members, and
the light emitting devices disposed in each of the resin members is disposed in the first direction.
5. The lighting module of claim 1, wherein the resin member includes a first region in which the light emitting device is disposed, and a second region between the first region and the second side surface,
the light extraction structure is disposed on the first and second regions, and
the light extraction structure of the second region has a gradually lower height as it is farther from the light emitting device.
6. The lighting module of claim 1, wherein the resin member includes first and second resin members adjacent to each other,
the light emitting device includes a first light emitting device disposed adjacent to a first side surface of the first resin member and a second light emitting device disposed adjacent to a first side surface of the second resin member, and
the first and second resin members include a protrusion portion covering the first and second light emitting devices.
7. The lighting module of claim 6, wherein the first resin member has a concave recess in a direction of the first light emitting device from the second side surface,
a protrusion portion of the second resin member is disposed in the recess of the first resin member, and
wherein the protrusion portion of the second resin member is protruded in a direction of the first light emitting device,
an upper surface of the protrusion portion has a rough surface.
8. The lighting module of claim 1, wherein the exit surface of the resin member includes a first region adjacent to the first side surface, a second region overlapped with the light emitting device in the vertical direction, and a third region between the second region and the third side surface,
the second region includes at least one of a concave portion and a convex portion,
the concave portion has a concave curved surface and a long length in the second direction of the resin member, and
the second region is disposed lower than an upper surface of the first region.
9. The lighting module of claim 1, wherein the exit surface of the resin member includes a plurality of concave portions having a concave curved surface and a convex portion disposed between the concave portions,
the concave portions have a long length in the second direction, and is alternately arranged in the first direction from the first side surface toward the second side surface of the resin member,
the exit surface of the resin member includes a first region including a concave portion adjacent to the first side surface and at least a portion of which is overlapped with the light emitting device in the vertical direction, a second region including a region in which a virtual straight line connecting at least two uppermost ends of the convex portions is inclined, a third region including at least one concave portion disposed between the second region and the second side surface, and a fourth region including at least one concave portion disposed between the third region and the second side surface.

10. The lighting module of claim 9, wherein a distance between the substrate and an uppermost end of the convex portion adjacent to the second region in the third region is smaller than a distance between the substrate and the uppermost end of the convex portion adjacent to the fourth region, and a height of the convex portion disposed in the first region is higher than a height of the convex portion disposed in the third region, and the convex portion disposed in the fourth region has a gradually lower height as it is adjacent to the second side surface of the resin member.

11. The lighting module of claim 1, wherein the exit surface of the resin member includes a first region at least a portion of which is overlapped with the light emitting device in the vertical direction, a second region including a concave portion having a predetermined depth in a direction of the substrate between the first region and the second side surface, and a third region disposed between the second region and the second side surface, wherein the first region includes the light extraction structure, the second region has a height lower than a height of an uppermost end of the first region, the concave portion of the second region includes a first reflective surface having a surface inclined in a direction toward the substrate, and a second reflective surface having a surface inclined in a direction away from the substrate, wherein the first and second reflective surfaces have a long length in the second direction, the light extraction structure disposed in the third region has a long length in the second direction and is arranged in the first direction, and a lowermost end of the concave portion is higher than an upper surface of the light emitting device and is not overlapped with the light emitting device and the substrate in the vertical direction.

12. A lighting module comprising:
a substrate;
a plurality of light emitting devices disposed on the substrate; and
a resin member disposed on the substrate and the plurality of light emitting devices,
wherein the resin member includes a plurality of side surfaces and an exit surface on an upper portion,
wherein the exit surface of the resin member includes a light extraction structure,
wherein the plurality of light emitting devices includes a first light emitting device and a second light emitting device spaced from the first light emitting device in a first direction,
wherein the resin member includes a first resin member surrounding a periphery of the first light emitting device and a second resin member surrounding a periphery of the second light emitting device,
wherein an exit surface of each of the first and second resin members includes the light extraction structure,
wherein a height of a region adjacent to the first light emitting device on the exit surface of the first resin member is lower than a height of a region adjacent to the second light emitting device.

13. The lighting module of claim 12, wherein the first resin member is in contact with a side surfaces and an upper surface of the first light emitting device, and
the second resin member contacts a side surfaces and an upper surface of the second light emitting device.

14. The lighting module of claim 12, wherein the exit surface of each of the first and second resin members includes a first region overlapping with the light emitting device in the vertical direction and a second region from the first region adjacent to the second light emitting device, and
wherein the second region of the exit surface comprises an inclined structure.

15. The lighting module of claim 14, wherein the first and second regions are lower than a high point of the first resin member,
wherein the high point of the first resin member is disposed between the first and second regions,
wherein a length of the second region in the first direction is greater than a length of the first region.

16. The lighting module of claim 15, wherein the first resin member includes first and second side surfaces facing each other in the first direction and third and fourth side surfaces facing each other in a second direction orthogonal to the first direction,
wherein the first light emitting device includes an emission region facing the second side surface,
wherein the first side surface being adjacent to the first light emitting device,
wherein the second side surface is closer to the second light emitting device than the first light emitting device, and
wherein a thickness of the second side surface is less than a thickness of the first side surface.

17. The lighting module of claim 16, wherein the first resin member has a recess recessed from the second side surface toward the first light emitting device,
wherein each of the first and second resin members includes a protrusion portion on which the first and second light emitting devices are disposed,
wherein the protrusion portion of the second resin member is disposed in a recess of the first resin member,
wherein the protrusion portion of the second resin member protrudes toward the first light emitting device, and
wherein an upper surface of the protrusion portion has a rough surface.

18. The lighting module of claim 16, wherein the exit surface of the resin member includes a third region between the high point and the first region,
wherein the third region includes at least one of a concave portion and a convex portion,
wherein the concave portion has a concave curved surface and has a long length in the second direction of the resin member, and
wherein the third region is disposed lower than an upper surface of the first region.

19. The lighting module of claim 15, wherein the first and second resin members are connected to each other or separated from each other.

20. The lighting module of claim 15, comprising a reflecting member disposed between the resin member and the substrate,
wherein the light extracting structure comprises a prismatic or hemispherical groove.

* * * * *